Dec. 31, 1968 U. KRAMMER 3,419,850
PROGRAMMABLE COMPUTER UTILIZING NONADDRESSABLE REGISTERS
Filed Oct. 21, 1965 Sheet 1 of 125

JAN KRAMMER
INVENTOR

BY Charles R. [signature]
ATTORNEY

Dec. 31, 1968 J. KRAMMER 3,419,850

PROGRAMMABLE COMPUTER UTILIZING NONADDRESSABLE REGISTERS

Filed Oct. 21, 1965 Sheet 6 of 125

Dec. 31, 1968 J. KRAMMER 3,419,850

PROGRAMMABLE COMPUTER UTILIZING NONADDRESSABLE REGISTERS

Filed Oct. 21, 1965 Sheet 8 of 125

PROGRAMMABLE COMPUTER UTILIZING NONADDRESSABLE REGISTERS

PROGRAMMABLE COMPUTER UTILIZING NONADDRESSABLE REGISTERS

Filed Oct. 21, 1965

Dec. 31, 1968 J. KRAMMER 3,419,850

PROGRAMMABLE COMPUTER UTILIZING NONADDRESSABLE REGISTERS

Filed Oct. 21, 1965

Sheet 42 of 125

INSTRUCTION B14 RA PLUS RP INTO RA
COMMAND LEVELS H9 H12 H14 H18 H19

| FIG. | OPERATION | SIGNAL |
|---|---|---|
| 61 | PATCH | B14 |
| 61 | B14 | YO |
| 61 | B14 | Z1 |
| 49c | YO | H9 H12 H18 |
| 49c | YO•Z1 | H14 H19 |
| 48 | PO•H19 | G9 |
| 42 | G9 | 0 INTO A |
| 48 | PO•H12 | G12 |
| 45 | G12 | S(R) |
| 48 | P1•H19 | G16 |
| 45 | G16 | READ |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A DOWN TO ZERO |
| 43 | S(A) | COUNTS B UP TO An |
| 48 | P3•H19 | G15 |
| 45 | G15 | WRITE |
| 48 | P4•H14 | G11 |
| 43 | G11 | 0 INTO CRb |
| 43 | 0 INTO CRb | S(B) |
| 43 | Bd BAR | 1 INTO CRa |
| 48 | P4•H12 | G12 |
| 45 | G12 | S(R) |
| 48 | P5•H18 | G16 |
| 45 | G16 | READ |
| 48 | P6•H14 | G17 |
| 42 | G17 | 0 INTO S(P) |
| 59 | 0 INTO S(P) | ENABLES S(A)•DISABLES T(P) |
| 42 | S(A) | COUNTS A DOWN TO ZERO |
| 43 | S(A) | COUNTS B UP TO An |
| 43 | Bd BAR | 1 INTO CRa |
| 48 | P7•H18 | G15 |
| 45 | G15 | WRITE |
| 48 | P7•H14 | G13 |
| 43 | G13 | 0 INTO CRa |
| 43 | CRa BAR | 1 INTO CRb |
| 48 | P8•H18 | G10 |
| 43 | G10 | 0 INTO B |
| 48 | P8•H9 | G2 |
| 46 | G2 | S(D) |
| REPEAT TILL D(0) | | |
| 61 | YO•Z1 | YO•Z1-6 |
| 51 | P9•DO•YO•Z1-6 | S(I) |

FIG. 63

INSTRUCTION B15 RP MINUS RA INTO RA
COMMAND LEVEL H9 H11 H12 H14 H18 H19

| FIG. | OPERATION | SIGNAL |
|---|---|---|
| 61 | PATCH | B15 |
| 61 | B15 | Y0 |
| 61 | B15 | Z2 |
| 49c | Y0 | H9 H12 H18 |
| 49c | Y0•Z2 | H11 H14 H19 |
| 48 | P0•H19 | G9 |
| 42 | G9 | 0 INTO A |
| 48 | P0•H11•D1 | G14 |
| 43 | G14 | 1 INTO CRb |
| 48 | P0•H12 | G12 |
| 45 | G12 | S(R) |
| 48 | P1•H19 | G16 |
| 45 | G16 | READ |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A DOWN TO ZERO |
| 43 | S(A) | COUNTS B UP TO An |
| 48 | P3•H19 | G15 |
| 45 | G15 | WRITE |
| 48 | P4•H14 | G11 |
| 43 | G11 | 0 INTO CRb |
| 43 | CRb BAR | S(B) |
| 43 | Bd BAR | 1 INTO CRa |
| 48 | P4•H12 | G12 |
| 45 | G12 | S(R) |
| 48 | P5•H18 | G16 |
| 45 | G16 | READ |
| 48 | P6•H11 | G19 |
| 42 | G19 | COUNT A UP TO 9 A NEG BAR |
| 48 | P6•H14 | G17 |
| 59 | 0 INTO S(P) | ENABLES S(A)•DISABLES T(P) |
| 42 | S(A) | COUNTS A UP TO 9 |
| 43 | S(A) | COUNTS B UP TO An COMPLEMENT |
| 43 | Bd BAR | 1 INTO CRa |
| 48 | P7•H18 | G15 |
| 45 | G15 | WRITE |
| 48 | P7•H14 | G13 |
| 43 | G13 | 0 INTO CRa |
| 43 | CRa BAR | 1 INTO CRb |
| 48 | P8•H18 | G10 |
| 43 | G10 | 0 INTO B |
| 48 | P8•H9 | G2 |
| 46 | G2 | S(D) |
| REPEAT TILL D(0) | | |
| 61 | Y0•Z2 | Y0•Z1-6 |
| 51 | P9•D0•Y0 • Z1-6 | S(I) |

FIG_64

INSTRUCTION B16 0 INTO RA
COMMAND LEVEL H9 H12 H18

| FIG. | OPERATION | SIGNAL |
|---|---|---|
| 61 | PATCH | B16 |
| 61 | B16 | Y0 |
| 49c | $\underline{Y0}$ | H9 H12 H18 |
| 48 | $\overline{P0}$•H12 | G12 |
| 45 | G12 | S(R) |
| 48 | P4•H18 | G9 |
| 42 | G9 | 0 INTO A |
| 48 | P4•H12 | G12 |
| 45 | G12 | S(R) |
| 48 | P5•H18 | G16 |
| 45 | $\underline{G16}$ | READ |
| 48 | $\overline{P7}$•H18 | G15 |
| 45 | $\underline{G15}$ | WRITE |
| 48 | $\overline{P8}$•H18 | G10 |
| 43 | $\underline{G10}$ | 0 INTO B |
| 48 | $\overline{P8}$•H9 | G2 |
| 46 | G2 | S(D) |
| REPEAT TILL D(0) | | |
| 61 | Y0•Z3 | Y0•Z1-6 |
| 51 | P9•D0•Y0•Z1-6 | S(I) |

FIG. 65

INSTRUCTION B17 LSD5 PLUS RA INTO RA
COMMAND LEVEL H9 H12 H14 H18

| FIG. | OPERATION | SIGNAL |
|---|---|---|
| 61 | PATCH | B17 |
| 61 | B17 | YO |
| 61 | B17 | Z4 |
| 49c | YO | H9 H12 H18 |
| 49c | YO•Z4 | H14 |
| 43 | $\overline{FO}$•YO•Z4•D1 | 5 INTO B |
| 48 | $\overline{FC}$•H12 | G12 |
| 45 | G12 | S(R) |
| 48 | P4•H18 | G9 |
| 42 | G9 | O INTO A |
| 48 | P4•H14 | G11 |
| 43 | G11 | O INTO CRb |
| 43 | CRb BAR | S(B) |
| 43 | Bd BAR | 1 INTO CRa |
| 48 | P4•H12 | G12 |
| 45 | G12 | S(R) |
| 48 | P5•H18 | G16 |
| 45 | G16 | READ |
| 48 | P6•H14 | G17 |
| 42 | G17 | O INTO S(P) |
| 59 | O INTO S(P) | ENABLES S(A)•DISABLES T(P) |
| 42 | S(A) | COUNTS A DOWN TO ZERO |
| 43 | S(A) | COUNTS B UP TO An |
| 43 | Bd BAR | 1 INTO CRa |
| 48 | $\overline{P7}$•H18 | G15 |
| 45 | G15 | WRITE |
| 48 | $\overline{P7}$•H14 | G13 |
| 43 | G13 | O INTO CRa |
| 43 | CRa BAR | 1 INTO CRb |
| 48 | $\overline{P8}$•H18 | G10 |
| 43 | G10 | O INTO B |
| 48 | $\overline{P8}$•H9 | G2 |
| 46 | G2 | S(D) |
| REPEAT TILL D(O) | | |
| 61 | YO•Z4 | YO•Z1-6 |
| 51 | P9•DO•YO•Z1-6 | S(I) |

FIG. 66

INSTRUCTION B18 .1 X RA INTO RA
COMMAND LEVEL H6 H9 H12 H18 H17

| FIG. | OPERATION | SIGNAL |
|---|---|---|
| 61 | PATCH | B18 |
| 61 | B18 | Y0 |
| 61 | B18 | Z5 |
| 61 | Z5 | Z5-8 |
| 49c | Y0 | H9 H12 H18 |
| 49c | Y0•Z5 | H6 |
| 49c | $\overline{Y0}$•Z5-8 | H17 |
| 48 | $\overline{P0}$•H6 | G6 |
| 46 | G6 | 1 INTO D NEG (COUNT DOWN) |
| 48 | $\overline{P0}$•H12 | G12 |
| 45 | G12 | S(R) |
| 48 | P2•H17 | G17 |
| 42 | G17 | 0 INTO S(P) |
| 59 | 0 INTO S(P) | ENABLES S(A)•DISABLES T(P) |
| 42 | S(A) | COUNTS A DOWN TO ZERO |
| 43 | S(A) | COUNTS B UP TO An |
| 48 | P4•H12 | G12 |
| 45 | G12 | S(R) |
| 48 | P5•H18 | G16 |
| 45 | G16 | READ |
| 48 | $\overline{P7}$•H18 | G15 |
| 45 | G15 | WRITE |
| 48 | $\overline{P8}$•H18 | G10 |
| 43 | G10 | 0 INTO B |
| 48 | $\overline{P8}$•H9 | G2 |
| 46 | G2 | S(D) |
| REPEAT TILL D(0) | | |
| 61 | Y0•Z5 | Y0•Z1-6 |
| 51 | P9•D0•Y0•Z1-6 | S(I) |
| 46 | P9•S(I) | D NEG BAR (COUNT UP) |

FIG. 62

INSTRUCTION B19 10 X RA INTO RA (SL 1 X)
COMMAND LEVELS H9 H12 H18 H17

| FIG. | OPERATION | SIGNAL |
|---|---|---|
| 61 | PATCH | B19 |
| 61 | B19 | YO |
| 61 | B19 | Z6 |
| 61 | Z6 | Z5-8 |
| 49c | YO | H9 H12 H18 |
| 49c | Z5-8 | H17 |
| 48 | $\overline{\text{PO}}$•H12 | G12 |
| 45 | G12 | S(R) |
| 48 | P2•H17 | G17 |
| 42 | G17 | O INTO S(P) |
| 59 | O INTO S(P) | ENABLES S(A)•DISABLES T(P) |
| 42 | S(A) | COUNTS A DOWN TO ZERO |
| 43 | S(A) | COUNTS B UP TO An |
| 48 | P4•H12 | G12 |
| 45 | G12 | S(R) |
| 48 | P5•H18 | G16 |
| 45 | G16 | READ |
| 48 | $\overline{\text{P7}}$•H18 | G15 |
| 45 | G15 | WRITE |
| 48 | $\overline{\text{P8}}$•H18 | G10 |
| 43 | G10 | O INTO B |
| 48 | $\overline{\text{P8}}$•H9 | G2 |
| 46 | G2 | S(D) |
| REPEAT TILL D(O) | | |
| 61 | YO•Z6 | YO•Z1-6 |
| 51 | P9•DO•YO•Z1-6 | S(I) |

FIG. 68

INSTRUCTION B20 .01 X RA INTO RA (SR 2X)
COMMAND LEVELS H6 H9 H12 H18
PHASE COUNTER HS

| FIG. | OPERATION | SIGNAL |
|---|---|---|
| 61 | PATCH | B20 |
| 61 | B20 | Y0 |
| 61 | B20 | Z7 |
| 61 | Z7 | Z5-8 |
| 49c | Y0 | H9 H12 H18 |
| 49c | Y0•Z5 | H6 |
| 49c | $\overline{Y0}$•Z5-8 | H17 |
| 48 | $\overline{P0}$•H6 | G6 |
| 46 | G6 | 1 INTO D NEG (COUNT DOWN) |
| 48 | $\overline{P0}$•H12 | G12 |
| 45 | G12 | S(R) |
| 48 | P2•H17 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP |
| 48 | P4•H12 | G12 |
| 45 | G12 | S(R) |
| 48 | P5•H18 | G16 |
| 45 | G16 | READ |
| 48 | $\overline{P7}$•H18 | G15 |
| 45 | G15 | WRITE |
| 48 | $\overline{P8}$•H18 | G10 |
| 43 | G10 | 0 INTO B |
| 48 | $\overline{P8}$•H9 | G2 |
| 46 | G2 | S(D) |
| REPEAT TILL D(0) | | |
| 51 | P9•Y0•D0•Z7 | S(HS) |
| REPEAT TILL D(0) | | |
| 51 | P9•Y0•D0•Z7 | S(HS) |
| 51 | P9•HS1•D0 | S(I) |
| 46 | P9•S(I) | D NEG BAR (COUNT UP) |

FIG. 69

INSTRUCTION B21 100 X RA INTO RA (SL 2X)
COMMAND LEVELS H9 H12 H18
PHASE COUNTER HS

| FIG. | OPERATION | SIGNAL |
|---|---|---|
| 61 | PATCH | B21 |
| 61 | B21 | Y0 |
| 61 | B21 | Z8 |
| 61 | Z8 | Z5-8 |
| 49c | Y0 | H9 H12 H18 |
| 49c | Z5-8 | H17 |
| 48 | $\overline{P0}$•H12 | G12 |
| 45 | G12 | S(R) |
| 48 | P2•H17 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP |
| 48 | P4•H12 | G12 |
| 45 | G12 | S(R) |
| 48 | P6•H18 | G16 |
| 45 | G16 | READ |
| 48 | $\overline{P7}$•H18 | G15 |
| 45 | G15 | WRITE |
| 48 | $\overline{P8}$•H18 | G10 |
| 43 | G10 | 0 INTO B |
| 48 | $\overline{P8}$•H9 | G2 |
| 46 | G2 | S(D) |
| REPEAT TILL D(0) | | |
| 51 | P9•Y0•D0Z8 | S(HS) |
| REPEAT TILL D(0) | | |
| 51 | P9•Y0•D0•Z8 | S(HS) |
| 51 | P9•HS1•D0 | S(I) |

FIG. 20

INSTRUCTION B22 O INTO I (ITERATE)

| FIG. | OPERATION | SIGNAL |
|---|---|---|
| 61 | PATCH | B22 |
| 61 | B22 | YO |
| 61 | B22 | Z9 |
| 47 | P8•YO•Z9 | 1 INTO IPL |
| 52b | P9•IPL | 1 INTO OSH B |
| 59 | P9•IPL | 1 INTO SS (STOPS PG) |
| 52b | OSH B | 1 INTO PR |
| 51 | PR | O INTO I |
| 51 | O INTO I | RESET INSTRUCTION COUNTER TO ZERO |

NOTE: WHEN IN PROGRAM, PR AT O AND $\overline{IPL}$ AT 1 WILL SAY 1 INTO FC, THEN WHEN IPL SETS ON THE P8, IT WILL STAY UNTIL THE FOLLOWING PO. THIS INSURES THAT THE INFORMATION IN THE FC FLIP FLOPS IS NOT DESTROYED.

| FIG. | OPERATION | SIGNAL |
|---|---|---|
| 52b | OSH B TIMES OUT | O INTO PR |
| 59 | $\overline{OSH\ B}$ | O INTO SS (STARTS PG) |
| 47 | PO | O INTO IPL |

FIG_21

INSTRUCTION C14 MULTIPLICATION (RP)X(RA) INTO RA
COMMAND LEVELS Y1 Z1
PHASE COUNTER HM

| FIG. | OPERATION | SIGNAL |
|---|---|---|
| 61 | PATCH | C14 |
| 61 | C14 | Y1 |
| 61 | C14 | Z1 |
| 50 | P9•D0•Y1•Z1•$\overline{HMc}$ | S(HM) HM0 IS NOT USED.ON THE P9 THE HM IS STEPPED FROM ZERO TO 1. |
| 50 | $\overline{HMc}$•$\overline{HMb}$•HMa | HM1 |
| 49b | HM1 | H7 H9 H18 H19 |
| 44 | P0•HM1 | 1 INTO C |
| 44 | 1 INTO C | $\overline{Cd}$•$\overline{Cc}$•$\overline{Cb}$•Ca |
| 48 | P0•H19 | G9 |
| 42 | G9 | 0 INTO A |
| 48 | P1•H19 | G16 |
| 45 | G16 | READ (RA INTO A) |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P3•H19 | G15 |
| 45 | G15 | WRITE (B INTO RA) |
| 48 | P4•H7 | G3 |
| 45 | G3 | S(Y) (LOOK AT S0) |
| 48 | P5•H18 | G16 |
| 45 | G16 | READ (S0 INTO A) (CLEAR S0) |
| 48 | P7•H18 | G15 |
| 45 | G15 | WRITE (B INTO S0) |
| 48 | P8•H18 | G10 |
| 43 | G10 | 0 INTO B |
| 48 | P8•H9 | G2 |
| 46 | G2 | S(D) |
| 48 | P8•H7 | G3 |
| 45 | G3 | S(Y) (LOOK AT RA) |
| REPEAT TILL D(0) | | |
| 50 | P9•D0•Y1•Z1•$\overline{HMc}$ | S(HM) TO 2 |

FIG. 22-1

MULTIPLICATION (CONTINUED)
HM2 O INTO RA
COMMAND LEVELS H9 H18

| FIG. | OPERATION | SIGNAL |
|---|---|---|
| 49b | HM2 | H9 H18 |
| 48 | P4•H18 | G9 |
| 42 | G9 | O INTO A |
| 48 | P5•H18 | G16 |
| 45 | G16 | READ (RA INTO A) (CLEAR RA) |
| 48 | P7•H18 | G15 |
| 45 | G15 | WRITE (O INTO RA) |
| 48 | P8•H9 | G2 |
| 46 | G2 | S(D) |
| 48 | P8•H18 | G10 |
| 43 | G10 | O INTO B |
| REPEAT TILL D(O) | | |
| 50 | P9•DO•Y1•Z1•$\overline{HMc}$ | S(HM) TO 3 |

NOTE: HM3 IS NOT USED. ON THE P9 THE HM WILL STEP FROM 3 TO 4.

FIG_22-2

MULTIPLICATION (CONTINUED)
HM4 SO/C INTO M
COMMAND LEVELS H5 H7 H18

| FIG. | OPERATION | SIGNAL |
|---|---|---|
| 50 | HM4 | HMC |
| 49b | HMC | H18 |
| 49b | HM4 | H5 H7 |
| 48 | P4•H18 | G9 |
| 42 | G9 | 0 INTO A |
| 48 | P4•H7 | G3 |
| 45 | G3 | S(Y) (LOOK AT SO) |
| 48 | P4•H5 | G8 |
| 44&46 | C•G8 | C INTO D |
| 46 | C INTO D | SET C INTO D |
| 48 | P5•H18 | G16 |
| 45 | G16 | READ (SO INTO A) |
| 48 | P6•H5 | G7 |
| 42 | A (IF RESET) | ENABLES M |
| 42 | G7 | SET 15 COMP OF A INTO M |
| 48 | P7•H18 | G15 |
| 45 | G15 | WRITE (0 INTO SO) |
| 48 | P8•H7 | G3 |
| 45 | G3 | S(Y) (LOOK AT RA) |
| 46 | P8•HM4 | 0 INTO D |
| 48 | P8•H18 | 0 INTO B |

IF THE M COUNTER RECEIVED A VALID NUMBER FROM A DURING P6 TIME, $\overline{M15}$ IS VALID.

| | | |
|---|---|---|
| 50 | P9•DO•HM4•$\overline{M15}$ | S(HM) |

IF THE M COUNTER DID NOT RECEIVE A VALID NUMBER FROM A DURING P6 TIME, M15 IS VALID.

| | | |
|---|---|---|
| 50 | HM4•M15 | ENABLE HMb |
| 50 | P9 | 1 INTO HMb (HM NOW AT 6) |

FIG. 22-3

MULTIPLICATION (CONTINUED)
HM5 (RP) PLUS (RA) INTO RA
COMMAND LEVELS H9 H12 H14 H18 H19

| FIG. | OPERATION | SIGNAL |
|---|---|---|
| 50 | HM6 | HMC |
| 49b | HMC | H18 |
| 49b | HM5 | H9 H14 H19 |
| 49b | HM5•Y1 | H12 |
| 48 | $\overline{P0}$•H19 | G9 |
| 42 | G9 | 0 INTO A |
| 48 | $\overline{P0}$•H12 | G12 |
| 45 | G12 | S(R) (LOOK AT RP) |
| 48 | P1•H19 | G16 |
| 45 | G16 | READ (RP INTO A) |
| 48 | P2•H19 | G17 |
| 42 | G17 | 0 INTO S(P) |
| 49 | 0 INTO S(P) | ENABLES S(A)•DISABLES T(P) |
| 42 | S(A) | COUNTS A DOWN |
| 43 | S(A) | COUNTS B UP TO An |
| 48 | P3•H19 | G15 |
| 45 | G15 | WRITE (B INTO RP) |
| 48 | P4•H14 | G11 |
| 43 | G11 | 0 INTO CRb |
| 43 | CRb BAR | S(B) |
| 43 | Bd BAR | 1 INTO CRa |
| 48 | P4•H12 | G12 |
| 45 | G12 | S(R) (LOOK AT RA) |
| 48 | P5•H18 | G16 |
| 45 | G16 | READ (RA INTO A) |
| 48 | P6•H14 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 43 | Bd BAR | 1 INTO CRa |
| 48 | $\overline{P7}$•H18 | G15 |
| 45 | G15 | WRITE (RP PLUS RA INTO RA) |
| 48 | $\overline{P7}$•H14 | G13 |
| 43 | G13 | 0 INTO CRa |
| 43 | CRa BAR | 1 INTO CRb |
| 48 | $\overline{P8}$•H9 | G2 |
| 46 | G2 | S(D) |
| REPEAT TILL D(0) | | |
| 42 | P9•D0•HM5 | S(M) |
| REPEAT TILL M=14 | | |
| 50 | P9•D0•HM5•M14 | S(HM) |

FIG. 72-4

MULTIPLICATION (CONTINUED)
HM6 SHIFT RIGHT 1X S(C)
COMMAND LEVELS H9 H17 H18

| FIG. | OPERATION | SIGNAL |
|---|---|---|
| 50 | HM6 | (HM6 OR 7) |
| 50 | HM6+4+5+7 | HMC |
| 49c | (HM6 OR 7) | H9 H17 |
| 49b | HMC | H18 |
| 48 | P2•H17 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P5•H18 | G16 |
| 45 | G16 | READ (RA INTO A) |
| 48 | P7•H18 | G15 |
| 45 | G15 | WRITE (B INTO RA) |
| 48 | P8•H18 | G10 |
| 43 | G10 | 0 INTO B |
| 48 | P8•H9 | G2 |
| 42 | P8•HM6 | 0 INTO M |
| 46 | G2 | S(D) |
| REPEAT TILL D(2) | | |
| 44 | $\overline{C1+2+3}$ | CP |
| 42 | P9•HM6•D2•D $\overline{NEG}$•CP | 0 INTO A |
| 46 | P9•HM6 OR 7•D2•D $\overline{NEG}$ | 12 INTO D (1 INTO Dd)•(1 INTO Dc)• (0 INTO Db)•(1 INTO Da) |
| 46 | P9•HM6 or 7•D2•D $\overline{NEG}$ | D NEG (COUNT DOWN) |
| REPEAT TILL D(0) | | |
| 44 | P9•D0•HM6 | S(C) |
| 50 | P9•D0•HM6 | S(HM) (TO7) |
| 50 | P9•D0•HM6•$\overline{C12}$ | 3 TO HM (0 INTO HMc) HM=3 |
| BACK TO HM3 TILL C=12 | | |
| 46 | P9•D0•HM6+7 | D $\overline{NEG}$ |
| 44 | C13 | 0 INTO Cc |
| 44 | Cc | 0 INTO Cd (C=1) |
| 50 | Pd•D0•HM6 | S(HM) HM=7 |

FIG. 22-5

MULTIPLICATION (CONTINUED)
HM7 SHIFT ROUND
COMMAND LEVELS H9 H17 H18

| FIG. | OPERATION | SIGNAL |
|---|---|---|
| 50 | HM7 | HM6 OR 7 |
| 50 | HM6+4+5+7 | HMC |
| 49c | HM6 OR 7 | H9 H17 |
| 49b | HMC | H18 |
| 48 | P2•H17 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P5•H18 | G16 |
| 45 | G16 | READ (RA INTO A) |
| 48 | $\overline{P7}$•H18 | G15 |
| 45 | G15 | WRITE (B INTO RA) |
| 48 | $\overline{P8}$•H18 | G10 |
| 43 | G10 | 0 INTO B |
| 48 | $\overline{P8}$•H9 | G2 |
| 46 | G2 | S(D) |
| 46 | P9•HM6+7•DO | D NEG |
| REPEAT TILL D(2) | | |
| 46 | P9•HM6 OR 7•D2•D $\overline{NEG}$ | 12 INTO D (1 INTO Dd)•(1 INTO Dc)• (0 INTO Db)•( 1 INTO Da) |
| 46 | P9•HM6 OR 7•$\overline{D2}$•D $\overline{NEG}$ | D NEG (COUNT DOWN) |
| 44 | P9•HM7•D2•D $\overline{NEG}$ | S(C) |
| REPEAT TILL $\overline{CP}$ (C4) | | |
| 44 | C4 | $\overline{CP}$ |
| 50 | $\overline{CP}$•HM7 | $\overline{CP}$•HM7 SIGNAL |
| 50 | P9($\overline{CP}$•HM7) DO | S(HM) (HM=0) |
| 51 | P9 ($\overline{CP}$•HM7) DO | S(I) |

FIG. 22-6

INSTRUCTION C12 1 INTO RMS1
COMMAND LEVELS Y1 Z2

| FIG. | OPERATION | SIGNAL |
|---|---|---|
| 61 | C12 | Y1·Z2 |
| 54 | PO·Y1·Z2 | 1 INTO RMS1 |
| 56 | $\overline{Z1}\cdot Y1$ | $\overline{Z1}\cdot Y1$ SIGNAL |
| 51 | $P9\cdot DO\cdot(\overline{Z1}\cdot Y1)$ | S(I) |
| AT THE END OF THE PROGRAM LINE, | | (EPL) |
| 59 | $\overline{X}\cdot\overline{OSHB}\cdot\overline{OSHA}\cdot\overline{BAT\ 1}\cdot\overline{BAT2}$ | 1 INTO EPL |
| 52b | 1 INTO EPL | SET EPL FF·OSHB |
| 54 | OSHB | PR |
| 54 | EPL·RMS1 | 0 INTO MSA, B, C |
| 54 | 0 INTO MSA, B, C | RESETS MSA, B, C |
| 54 | MSA, B, C RESET | RESETS RMS1 |

FIG. 23

INSTRUCTION C13 1 INTO RMS2
COMMAND LEVELS Y1 Z3

| FIG. | OPERATION | SIGNAL |
|---|---|---|
| 61 | C13 | Y1·Z3 |
| 54 | PO·Y1·Z3 | 1 INTO RMS2 |
| 56 | $\overline{Z1}\cdot Y1$ | $\overline{Z1}\cdot Y1$ SIGNAL |
| 51 | $P9\cdot DO\cdot(\overline{Z1}\cdot Y1)$ | S(I) |
| AT THE END OF THE PROGRAM LINE, | | |
| 59 | $\overline{X}\cdot\overline{OSHB}\cdot\overline{OSHA}\cdot\overline{BAT\ 1}\cdot\overline{BAT2}$ | 1 INTO EPL |
| 52b | 1 INTO EPL | SETS EPL FF·OSHB |
| 52b | OSHB | PR |
| 54 | EPL·RMS2 | 0 INTO MSX, Y, Z |
| 54 | 0 INTO MSX, Y, Z | RESETS MSX, Y, Z |
| 54 | MSX, Y, Z RESET | RESETS RMS2 |

FIG. 24

PROGRAMMABLE COMPUTER UTILIZING NONADDRESSABLE REGISTERS

INSTRUCTION C17 RESTORE PROGRAM BANK (KEYS 1-10 MSA,B,C,X,Y,Z)
COMMAND LEVELS Y1 Z4

| FIG. | OPERATION | SIGNAL |
|---|---|---|
| 61 | PATCH | C17 |
| 61 | C17 | Y1 Z4 |
| 55 | Y1·Z4 | X14 |
| 54 | PO·X14 | 1 INTO RMS1 |
| 54 | PO·X14 | 1 INTO RMS2 |
| 54 | PO·X14 | 1 INTO RPB |
| 55 | $\overline{Z1}$·Y1 | $\overline{Z1}$·Y1 SIGNAL |
| 51 | P9·DO·($\overline{Z1}$·Y1) | S(I) |
| AT THE END OF THE PROGRAM LINE, | | |
| 59 | X·$\overline{OSHA}$·$\overline{OSHB}$·$\overline{BAT\ 1}$·$\overline{BAT\ 2}$ | 1 INTO EPL |
| 52b | 1 INTO EPL | SETS EPL FF·OSHB |
| 52b | OSHB | PR |
| 54 | EPL·RMS1 | 0 INTO MSA,B,C |
| 54 | 0 INTO MSA,B,C | RESET MSA,B,C |
| 54 | EPL·RMS2 | 0 INTO MSX,Y,Z |
| 54 | 0 INTO MSX,Y,Z | RESET MSX,Y,Z |
| 54 | EPL·RPB | 1 INTO EPL·RPB |
| 59 | EPL·RPB | 0 INTO PCA |
| 59 | 0 INTO PCA | 1 INTO PCO |
| 54 | PCO·MSA,B,C·MSX,Y,Z | 0 INTO RPB |
| 54 | MSA,B,C | 0 INTO RMS1 |
| 54 | MSX,Y,Z | 0 INTO RMS2 |

FIG. 75

INSTRUCTION C18 1 INTO BAT 1 (BLOCK AUTOMATIC TAB)
COMMAND LEVELS Y1 Z5

| FIG. | OPERATION | SIGNAL |
|---|---|---|
| 61 | PATCH | C18 |
| 61 | C18 | Y1 Z5 |
| 61 | $\overline{Z1}\cdot Y1$ | $\overline{Z1}\cdot Y1$ SIGNAL |
| 59 | PO•Y1•Z5 | 1 INTO BAT 1 |
| 59 | BAT 1 | 0 INTO EPL |
| 51 | $P9\cdot DO\cdot(\overline{Z1}\cdot Y1)$ | S(I) |

WITH EPL AT ZERO WE REMAIN IN PROGRAM. WHEN THE CARRIAGE IS MOVED ACROSS A NUMBER 11 FIELD ACTUATOR, FS11 WILL OPERATE.

| | | |
|---|---|---|
| 59 | FS11 | RESETS BAT 1 FF |

FIG_26

INSTRUCTION C19 1 INTO BAT 2 (BLOCK AUTOMATIC TAB)
COMMAND LEVEL Y1 Z6

| FIG. | OPERATION | SIGNAL |
|---|---|---|
| 61 | PATCH | C19 |
| 61 | C19 | Y1 Z6 |
| 61 | $\overline{Z1}\cdot Y1$ | $\overline{Z1}\cdot Y1$ SIGNAL |
| 59 | PO•Y1•Z6 | 1 INTO BAT 2 |
| 59 | BAT 2 | 0 INTO EPL |
| 51 | $P9\cdot DO\cdot(\overline{Z1}\cdot Y1)$ | S(I) |

WITH EPL AT ZERO WE REMAIN IN PROGRAM. WHEN THE CARRIAGE IS MOVED ACROSS A NUMBER 12 FIELD ACTUATOR, FS12 WILL OPERATE.

| | | |
|---|---|---|
| 59 | FS12 | RESETS BAT 2 FF |

FIG_27

INSTRUCTION C20 TYPE AUTOMATIC DATE
COMMAND LEVELS H6 H7 H16 HO H2 H3 H4

| FIG. | OPERATION | SIGNAL |
|---|---|---|
| 61 | PATCH | C20 |
| 61 | C20 | Y1 Z7 |
| 55 | Y1•Z7 | X17 |
| 61 | X17 | Y3 |
| 61 | Y3 | Y2 OR 3 |
| 49a | $\overline{BSP}$•Y2 OR 3 | H6 |
| 49a | X17 | H7 |
| 49a | Y3 | H16 |
| | PHASE 1 | |
| 48 | $\overline{PO}$•H6 | G6 |
| 45 | G6 | D NEG |
| 48 | P4•H16 | G9 |
| 42 | G9 | O INTO A |
| 48 | P4•H16 | G10 |
| 43 | G10 | O INTO B |
| 49a | $\overline{SD}$•Y2+3 | H3 |
| 48 | P4•H3 | G2 |
| 45 | G2 | S(D) |
| 48 | P4•H7 | G3 |
| 45 | G3 | S(Y) (LOOK AT S7) |
| 53 | X17•D12•Y2 OR 3 | 1 INTO LR |
| 48 | P5•H16 | G16 |
| 45 | G16 | READ (S7 INTO A) |
| 53 | Y3•D12•X17 | H4 |
| 48 | P5•H4 | G4 |
| 52a | $\overline{G4}$ | 1 INTO SP |
| 48 | P6•H16 | G17 |
| 42 | G17 | O INTO S(P) |
| 59 | O INTO S(P) | ENABLES S(A)•DISABLES T(P) |
| 42 | S(A) | COUNTS A DOWN |
| 43 | S(A) | COUNTS B UP TO An |
| 48 | $\overline{P7}$•H16 | G15 |
| 45 | G15 | WRITE (B INTO S7) |
| IF B NOW HAS A DIGIT THEN $\overline{BO}$ | | |
| 43 | $\overline{BO}$ | HO |
| 49a | HO | HO |
| 48 | P7•HO | G1 |
| 52a | G1 | O INTO SP |
| 48 | P8•H7 | G3 |
| 45 | G3 | S(Y) (LOOK AT RA) |
| 59 | P9•LR | 1 INTO SS |
| 52a | P9•LR•Y3 | 1 INTO OP |

FIG. 78-1

TYPE AUTOMATIC DATE (CONTINUED)
INSTRUCTIONS C20

| FIG. | OPERATION | SIGNAL |
|---|---|---|
| SP FF NOT RESET ON P7 | | |
| 43 | SP | 0 INTO B (OUTPUT LINES) |
| 55 | SP | 1 INTO 8-9 LINES |
| 55 | OP·SP·CS·($\overline{Y8-12}$ OR $\overline{BCS}$ OR $\overline{Z5-8}$) | 1 INTO SP LINE |
| 62 | 1 INTO 8-9·SP LINE | TYPE SPACE |
| 62 | SPACE BAR CONTACTS SP | 1 INTO SP LINE |
| 52b | 1 INTO SP LINE | $\overline{OK}$ |
| SP FF RESET ON P7 (NUMBER WILL BE A ONE) | | |
| 43 | Ba | 1 INTO 13579 LINE |
| 43 | Bd·Bc·Bb | 1 INTO 0-1 LINE |
| 43 | 1 INTO 13579 LINE·OP·CS ($\overline{Y8-12}$ OR $\overline{BCS}$ OR $\overline{Z5-8}$) | 1 INTO 1 LINE |
| 62 | 1 INTO 1·0-1 LINE | TYPE DIGIT 1 |
| 62 | RIBBON CONTACTS CLOSE | 1 INTO RIBBON LINE |
| 52b | 1 INTO RIBBON LINE | $\overline{OK}$ |
| 52b | $\overline{OK}$ | 0 INTO OP |
| 52b | OK TIMES OUT | OK |
| 52b | OK·$\overline{OP}$ | 0 INTO SS |
| REPEAT TILL D=11 | | |

FIG. 28-2

INSTRUCTION C20 TYPE AUTOMATIC DATE (CONTINUED)
PHASE 2

| FIG. | OPERATION | SIGNAL |
|---|---|---|
| 48 | $\overline{P0}$•H6 | G6 |
| 46 | G6 | D NEG |
| 48 | P4•H16 | G9 |
| 42 | G9 | 0 INTO A |
| 48 | P4•H16 | G10 |
| 43 | G10 | 0 INTO B |
| 49a | $\overline{SD}$•Y2+3 | H3 |
| 48 | P4•$\overline{SD}$•H3 | G2 |
| 46 | G2 | S(D) D=10 |
| 48 | P4•H7 | G3 |
| 45 | G3 | S(Y) (LOOK AT S7) |
| 48 | P5•H16 | G16 |
| 45 | G16 | READ (S7 INTO A) |
| 53 | D10•X17 | DP |
| 49a | DP•LR•$\overline{BSP}$ | H2 |
| 48 | P5•H2 | G5 |
| 53 | G5 | S(SD) (S(SD) PREVENTS S(D) NEXT TIME) |
| 53 | DP•Y3 | H4 |
| 53 | SD•DP•$\overline{BSP}$ | PT |
| 48 | P5•H4 | G4 |
| 52a | G4 | 1 INTO SP |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | $\overline{P7}$•H16 | G15 |
| 45 | G15 | WRITE (B INTO S7) |
| 48 | $\overline{P8}$•H7 | G3 |
| 45 | G3 | S(Y) (LOOK AT RA) |
| 59 | P9•LR | 1 INTO SS |
| 52a | P9•LR•Y3 | 1 INTO OP |
| 43 | PT | 0 INTO B OUTPUT LINES |
| 55 | PT•X17 | 1 INTO SP OR DASH OR Pt |

NOTE: OUR EXAMPLE WILL USE DASH

| | | |
|---|---|---|
| 55 | 1 INTO DASH | 1 INTO 6-7 LINE |
| 55 | OP•DASH•CS ($\overline{Y8-12}$ OR $\overline{BCS}$ OR $\overline{Z5-8}$) | 1 INTO DASH LINE |
| 55 | RIBBON CONTACTS CLOSED | 1 INTO RIBB LINE |
| 52b | 1 INTO RIBB | $\overline{OK}$ |
| 52b | $\overline{OK}$ | 0 INTO OP |
| 52b | OK TIMES OUT | OK |
| 52b | OK•$\overline{OP}$ | 0 INTO SS |

FIG. 78-3

INSTRUCTIONS C20 TYPE AUTOMATIC DATE (CONTINUED)
PHASE 3

| FIG. | OPERATION | SIGNAL |
|---|---|---|
| 48 | $\overline{F0}$•H6 | G6 |
| 46 | G6 | D NEG |
| 48 | P4•H16 | G9 |
| 42 | G9 | 0 INTO A |
| 48 | P4•H16 | G10 |
| 43 | G10 | 0 INTO B |
| 49a | $\overline{SD}$•Y2+3 | H3 |
| 48 | P4•SD•H3 | G2 |
| 46 | G2 | S(D) |
| 48 | P4•H7 | G3 |
| 45 | G3 | S(Y) (LOOK AT S7) |
| 48 | P5 H2 | G5 |
| 53 | G5 | S(SD) |
| 45 | G16 | READ (S7 INTO A) |
| 53 | Y17•D10 | DP |
| 53 | Y3•DP | H4 |
| 48 | P5•H4 | G4 |
| 52a | G4 | 1 INTO SP |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P7•H16 | G15 |
| 45 | G15 | WRITE (B INTO S7) |
| IF B NOW HAS A DIGIT THEN $\overline{B0}$ | | |
| 43 | $\overline{B0}$ | (H0) |
| 49c | (H0) | H0 |
| 48 | P7•H0 | G1 |
| 52a | G1 | 0 INTO SP |
| 48 | P8 H7 | G3 |
| 45 | G3 | S(Y) (LOOK AT RA) |
| 59 | P9•LR | 1 INTO SS |
| 52a | P9•LR•Y3 | 1 INTO OP |
| SP FF NOT RESET ON P7 | | |
| 43 | SP | 0 INTO B (OUTPUT LINES) |
| 55 | SP | 1 INTO 8-9 LINE |
| 55 | OP•SP•CS•(Y8-12 OR $\overline{BCS}$ OR Z5-8) | 1 INTO SP LINE |
| 62 | 1 INTO 8-9•SP LINE | TYPE SPACE |
| 62 | SPACE BAR CONTACTS SP | 1 INTO SP LINE |
| 52b | 1 INTO SP LINE | $\overline{OK}$ |
| SP FF RESET ON P7 (NUMBER WILL BE A ONE) | | |
| 43 | Ba | 1 INTO 13579 LINE |
| 43 | $\overline{Bd}$•$\overline{Bc}$•$\overline{Bb}$ | 1 INTO 0-1 LINE |
| 43 | 1 INTO 13579 LINE•OP•CS (Y8-12 OR $\overline{BCS}$ OR Z5-8) | 1 INTO 1 LINE |
| 62 | 1 INTO 1•0-1 LINE | TYPE DIGIT 1 |
| 62 | RIBBON CONTACTS CLOSE | 1 INTO RIBBON LINE |
| 52b | 1 INTO RIBBON LINE | $\overline{OK}$ |
| 52b | $\overline{OK}$ | 0 INTO OP |
| 52b | OK TIMES OUT | OK |
| 52b | OK•$\overline{OP}$ | 0 INTO SS |
| REPEAT TILL D=8 | | |

FIG. 78-4

INSTRUCTION C20 TYPE AUTOMATIC DATE (CONTINUED)
PHASE 4

| FIG. | OPERATION | SIGNAL |
|---|---|---|
| 48 | $\overline{P0}$•H6 | G6 |
| 46 | G6 | D NEG |
| 48 | P4•H16 | G9 |
| 42 | G9 | 0 INTO A |
| 48 | P4•H16 | G10 |
| 43 | G10 | 0 INTO B |
| 49a | $\overline{SD}$•Y2+3 | H3 |
| 48 | P4•$\overline{SD}$•H3 | G2 |
| 46 | G2 | S(D) D=8 |
| 48 | P4•H7 | G3 |
| 45 | G3 | S(Y) (LOOK AT S7) |
| 48 | P5•H16 | G16 |
| 45 | G16 | READ (S7 INTO A) |
| 53 | D8•X17 | DP |
| 49a | DP•LR•$\overline{BSP}$ | H2 |
| 48 | P5•H2 | G5 |
| 53 | G5 | S(SD) (S(SD) PREVENTS S(D) NEXT TIME) |
| 53 | DP•Y3 | H4 |
| 48 | P5•H4 | G4 |
| 52a | $\overline{G4}$ | 1 INTO SP |
| 53 | SD•DP•$\overline{BSP}$ | PT |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | $\overline{P7}$•H16 | G15 |
| 45 | G15 | WRITE (B INTO S7) |
| 48 | $\overline{P8}$•H7 | G3 |
| 45 | G3 | S(Y) (LOOK AT RA) |
| 59 | P9•LR | 1 INTO SS |
| 52a | P9•LR•Y3 | 1 INTO OP |
| 43 | PT | 0 INTO B OUTPUT LINES |
| 55 | PT•X17 | 1 INTO SP OR DASH OR Pt |

NOTE: OUR EXAMPLE WILL USE DASH

| FIG. | OPERATION | SIGNAL |
|---|---|---|
| 55 | 1 INTO DASH | 1 INTO 6-7 LINE |
| 55 | OP•DASH•CS•($\overline{Y8-12}$ $\overline{OR}$ $\overline{BCS\ OR\ Z5-8}$) | 1 INTO DASH LINE |
| 55 | RIBBON CONTACTS CLOSE | 1 INTO RIBB LINE |
| 52b | 1 INTO RIBB | $\overline{OK}$ |
| 52b | $\overline{OK}$ | 0 INTO OP |
| 52b | OK TIMES OUT | OK |
| 52b | OK•$\overline{OP}$ | 0 INTO SS |

FIG. 28-5

INSTRUCTION C20 TYPE AUTOMATIC DATE (CONTINUED)
PHASE 5

| FIG. | OPERATION | SIGNAL |
|---|---|---|
| 48 | $\overline{P0}$•H6 | G6 |
| 46 | G6 | D NEG |
| 48 | P4•H16 | G9 |
| 42 | G9 | 0 INTO A |
| 48 | P4•H16 | G10 |
| 43 | G10 | 0 INTO B |
| 49a | $\overline{SD}$•Y2+3 | H3 |
| 48 | P4•H3 | G2 |
| 46 | G2 | S(D) |
| 48 | P4•H7 | G3 |
| 45 | G3 | S(Y) (LOOK AT S7) |
| 48 | P5•H2 | G5 |
| 53 | G5 | S(SD) |
| 48 | P5•H16 | G16 |
| 45 | G16 | READ (S7 INTO A) |
| 53 | Y17•D8 | DP |
| 53 | Y3•DP | H4 |
| 48 | P5•H4 | G4 |
| 52a | G4 | 1 INTO SP |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P7•H16 | G15 |
| 45 | G15 | WRITE (B INTO S7) |
| IF B NOW HAS A DIGIT THEN $\overline{BO}$ | | |
| 43 | $\overline{BO}$ | (HO) |
| 49c | (HO) | HO |
| 48 | P7•HO | G1 |
| 52a | $\overline{G1}$ | 0 INTO SP |
| 48 | $\overline{P8}$•H7 | G3 |
| 45 | G3 | S(Y) (LOOK AT RA) |
| 59 | P9•LR | 1 INTO SS |
| 52a | P9•LR•Y3 | 1 INTO CP |
| SP FF NOT RESET ON P7 | | |
| 43 | SP | 0 INTO B (OUTPUT LINES) |
| 55 | SP | 1 INTO 8-9 LINE |
| 62 | OP•SP•CS•($\overline{Y8-12}$ OR $\overline{BCS}$ OR $\overline{Z5-8}$) | 1 INTO SP LINE |
| 62 | 1 INTO 8-9•SP LINE | TYPE SPACE |
| 62 | SPACE BAR CONTACTS SP | 1 INTO SP LINE |
| 52b | 1 INTO SP LINE | OK |
| SP FF RESET ON P7 (NUMBER WILL BE A ONE) | | |
| 43 | Ba | 1 INTO 13579 LINE |
| 43 | Bd•$\overline{Bc}$•$\overline{Bb}$ | 1 INTO 0-1 LINE |
| 43 | 1 INTO 13579 LINE•OP•CS ($\overline{Y8-12}$ OR $\overline{BCS}$ OR $\overline{Z5-8}$) | 1 INTO1LINE |
| 62 | 1 INTO 1•0-1 LINE | TYPE DIGIT 1 |
| 62 | RIBBON CONTACTS CLOSE | 1 INTO RIBBON LINE |
| 52b | 1 INTO RIBBON LINE | $\overline{OK}$ |
| 52b | $\overline{OK}$ | 0 INTO CP |
| 52b | OK TIMES OUT | OK |
| 52b | OK•$\overline{OP}$ | 0 INTO SS |
| REPEAT TILL D=7 | | |

FIG. 78-6

INSTRUCTION C20 TYPE AUTOMATIC DATE (CONTINUED)
PHASE 6

| FIG. | OPERATION | SIGNAL |
|---|---|---|
| 48 | $\overline{P0}$•H6 | G6 |
| 46 | G6 | D NEG |
| 48 | P4•H16 | G9 |
| 42 | G9 | 0 INTO A |
| 48 | P4•H16 | G10 |
| 43 | G10 | 0 INTO B |
| 49a | $\overline{SD}$•Y2+3 | H3 |
| 48 | P4•SD•H3 | G2 |
| 46 | G2 | S(D) D=6 |
| 48 | P4•H7 | G3 |
| 45 | G3 | S(Y) (LOOK AT S7) |
| 53 | X17•D6•Y2 OR3 | 0 INTO LR |
| 48 | P5•H16 | G16 |
| 45 | G16 | READ (S7 INTO A) |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | $\overline{P7}$•H16 | G15 |
| 45 | G15 | WRITE (B INTO S7) |
| 48 | $\overline{P8}$•H7 | G3 |
| 45 | G3 | S(Y) (LOOK AT RA) |
| REPEAT TILL D(0) | | |
| 51 | P9•D0•Y2 OR 3 | S(I) |
| 46 | P9•S(I) | D $\overline{NEG}$ |

FIG_28-2

INSTRUCTION C21 S(R) STEP R
COMMAND LEVEL H13

| FIG. | OPERATION | SIGNAL |
|---|---|---|
| 61 | PATCH | C21 |
| 61 | C21 | Y1 Z8 |
| 49b | Y1•Z8 | $\overline{H13}$ |
| 48 | $\overline{F0}$•H13 | G12 |
| 45 | G12 | S(R) |
| 55 | $\overline{Z1}$•Y1 | $\overline{Z1}$•Y1 SIGNAL |
| 51 | P9•DO•($\overline{Z1}$•Y1) | S(I) |

FIG. 79

INSTRUCTION C22 RA NEG 1 INTO MSC
COMMAND LEVEL H19

| FIG. | OPERATION | SIGNAL |
|---|---|---|
| 61 | PATCH | C22 |
| 61 | C22 | Y1 Z9 |
| 55 | Y1•Z9 | X19 |
| 49a | X19 | H19 |
| 48 | $\overline{F0}$•H19 | G9 |
| 42 | G9 | O INTO A |
| 48 | P1•H19 | G16 |
| 45 | G16•X19 | READ (RA INTO A 12th POSITION) |
| 48 | P2•H19 | G17 |
| 42 | G17 | O INTO S(P) |
| 59 | O INTO S(P) | ENABLES S(A)•DISABLES T(P) |
| 42 | S(A) | COUNTS A DOWN |
| 43 | S(A) | COUNTS B UP TO An |
| 48 | P3•H19 | G15 |
| 45 | G15 | WRITE (B INTO RA) |
| 54 | $\overline{F7}$•Ba•Bd•X19 | 1 INTO MSC |
| 48 | $\overline{F8}$•H19 | G10 |
| 43 | G10 | O INTO B |
| 55 | $\overline{Z1}$•Y1 | $\overline{Z1}$•Y1 SIGNAL |
| 51 | P9•DO•$\overline{Z1}$•Y1 | S(I) |

FIG. 80

INSTRUCTION D14-22 TW INTO RA (LRD 1-9)
COMMAND LEVELS H15 LRD 2L•2R H0•H3•H6•H15

| FIG. | OPERATION | SIGNAL |
|---|---|---|
| 61 | PATCH | D14 |
| 61 | D14 | Y2 |
| 61 | Y2 | Y2 OR 3 |
| 61 | D14 | Z1 |
| 49b | Y2 | H15 |
| 49b | D0•Y2 | H13+H0 |
| 48 | P0•H13 | G12 |
| 45 | G12 | S(R) |
| 49a | Y2 OR 3•$\overline{BSP}$ | H6 |
| 48 | P0•H6 | G6 |
| 46 | G6 | D NEG (COUNT DOWN) |
| 48 | P3•H15 | G15 |
| 45 | G15 | WRITE (B INTO RA) |
| 48 | P4•H15 | G10 |
| 43 | G10 | 0 INTO B |
| 49a | $\overline{SD}$•Y2 OR 3 | H3 |
| 48 | P4•H3 | G2 |
| 46 | G2 | S(D) |
| 48 | P5•H15 | G16 |
| 45 | G16 | READ (RA INTO A) |
| REPEAT TILL D=6 | | |
| 48 | P4•H15 | G10 |
| 43 | G10 | 0 INTO B |
| 49a | $\overline{SD}$•Y2 OR 3 | H3 |
| 48 | P4•H3 | G2 |
| 46 | G2 | S(D) (D=5) |
| 53 | Z1 | C37•38 |
| 53 | C37 PATCH | F36 |
| 53 | F36•D5 | (L) |
| 53 | (L)•Y2 OR 3•$\overline{X17}$ | 1 INTO LR |
| 48 | P5•H15 | G16 |
| 45 | G16 | READ (RA INTO A) |
| 59 | P9•LR | 1 INTO SS (STOPS PG) |
| 52a | P9•LR•Y2•$\overline{PT}$ | 1 INTO IP |
| TYPE SPACE | | |

FIG_81-1

INSTRUCTION D14-22 TW INTO RA (LRD 1-9)

| FIG. | OPERATION | SIGNAL |
|---|---|---|
| 62 | SPACE BAR | KSP |
| 52a | KSP | 0 INTO AR |
| 52a | KSP+BS+KO+K1-9•OK•$\overline{OP}$• IP•($\overline{X•KCS}$) | ENABLE OSHC |
| 52a | AR | FIRES OSHC |
| 52a | OBHC•KSP | 1 INTO SP FF |
| 52a | SP FF | SP |
| 52a | OSHC TIMES OUT | 1 INTO OP 0 INTO IP |
| 43 | SP | 0 INTO B OUTPUT LINES |
| 55 | SP | 1 INTO 8-9 LINE |
| 55 | OP•SP•CS•($\overline{Y8-12 OR BCS OR Z5-8}$) | 1 INTO SP LINE |
| 62 | 1 INTO 8-9 LINE | TYPE SPACE |
| 62 | SPACE BAR CONTACTS | 1 INTO SP LINE |
| 52b | 1 INTO SP LINE | $\overline{OK}$ |
| 52b | $\overline{OK}$ | 0 INTO OP |
| 52b | OK TIMES OUT | OK |
| 52b | OK•$\overline{OP}$ | 0 INTO SS (RESTARTS PG) |
| 48 | P3•H15 | G15 |
| 45 | G15 | WRITE (B INTO RA) |
| 48 | P4•H15 | G10 |
| 43 | G10 | 0 INTO B |
| 49a | $\overline{SD}$•Y2 OR 3 | H3 |
| 48 | P4•H3 | G2 |
| 46 | G2 | S(D) (D=4) |
| 48 | P5•H15 | G16 |
| 45 | G16 | READ (RA INTO A) |
| 59 | P9•LR | 1 INTO SS |
| 52 | P9•LR•Y2•$\overline{PT}$ | 1 INTO IP |

TYPE DIGIT 1

FIG. 81-2

INSTRUCTION D14-22 TW INTO RA (LRD 1-9)

| FIG. | OPERATION | SIGNAL |
|---|---|---|
| 62 | #1 KEY | K1-9 |
| 62 | K1-9 | K1-9 LINE |
| 52a | K1-9 LINE | 0 INTO AR |
| 52a | KSP+BS+KO+K1-9• OK•$\overline{OP}$•IP•($\overline{X•KCS}$) | ENABLES OSHC |
| 52a | AR | FIRES OSHC•0 INTO SP |
| 43 | OSHC•K1 | 1 INTO Ba |
| 52a,b | OSHC TIMES OUT | 1 INTO OP 0 INTO IP |
| 43 | Ba | 1 INTO 13579 LINE |
| 43 | $\overline{Bd}$•$\overline{Bc}$•$\overline{Bb}$ | 1 INTO 0-1 LINE |
| 43 | 1 INTO 13579 LINE•OP• CS•($\overline{Y8-12 \text{ OR } BCS \text{ OR } Z5-8}$) | 1 INTO 1 LINE |
| 62 | 1 INTO 1•0-1 LINE | TYPE DIGIT 1 |
| 62 | RIBBON CONTACTS CLOSE | 1 INTO RIBB LINE |
| 62 | 1 INTO RIBB LINE | OK |
| 62 | $\overline{OK}$ | 0 INTO OP |
| 62 | OK TIMES OUT | OK |
| 62 | OK•$\overline{OP}$ | 0 INTO SS (RESTARTS PG) |
| 48 | P3•H15 | G15 |
| 45 | G15 | WRITE (B INTO RA) |
| 48 | P4•H15 | G10 |
| 43 | G10 | 0 INTO B |
| 49a | $\overline{SD}$•Y2 OR 3 | H3 |
| 48 | P4•H3 | G2 |
| 46 | G2 | S(D) (D=3) |
| 53 | D3 | (Dp) |
| 53 | (Dp)•$\overline{X17}$ | DP |
| 49a | DP•LR•$\overline{BSP}$ | H2 |
| 48 | P5•H2 | G5 |
| 53 | G5 | S(SD) |
| 53 | SD•DP•$\overline{BSP}$ | Pt |
| 49a | DP•$\overline{X17}$ | HO |
| 48 | P7•HO | G1 |
| 52a | G1 | 0 INTO SP |
| 59 | P9•LR | 1 INTO SS (STOPS PG) |
| 52a | P9•Pt | OP |
| 43 | Pt | 0 INTO B OUTPUT LINES |
| 55 | Pt•$\overline{X17}$ | 1 INTO 8-9 LINE |
| 55 | OP•Pt•CS•($\overline{Y8-12 \text{ OR } BCS \text{ OR } Z5-8}$) | 1 INTO DECIMAL LINE |
| 55 | RIBB CONTACTS CLOSED | 1 INTO RIBB LINE |
| 52a | 1 INTO RIBB | OK |
| 52a | $\overline{OK}$ | 0 INTO OP |
| 52a | OK TIMES OUT | OK |
| 52a | OK•$\overline{OP}$ | 0 INTO SS (RESTARTS PG) |
| 48 | P3•H15 | G15 |
| 45 | G15 | WRITE (B INTO RA) |
| 48 | P4•H15 | G10 |
| 43 | G10 | 0 INTO B |
| 49a | DP•LR•$\overline{BSP}$ | H2 |
| 48 | P5•H2 | G5 |
| 53 | G5 | S(SD) |
| 59 | P9•LR | 1 INTO SS (STOPS PG) |
| 52a | P9•LR•Y2•$\overline{PT}$ | 1 INTO IP |

TYPE DIGIT

FIG. 81-3

INSTRUCTION D14-22 TW INTO RA (LRD 1-9)

| FIG. | OPERATION | SIGNAL |
|---|---|---|
| 62 | #1 KEY | K1-9 |
| 62 | K1-9 | K1-9 LINE |
| 52a | K1-9 LINE | 0 INTO AR |
| 52a | KSP+$\overline{BS}$+KO+K1-9•OK•$\overline{OP}$• (X•$\overline{KCS}$) | ENABLES OSHC |
| 52a | AR | FIRES OSHC |
| 43 | OSHC•K1 | 1 INTO Ba |
| 52a,b | OSHC TIME OUT | 1 INTO OP•0 INTO IP |
| 43 | Ba | 1 INTO 13579 LINE |
| 43 | $\overline{Bd}$•$\overline{Bc}$•$\overline{Bb}$ | 1 INTO 0-1 LINE |
| 43 | 1 INTO 13579 LINE•OP•CS• ($\overline{Y8-12}$ OR $\overline{BCS}$ OR $\overline{Z5-8}$) | 1 INTO 1 LINE |
| 62 | 1 INTO 1•0-1 LINE | TYPE DIGIT 1 |
| 62 | RIBBON CONTACTS CLOSE | 1 INTO RIBB LINE |
| 62 | 1 INTO RIBB LINE | OK |
| 62 | $\overline{OK}$ | 0 INTO OP |
| 62 | OK TIMES OUT | OK |
| 62 | OK•$\overline{OP}$ | 0 INTO SS (RESTARTS PG) |
| 48 | P3•H15 | G15 |
| 45 | G15 | WRITE (B INTO RA) |
| 48 | P4•H15 | G10 |
| 43 | G10 | 0 INTO B |
| 49a | $\overline{SD}$•Y2 OR 3 | H3 |
| 48 | P4•H3 | G2 |
| 46 | G2 | S(D) (D=2) |
| 48 | P5•H15 | G16 |
| 45 | G16 | READ (RA INTO A) |
| 59 | P9•LR | 1 INTO SS (STOPS PG) |
| 52a | P9•LR•Y2•PT | 1 INTO IP |
| TYPE DIGIT | | |

FIG. 81-4

INSTRUCTION D14-22 TW INTO RA (LRD 1-9)

| FIG. | OPERATION | SIGNAL |
|---|---|---|
| 62 | #1 KEY | K1-9 |
| 62 | K1-9 | K1-9 LINE |
| 52a | K1-9 LINE | 0 INTO AR |
| 52a | OK·$\overline{OP}$·IP·(X·$\overline{KCS}$) | ENABLES OSHC |
| 52a | AR | FIRES OSHC |
| 43 | OSHC·K1 | 1 INTO Ba |
| 52a | OSHC TIMES OUT | 1 INTO OP 0 INTO IP |
| 43 | Ba | 1 INTO 13579 LINE |
| 43 | $\overline{Bd}$·$\overline{Bc}$·$\overline{Bb}$ | 1 INTO 0-1 LINE |
| 43 | 1 INTO 13579 LINE·OP·CS·($\overline{Y8-12}$ OR $\overline{BCS}$ OR $\overline{Z5-8}$) | 1 INTO 1 LINE |
| 62 | 1 INTO 1·0-1 LINE | TYPE DIGIT 1 |
| 62 | RIBBON CONTACTS CLOSE | 1 INTO RIBB LINE |
| 62 | 1 INTO RIBB LINE | $\overline{OK}$ |
| 62 | $\overline{OK}$ | 0 INTO OP |
| 62 | OK TIMES OUT | OK |
| 62 | OK·$\overline{OP}$ | 0 INTO SS (RESTARTS PG) |
| 48 | P3·H15 | G15 |
| 45 | G15 | WRITE (B INTO RA) |
| 48 | P4·H15 | G10 |
| 43 | G10 | 0 INTO B |
| 49a | $\overline{SD}$·Y2 OR 3 | H3 |
| 48 | P4·H3 | G2 |
| 46 | G2 | S(D) (D=1) |
| 53 | Z1 | C37·C38 |
| 53 | C38 PATCH | B36 |
| 53 | B36·D1 | R |
| 53 | R·Y2 OR 3·$\overline{X17}$ | 0 INTO LR |
| 48 | P5·H15 | G16 |
| 45 | G16 | READ (RA INTO A) |
| 48 | P3·H15 | G15 |
| 45 | G15 | WRITE (B INTO RA) |
| 48 | P4·H15 | G10 |
| 43 | G10 | 0 INTO B |
| 49a | $\overline{SD}$·Y2 OR 3 | H3 |
| 48 | P4·H3 | G2 |
| 46 | G2 | S(D) (D=0) |
| 51 | P9·D0·Y2 OR 3 | S(I) |
| 46 | P9·S(I) | D $\overline{NEG}$ |

FIG. 81-5

INSTRUCTION D14-22 TW INTO RA (LRD 1-9)
BACK SPACE IN ENTRY FIELD AT ANY POINT OTHER THAN THE FIRST PLACE TO THE RIGHT OF THE DECIMAL.

| FIG. | OPERATION | SIGNAL |
|---|---|---|
| 42 | BACK SPACE | 1 INTO BS LINE AND BACK SPACE TW CARRIAGE |
| 52b | 1 INTO BS LINE | 0 INTO AR |
| 52a | 0 INTO AR | FIRE OSHC |
| 52b | 1 INTO BS LINE•OSHC | 1 INTO BSP (DISABLE PT) |
| 52b | OSHC TIMES OUT | 1 INTO OP 0 INTO IP |
| 52b | 1 INTO BS LINE | $\overline{OK}$ |
| 52b | $\overline{OK}$ | 0 INTO OP |
| 52b | OK TIMES OUT | OK |
| 52b | OK•$\overline{OP}$ | 0 INTO SS (RESTART PG) |
| 48 | $\overline{PO}$•B52•Y2 OR 3 | G18 |
| 46 | G18 | D NEG |
| 48 | P3•H15 | G15 |
| 45 | G15 | WRITE |
| 49a | $\overline{SD}$•Y2 OR 3 | H3 |
| 48 | P4•H3 | G2 |
| 46 | G2 | S(D) (UP) |
| 48 | P4•H15 | G10 |
| 43 | G10 | 0 INTO B |
| 48 | P5•H15 | G16 |
| 45 | G16 | READ (RA INTO A) |
| 59 | P9•LR | 1 INTO SS (STOP PG) |
| 52a | P9•LR•Y2•$\overline{PT}$ | 1 INTO IP |

TYPE CORRECT DIGIT

FIG. 81-6

INSTRUCTION D14-22 TW INTO RA (LRD 1-9)
BACK SPACE IN ENTRY FIELD AT THE FIRST PLACE TO THE RIGHT OF THE DECIMAL.

| FIG. | OPERATION | SIGNAL |
|---|---|---|
| 62 | BACK SPACE | 1 INTO BS LINE AND BACK SPACE TW CARRIAGE |
| 52b | 1 INTO BS LINE | 0 INTO AR |
| 52a | 0 INTO AR | FIRE OSHC |
| 52b | 1 INTO BS LINE•OSHC | 1 INTO BSP (DISABLE PT) |
| 52b | OSHC TIMES OUT | 1 INTO OP 0 INTO IP |
| 52b | 1 INTO BS LINE | $\overline{OK}$ |
| 52b | $\overline{OK}$ | 0 INTO OP |
| 52b | OK TIMES OUT | OK |
| 52b | OK•$\overline{OP}$ | 0 INTO SS (RESTART PG) |
| 48 | $\overline{PO}$•BSP•Y2 OR 3 | G18 |
| 46 | G18 | D NEG (D COUNTS UP) |
| 49a | $\overline{BSP}$•DP | H1 |
| 48 | $\overline{PO}$•H1 | S(SD) (SET SD) |
| 48 | P3•H15 | G15 |
| 45 | G15 | WRITE |
| 48 | P4•H15 | G10 |
| 43 | G10 | 0 INTO B |
| 48 | P5•H15 | G16 |
| 45 | G16 | READ (RA INTO A) |
| 59 | P9•LR | 1 INTO SS (STOP PG) |
| 52a | P9•LR•Y2•$\overline{Pt}$ | 1 INTO IP |
| TYPE SECOND BACKSPACE | | |
| 62 | BACK SPACE | 1 INTO BS LINE AND BACK SPACE TW CARRIAGE |
| 52b | 1 INTO BS LINE | 0 INTO AR |
| 52a | 0 INTO AR | FIRE OSHC |
| 52b | 1 INTO BS LINE•OSHC | 1 INTO BSP (DISABLE PT) |
| 52b | OSHC TIMES OUT | 1 INTO OP 0 INTO IP |
| 52b | 1 INTO BS LINE | $\overline{OK}$ |
| 52b | $\overline{OK}$ | 0 INTO OP |
| 52b | OK TIMES OUT | OK |
| 52b | OK•$\overline{OP}$ | 0 INTO SS (RESTART PG) |
| 48 | $\overline{PO}$•BSP•Y2 OR 3 | G18 |
| 46 | G18 | D NEG |
| 49a | $\overline{BSP}$•DP | H1 |
| 48 | $\overline{PO}$•H1 | S(SD) (RESET SD) |
| 48 | P3•H15 | G15 |
| 45 | G15 | WRITE |
| 49a | $\overline{SD}$•Y2 OR 3 | H3 |
| 48 | P4•H3 | G2 |
| 46 | G2 | S(D) (UP) |
| 48 | P4•H15 | G10 |
| 43 | G10 | 0 INTO B |
| 48 | P5•H15 | G16 |
| 45 | G16 | READ (RA INTO A) |
| 59 | P9•LR | 1 INTO SS (STOP PG) |
| 52a | P9•LR•Y2•$\overline{PT}$ | 1 INTO IP |
| TYPE CORRECT DIGIT | | |

FIG_81-2

INSTRUCTION E14-22 OUTPUT RA INTO TW (LRD 1-9)
COMMAND LEVELS H6 H16 HO H3

| FIG. | OPERATION | SIGNAL |
|---|---|---|
| 61 | PATCH | E15 |
| 61 | E15 | Y3 Z2 |
| 61 | Y3 | Y2 OR 3 |
| 49a | $\overline{BSP}$•Y2 OR 3 | H6 |
| 49a | Y3 | H16 |
| 48 | $\overline{P0}$•H6 | G6 |
| 46 | G6 | D NEG |
| 48 | P4•H16 | G9 |
| 42 | G9 | 0 INTO A |
| 48 | P4•H16 | G10 |
| 43 | G10 | 0 INTO B |
| 49a | $\overline{SD}$•Y2 OR 3 | H3 |
| 48 | P4•H3 | G2 |
| 46 | G2 | S(D) |
| 48 | P5•H16 | G16 |
| 45 | G16 | READ (RA INTO A) |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | $\overline{S(A)}$ | COUNTS B UP TO An |
| 48 | $\overline{P7}$•H16 | G15 |
| 45 | G15 | WRITE (B INTO RA) |
| IF B NOW HAS A DIGIT THEN $\overline{BO}$ ($\overline{BO}$=B NOT AT 0) | | |
| 43 | $\overline{BO}$ | (HO) |
| 49c | (HO) | HO |
| 48 | $\overline{P7}$•HO | G1 |
| 52a | G1 | 0 INTO SP |
| REPEAT TILL D=6 | | |

FIG. 82-1

INSTRUCTION E14-22 OUTPUT RA INTO TW (LRD 1-9)
COMMAND LEVELS H6 H16 H3 H4
FIRST DIGIT=SPACE

| FIG. | OPERATION | SIGNAL |
|---|---|---|
| 48 | P4•H16 | G9 |
| 42 | G9 | 0 INTO A |
| 48 | P4•H16 | G10 |
| 43 | G10 | 0 INTO B |
| 49a | $\overline{SD}$•Y2 OR 3 | H3 |
| 48 | P4•H3 | G2 |
| 46 | G2 | S(D) (D=5) |
| 53 | Z2 | D37-38 |
| 53 | D37•D5 | (L) |
| 53 | (L) | L |
| 53 | (L)•Y2 OR 3•$\overline{Y17}$ | LR |
| 53 | LR•$\overline{X17}$•Y3 | H4 |
| 49a | H4 | $\overline{H4}$ |
| 48 | P5•H4 | G4 |
| 52a | G4 | 1 INTO SP FF |
| 48 | P5•H16 | G16 |
| 45 | G16 | READ (RA INTO A) |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | $\overline{P7}$•H16 | G15 |
| 45 | G15 | WRITE (B INTO RA) |
| 59 | P9•LR | 1 INTO SS |
| 59a | P9•LR•Y3 | 1 INTO OP |
| 43 | SP | 0 INTO B (OUTPUT LINES) |
| 55 | SP | 1 INTO 8-9 LINE |
| 55 | OP•SP•CS•($\overline{Y8-12}$ OR $\overline{BCS}$ OR $\overline{Z5-8}$) | 1 INTO SP LINE |
| 62 | 1 INTO 8-9 LINE | TYPE SPACE |
| 62 | SPACE BAR CONTACTS SP | 1 INTO SP LINE |
| 52b | 1 INTO SP LINE | $\overline{OK}$ |
| 52b | $\overline{OK}$ | 0 INTO OP |
| 52b | OK TIMES OUT | OK |
| 52b | OK•$\overline{OP}$ | 0 INTO SS |

FIG. 82-2

INSTRUCTION E14-22 OUTPUT RA INTO TW (LRD 1-9)
COMMAND LEVELS H6 H16 H3 HO
SECOND DIGIT = #1

| FIG. | OPERATION | SIGNAL |
|---|---|---|
| 48 | P4•H16 | G9 |
| 42 | G9 | 0 INTO A |
| 48 | P4•H16 | G10 |
| 43 | G10 | 0 INTO B |
| 49a | $\overline{SD}$•Y2 OR 3 | H3 |
| 48 | P4•H3 | G2 |
| 46 | G2 | S(D) (D=4) |
| 48 | $\overline{P5}$•H16 | G16 |
| 45 | G16 | READ (RA INTO A) |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | $\overline{P7}$•H16 | G15 |
| 45 | G15 | WRITE (B INTO RA) |
| B NOW HAS A DIGIT THEN $\overline{BO}$ | | |
| 43 | $\overline{BO}$ | (HO) |
| 49c | (HO) | HO |
| 48 | $\overline{P7}$•HO | G1 |
| 52a | G1 | 0 INTO SP |
| 59 | P9•LR | 1 INTO SS |
| 52a | P9•LR•Y3 | 1 INTO OP |
| 43 | Ba | 1 INTO 13579 LINE |
| 43 | Bd•$\overline{Bc}$•$\overline{Bb}$ | 1 INTO 0-1 LINE |
| 43 | 1 INTO 13579 LINE•OP•CS•(Y8-12 OR $\overline{BCS}$ OR Z5-8) | 1 INTO 1 LINE |
| 62 | 1 INTO 1•0-1 LINE | TYPE DIGIT 1 |
| 62 | RIBBON CONTACTS CLOSE | 1 INTO RIBB LINE |
| 62 | 1 INTO RIBB LINE | $\overline{OK}$ |
| 62 | $\overline{OK}$ | 0 INTO OP |
| 62 | OK TIME OUT | OK |
| 62 | OK•$\overline{OP}$ | 0 INTO SS |

FIG. 82-3

INSTRUCTION E14-22 OUTPUT RA INTO TW (LRD 1-9)
COMMAND LEVELS H6 H16 H0 H2 H3
TYPE DECIMAL

| FIG. | OPERATION | SIGNAL |
|---|---|---|
| 48 | P4•H16 | G9 |
| 42 | G9 | 0 INTO A |
| 48 | P4•H16 | G10 |
| 43 | G10 | 0 INTO B |
| 49a | $\overline{SD}$•Y2 OR 3 | H3 |
| 48 | P4•H3 | G2 |
| 46 | G2 | S(D) (D=3) |
| 53 | D3 | (Dp) |
| 53 | (Dp)•$\overline{X17}$ | DP |
| 49a | DP•LR•$\overline{BSP}$ | H2 |
| 48 | P5•H2 | G5 |
| 53 | G5 | S(SD) |
| 53 | SD•DP•$\overline{BSP}$ | Pt |
| 48 | P5•H16 | G16 |
| 45 | G16 | READ (RA INTO A) |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | $\overline{P7}$•H16 | G15 |
| 45 | G15 | WRITE (B INTO RA) |
| 49a | DP•$\overline{X17}$ | H0 |
| 48 | $\overline{P7}$•H0 | G1 |
| 52a | G1 | 0 INTO SP |
| 52b | P9•F | 1 INTO OP |
| 59 | P9•LR | 1 INTO SS (STOPS PG) |
| 43 | PT | 0 INTO B (OUTPUT LINES) |
| 55 | PT•$\overline{X17}$ | 1 INTO 8-9 LINE |
| 55 | OP•PT•CS•($\overline{Y8-12}$ OR $\overline{BCS}$ OR $\overline{Z5-8}$) | 1 INTO DECIMAL LINE |
| 55 | RIBB CONTACTS CLOSE | 1 INTO RIBB LINE |
| 52b | 1 INTO RIBB | OK |
| 52b | $\overline{OK}$ | 0 INTO OP |
| 52b | OK TIMES OUT | OK |
| 52b | OK•$\overline{OP}$ | 0 INTO SS (RESTARTS PG) |

FIG. 82-4

INSTRUCTION E14-22 OUTPUT RA INTO TW (LRD 1-9)
COMMAND LEVELS H6 H16
TYPE ZERO

| FIG. | OPERATION | SIGNAL |
|---|---|---|
| 48 | P4•H16 | G9 |
| 42 | G9 | 0 INTO A |
| 48 | P4•H16 | G10 |
| 43 | G10 | 0 INTO P |
| 49a | DP•LR•$\overline{BSP}$ | H2 |
| 48 | P5•H2 | G5 |
| 53 | G5 | S(SD) (DIGIT COUNTER MAY NOW BE STEPPED) |
| 48 | P5•H16 | G16 |
| 45 | G16 | READ (RA INTO A) |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | $\underline{S}$(A) | COUNTS B UP TO An |
| 48 | P7•H16 | G15 |
| 45 | G15 | WRITE (B INTO RA) |
| B NOW CONTAINS A ZERO | | |
| 59 | P9•LR | 1 INTO SS (STOPS PG) |
| 52a | P9•LR•Y3 | 1 INTO OP |
| 43 | B AT 0 | 1 INTO 24680 LINE |
| 43 | B AT 0 | 1 INTO 0-1 LINE |
| 55 | OP•24680 LINE•0-1 LINE•CS•(Y8-12 OR $\overline{BCS}$ OR Z5-8) | 1 INTO 0 LINE |
| 62 | 1 INTO 0 LINE | TYPE ZERO |
| 62 | RIBB CONTACTS CLOSE | 1 INTO RIBB LINE |
| 52b | 1 INTO RIBB LINE | $\overline{OK}$ |
| 52b | $\overline{OK}$ | 0 INTO OP |
| 52b | OK TIMES OUT | OK |
| 52b | OK•$\overline{OP}$ | 0 INTO SS |

FIG. 82-5

INSTRUCTION E14-22 OUTPUT RA INTO TW (LRD 1-9)
COMMAND LEVELS H6 H16 HO H3 H
TYPE DIGIT 1

| FIG. | OPERATION | SIGNAL |
|---|---|---|
| 48 | P4•H16 | G9 |
| 42 | G9 | 0 INTO A |
| 48 | P4•H16 | G10 |
| 43 | G10 | 0 INTO B |
| 49a | $\overline{SD}$•Y2 OR 3 | H3 |
| 48 | P4•H3 | G2 |
| 46 | G2 | S(D) (D=2) |
| 48 | P5•H16 | G16 |
| 45 | G16 | READ (RA INTO A) |
| 48 | P6•H16 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P7•H16 | G15 |
| 45 | G15 | WRITE (B INTO RA) |
| B NOW HAS A DIGIT THEN $\overline{BO}$ | | |
| 43 | $\overline{BO}$ | (HO) |
| 49c | (HO) | HO |
| 48 | P7•HO | G1 |
| 52a | G1 | 0 INTO SP |
| 59 | P9•LR | 1 INTO SS |
| 52a | P9•LR•Y3 | 1 INTO OP |
| 43 | Ba | 1 INTO 13579 LINE |
| 43 | $\overline{Bd}$•$\overline{Bc}$•$\overline{Bb}$ | 1 INTO 0-1 LINE |
| 43 | 1 INTO 13579 LINE•OP• CS•(Y8-12 OR $\overline{BCS}$ OR $\overline{Z5-8}$) | 1 INTO 1 LINE |
| 62 | 1 INTO 1•0-1 LINE | TYPE DIGIT 1 |
| 62 | RIBBON CONTACTS CLOSE | 1 INTO RIBB LINE |
| 62 | 1 INTO RIBB LINE | $\overline{OK}$ |
| 62 | $\overline{OK}$ | 0 INTO OP |
| 62 | OK TIMES OUT | OK |
| 62 | OK•$\overline{OP}$ | OK INTO SS |

FIG. 82-6

INSTRUCTION E14-22 OUTPUT RA INTO TW (LRD 1-9)
COMMAND LEVELS H6 H16 H3

| FIG. | OPERATION | SIGNAL |
|---|---|---|
| 48 | P4•H16 | G9 |
| 42 | G9 | O INTO A |
| 48 | P4•H16 | G10 |
| 43 | G10 | O INTO B |
| 49a | SD•Y2 OR 3 | H3 |
| 48 | P4•H3 | G2 |
| 46 | G2 | S(D) (D=1) |
| 53 | D38•D1 | (R) |
| 53 | X17•(R)•Y2 OR 3 | O INTO LR |
| 48 | P5•H16 | G16 |
| 45 | G16 | READ (RA INTO A) |
| 48 | P6•H16 | G17 |
| 42 | G17 | O INTO S(P) |
| 59 | O INTO S(P) | ENABLES S(A)•DISABLES T(P) |
| 42 | S(A) | COUNTS A DOWN |
| 43 | S(A) | COUNTS B UP TO An |
| 48 | P7•H16 | G15 |
| 45 | G15 | WRITE (B INTO RA) |
| 48 | P4•H16 | G9 |
| 42 | G9 | O INTO A |
| 48 | P4•H16 | G10 |
| 43 | G10 | O INTO B |
| 49a | SD•Y2 OR 3 | H3 |
| 48 | P4•H3 | G2 |
| 46 | G2 | S(D) (D=O) |
| 48 | P5•H16 | G16 |
| 45 | G16 | READ |
| 48 | P6•H16 | G17 |
| 42 | G17 | O INTO S(P) |
| 59 | O INTO S(P) | ENABLES S(A)•DISABLES T(P) |
| 42 | S(A) | COUNTS A DOWN |
| 43 | S(A) | COUNTS B UP TO An |
| 48 | P7•H16 | G15 |
| 45 | G15 | WRITE |
| 51 | P9•DO•Y2 OR 3 | S(I) |
| 46 | P9•S(I) | D NEG |

FIG. 82-2

INSTRUCTION F14-22 STORE (RA INTO Sz) (RA INTO RA) Sz 1-9
COMMAND LEVELS H7 H9 H18 H19

| FIG. | OPERATION | SIGNAL |
|---|---|---|
| 49b | Y4 | H7 H9 H18 H19 |
| 48 | $\overline{P0}$•H19 | G9 |
| 42 | G9 | 0 INTO A |
| 48 | P1•H19 | G16 |
| 45 | G16 | READ (RA INTO A) |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P3•H19 | G15 |
| 45 | G15 | WRITE (B INTO RA) |
| 48 | P4•H7 | G3 |
| 45 | G3 | S(Y) (LOOK AT Sz) |
| 48 | P5•H18 | G16 |
| 45 | G16 | READ (Sz INTO A) (CLEAR Sz) |
| 48 | $\overline{P7}$•H18 | G15 |
| 45 | G15 | WRITE (B INTO Sz) |
| 48 | $\overline{P8}$•H18 | G10 |
| 42 | G10 | 0 INTO B |
| 48 | $\overline{P8}$•H9 | G2 |
| 46 | G2 | S(D) |
| 48 | $\overline{P8}$•H7 | G3 |
| 45 | G3 | S(Y) (LOOK AT RA) |
| REPEAT TILL D(0) | | |
| 51 | P9•Y4•D0 | S(I) |

FIG. 83

INSTRUCTION G14-22 RETRIEVE (Sz INTO RA) (Sz INTO Sz)S1-9
COMMAND LEVELS H8 H9 H13 H18 H19

| FIG. | OPERATION | SIGNAL |
|---|---|---|
| 61 | PATCH | G14 |
| 61 | G14 | Y5 Z1 |
| 49b | Y5•DO | H13 |
| 49b | Y5 | H8 H9 H18 H19 |
| 48 | P0•H13 | G12 |
| 45 | G12 | S(R) |
| 48 | P0•H19 | G9 |
| 42 | G9 | 0 INTO A |
| 48 | P0•H8 | G3 |
| 45 | G3 | S(Y) |
| 48 | P1•H19 | G16 |
| 45 | G16 | READ (Sz INTO A) |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P3•H19 | G15 |
| 45 | G15 | WRITE (B INTO Sz) |
| 48 | P4•H8 | G3 |
| 45 | G3 | S(Y) |
| 48 | P5•H18 | G16 |
| 45 | G16 | READ (RA INTO A) (CLEAR RA) |
| 48 | P7•H18 | G15 |
| 45 | G15 | WRITE (B INTO RA) |
| 48 | P8•H18 | G10 |
| 42 | G10 | 0 INTO B |
| 48 | P8•H9 | G2 |
| 46 | G2 | S(D) |
| REPEAT TILL D(0) | | |
| 51 | P9•Y5•DO | S(I) |

FIG_84

INSTRUCTION H14-22 (Sz PLUS RA INTO SZ) (RA INTO RA) Sz 1-9
COMMAND LEVELS H7 H9 H14 H18 H19

| FIG. | OPERATION | SIGNAL |
|---|---|---|
| 61 | PATCH | H14 |
| 61 | H14 | Y6 |
| 51 | Y6N RESET | Y6 NO |
| 49b | Y6•NO | H7 H9 H14 H18 H19 |
| 48 | $\overline{P0}$•H19 | G9 |
| 42 | G9 | 0 INTO A |
| 48 | P1•H19 | G16 |
| 45 | G16 | READ (RA INTO A) |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A DOWN TO ZERO |
| 43 | S(A) | COUNTS B UP TO An |
| 48 | P3•H19 | G15 |
| 45 | G15 | WRITE (B INTO RA) |
| 59 | P4•H14 | G11 |
| 43 | G11 | 0 INTO CRb |
| 43 | 0 INTO CRb | S(B) |
| 43 | Bd BAR | 1 INTO CRa |
| 48 | P4•H7 | G3 |
| 45 | G3 | S(Y) |
| 48 | P5•H18 | G16 |
| 45 | G16 | READ (Sz INTO A) |
| 48 | P6•H14 | G17 |
| 42 | G17 | 0 INTO S(P) |
| 59 | 0 INTO S(P) | ENABLES S(A)•DISABLES T(P) |
| 42 | S(A) | COUNTS A DOWN TO ZERO |
| 43 | S(A) | COUNTS B UP TO An |
| 43 | Bd BAR | 1 INTO CRa |
| 48 | $\overline{P7}$•H18 | G15 |
| 45 | G15 | WRITE (B INTO Sz) |
| 48 | $\overline{P7}$•H14 | G13 |
| 43 | G13 | 0 INTO CRa |
| 43 | CRa BAR | 1 INTO CRb |
| 48 | $\overline{P8}$•H18 | G10 |
| 43 | G10 | 0 INTO B |
| 48 | $\overline{P8}$•H9 | G2 |
| 46 | G2 | S(D) |
| 48 | $\overline{P8}$•H7 | G3 |
| 45 | G3 | S(Y) |
| REPEAT TILL D(0) | | |
| 51 | Y6•MSZ | Y6•$\overline{MSZ}$ |
| 51 | P9•DO•$\overline{MSZ}$•Y6 | S(I) |

FIG. 85

INSTRUCTION H14-22 (Sz MINUS RA) INTO Sz) (RA INTO RA) Sz 1-9
COMMAND LEVELS H7 H9 H10 H14 H18 H19 MSZ

| FIG. | OPERATION | SIGNAL |
|---|---|---|
| 61 | PATCH | H14 |
| 61 | H14 | Y6 |
| 51 | Y6 N RESET | Y6•NO |
| 49b | Y6•NO | H7 H9 H14 H18 H19 |
| 49b | $\overline{Y6}$•NO•MSZ | H10 |
| 48 | $\overline{P0}$•H19 | G9 |
| 42 | G9 | 0 INTO A |
| 48 | $\overline{P0}$•D1•H10 | G14 |
| 43 | G14 | 1 INTO CRb |
| 48 | P1•H19 | G16 |
| 45 | G16 | READ (RA INTO A) |
| 48 | P2•H10 | G19 |
| 42 | G19 | A NEG |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A UP TO 9 |
| 43 | S(A) | COUNTS B UP TO An |
| 48 | P3•H19 | G15 |
| 45 | G15 | WRITE (B INTO RA) |
| 48 | P4•H18 | G9 |
| 42 | G9 | 0 INTO A |
| 59 | P4•H14 | G11 |
| 43 | G11 | 0 INTO CRb |
| 43 | 0 INTO CRb | S(B) |
| 43 | Bd BAR | 1 INTO CRa |
| 48 | P4•H7 | G3 |
| 45 | G3 | S(Y) |
| 48 | P5•H18 | G16 |
| 45 | G16 | READ (Sz INTO A) |
| 48 | P6•H14 | G17 |
| 42 | G17 | 0 INTO S(P) |
| 59 | 0 INTO S(P) | ENABLES S(A)•DISABLES T(P) |
| 42 | S(A) | COUNTS A DOWN TO 0 |
| 43 | S(A) | COUNTS B UP TO An |
| 43 | Bd BAR | 1 INTO CRa |
| 48 | $\overline{P7}$•H18 | G15 |
| 45 | G15 | WRITE (B INTO Sz) |
| 48 | $\overline{P7}$•H14 | G13 |
| 43 | G13 | 0 INTO CRa |
| 43 | CRa BAR | 1 INTO CRb |
| 48 | $\overline{P8}$•H18 | G10 |
| 43 | G10 | 0 INTO B |
| 48 | $\overline{P8}$•H9 | G2 |
| 46 | G2 | S(D) |
| 48 | $\overline{P8}$•H7 | G3 |
| 45 | G3 | S(Y) |
| REPEAT TILL D(0) | | |
| 51 | P9•DO•MSZ•Y6 | S(N) |

FIG. 86

INSTRUCTION H14-22 (RA MINUS Sz) INTO Sz) (RA INTO RA) Sz 1-9
COMMAND LEVELS H9 H10 H19

| FIG. | OPERATION | SIGNAL |
|---|---|---|
| 49a | N1 | H9 H10 H19 |
| 48 | $\overline{P0}$•H19 | G9 |
| 42 | G9 | 0 INTO A |
| 48 | P1•H19 | G16 |
| 45 | G16 | READ (RA INTO A) |
| 48 | P2•H10 | G19 |
| 42 | G19 | A NEG |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A UP TO 9 |
| 43 | S(A) | COUNTS B UP TO An |
| 43 | P3•H19 | G15 |
| 45 | G15 | WRITE (B INTO RA) |
| 48 | P8•H19 | G10 |
| 43 | G10 | 0 INTO B |
| 48 | P8•H9 | G2 |
| 46 | G2 | S(D) |
| 48 | P8•H7 | G3 |
| 45 | G3 | S(Y) |
| REPEAT TILL D(0) | | |
| 51 | P9•D0•N1 | S(I) |
| 51 | P9•D0•MSZ•Y6 | S(N) N=0 |

FIG. 82

INSTRUCTION I14-22 RETRIEVE MULT (Sz)X(RA) INTO RA Sz 1-9
COMMAND LEVELS Y7 Z1-9
PHASE COUNTER HM
HMO

| FIG. | OPERATION | SIGNAL |
|---|---|---|
| 61 | PATCH | I14 |
| 61 | I14 | Y7 |
| 61 | I14 | Z1 |
| 50 | P9•DO•Y7•$\overline{\text{HMc}}$ | S(HM) HMO IS NOT USED. ON THE P9• THE HM IS STEPPED FROM ZERO TO 1. |

HM1 (RA) INTO SO
COMMAND LEVELS H7 H9 H18 H19

| | | |
|---|---|---|
| 50 | $\overline{\text{HMc}}$•$\overline{\text{HMb}}$•HMa | HM1 |
| 49b | HM1 | H7 H9 H18 H19 |
| 44 | $\overline{\text{P0}}$•HM1 | 1 INTO C |
| 44 | 1 INTO C | $\overline{\text{Cd}}$ $\overline{\text{Cc}}$ $\overline{\text{Cb}}$ Ca |
| 48 | $\overline{\text{P0}}$•H19 | G9 |
| 42 | G9 | 0 INTO A |
| 48 | P1•H19 | G16 |
| 45 | G16 | READ (RA INTO A) |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P3•H19 | G15 |
| 45 | G15 | WRITE (B INTO RA) |
| 48 | P4•H7 | G3 |
| 45 | G3 | S(Y) (LOOK AT SO) |
| 48 | P5•H18 | G16 |
| 45 | G16 | READ (SO INTO A) (CLEAR SO) |
| 48 | $\overline{\text{P7}}$•H18 | G15 |
| 45 | G15 | WRITE (B INTO SO) |
| 48 | $\overline{\text{P8}}$•H18 | G10 |
| 43 | G10 | 0 INTO B |
| 48 | $\overline{\text{P8}}$•H9 | G2 |
| 46 | G2 | S(D) |
| 48 | $\overline{\text{P8}}$•H7 | G3 |
| 45 | G3 | S(Y) (LOOK AT RA) |
| REPEAT TILL D(0) | | |
| 50 | P9•DO•Y7•$\overline{\text{HMc}}$ | S(HM) |

FIG. 88-1

INSTRUCTION I14-22 RETRIEVE MULT (Sz)X(RA) INTO RA Sz 1-9
COMMAND LEVELS H9 H18
HM2 O INTO RA

| FIG. | OPERATION | SIGNAL |
|---|---|---|
| 49b | HM2 | H9 H18 |
| 48 | P4•H18 | G9 |
| 42 | G9 | O INTO A |
| 48 | P5•H18 | G16 |
| 45 | <u>G16</u> | READ (RA INTO A) (CLEAR RA) |
| 48 | $\overline{P7}$•H18 | G15 |
| 45 | <u>G15</u> | WRITE (O INTO RA) |
| 48 | $\overline{P8}$•H9 | G2 |
| 46 | <u>G2</u> | S(D) |
| 48 | $\overline{P8}$•H18 | G10 |
| 43 | G10 | O INTO D |
| REPEAT TILL D(O) | | |
| 50 | P9•DO•Y7•$\overline{HMc}$ | S(HM) |

COMMAND LEVELS Y7 Z1-9

| | | |
|---|---|---|
| 50 | P9•DO•Y7•$\overline{HMc}$ | S(HM) |

HM3 IS NOT USED. ON THE P9 THE HM WILL STEP FROM 3 TO 4.

FIG. 88-2

INSTRUCTION I14-22 RETRIEVE MULT (Sz)X(RA) INTO RA Sz 1-9
COMMAND LEVELS H5 H7 H18
HM4 SO/C INTO M

| FIG. | OPERATION | SIGNAL |
|---|---|---|
| 50 | HM4 | HMC |
| 49b | HMC | H18 |
| 49b | HM4 | H5 H7 |
| 48 | P4•H18 | G9 |
| 42 | G9 | O INTO A |
| 48 | P4•H7 | G3 |
| 45 | G3 | S(Y) (LOOK AT SO) |
| 48 | P4•H5 | G8 |
| 44&46 | C•G8 | C INTO D |
| 46 | C INTO D | SET C INTO D |
| 48 | P5•H18 | G16 |
| 45 | G16 | READ (SO INTO A) |
| 48 | P6•H5 | G7 |
| 42 | A (IF RESET) | ENABLES M |
| 42 | G7 | SET 15 COMP OF A INTO M |
| 48 | $\overline{P7}$•H18 | G15 |
| 45 | G15 | WRITE (O INTO SO) |
| 48 | P8•H7 | G3 |
| 45 | G3 | S(Y) (LOOK AT RA) |
| 46 | P8•$\overline{HM4}$ | O INTO D |
| 48 | P8•H8 | G10 |
| 43 | G10 | O INTO D |

IF THE M COUNTER RECEIVED A VALID NUMBER FROM A DURING P6 TIME, M15 IS VALID.

| | | |
|---|---|---|
| 50 | P9•DO•HM4•$\overline{M15}$ | S (HM) |

IF THE M COUNTER DID NOT RECEIVE A VALID NUMBER FROM A DURING P6 TIME, M15 IS VALID.

| | | |
|---|---|---|
| 50 | HM4•M15 | ENABLE HMb |
| | P9 | 1 INTO HMb (HM NOW AT 6) |

FIG. 88-3

INSTRUCTION I14-22 RETRIEVE MULT (Sz)X(RA) INTO RA Sz 1-9
COMMAND LEVELS H8 H9 H14 H18 H19
HM5 Sz PLUS RA INTO RA

| FIG. | OPERATION | SIGNAL |
|---|---|---|
| 50 | HM6 | HMC |
| 49b | HMC | H18 |
| 49b | HM5 | H9 H14 H19 |
| 49b | HM5•Y7 | H8 |
| 48 | P0•H19 | G9 |
| 42 | G9 | 0 INTO A |
| 48 | P0•H8 | G3 |
| 45 | G3 | S(Y) (LOOK AT Sz) |
| 48 | P1•H19 | G16 |
| 45 | G16 | READ (Sz INTO A) |
| 48 | P2•H19 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P3•H19 | G15 |
| 45 | G15 | WRITE (B INTO Sz) |
| 48 | P4•H14 | G11 |
| 43 | G11 | 0 INTO CRb |
| 43 | CRb BAR | S(B) |
| 43 | Bd BAR | 1 INTO CRa |
| 48 | P4•H8 | G3 |
| 45 | G3 | S(Y) (LOOK AT RA) |
| 48 | P5•H18 | G16 |
| 45 | G16 | READ (RA INTO A) |
| 48 | P6•H14 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 43 | Bd BAR | 1 INTO CRa |
| 48 | P7•H18 | G15 |
| 45 | G15 | WRITE (RP PLUS RA INTO RA) |
| 48 | P7•H14 | G13 |
| 43 | G13 | 0 INTO CRa |
| 43 | CRa BAR | 1 INTO CRb |
| 48 | P8•H9 | G2 |
| 46 | G2 | S(D) |
| 48 | P8•H18 | G10 |
| 43 | G10 | 0 INTO D |
| REPEAT TILL D(0) | | |
| 42 | P9•D0•HM5 | S(M) |
| REPEAT TILL M=14 | | |
| 50 | P9•D0•HM5•M14 | S(HM) |

FIG. 88-4

INSTRUCTION I14-22 RETRIEVE MULT (Sz)X(RA) INTO RA Sz 1-9
COMMAND LEVELS H9 H17 H18
HM6 SHIFT RIGHT 1X S(C)

| FIG. | OPERATION | SIGNAL |
|---|---|---|
| 50 | HM6 | (HM6 OR 7) |
| 50 | HM6+4+5+7 | HM0 |
| 49c | (HM6 OR 7) | H9 H17 |
| 49c | HMC | H18 |
| 48 | P2•H17 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P5•H18 | G16 |
| 45 | G16 | READ (RA INTO A) |
| 48 | $\overline{P7}$•H18 | G15 |
| 45 | G15 | WRITE (B INTO RA) |
| 48 | $\overline{P8}$•H18 | G10 |
| 42 | G10 | 0 INTO B |
| 48 | $\overline{P8}$•H9 | G2 |
| 42 | $\overline{P8}$•HM6 | 0 INTO B |
| 46 | G2 | S(D) |
| REPEAT TILL D(2) | | |
| 44 | C1+2+3 | CP |
| 42 | P9•HM6•D2•D $\overline{NEG}$•$\overline{CP}$ | 0 INTO A |
| 46 | P9•HM6 OR 7•D2•D $\overline{NEG}$ | 12 INTO D (1 INTO Dd)•(1 INTO Dc)• (0 INTO Db)•(1 INTO Da) |
| 46 | P9•HM6 OR 7•D2•D $\overline{NEG}$ | D $\overline{NEG}$ (COUNT DOWN) |
| REPEAT TILL D(0) | | |
| 50 | P9•D0•HM6+7 | D $\overline{NEG}$ |
| 44 | P9•D0•HM6 | S(C) |
| 50 | P9•D0•HM6 | S(HM) (TO 7) |
| 50 | P9•D0•HM6•$\overline{C12}$ | 3 TO HM (0 INTO HMc) HM=3 |
| BACK TO HM3 TILL C=12 | | |
| 44 | C13 | 0 INTO Cc |
| 44 | Cc | 0 INTO Cd (C=1) |
| 50 | P9•D0•HM6 | S(HM) HM=7 |
| 46 | P9•D0•HM6 | D $\overline{NEG}$ |

FIG. 88-5

Dec. 31, 1968 J. KRAMMER 3,419,850

PROGRAMMABLE COMPUTER UTILIZING NONADDRESSABLE REGISTERS

Filed Oct. 21, 1965 Sheet 118 of 125

INSTRUCTION I14-22 RETRIEVE MULT (Sz)X(RA) INTO RA Sz 1-9
COMMAND LEVELS H9 H17 H18
HM7 SHIFT ROUND

| FIG. | OPERATION | SIGNAL |
|---|---|---|
| 50 | HM7 | HM6 OR 7 |
| 50 | HM6+4+5+7 | HMC |
| 49c | HM6 OR 7 | H9 H17 |
| 49c | HMC | H18 |
| 48 | P2•H17 | G17 |
| 42 | G17 | 0 INTO S(P) |
| 59 | 0 INTO S(P) | ENABLES S(A)•DISABLES T(P) |
| 42 | S(A) | COUNTS A DOWN |
| 43 | S(A) | COUNTS B UP TO An |
| 48 | P5•H18 | G16 |
| 45 | G16 | READ (RA INTO A) |
| 48 | $\overline{\text{P7}}$•H18 | G15 |
| 45 | G15 | WRITE (B INTO RA) |
| 48 | $\overline{\text{P8}}$•H18 | G10 |
| 42 | G10 | 0 INTO B |
| 48 | $\overline{\text{P8}}$•H9 | G2 |
| 46 | G2 | S(D) |
| REPEAT TILL D(2) | | |
| 46 | P9•D0•H6+7 | D $\overline{\text{NEG}}$ |
| 46 | P9•HM6 OR 7•D2•D $\overline{\text{NEG}}$ | 12 INTO D (1 INTO Dd)•(1 INTO Dc)• (0 INTO Db)•(1 INTO Da) |
| 46 | P9•HM6 OR 7•D2•D $\overline{\text{NEG}}$ | D NEG (COUNT DOWN) |
| 44 | P9•HM7•D2•D $\overline{\text{NEG}}$ | S(C) |
| REPEAT TILL $\overline{\text{CP}}$ (C4) | | |
| 44 | C4 | $\overline{\text{CP}}$ |
| 50 | $\overline{\text{CP}}$•HM7 | $\overline{\text{CP}}$•HM7 SIGNAL |
| 50 | P9 ($\overline{\text{CP}}$•HM7)•D0 | S(HM) (HM=0) |
| 51 | P9 ($\overline{\text{CP}}$•HM7)•D0 | S(I) |

FIG. 88-6

INSTRUCTIONS J14-N21 OUTPUT CHARACTERS, TAB AND CARRIAGE RETURN
THE OUTPUT INSTRUCTIONS ARE DIVIDED INTO THREE GROUPS,
LOWER CASE, UPPER CASE AND CARRIAGE MOVEMENT. (TAB AND CAR. RET)

GROUP 1 LOWER CASE
J14-J17
K14-K17
L14-L17
M14-M17
N14-N17

| FIG. | OPERATION | SIGNAL |
|---|---|---|
| 55 | Y8-12 | Y8-12 |
| 51 | Y8-12 | Y8-12•HSO |
| 59 | P9•Y8-12•HSO | 1 INTO SS (STOP PG) |
| 52a | P9•Y8-12•HSO | 1 INTO OP |
| 52a | P9•Y8-12 | S (HS) (HS=1) |
| 56 | Y8-12•Z1-4•OP•CS | (OC) INTO TW |
| 62 | RIBB CONTACTS CLOSE | 1 INTO RIBB LINE |
| 52b | 1 INTO RIBB LINE | $\overline{OK}$ |
| 52b | $\overline{OK}$ | 0 INTO OP |
| 52b | OK TIMES OUT | OK |
| 52b | OK•$\overline{OP}$ | 0 INTO SS (START PG) |

HS IS USED TO GIVE A DELAY SO THE TW CAN COMPLETE THE TYPING OF THE CHARACTER.

| | | |
|---|---|---|
| 51 | P9•DO•HS1 | S(I) |
| 51 | P9•Y8-12 | S(HS) (HS=0) |

FIG. 89-1

GROUP 2 UPPER CASE
J18-J21
K18-K21
L18-L21
M18-M21
N18-N21

| FIG. | OPERATION | SIGNAL |
|---|---|---|
| 55 | Y8-12 | Y8-12 |
| 61 | Z5-8 | Z5-8 |
| 56 | Y8-12•Z5-8•BCS | 1 INTO CS LINE |
| 62 | 1 INTO CS LINE | CS1-2 |
| 62 | CS1-2 | KCS |
| 56 | KCS | $\overline{CS}$ |
| 51 | Y8-12 | Y8-12•HSO |
| 59 | P9•Y8-12•HSO | 1 INTO SS (STOP PG) |
| 52a | P9•Y8-12•HSO | 1 INTO OP |
| 51 | P9•Y8-12 | S (HS) (HS=1) |
| 56 | Y8-12•Z5-8•OP•CS• (Y8-12•Z5-8•BCS) | (OC) INTO TW |
| 62 | RIBB CONTACTS CLOSE | 1 INTO RIBB LINE |
| 52b | 1 INTO RIBB LINE | $\overline{OK}$ |
| 52b | $\overline{OK}$ | 0 INTO OP |
| 52b | OK TIMES OUT | OK |
| 52b | OK•$\overline{OP}$ | 0 INTO SS (START PG) |

HS IS USED TO GIVE A DELAY SO THE TW CAN COMPLETE THE TYPING OF THE CHARACTER
CS1-2 ARE ENERGIZED AS LONG AS THE SIGNAL Y8-12•Z5-8•BSC IS VALID.

| | | |
|---|---|---|
| 51 | P9•DO•HS1 | S(I) |
| 51 | P9•Y8-12 | S(HS) (HS=0) |

FIG. 89-2

GROUP 3 TAB AND CARRIAGE RETURN
J22
K22
L22
M22

TAB J22

| FIG. | OPERATION | SIGNAL |
|---|---|---|
| 61 | PATCH | J22 |
| 61 | J22 | Y8 Z9 |
| 55 | Y8 | Y8-12 |
| 51 | Y8-12 | Y8-12•HSO |
| 59 | P9•Y8-12•HSO | 1 INTO SS (STOP PG) |
| 52a | P9•Y8-12•HSO | 1 INTO OP |
| 51 | P9•$\overline{\text{Y8-12}}$ | S (HS) (HS=1) |
| 55 | (Z9•$\overline{\text{Y2}}$ OR $\overline{3}$)•(Y8•Z9)• OP•CS | (OC) INTO TW |
| 62 | TAB CONTACTS CLOSE | $\underline{1}$ INTO SP LINE |
| 52b | $\underline{1}$ INTO SP LINE | $\overline{\text{OK}}$ |
| 52b | $\overline{\text{OK}}$ | 0 INTO OP |
| 52b | OK $\underline{\text{TIMES}}$ OUT | OK |
| 52b | OK•$\overline{\text{OP}}$ | 0 INTO SS (START PG) |

HS IS USED TO GIVE A DELAY SO THE TW CAN COMPLETE THE OPERATION.

| FIG. | OPERATION | SIGNAL |
|---|---|---|
| 51 | P9•DO•HS1 | S(I) |
| 51 | P9•Y8-12 | S(HS) (HS=0) |

FIG_90-1

CARRIAGE RETURN K22

| FIG. | OPERATION | SIGNAL |
|---|---|---|
| 61 | PATCH | K22 |
| 61 | K22 | Y9 Z9 |
| 55 | Y9 | Y8-12 |
| 51 | Y8-12 | Y8-12•HSO |
| 59 | P9•Y8-12•HSO | 1 INTO SS (STOP PG) |
| 52a | P9•Y8-12•HSO | 1 INTO OP |
| 51 | P9•$\overline{\text{Y8-12}}$ | S (HS) (HS=1) |
| 55 | (Z9•$\overline{\text{Y2}}$ OR $\overline{3}$)•(Y9•Z9)•OP | (OC) INTO TW (CR) |
| 55 | (Z9•$\overline{\text{Y2}}$ OR $\overline{3}$)• (SS•(Y9•Z9)•$\overline{\text{PF}}$) | (OC) INTO TW (RPCR) |
| 62 | CR CONTACTS CLOSE | $\underline{1}$ INTO SP LINE |
| 52b | $\underline{1}$ INTO SP LINE | $\overline{\text{OK}}$ |
| 52b | $\overline{\text{OK}}$ | 0 INTO OP |
| 52b | OK $\underline{\text{TIMES}}$ OUT | OK |
| 52b | OK•$\overline{\text{OP}}$ | 0 INTO SS (START PG) |

HS IS USED TO GIVE A DELAY SO THE TW CAN COMPLETE THE OPERATION.

| FIG. | OPERATION | SIGNAL |
|---|---|---|
| 51 | P9•DO•HS1 | S(I) |
| 51 | P9•Y8-12 | S(HS) (HS=0) |

FIG_90-2

CARRIAGE RETURN L22

| FIG. | OPERATION | SIGNAL |
|---|---|---|
| 61 | PATCH | L22 |
| 61 | L22 | Y10 Z9 |
| 55 | Y10 | Y8-12 |
| 51 | Y8-12 | Y8-12•HSO |
| 59 | P9•Y8-12•HSO | 1 INTO SS (STOP PG) |
| 52a | P9•Y8-12•HSO | 1 INTO OP |
| 51 | P9•Y8-12 | S (HS) (HS=1) |
| 55 | (Z9•$\overline{Y2}$ OR $\overline{3}$)•(Y10•Z9)•OP | (OC) INTO TW (CR) |
| 55 | (Y10•FS10)•Z9 | PF |
| 55 | (Z9•$\overline{Y2}$ OR $\overline{3}$)•(PF•SS) | (OC) INTO TW (PCR) |
| 62 | CR CONTACTS CLOSE | 1 INTO SP LINE |
| 52b | 1 INTO SP LINE | $\overline{OK}$ |
| 52b | $\overline{OK}$ | 0 INTO OP |
| 52b | OK TIMES OUT | OK |
| 52b | OK•$\overline{OP}$ | 0 INTO SS (START PG) |
| HS IS USED TO GIVE A DELAY SO THE TW CAN COMPLETE THE OPERATION. | | |
| 51 | P9•DO•HS1 | S(I) |
| 51 | P9•Y8-12 | S(HS) (HS=0) |

FIG. 90-3

CARRIAGE RETURN M22

| FIG. | OPERATION | SIGNAL |
|---|---|---|
| 61 | PATCH | M22 |
| 61 | M22 | Y11 Z9 |
| 55 | Y11 | Y8-12 |
| 51 | Y8-12 | Y8-12•HSO |
| 59 | P9•Y8-12•HSO | 1 INTO SS (STOP PG) |
| 52a | P9•Y8-12•HSO | 1 INTO OP |
| 51 | P9•Y8-12 | S (HS) (HS=1) |
| 55 | (Z9•$\overline{Y2}$ OR $\overline{3}$)•(Y11•Z9)•OP | (OC) INTO TW (CR) |
| 55 | Y11•Z9 | PF |
| 55 | (Z9•$\overline{Y2}$ OR $\overline{3}$)•(PF•SS) | (OC) INTO TW (PCR) |
| 62 | CR CONTACTS CLOSE | 1 INTO SP LINE |
| 52b | 1 INTO SP LINE | $\overline{OK}$ |
| 52b | $\overline{OK}$ | 0 INTO OP |
| 52b | OK TIMES OUT | OK |
| 52b | OK•$\overline{OP}$ | 0 INTO SS (START PG) |
| HS IS USED TO GIVE A DELAY SO THE TW CAN COMPLETE THE OPERATION. | | |
| 51 | P9•DO•HS1 | S(I) |
| 51 | P9•Y8-12 | S(HS=0) |

FIG. 90-4

AUTOMATIC TAB
AUTO TAB (AT)

| FIG. | OPERATION | SIGNAL |
|---|---|---|
| 61 | NO INSTRUCTION | $\overline{X}$ |
| 59 | $\overline{X}$ | 1 INTO EPL |
| 52b | 1 INTO EPL | SET EPL |
| 52b | SET EPL | 1 INTO OSHB |
| 52b | OSHB | PR |
| 52b | $\overline{OSHB}$ TIME OUT | 1 INTO OP |
| 52a | $\overline{X}\cdot\overline{PCO}\cdot EPL$ | AT |
| 55,56 | $AT\cdot\overline{X}\cdot OP$ | 0 INTO OAa |
| 59 | 0 INTO OAa | ENABLE OAa |
| 55 | AT | 1 INTO OAb |
| 62 | OAa·OAb | 1 INTO TAB 1·2 |
| 62 | 1 INTO TAB 1·2 | TAB |
| 62 | TRANSFER TAB CONTACTS | 1 INTO SP LINE |
| 52b | 1 INTO SP LINE | $\overline{OK}$ |
| 52b | $\overline{OK}$ | 0 INTO OP (RESET OP) |
| 52b | $\overline{OK}\cdot\overline{X}$ | (0 INTO B) |
| 56 | 0 INTO OP | TURN OFF OAa |
| 62 | TAB CONTACTS RESTORE | 0 INTO SP LINE |
| 52b | 0 INTO SP LINE | SET OK |
| 52b | OK TIME OUT | OK |
| 52b | $OK\cdot\overline{OP}\cdot\overline{IP}\cdot\overline{OSHB}\cdot EPL\cdot\overline{PCO}$ | 1 INTO OSHB |
| 52b | TAB UNTIL X | |

FIG. 91

PROGRAM WORKSHEET

CUSTOMER APPLICATION *Net Extension* DATE PAGE 1 OF 1

PROGRAMMER

| NOTES | STEP NO. | INSTR | DESCRIPTION | RA REGISTER 12 11 10 9 8 7 6 5 4 | 3 2 1 | RP REGISTER 12 11 10 9 8 7 6 5 4 | 3 2 1 |
|---|---|---|---|---|---|---|---|
| Prog. Line I | 1 | 03 | Clear RA Register | ∅ | | | |
| | 2 | 13 | Release Selector Keys X-Y-2 | ∅ | | | |
| | 3 | 15 | Block Auto Tab | ∅ | | | |
| | | | | | | | |
| Prog. Line A | 1 | 21 | Enter Quantity LRD1 (4.0) | 100 | 00 | ∅ | |
| | 2 | 61 | Store Accumulative Qty S-1 | 100 | 00 | ∅ | |
| | 3 | 89 | Tab | 100 | 00 | ∅ | |
| | 4 | 22 | Enter Price LRD 2 (2.2) | 2 | 25 | 100 | 00 |
| | 5 | 11 | Multiply RA x RP | 225 | 00 | 100 | 00 |
| | 6 | 89 | Tab | 225 | 00 | 100 | 00 |
| | 7 | 33 | Printout Net Amount LRD3 (5.2) | 225 | 00 | 100 | 00 |
| | 8 | 124/114 | Space or Print Minus Sign | 225 | 00 | 100 | 00 |
| | 9 | 62 | Store Accumulative Amt (S-2) | 225 | 00 | 100 | 00 |
| | 10 | 99 | Carriage Return | 225 | 00 | 100 | 00 |

FIG. 92

United States Patent Office 3,419,850

Patented Dec. 31, 1968

3,419,850
PROGRAMMABLE COMPUTER UTILIZING NONADDRESSABLE REGISTERS

Jan Krammer, Nijmegen, Netherlands, assignor to Friden, Inc.

Continuation-in-part of application Ser. No. 471,313, July 12, 1965. This application Oct. 21, 1965, Ser. No. 499,537

65 Claims. (Cl. 340—172.5)

TABLE OF CONTENTS

| | Column |
|---|---|
| I. Introduction | 2 |
| II. Objects | 3 |
| III. Brief Description | 3 |
| IV. Figures | 4 |
| V. System Description | 5 |
| A. Typewriter | 5 |
| B. Electronic Processor (Block Diagrams) | 8 |
| (1) Program Line Selection | 8 |
| (2) Memory Organization | 15 |
| VI. Block Symbols | 20 |
| A. Gates | 20 |
| B. Amplifiers and Switches | 21 |
| C. Bistable Devices | 25 |
| D. One-Shot Circuit | 28 |
| VII. Power Supply | 28 |
| A. Voltages | 28 |
| B. Protection Circuit | 28 |
| VIII. Logic Diagram | 29 |
| (1) A Counter | 30 |
| (2) B Counter | 31 |
| (3) C Counter | 31 |
| (4) Core Memory | 32 |
| (5) D Counter | 32 |
| (6) G Signal Generator | 33 |
| (7) H Signal Generator | 33 |
| (8) Multiplication Phase Counter | 33 |
| (9) Instruction Counter | 34 |
| (10) Input | 34 |
| (11) Left and Right of Decimal (LRD) | 35 |
| (12) Manual Selector Switches | 36 |
| (13) Output | 37 |
| (14) P Pulse Generator | 37 |
| (15) Square Wave Generator | 38 |
| (16) Block Automatic Tabulation | 38 |
| (17) Typewriter Keyboard Switches | 39 |
| (18) Ten Program Keys | 40 |
| (19) Field Code Switches | 41 |
| (20) Program Lines | 42 |
| (21) Instruction Patchboard | 43 |
| IX. Instructions | 44 |
| A. Arithmetic Instructions | 45 |
| B. Transfer Instructions | 45 |
| C. Input and Output Instructions | 46 |
| D. Miscellaneous Instructions | 46 |
| E. Typewriter Instructions | 46 |
| (1) Add | 48 |
| (2) Subtract | 54 |
| (3) Clear | 56 |
| (4) Five-Cent Roundoff | 56 |
| (5) Shift Right (1) | 57 |
| (6) Shift Left (1) | 58 |
| (7) Shift Right (2) | 58 |
| (8) Shift Left (2) | 59 |
| (9) Repeat Program | 59 |
| (10) Multiplication | 60 |
| (11) Reset of Manually Operated Keys and Switches | 66 |
| (12) Block Automatic Tabulation | 67 |
| (13) Automatic Date | 67 |
| (14) Switch Registers (Invert) | 70 |
| (15) Negative Number Test | 71 |
| (16) Input | 71 |
| (17) Output | 75 |
| (18) Store | 75 |
| (19) Retrieve | 76 |
| (20) Store Adding | 76 |
| (21) Store Subtracting | 77 |
| (22) Recall Multiplying | 77 |
| (23) Typewriter Control | 78 |
| (24) Tabulate | 78 |
| (25) Carriage Return | 79 |
| (26) Automatic Tabulation | 79 |
| X. Programming | 80 |
| A. Program Panel Wiring | 80 |
| B. Program Selection | 80 |
| C. Program Lines | 81 |
| D. Instructions | 81 |
| E. Programming Principles | 82 |
| (1) Analysis | 82 |
| (2) Allocation | 82 |
| (3) Coding | 82 |
| (4) Refinement | 82 |
| (5) Wiring | 82 |
| (6) Checking | 82 |
| F. Sample Application | 83 |
| G. Program Modification | 85 |

ABSTRACT OF THE DISCLOSURE

A programmable computer is disclosed which has several storage registers, selected ones of which are capable of cooperating as a working pair of nonaddressable registers. A means is provided for interchanging the active and passive registers prior to the entry of a nonaddressed number into the active register. A program means is also provided which causes a predetermined program sequence to be performed by the arithmetic and control unit of the computer in response to the combination of an activated manual program selecting device and a position of a movable portion of the input-output unit.

I. INTRODUCTION

This invention relates to electronic computers and more particularly to an automatic, high speed, and flexible billing/accounting electronic computer.

This application is a continuation-in-part of United States application Ser. No. 471,313, filed July 12, 1965, entitled "Organization of a Temporary Storage for the General Arithmetic and Control Unit of an Electronic Computer," now abandoned.

Various billing/accounting or invoicing machines presently available can generally be broken down into two groups. One group comprises relatively high speed, automatically, electronic machines which can be characterized as being essentially one program machines which cannot readily handle various jobs and functions which the user may have. The second group comprises machines which are highly flexible and can handle a wide variety of jobs and functions by having interchangeable racks, control belts, etc., but have the disadvantage of not being automatic in operation.

A high speed, automatic, and flexible billing/accounting machine can readily be obtained by using well-known techniques. However; flexibility and versatility achieved with well-known techniques results in a disproportionate increase in cost of the machine. One reason for this disproportionate increase in cost is due to the typical computer memory organization including a relatively permanent storage means and temporary storage means. In order to carry out arithmetic calculations, etc., data must generally be transferred back and forth between the temporary and permanent storages. This is accomplished by having the data include address and instruction portions which must be stored along with the data to be operated upon. The temporary and permanent storage capacity must be increased to accommodate these non-data instructions and addresses and, as the flexibility and versatility of a computer is increased, the temporary and permanent storage capacity must be increased to handle the increased number and length of addresses and instructions. This results in a disproportionate increase in the cost of the computer because the price per bit of memory storage is relatively high.

If the number and/or length of the required instructions and addresses can be reduced, a simpler and less expensive computer can be realized because a smaller memory capacity would be required. A memory organization has been proposed which requires only a short instruction portion which is accomplished by interconnecting a plurality of storage registers into a "stack." The first register (transaction register) is the most significant register and the significance of the remaining registers decrease according to their location with respect to the first register. For example, the least significant register is the last register, i.e., the register farthest removed from the first register. One disadvantage of this organization is that the sequence of significance of each register (the sequence in which the registers are used) cannot be changed and all information contained in the memory is successively interchanged via the first or transaction register. Also, the number of registers in the "stack" must provide the maximum capacity required so that the many computations which do not require the maximum storage capacity causes a portion of the memory to be empty. Further, since each register has a fixed significance, the registers are not randomly accessible.

Also, in order to obtain flexibility and versatility, the computing apparatus must be capable of performing a plurality of programs. Providing separate programs, with each program comprising various functions and/or steps for every routine to be performed by the computing apparatus, is undesirable and costly because many such programs will not be used when particular operations and jobs are being performed. A better approach would be to provide a lesser number of program means which can readily and economically be changed or modified to perform the various desired operations without sacrificing automatic and high speed operation.

II. OBJECTS

Accordingly, one object of this invention is to provide a randomly accessible temporary storage organized in such a manner that instructions and addresses, if not eliminated entirely, are substantially reduced thereby enabling a simple and relatively inexpensive computer to be realized.

Another object of this invention is to provide improved billing/accounting computing apparatus.

Still another object of this invention is to provide high speed, automatic flexible and versatile billing/accounting computing apparatus.

A further object of this invention is to provide automatic and versatile billing/accounting computing apparatus without a disproportionate increase in cost.

A still further object of this invention is to provide computing apparatus having an improved memory organization.

Further, an object of this invention is to provide computing apparatus capable of performing a number of programs.

Another object of this invention is to provide computing apparatus capable of performing a number of programs wherein an operator may cause the computing apparatus to change from one program to another even though the previously selected program is being performed.

Still another object of this invention is to provide computing apparatus capable of performing a number of programs wherein an operator may readily modify the steps in a selected program even though the program is being performed.

A further object of this invention is to provide computing apparatus capable of performing a number of programs wherein the programs are selected automatically and/or by an operator.

III. BRIEF DESCRIPTION

In accordance with one feature of this invention, two temporary storage registers are provided, which registers function as a working pair. At any instant in time, one of the registers in the pair is an active register and the remaining register is a passive register with all data entries and transfers being made via the active register.

In accordance with another feature of the present invention, the activity or passivity of each of the cooperating pair of registers is determined by an arithmetic and control unit so that arithmetic operations, data entries and transfers, etc., can be accomplished efficiently and in such a manner that instructions, if not eliminated entirely, are substantially reduced.

In accordance with another feature of the present invention, a plurality of temporary storage registers are provided wtih the cooperating pair of registers, which storage registers serve to store constant factors and/or intermediate results.

In accordance with another feature of this invention, one of the cooperating pair of registers and one of the temporary storage registers may be selected as a pair of cooperating registers such that the number of instructions required to perform a function is reduced.

In accordance with another feature of this invention, a number of programs which can be performed by computing means are provided and a program is selected by the combination of an operator function and the condition of an input-output device.

In accordance with another feature of this invention, programs selected may be readily changed or modified by a manual operator function.

In accordance with another feature of this invention, the presence of an operator function which tends to select a program will cause the computing apparatus to activate the input-output device such that the combination of input/output device condition and operator function which selects a program is achieved.

In accordance with another feature of this invention each of the plurality of programs has a plurality of functions or instructions associated therewith. Once a program is selected the functions associated therewith are performed sequentially and each function is individually identified by at least two D.C. level signals. Circuit means are provided which, in response to the two D.C. level signals, provide sequentially occurring pulses which cause the function or instruction identified with the two D.C. level signals to be performed.

IV. FIGURES

This invention, as well as other features, objects and advantages thereof, will be readily apparent from consideration of the following description relating to the accompanying drawings in which like reference characters designate like or corresponding parts throughout the several views and wherein:

FIGS. 10 through 38 illustrate schematically various circuits utilized in this invention;

FIGS. 10A through 38A illustrate symbolically the circuit diagrams of FIGS. 10 through 38, respectively;

Figure 39:
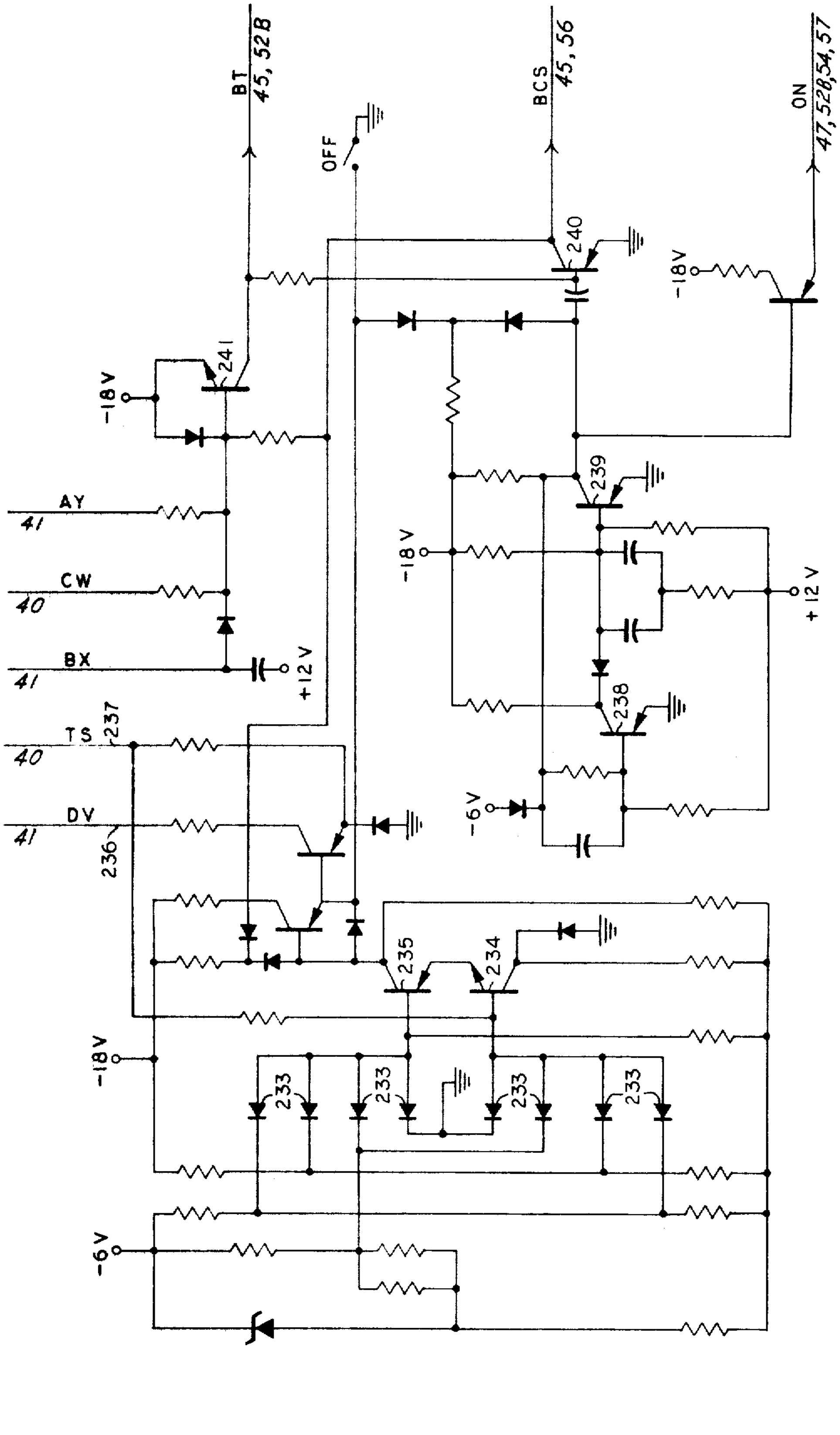
Figure 40:
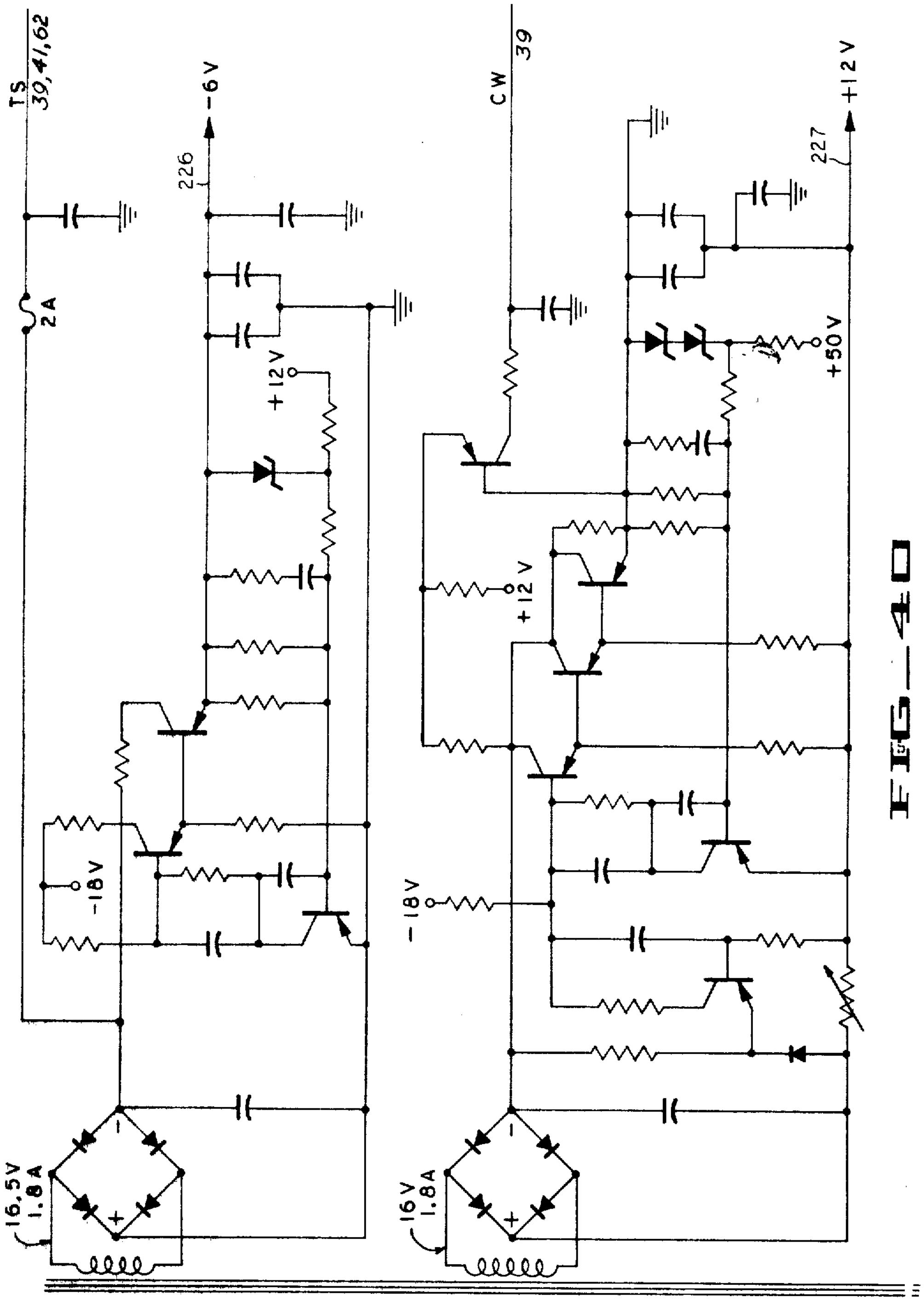
Figure 41:
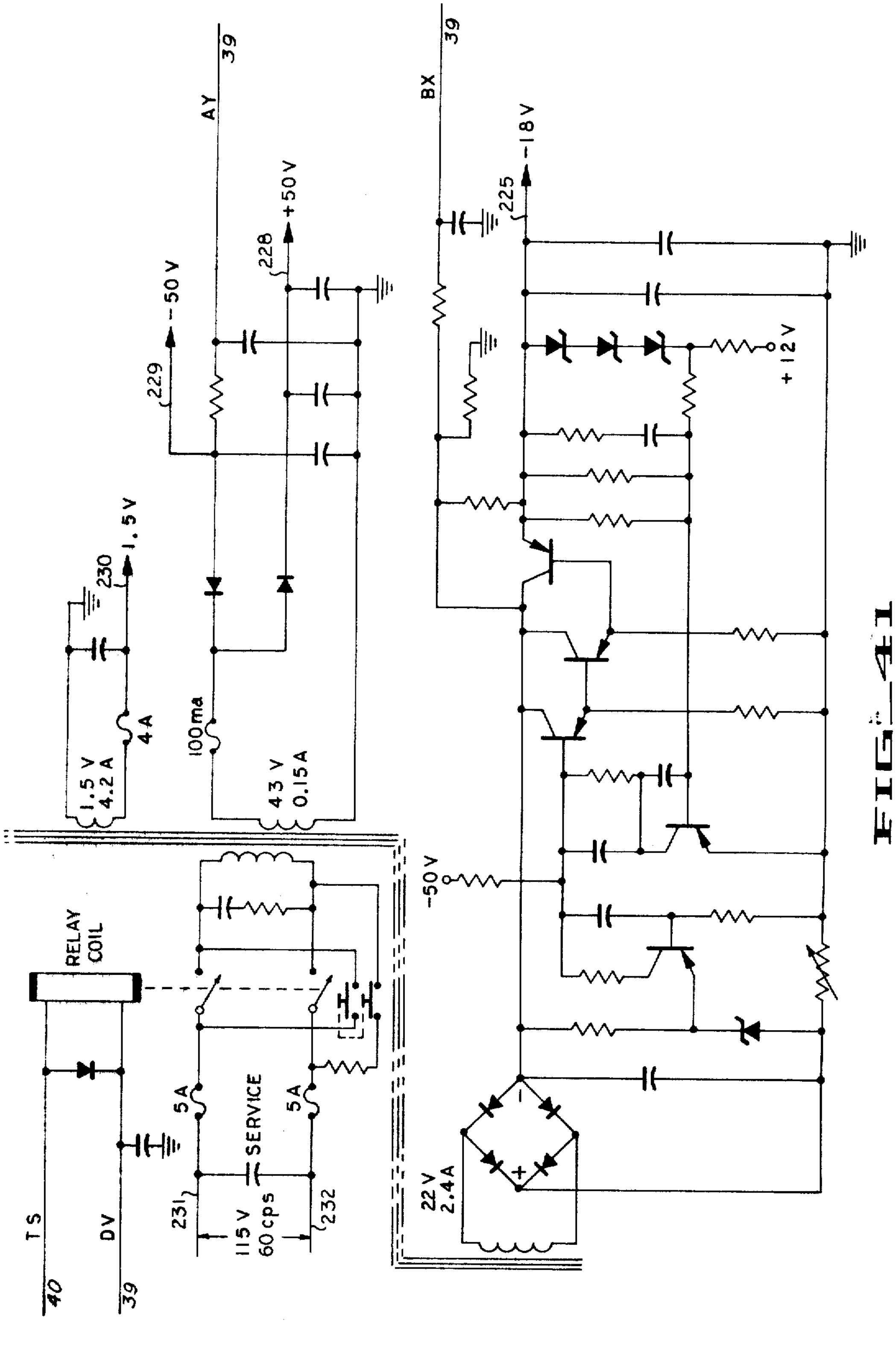
Figure 93:
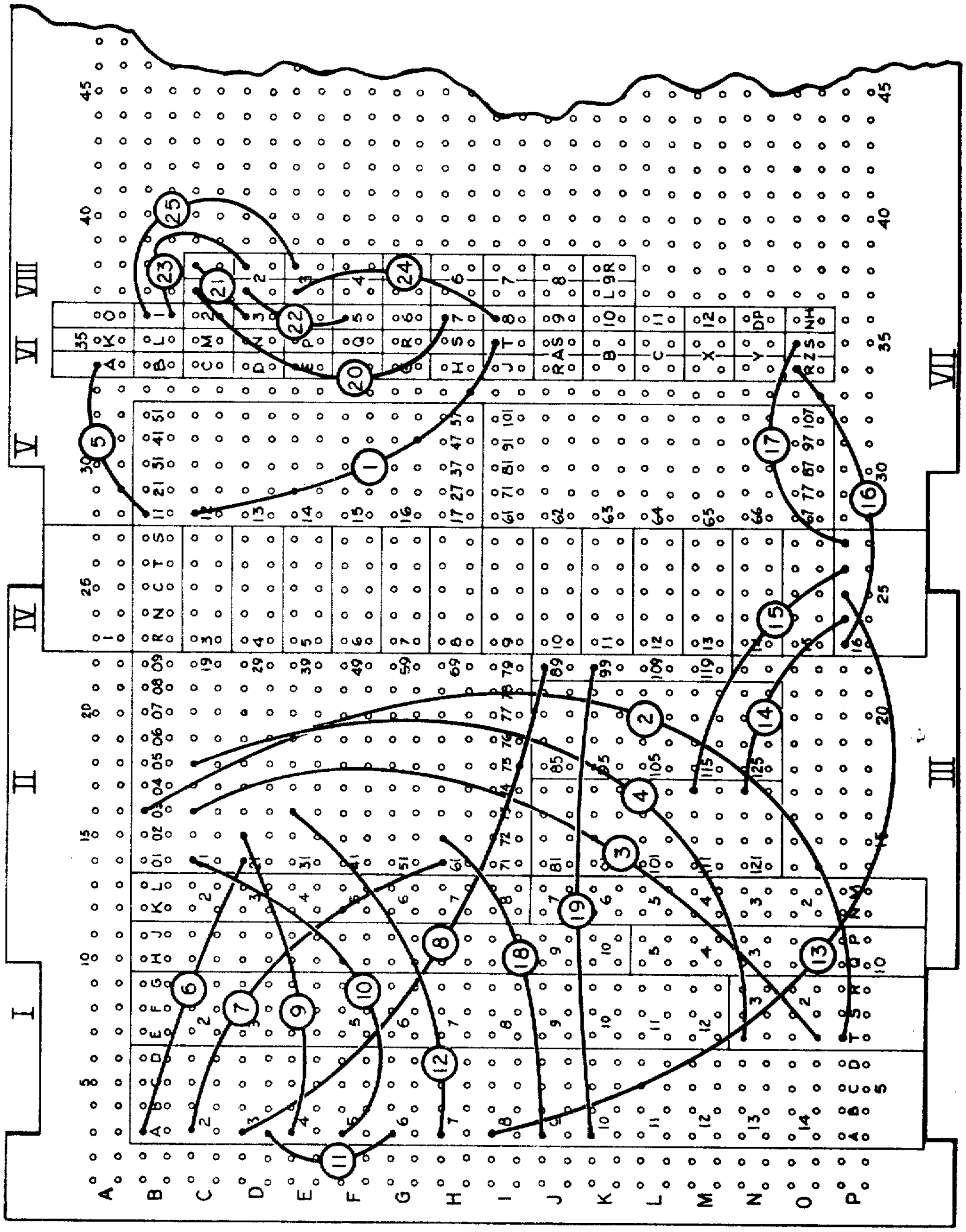

FIGS. 39, 40 and 41 comprise a schematic diagram of the power supply used in this invention;

FIGS. 42 through 62 illustrate a complete logic diagram of the present invention and include the symbols illustrated in FIGS. 10A through 38A;

FIGS. 63 through 91 illustrate various operational charts, logic diagrams and flow charts which describe various operations performed by this invention;

FIG. 92 illustrates a work sheet for preparing a simple program for the present invention; and FIG. 93 illustrates a plugboard utilized in this invention and having a sample program patched thereon.

V. SYSTEM DESCRIPTION

A. *Typewriter*

Figure 1:
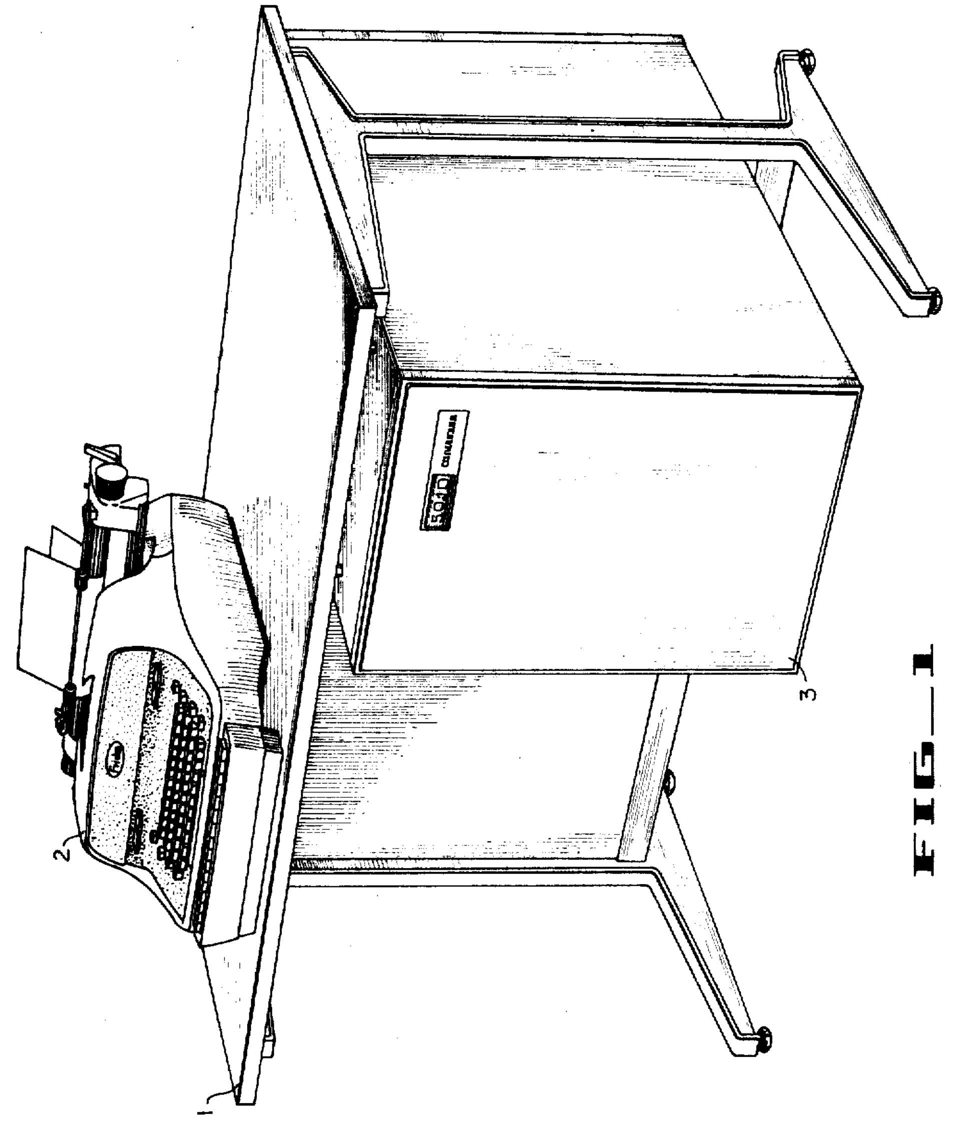
FIG. 1 illustrates a pictorial view of apparatus embodying a preferred form of this invention.

Referring now to FIG. 1, which illustrates a pictorial view of a machine embodying a preferred form of the present invention, there is illustrated a console desk 1. The left portion of the desk top is adapted to receive a typewriter 2, such as an IBM model "C" electric typewriter, which is modified in a manner as described hereinbelow. At the right-hand portion of the desk, beneath the desk top, a housing 3 is provided for an electronic processor, which includes various electronic circuits that, with the electric typewriter 2, accomplish the objects of this invention.

The typewriter 2 preferably includes the features of front panel Tab Set and Clear, Multiply Copy Control, Variable Line Spacer, Line Position Reset, Impression Control and Indicator, Paper Release Lever, Carriage Release Lever, Ribbon Shaft and Ribbon Rewind. In one embodiment of this invention which was constructed, the Margin Reset feature of the typewriter was removed because a Partial Carriage Return feature activated by the electronic processor was provided. This was accomplished, in part, by installing at least two Partial Carriage Return (PCR) stops on the margin rack of the typewriter.

The typewriter 2 functions as the input and output unit for the electronic processor contained within the housing 3 and is modified so that the numeric keys and space bar on the typewriter keyboard are not coupled to their respective type bar arms. Accordingly, when a numeric key (or the space bar) is depressed, the corresponding type bar or space mechanism is not actuated by the key depression. However, depression of a numeric key produces an electrical signal that is transmitted to the electronic processor which stores the corresponding numeral or digit in a one-digit binary memory or counter. The numeral or digit entered into the one-digit binary counter is then transferred into a magnetic core memory unit and at the same time the electronic processor causes the type bar corresponding to the numeral entered into the memory unit to be actuated thereby causing the numeral entered into the memory unit to be typed. The digit typed represents exactly the numeric value entered into the memory unit. As a consequence of this, the digit typed may differ from the numeric key depressed due to any mechanical failures, such as dirty contacts, etc., that cause an erroneous electrical signal to be transmitted to the electronic processor. This arrangement provides a safety feature which enables easy checking of the typewriter keyboard electrical contacts by comparing the digit typed with the numeric key depressed. Likewise, depression of the space bar on the typewriter keyboard causes the electronic processor to activate the space-producing mechanism in the typewriter.

The alphabetic and symbolic keys on the typewriter keyboard, however, are coupled to their corresponding type bars which enable depression of these keys to cause the typing of their corresponding letters and symbols independently of the electronic processor. Selected ones of the alphabetic and symbolic type bars can also be activated by the electronic processor as discussed hereinbelow.

Utilization of the typewriter 2 as the input unit for the electronic processor does not inhibit the speed at which the typewriter keyboard can be operated. Rather, keyboard entry speed is a factor dependent upon the operator and the data being typed or entered, i.e., numeric, alphabetic or both. When functioning as an output unit, the typewriter output speed, while under the control of the electronic processor, is approximately seventeen characters per second.

Figure 4:
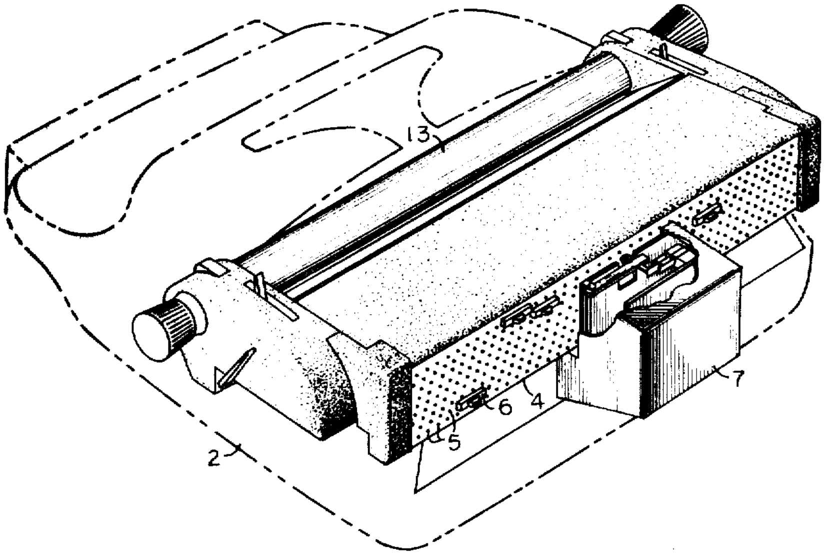
FIGS. 4 and 5 illustrate in detail particular features of the input/output device.

Referring now to FIG. 4, there is illustrated a substantially flat, rectangular actuator rack 4 which is removably secured to the back of the carriage of the typewriter 2 such that the longitudinal axis of the actuator rack is parallel to the longitudinal axis of the cylindrical platen 13 of the typewriter. The actuator rack includes a plurality of channels, each channel consisting of a row of perforations 5, which are parallel to one another and parallel to the longitudinal axis of the actuator rack 4. Each channel is adapted to receive a plurality of flat-surfaced cams 6, each of which extend outwardly from, and substantially perpendicular to, the flat surface of the actuator rack with the longitudinal axis of each cam being parallel to the longitudinal axis of the actuator rack. The actuating portion of each cam 6, i.e., the surface of the cam remote from the substantially flat surface of the actuator rack 4, is flat and rectangular, with a ramp on each side, and substantially parallel to the flat surface of the actuator rack.

In accordance with a preferred embodiment of the present invention, six channels on the actuator rack are utilized for receiving cams. However, the present invention is not limited to this number of channels because a greater or lesser number of such channels can be utilized in practicing this invention. Three channels located on the upper portion of the actuator rack are utilized to control program line PL selection, two channels located near the bottom of the rack are utilized to enable the operator of the typewriter to type descriptive material, and another channel near the bottom of the rack is used in conjunction with a partial carriage return PCR feature.

Figure 5:
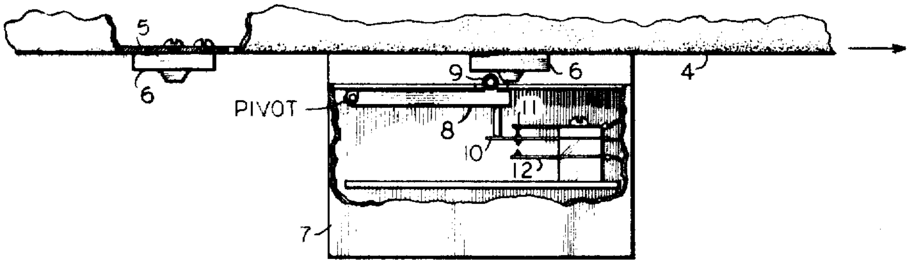

Secured to the base of the typewriter is a housing 7 which contains a switch for each of the channels on the actuator rack which are utilized. One such switch is illustrated in FIG. 5 as comprising a lever 8 pivoted on one end and having a roller 9 located adjacent the other end. Since the longitudinal position of the lever is fixed, movement of the typewriter carriage causes an equal movement of the actuator rack so that the cams located on the channels used will, if enough movement takes place, actuate the switches associated with those channels. When a cam 6 contacts the roller 9, the lever rotates around its pivot point and causes an electrical switch contact 10 to engage another contact 12 and to disengage from a contact 11. These electrical switches are identified as field switches FS and one such field switch is provided for each channel on the actuator rack, which is utilized by having one or more cams 6 placed thereon.

Figure 3:
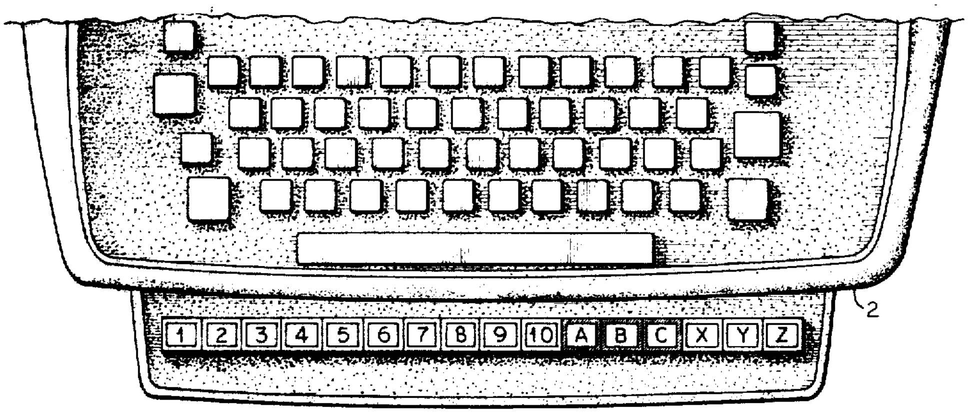
FIG. 3 illustrates the keyboard of an input-output device used in the present invention.

Located in front of the typewriter keyboard is a program key bank comprising sixteen keys as illustrated in FIG. 3. The ten keys at the left side, and labeled "1" through "10" are identified as being Program Keys PK, while the six keys to the right labeled A, B, C, X, Y and Z are identified as being Manual Selector Keys MSK.

Each of the ten program keys is equipped with an indicating light located behind the face of the key which lights up when the key is depressed. The ten program keys are utilized in conjunction with the three field switches FS associated with the three channels located near the top of the actuator rack, described in conjunction with FIGS. 4 and 5, to select a Program Line PL to be performed by the machine in a manner described in detail hereinbelow. By means to be described, only one program key can be selected at a time. If two or more program keys are depressed, none will be selected. Because of this feature, a program key erroneously depressed, i.e., selected, can be released by depressing another program key which results in neither of the two program keys being selected. The single selected program key can also be released by a signal produced by the electronic processor unit.

Each of the six manual selector keys, A, B, C, X, Y and Z, is also equipped with an indicating light located beneath the face of the key which lights up when the key is depressed. By means to be described, these keys function, when depressed, to change the program line selected by the combined action of a depressed program key and the three field switches, or to modify the steps the program line so selected is to perform. When a manual selector key is depressed, it remains selected until released by depressing the same key again, or by a signal provided by the electronic processor. Further, unlike the ten program keys, one, any combination, or all six of the manual selector keys can be selected at one time. Also, as will be described below, manual selector keys C and Z are utilized by the electronic processor.

Figure 2:
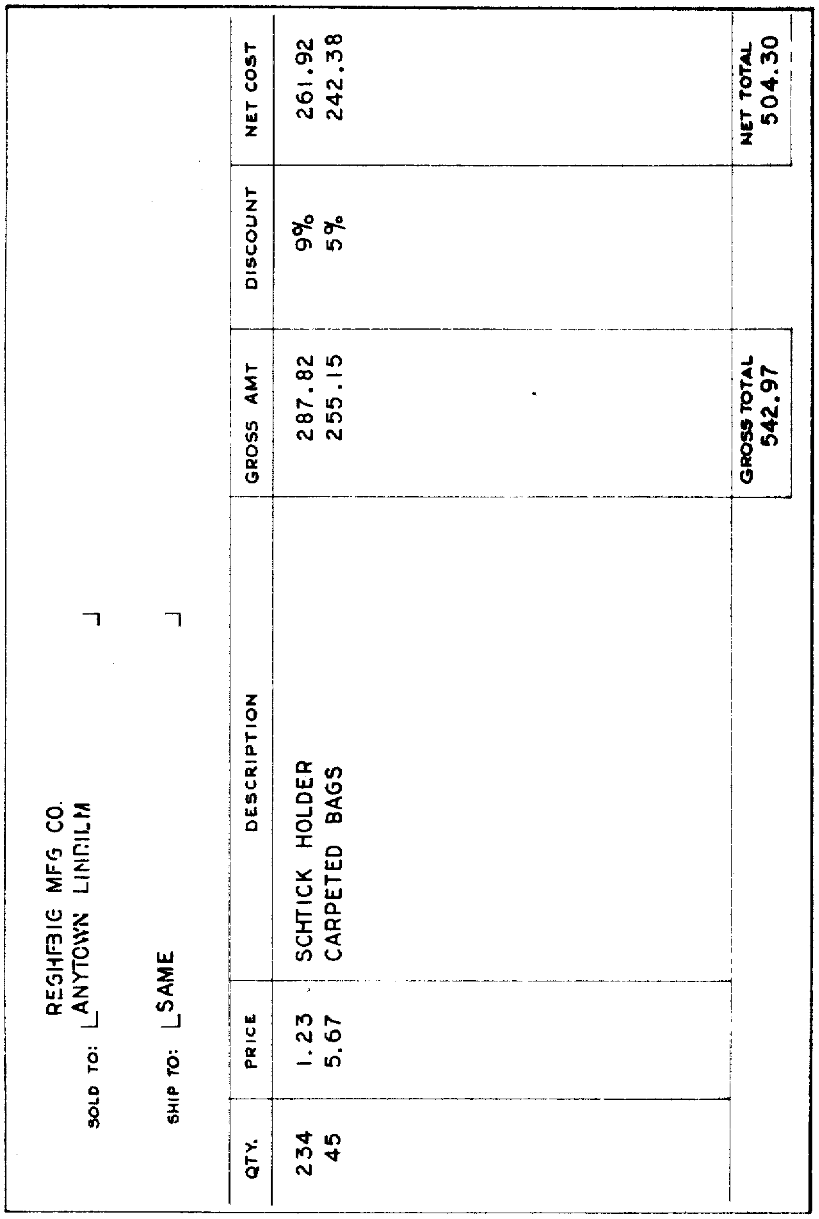
FIG. 2 illustrates a typical billing/accounting or invoicing form which may be utilized with the apparatus of FIG. 1.

FIG. 2 illustrates a simplified billing/accounting or invoicing form which may be used with the apparatus comprising this invention. As illustrated, the form includes a column for Quantity, Unit Price, Description, Gross Amount, Percentage Discount and Net Cost. After the form is placed in the typewriter 2 and information, such as seller, buyer, invoice number, etc., is entered onto the heading of the form, the operator enters the quantity, unit price and description for a particular sale or transaction. When the Gross Amount column is reached, the electronic processor automatically causes the typewriter to print or type out the correct amount into this column. The operator next enters the Percentage Discount, after which the electronic processor automatically causes the typewriter to enter the correct amount into the Net Cost column. The process is repeated for each item or transaction and, as each item is entered, the electronic processor calculates the Gross and Net Total. When the entry is complete, the electronic processor will cause the typewriter to type out the correct amounts into the Gross Total and Net Total columns.

The form shown in FIG. 2, for purposes of illustration, is an extremely simple form. The apparatus comprising this invention readily handles much more complex forms and calculations, and it is to be understood, therefore, that the present invention is not limited to the simple calculations associated with the form of FIG. 2. For example, the apparatus of this invention can readily be used to perform various accounting functions, such as cost accounting, employee earning records, including deductions, overtime, contributions, etc., and many other invoicing or accounting functions, either singularly or in combination.

A number of programs or program lines PL are provided which may be carried out by the electronic processor. A program line may span one or more columns of a particular form being used with the typewriter, and once the program line is completed, it may be necessary to select a new program line. This is accomplished by a combination of a depressed program key and a particular combination of the three field switches discussed in conjunction with FIGS. 4 and 5. The three field switches provide seven different combinations where one or more of these three switches are activated by a cam or the associated channel. One of these seven combinations is used, in conjunction with a depressed program key, in selecting a new program line. Since a program line begins at a particular column, the cams which will provide the desired field switch combination are positioned in their channels on the actuator rack in such a manner that the column line, corresponding to the left side of the first column in the new program line, is located and passes substantially perpendicularly between and in front of the two side edges of the flat actuating surface of the cam or cams. Likewise, the roller 9 on the lever switches 8 is positioned to be in line with the typing or printing area on the typewriter platen 13.

If the termination of a previous program line does not place the typewriter carriage in a position where a cam or cams actuate one or more of the three field switches, the electronic processor will, if certain conditions exist, automatically tabulate the typewriter to arrive at the desired carriage position. Alternatively, the operator can depress the tabulator key in order to obtain the carriage position which selects a new program line. In order to have the carriage stop at a position which activates one or more field switches, a tab stop is set at each carriage position where one or more cams are placed so as to be capable of selecting a program line. The tab stops may be set by depressing the tab stop lever in each of the desired positions. This lever is nonlatching and will return to its normal position after each tab stop is set. It will be understood that since each form used with the typewriter may require a plurality of program lines, a tab stop position and combination of cams located with reference to the form being used is provided for each program line that may be used with a particular form. Once these settings are made, however, the program lines actually run or performed are under the control of the operator and the electronic processor. That is, these settings merely provide a certain number of program lines which may be selected by the operator in any desired sequence.

B. *Electronic processor (block diagrams)*

(1) PROGRAM LINE SELECTION

Figure 6:
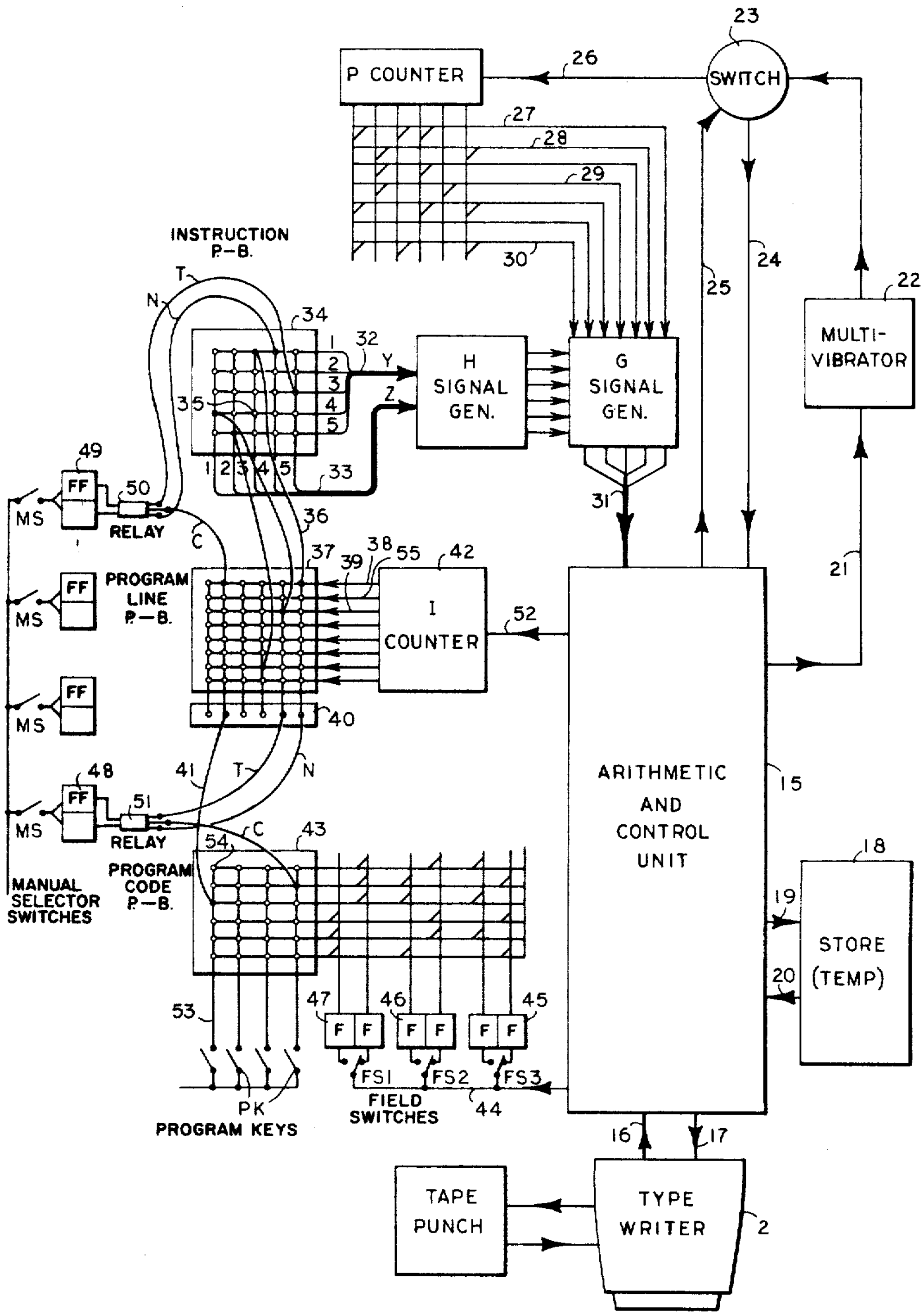
FIG. 6 illustrates a simplified block diagram of the present invention.

Before considering a detailed description of the electronic processor memory organization contained within the housing 3 shown in FIG. 1, it will be helpful to consider a simplified block diagram of the electronic processor. One such block diagram is illustrated in FIG. 6, wherein there is shown the typewriter 2 of FIGS. 1, 3, 4 and 5. Numeric and other data is entered from the typewriter keyboard into an arithmetic and control unit 15 by way of the line 16.

The numeric and preselected alphabetic and symbolic typewriter type bars are actuated by the arithmetic and control unit by means of the line 17. It is clear, then, that the typewriter 2 functions as the input and ouput unit for the arithmetic and control unit 15. Data entered into the arithmetic and control unit from the keyboard of the typewriter may be stored in a plurality of temporary storage registers 18 under the control of the arithmetic unit by way of the line 19. Likewise, data stored in the temporary storage registers 18 may be retrieved and utilized by the arithmetic and control unit by way of the line 20.

The arithmetic and control unit also controls, by way of the lead 21, a fee-running multivibrator 22. The operation of the multivibrator is such that, when enabled by the arithmetic and control unit, it produces square wave signals having a frequency of approximately twenty-five thousand cycles per second. When disabled by the arithmetic and control unit, the free-running multivibrator 22 does not produce an output. The square wave output of the multivibrator is applied to an electronic switch 23 which functions to direct the square waves to the arithmetic and control unit by way of the line 24 or, alternatively, to direct the square waves to a binary scale of ten P counter by way of the line 26. The position of the electronic switch is controlled by the arithmetic and control unit by way of the lead 25. When received by the arithmetic and control unit, the square wave pulses are utilized to perform various functions, such as counting up or counting down various binary counters to perform various arithmetic operations, such as addition and subtraction.

The scale of ten P counter is designed to step, that is, count, each time a complete cycle of the multivibrator output is applied thereto, by way of the electronic switch 23. The electrical condition or state of each bistable element included within the P counter is coupled to an associated electrically conductive line which is illustrated by the vertical lines emanating from the bottom of the P counter. This enables the count contained within the P counter to be determined by sampling the voltage levels appearing on the vertical lines. A plurality of horizontal conductors pass adjacent the vertical conductors emanating from the P counter. Selected ones of the vertical conductors are coupled to selective ones of the horizontal conductors by way of the slanted lines which represent diodes. The diodes are coupled between selected vertical and horizontal lines so that each horizontal line and the various vertical lines coupled thereto by way of the diodes constitutes an AND gate. Each AND gate is designed to be activated by a particular count, that is, digit, contained within the P counter. For example, if the P counter contains a "0" count, the first, or uppermost, AND gate would be activated, thereby causing a P0 signal to appear on the line 27. Likewise, if the P counter contained a "1" count, the second AND gate would be activated, causing a P1 signal to appear on the line 28, and if the P counter contained a count of "3," the third AND gate would be activated, causing the line 29 to be activated by the presence of a 3 pulse. Also, if the P counter contains a count of "6," the last or bottommost AND gate would be activated, thereby producing a P6 pulse on the line 30. As will be obvious to those skilled in the art, the number of AND gates may equal the number of counts which the counter is capable of counting to, or an AND gate can be provided for only selected ones of the counts that are capable of being present in the counter P. Since the P counter will contain only one count at any one time, only the AND gate associated with that count can be activated at any one given time. Further, since the P counter is counted sequentially by the output of the multivibrator 22, the AND gates are also activated sequentially.

Figure 7:
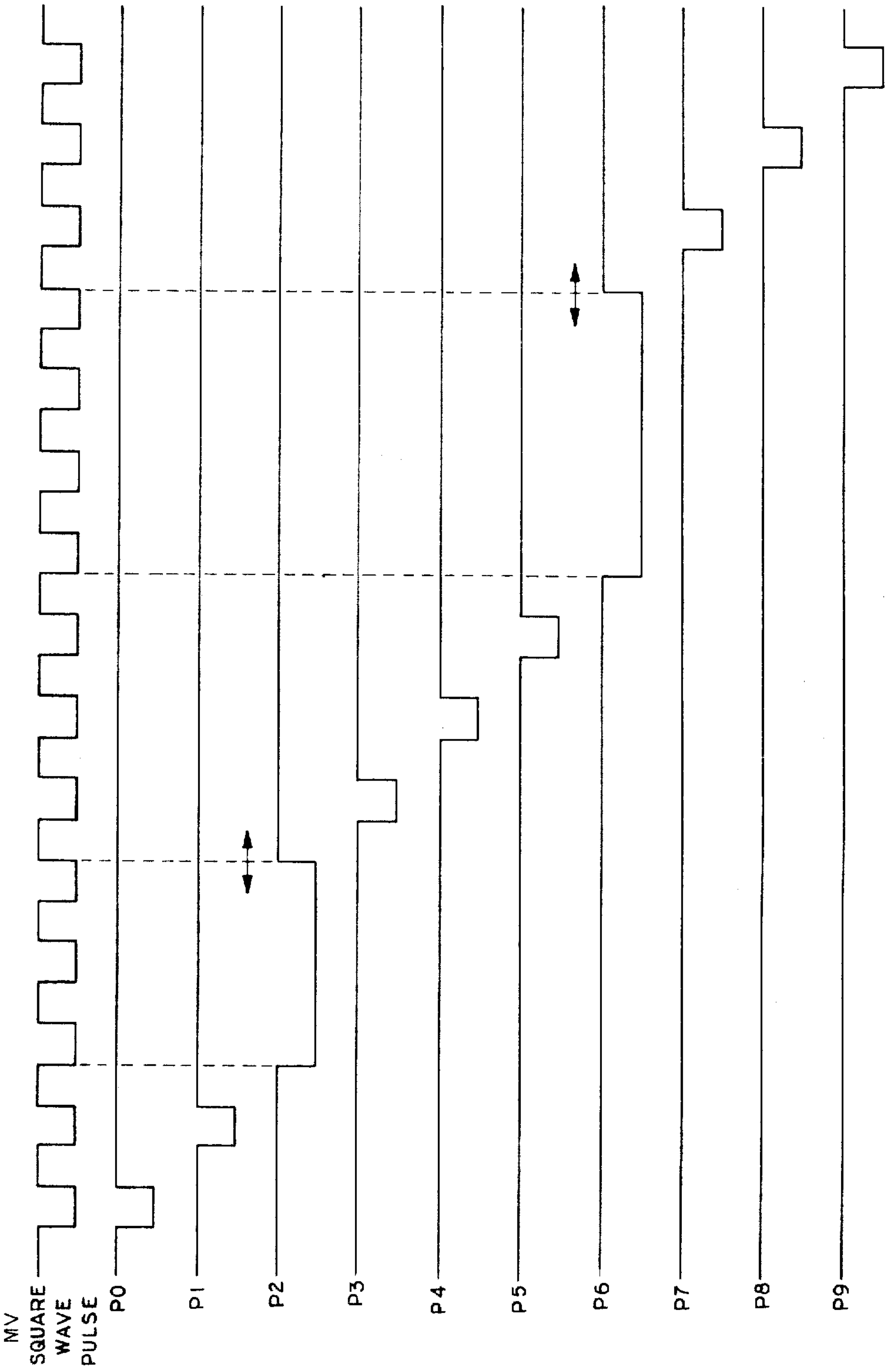
FIG. 7 illustrates idealized timing wave shapes generated by a portion of the apparatus comprising this invention.

In accordance with a preferred embodiment of the present invention, one AND gate is provided for each count, or digit, that can be contained within the P counter and the P counter has a scale of ten, therefore, ten AND gates are provided, one for each of the digits "0" through "9." As illustrated in FIG. 7, which shows the square wave output of the multivibrator and the outputs from the AND gates, this arrangement provides that the output from the AND gates appearing on the output leads, such as leads 27, 28 and 29, occurs sequentially and in synchronism with the count in the P counter.

As illustrated in FIG. 6, the output of each of the AND gates is individually applied to a G signal generator. In addition to receiving the sequentially occurring P pulses provided by the P counter and plurality of AND gates, the G signal generator also receives the output of an H signal generator. The input to the H signal generator is provided by a patchboard 34, hereinafter called the "instruction patchboard." The hubs on this patchboard represent arithmetic, logic and other functional instructions which can be performed by the arithmetic and control unit. The patchboard 34 comprises a plurality of hubs or terminals which are electrically interconnected to form a plurality of rows and columns. The horizontal rows of interconnected hubs are generally designated by the character Y, while the columns of vertically interconnected hubs are generally indicated by the character Z. As will be described in detail hereinbelow, only one instruction hub at one time may be selected and a particular instruction hub is selected by applying a potential thereto by way of a patch lead, such as lead 36. Once an instruction hub has been selected, it will provide a potential on one of the Y, or horizontal, leads and on one of the vertical or Z leads. These Y and Z potentials are then applied to the H signal generator by way of the cables 32 and 33, respectively. As will be obvious from an inspection of the instruction patchboard 34, selection of one of the plurality of instruction hubs, by applying a D.C. potential thereto, will generate a Y and Z signal which is associated with that instruction hub, and no other instruction hub. That is, selection of a particular instruction hub will generate a Y signal that is associated with each of the hubs in the horizontal row to which it is coupled. However, each instruction hub in every row is coupled to a different vertical, or Z, line. For example, selection of the hub 35, by applying a potential thereto, will produce a potential upon the horizontal line Y–4. Selection of any other hub in this horizontal row will likewise produce a potential upon the line Y–4. However, selection of the hub 35 will also produce a potential upon the vertical line Z–3, whereas, selecting any one of the other hubs in the horizontal row Y–4 will not produce a potential on the vertical line Z–3. It is clear, then, that the particular instruction hub selected is identified by the horizontal Y and vertical Z lines which it activates.

The Y and Z lines which are activated (i.e., have a D.C. potential applied thereto) by selecting an instruction hub on the patchboard 34 are coupled to the H signal generator and will activate selected ones of its output lines which are coupled to the G signal generator. Which, and how many, of the outputs of the H signal generator are activated is determined by which Y and Z leads have been activated which, in turn, is determined by which instruction hub has been selected. The activated outputs of the H signal generator, then, signify which instruction hub has been selected. The activated outputs of the H signal generator are characterized as being D.C. level signals which exist as long as the particular instruction hub is activated.

The G signal generator receives the D.C. outputs of the H signal generator and the sequentially occurring pulse outputs of the P counter and plurality of AND gates associated therewith. In response to these input signals, the G signal generator will produce sequentially occurring G signals, each of which have a duration equal to the duration of a P pulse supplied by the P counter and its associated plurality of AND gates. Depending upon the input to the G signal generator from the H signal generator, the G signal generator will generate one, none, or a plurality of such G signals for each P pulse received from the P counter, that is, for each pulse denoting a particular digit or count within the P counter. For example, during the time that the "0" count is contained within the P counter, the G signal generator may generate none, one, or a plurality of G signals which will exist only as long as the "0" count is contained within the P counter. These G signals, so generated, are applied to the arithmetic and control unit by way of the cable 31 and can be described as the working signals for the arithmetic and control unit which direct and enable the arithmetic and control unit to perform certain predetermined functions, such as addition, subtraction, resetting certain flip-flops, setting a "0" into certain register counters, setting flip-flops, instructing the arithmetic and control unit to enter data into the temporary storage registers 18, or to remove data from the temporray storage registers 18, or to enable input information to be received by the arithmetic and control units from the typewriter, or to cause the arithmetic and control unit to operate the typewriter, etc. As the P counter is stepped from "0" through "9," the G signals produced by the G signal generator will occur sequentially and in synchronism with the contents of the P counter. Also, once selected, an instruction hub remains activated until the P counter completes at least one full cycle, i.e., counts from "0" through "9." It is clear, then, that the selection of a particular hub on the instruction patchboard 34 causes the arithmetic and control unit to perform certain preselected steps or functions under the control of the G signals.

At this point, it should be mentioned that the interconnections between the units illustrated in FIG. 6 are not so clear or definite as might be implied from the simplified block diagram illustrated therein, since, for instance, the output of at least some of the AND gates associated with the P counter are applied to other units other than to the G signal generator. Also, the input to the H signal generator is not exclusively from the instruction patchboard 34. It will be understood, then, that the interconnecting lines shown in FIG. 6 are merely suggestive of the existence of information transfer and do not carry the implication that one such interconnecting line necessarily represents a single wire, cable or channel, or that the information transferred along such interconnection is necessarily unidirectional or bidirectional. Also, as will be obvious to those skilled in the art, the G signal generator, H signal generator, the free-running multivibrator 22, the electronic switch 23 and the P counter and associated AND gates, together with the patchboard 34, may be logically assumed to be a part of the arithmetic and control unit 15 and not separate therefrom, as illustrated by FIG. 6.

The instruction hubs on the instruction patchboard 34 are wired to a program line patchboard 37 by any suitable means, such as a patch wire 36. The program line patchboard contains a plurality of hubs interconnected into a plurality of rows and columns in a manner substantially similar to the instruction patchboard 34. Each of the hubs on the program line patchboard interconnected to form a vertical column can be identified as being a program line. Each program line terminates in the patchboard 40 and has associated therewith a hub which may be patched, or connected, to a program code patchboard 43.

The horizontal rows of hubs in the program line patchboard 37 are connected to the output of a binary counter 42, hereinafter called the "instruction (I) counter." Each line emanating from the instruction counter 42 has associated therewith a particular count in the instruction counter. For example, if the instruction counter contains the digit, or count, "0," the top, or uppermost, line 38 will be activated so as to produce a potential which is applied to each of the hubs in the uppermost row of the program line patchboard 37. Consequently, if the instruction counter has a count of "2" therein, only the output line 39 emanating from the instruction counter will be activated, thereby applying a potential to each of the interconnected hubs on the program line patchboard in the row third down from the top. The digit, or count, in the instruction counter is controlled by the arithmetic and control unit 15 by way of the line 52. That is, the count in the instruction counter is increased another digit by the arithmetic and control unit applying a pulse to the line 52 which causes the counter to step, that is, count, to the next highest digit, thereby activating the next horizontal line on the program line patchboard and each of the hubs associated therewith. In order to activate any particular hub on the program line patchboard, the horizontal line to which it is coupled must be activated by the output of the instruction counter, and also the vertical line to which the hub to be selected is coupled must also be activated. This is accomplished by the vertical program line being patched or connected by way of its hub on the patchboard 40 to an activated hub on the program code patchboard 43. If a hub on the program line patchboard 37 is activated, and is coupled by way of a patch wire to a hub on the instruction patchboard 34, that instruction will have been selected and the appropriate G signals will be generated and the arithmetic and control unit will cause the selected instruction to be performed.

In order to activate one of the program lines on the program line patchboard 37, it must first be selected by the program code patchboard 43. The program code patchboard contains a plurality of interconnected hubs which form a plurality of rows and columns in a manner substantially similar to the program line and instruction patchboards 37 and 34, respectively. Each vertical column of hubs on the program code patchboard is coupled to a switch PK which corresponds to one of the ten program keys described in conjunction with FIG. 3. Only four such switches or keys are illustrated for purposes of clarity. However, as will be obvious to those skilled in the art, more or less than four program keys may be utilized. For example, in a preferred embodiment of the present invention, ten such program keys were utilized as illustrated in FIG. 3. The horizontal rows of interconnected hubs on the program code patchboard are applied to selected outputs of a plurality of AND gates, said AND gates having their inputs coupled to selected outputs of three field code flip-flops 47, 46, and 45, respectively. As was the case with the AND gates associated with the P counter, only one of the AND gates associated with the three field code flip-flops may be activated at any one time. Which AND gate is activated is dependent upon which of the three field code flip-flops are set or reset. The conditions existing in each of the three field code flip-flops is determined by the position of the three field switches FS1, FS2 and FS3 when a pulse is supplied by the arithmetic and control unit along the line 44. These three field switches correspond to the three field switches located on the upper portion of the actuator rack 4 discussed hereinabove in conjunction with FIGS 4 and 5, and are activated by movement of the typewriter carriage, as hereinabove described.

The selection of a program line and the instructions associated therewith will be best understood by a specific example. Assume that the program key PK associated with the line 53 has been depressed. This causes a potential to appear on the plurality of vertical hubs on the program code patchboard associated therewith. Assume also, that the condition or state of the three field code flip-flops, due to the setting of the three field switches FS1, FS2 and FS3 at the time a pulse was supplied by arithmetic and control unit 15 on line 44, is such that the top, or uppermost, AND gate is activated. Activation of this AND gate causes all of the hubs in the uppermost row on the program code patchboard to be activated. The hub 54, which has the output of the uppermost AND gate applied thereto and which also has applied thereto the potential provided by closing the program key, is the selected hub on the program code patchboard. If this hub 54 is connected to one of the hubs on the patchboard 40 by means of a patch or lead, the program or vertical line on the program line patchboard associated with this hub on the patchboard 40 will have been selected which causes a potential to appear on each of the hubs on the selected program line.

By patching the hubs on the vertical program lines to predetermined hubs on the instruction patchboard, each program line may be caused to have associated therewith particular instructions. The instruction, associated with the selected program line being performed at any one time, is determined by the setting of the instruction counter 42. For example, assume that the instruction counter has a "0" count therein. For this case, the top, or uppermost, output line from the instruction counter will be activated, thereby activating the top, or uppermost, hub on the selected program line. The instruction to which this selected hub is connected on the instruction patchboard will be carried out by the arithmetic and control unit by command of the G signals generated in a manner as described above. Once the particular instruction has been performed, the arithmetic and control unit will provide a signal along the line 52 which causes the instruction counter to step to the next highest digit, in this case a count of "1." A "1" count in the instruction counter will cause the line 55 to be activated which, in turn, causes the next hub on the selected program line to be activated. This, in turn, causes the instruction to which this hub is connected on the instruction patchboard to be selected and the arithmetic control unit will then perform this instruction. Upon completion of this instruction, another pulse appears on the line 52 which steps the instruction counter to a "2" count which, in turn, activates the next hub on the selected program line which, in turn, selects a new instruction to be performed.

After the last hub or instruction associated with the selected program line has been activated or performed, the arithmetic and control unit will cause the instruction counter to step back to "0," at which time the arithmetic and control unit also produces another pulse along the line 44 which enables a new set of conditions or states to be set into the field code flip-flops 47, 46 and 45 if the three field switches FS1, FS2 and FS3 have been set into a new position by the cams which move with the carriage of the typewriter in a manner as described hereinabove. Setting a new condition or state into the field code flip-flops will activate a different AND gate which, in turn, will select a different horizontal line, or row, on the program code patchboard. If a program key is now depressed, the intersection of the vertical line associated with the newly depressed program key and the horizontal line associated with the AND gate activated by the three field code flip-flops activates a single hub on the program code patchboard. If this selected hub has been wired to the patchboard 40, a new program line will have been selected and, by stepping the instruction counter through its count under the control of the arithmetic and control unit, a new series of instructions can be performed by having the vertical column of hubs associated with the newly selected program line being patched to the desired instructions on the instruction patchboard 34.

As will now be obvious, each program line has associated therewith a plurality of instructions which are carried out sequentially by controlling the count in the instruction counter 42. The selection of any particular program line is a function of one of the ten program keys PK and the setting or condition of the three field code flip-flops 47, 46 and 45. As will be explained hereinbelow, only one program line may be selected at any one time and each program line may have a number of steps or instructions substantially equal to the number of counts which may be performed by the instruction counter. Each program line need not have this many instructions associated therewith for fewer instructions may be performed during each program line by only patching some of the hubs on the program line patchboard associated with any particular program line to the instruction patchboard 34.

To recapitulate, the typewriter 2 serves as the input and output unit for the arithmetic and control unit 15. For each instruction selected on the instruction patchboard 34, the P counter is caused to count through a complete cycle, that is, from "0" through "9" at least one time. After the last complete cycle of the P counter necessary to perform the instruction has been completed, the instruction counter is stepped one time so that each instruction hub on the instruction patchboard 34, when selected, is associated with a particular count in the instruction counter 42. However, once an instruction hub has been selected, the P counter will be caused to count or step through a complete cycle, that is, count from "0" through "9" at least one time before the instruction counter is stepped to its next highest count, thereby selecting a new instruction on the instruction patchboard 34. During the performance of a particular instruction or program line, the arithmetic and control unit under command of the G signals produced by the G signal generator, may divert the output of the free-running multivibrator into the arithmetic and control unit by way of the electronic switch 23. This eliminates the input to the P counter which, in turn, prevents the further generation of G signals during the time that the output of the free-running multivibrator is being utilized by the arithmetic and control unit. With no input to the P counter, the P pulse corresponding to the number or count contained in the P counter will exist until the square waves are again applied to the P counter. This is illustrated by FIG. 7 which shows the P2 and P6 pulses as having a variable width. Such P pulses are used when the time required by the processor to perform certain functions exceeds the normal P pulse width. Once the arithmetic and control unit has finished utilizing the output of the multivibrator, it may activate the electronic switch by way of the line 25 to again cause the output of the multivibrator to be applied to the P counter, thereby again generating G signals which, in turn, cause the arithmetic and control unit to continue on with the selected program line or instruction. Also, the arithmetic and control unit can disable the free-running multivibrator by way of the lead 21, thereby preventing the P counter from being stepped and the arithmetic and control unit from receiving the normally occurring output of the free-running multivibrator. The arithmetic and control unit will disable the free-running multivibrator when the typewriter 2 is being utilized as an input or output device. If the selection of one of the program keys and the condition of the three field code flip-flops are such that no program line is activated, that is, the selected hub on the program code patchboard is not connected to a program line hub, the typewriter will automatically tabulate, hunting for a position where the settings of the three field code flip-flops activate a hub associated with the depressed program key that will select a program line.

For purposes of simplicity and clarity, only a few patch or interconnecting leads, such as the patch lead 36, have been illustrated as interconnecting the various hubs on the three patchboards 34, 37 and 43. A much larger number of such patch leads would normally be used to provide a plurality of program lines, each having a variety of instructions associated therewith, and to provide a wide variety of program key and field code flip-flop combinations which would enable the selection of a predetermined program line. As will be clear to those skilled in the art, the program lines and instructions associated therewith and the program key and field code flip-flop combinations which select a program line are under the control of the programmer who patches up the various patchboards. The program board utilized in the instant invention and instructions for programming said board will be described in detail hereinbelow in conjunction with FIGS. 92 and 93.

Once a program line has been selected, it may be desirable to change to a new program line, even though the previously selected program line has not completed the instructions associated therewith. Further, once a program line has been selected, it may be desirable to change the sequence in which the instructions associated therewith are to be performed, or to substitute new instructions for those already associated with the selected program line. This may be readily accomplished by use of electronic relays, one of which is indicated by the reference character 51. The electronic relay contains three outputs, a common C lead, a normal N lead, and a transfer T lead. Two inputs are provided for the electronic relay line, each of which are coupled to opposite sides of a flip-flop, such as a manual selector flip-flop 48.

When utilized to switch program lines, the common C lead of the electronic relay is patched to a hub on the program code patchboard 43. The normal N lead of the relay is patched to the hub on the patchboard 40 associated with the program line which is to be selected when the combination of program key and field code flip-flops is such that the terminal to which the common C lead of the electronic relay is selected. The transfer T lead of the electronic relay is patched to the hub on the patchboard 40 associated with the program line which is to be activated in place of the program line associated with the normal N lead of the electronic relay.

The operation of the electronic relay is such that when a logic ONE is set in the top side of the manual selector flip-flop 48 and a logic zero is set in the bottom side of the flip-flop, and when the hub on the program code patchboard 43 to which the common C lead of the electronic relay is connected is activated, current flow will be through the common lead C, through the relay and along the normal N lead to activate the program line associated with the normal lead N of the electronic relay. When the manual selector switch MS associated with the flip-flop 48 is depressed, the state of flip-flop 48 will be changed regardless of its previous state, so that the depression of the switch now causes a ONE to appear in the bottom side of the flip-flop, and a ZERO to appear in the top side of the flip-flop. The normal condition of the MS flip-flops, prior to a depression of a manual selector key, is a ONE and a ZERO in the top and bottom ends of the flip-flop, respectively. This causes current to flow in the electronic relay through the common lead C and the transfer lead T, thereby activating the alternative program line and deactivating the program line associated with the normal N lead of the electronic relay. A second depression of the manual selector switch MS will again reverse the state of the manual selector flip-flop 48, thereby causing the program line selected to be transferred back to the program line associated with the normal N lead of the electronic relay. The manual selector switches MS correspond to the manual selector switches A, B, C, X, Y and Z previously discussed in conjunction with FIG. 3. However, for purposes of simplicity and clarity, only four such manual selector switches are illustrated in FIG. 6.

Modifying the instructions associated with a program line will be described in conjunction with the electronic relay indicated by the reference numeral 50. It is seen that the common C terminal of this electronic relay is connected to a hub on a program line and that its normal N terminal is connected to a hub on the instruction patchboard 34 while its transfer T lead is connected to a different hub on the instruction patchboard.

Assume, now, that the program line to which the common C lead is connected is activated and that the manual selector flip-flop 49 associated with the relay 50 is in its normal state. For this condition, current will flow in the common C lead, through the relay, and along the normal N lead to activate the hub on the instruction patchboard to which the normal lead is patched. When the state of the manual selector flip-flop 49 is reversed by depression of its associated manual selector switch MS, current flow will be changed so that it now flows through the common C lead, through the relay, and through the transfer T lead to activate the hub to which the transfer T lead is patched and at the same time disabling the patch to which the normal N lead is patched.

In accordance with a preferred embodiment of the present invention, six manual selector switches MS and associated flip-flops were utilized and sixteen electronic relays were made available. Under control of the programmer who prepares the patchboards, each manual selector flip-flop associated with a manual selector switch may be coupled to none, some, or all sixteen electronic relays. This arrangement provides a great deal of flexibility in providing a variety of program lines and associated instructions for various billing and accounting forms which may be utilized in the typewriter 2 and permits various functions to be performed on said billing and accounting forms. Not only does the use of the electronic relays permit switching from one program line to another, but the fixed instructions on the newly selected program line may be radically altered by using other electronic relays in association with other manual selector switches. Likewise, the electronic relays and manual selector switches may be utilized to modify the instructions associated with a program line which is not patched to be switchable to a different program line.

A tape punch coupled to the typewriter of FIG. 6 produces a record of the data entered by the operator and the data provided by the electronic processor. The punched tape thus produced can be utilized to produce additional copies of the various billing/accounting forms used in practicing the present invention.

(2) MEMORY ORGANIZATION

One object of this invention is to provide a randomly accessible temporary storage organized in such a manner that instructions, if not eliminated entirely, are shortened, thereby enabling a simple and relatively inexpensive computer to be realized. How this desirable object is achieved may be understood by a consideration of the simplified block diagram of FIG. 8 wherein there is illustrated the typewriter 2 and arithmetic and control unit 15 discussed hereinabove in conjunction with FIG. 6. The program line selecting means, P counter, H signal generator, G signal generator, etc., illustrated in FIG. 6, are represented generally in FIG. 8 by the blocks 61 and 62.

Figure 8:
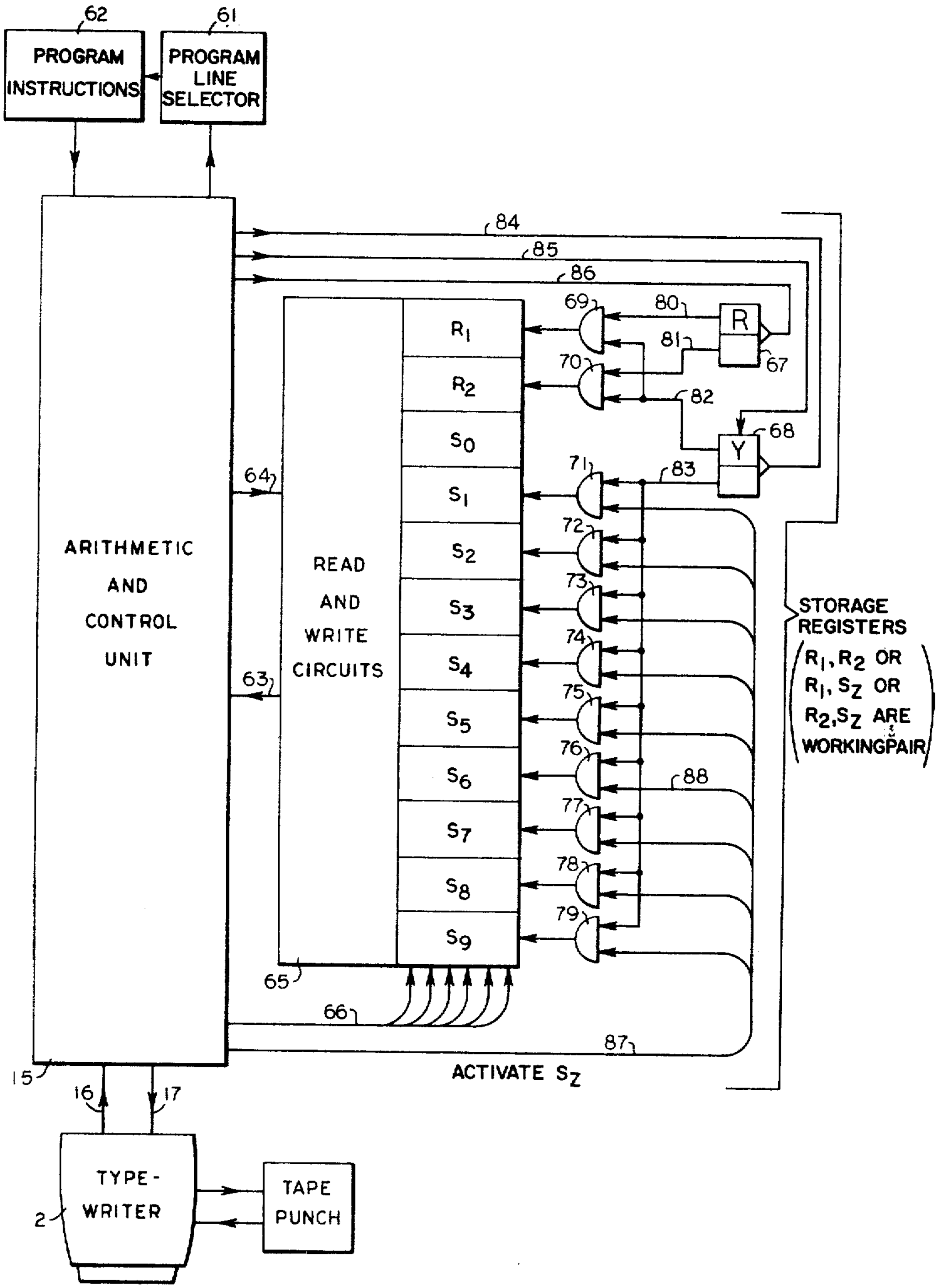
FIG. 8 illustrates another simplified block diagram of the present invention.

Twelve storage registers $R_1$, $R_2$ and $S_0$ through $S_9$ are illustrated in FIG. 8, although more or less than this number of registers may be utilized in practicing the present invention. These twelve registers are illustrated in FIG. 6 as the block identified by the reference numeral 18. The $S_0$ register is utilized in performing multiplication and the nine registers $S_1$ through $S_9$ are generally utilized to store constant factors and intermediate results when needed or desirable.

The two registers $R_1$ and $R_2$ generally function as working registers by receiving incoming data and cooperating with the arithmetic and control unit to perform various arithmetic operations, such as addition, subtraction, multiplication, etc. By means to be described below, at any instant in time, either the $R_1$ or $R_2$ register is an active register and the remaining register of the $R_1$ and $R_2$ pair of registers is a passive register. All data entries into the arithmetic and control unit from the typewriter 2, all transfers of data to or from the twelve storage registers $R_1$, $R_2$ and $S_0$ through $S_9$, all data read out from the twelve storage registers to the typewriter by way of the arithmetic and control unit 15, and all transfers of data to and from the twelve storage registers and the arithmetic and control unit are made via the active register ($R_1$ or $R_2$).

Data is entered into the twelve storage registers from the arithmetic and control unit by way of the line 64 and the WRITE circuits contained within the block 65, while data from the twelve storage registers is transferred into the arithmetic and control unit by way of the line 63 and the READ circuits contained within the block 65. By means of the blocks 61 and 62, various program lines are selected and their associated instructions (such as add, read, write, retrieve and the like) are directed to the arithmetic and control unit in a manner as discussed hereinabove in conjunction with FIG. 6. Input data from the typewriter is applied to the arithmetic and control unit, and output data to the typewriter from the arithmetic and control unit is carried by the lines 16 and 17, respectively. Through the cable 66, the arithmetic and control unit energizes the correct digit position of a selected one of the twelve storage registers $R_1$, $R_2$ and $S_0$ through $S_9$. For example, if the system operates in a binary-decimal code, then energizing one of the leads emanating from the cable 66 to the bottom of the twelve storage registers gives access to a decimal digit position in a selected register of four binary bits, thereby enabling a decimal digit to be stored into or read out from this digit position in the selected register.

Which of the twelve registers is selected is determined by selecting circuitry which includes two bistable elements, such as the flip-flops 67 and 68 and a plurality of AND gates 69 through 79. Each register, except the $S_0$ register which is used for multiplication, is preceded by and AND gate. One input of the AND gate 69 preceding the register $R_1$ is connected to an output 80 of the flip-flop 67 and the other input of this AND gate is connected to an output 82 of the flip-flop 68. One input of the AND gate 70 preceding the register $R_2$ is connected to the other output 81 of the flip-flop 67 and the other input of this AND gate is connected to the same output 82 of the flip-flop 68 to which the AND gate 69 is also connected.

The other output 83 of the flip-flop 68 is connected in parallel to an input of each of the AND gates 71 through 79. Each of the other inputs of said AND gates 71 through 79 are individually coupled to the arithmetic and control unit by way of the cable 87. Each of the AND gates 71 through 79 are associated with, and have their output coupled to, the selecting line of one of the registers $S_1$ through $S_9$.

The flip-flop 67 has both of its inputs coupled to the arithmetic and control unit 15 by way of the lead 86 such that a pulse appearing on the lead 86 causes the flip-flop 67 to change its state or condition. The flip-flop 68 also has both of its inputs coupled to the arithmetic and control unit by way of the lead 84 such that a pulse appearing on the lead 84 causes the flip-flop 68 to reverse its state or condition. One-half of the flip-flop 68 is also coupled to the arithmetic and control unit by way of the lead 85 such that a pulse appearing on the lead 85 sets the flip-flop 68 into an initial condition whereby its output 82 is activated, which output is applied to the AND gates 69 and 70. Once the flip-flop 68 has been set into its initial condition, a pulse on the lead 86 will enable the gate 69 or the gate 70, depending upon the prior condition of the flip-flop 67, and in this manner indicate either the temporary storage register $R_1$ or the temporary storage register $R_2$ as the active register. For example, assume that the flip-flop 68 has been set into its initial condition by a pulse appearing on the lead 85 thereby causing the output 82 on the flip-flop 68 to activate one-half of the inputs to the AND gates 69 and 70, and that a pulse appears on the lead 86, which causes the output of the flip-flop 67 to activate the AND gate 69 thereby selecting the temporary register $R_1$ as the active register. A subsequent pulse appearing on the lead 86 switches the flip-flop 67, causing the output 81 to activate the AND gate 70, thereby indicating the register $R_2$ as the active register. A subsequent pulse on the lead 86 will again switch the flip-flop 67, activating the output 80 which, in turn, enables the gate 69, thereby selecting the register $R_1$ as the active register. In other words, the activity or passivity of the temporary storage registers $R_1$ and $R_2$ as a cooperating pair of registers depends upon the condition of the flip-flop 67, said condition being controlled by pulses applied to the line 86 by the arithmetic and control unit 15.

A great majority of the arithmetic operations which are required to be performed by a billing/accounting machine are such that a following arithmetic step can be based upon the result of the immediately preceding arithmetic step. For example, an addition of a plurality of items $a+b+c+d+e+f$ can be broken up into the steps $a+b$; $(a+b)+c$; $(a+b+c)+d$; $(a+b+c+d)+e$, etc., which are coupled to one another in a series. The final result of a computation comprising a series of arithmetic steps which can be coupled to one another can be obtained without the necessity of addressing because once a pair of registers, such as registers $R_1$ and $R_2$, have been selected, the registers, in turn, serve as the active register. The data to be entered into the pair of registers is always transmitted to the active register and the result obtained by the pair of registers is also always fetched from the active register. Since intermediate results need not be stored in a third register, addressing becomes completely superfluous. The addition of a plurality of items, such as $a+b+c$ in one pair of registers, such as registers $R_1$ and $R_2$, is accomplished by first entering the value $a$ in the register $R_1$, thereupon the value $b$ in register $R_2$, and the sum of registers $R_1$ and $R_2$, that is, $a+b$, in register $R_2$ thereby erasing the value $b$ therein, and then replacing the value $a$ in register $R_1$ by the value $c$, and obtaining the sum of the registers $R_1$ and $R_2$, that is $(a+b)+c$ and placing this sum in register $R_1$. It is to be understood that prior to entering data into the registers $R_1$ and $R_2$, a pulse appears upon the lead 86 which causes the appropriate register, either $R_1$ or $R_2$, to become the active register prior to the entry of data therein. In a corresponding manner, a series of values can be alternatively added, subtracted, multiplied or divided.

The operation of a selected pair of registers, such as registers $R_1$ and $R_2$, in performing a series of arithmetic steps in such a manner as to eliminate addressing, can best be understood by a specific example: assume that it is desired to calculate gross price, minus discount, equals net price. In arithmetic terms this may be written as: $ab$ minus $abc$, equals $d$, wherein $a$ represents the number of units, $b$, the unit price, $c$ the discount factor and $d$ the net price. Therefore, the product $ab$ equals the gross price, the product $abc$ equals the discount, and as stated above, $d$ equals the net price. Depending upon the condition of the flip-flop 67 either register $R_1$ or $R_2$ is active. Assuming that $R_1$ is the active register, as a result of a previous computation, a pulse will appear upon the lead 86 which switches the condition of the flip-flop 67 thereby causing $R_2$ to become the active register. The value $a$ is now entered into the active register $R_2$, after which a pulse appearing upon the lead 86 causes the register $R_1$ to become active, after which the value $b$ is entered therein. After the value $b$ has been entered into the active register $R_1$, a multiplying instruction is given and the product of $a$ times $b$ is obtained in the arithmetic and control unit and placed into the active register $R_1$, thereby erasing the value $b$ contained therein.

At this moment, the situation is as follows: register $R_1$ is active, and contains the product $ab$; register $R_2$ is passive and contains the value $a$. The arithmetic and control unit now generates a pulse on the lead 86, which switches the state of the flip-flop 67, causing register $R_2$ to become active and the value $c$ is entered therein, which causes the value $a$ previously entered in register $R_2$, to be erased. A multiplication instruction is again given and the product $abc$ is obtained and entered into the active register $R_2$ thereby erasing the value $c$ previously contained therein. Next, and as the last arithmetic operational step, a subtract operation is given so that the active register $R_2$ will contain the requested value $ab$ minus $abc$ equals $d$, which will leave the passive register $R_1$ with the value $ab$.

The operation of the system illustrated in FIG. 8 is such that it is essential for the arithmetic and control unit to automatically ensure that immediately preceding the entering of a number, either from the typewriter 2 or from one of the additional storage registers, $S_1$ through $S_9$, into one of the temporary storage registers $R_1$ or $R_2$, the active register and the passive register must be interchanged by means of a pulse applied to the line 86, which switches the condition or state of the flip-flop 67. It is clear, however, that by selecting a pair of registers, such as $R_1$ and $R_2$, only one of which is caused to be active at any one given time, addressing for performing arithmetic calculations can be eliminated, thereby reducing the memory capacity required which, in turn, reduces the cost of a billing/accounting type computer.

Although the great majority of arithmetic operations to be performed by a billing/accounting machine are such that a following arithmetic step can be based upon the result of an immediately preceding arithmetic step, it is sometimes necessary to perform an arithmetic operation which does not constitute one series. For example, suppose it is desired to obtain the product $(a+b+c)$ times $(d+e+f)$. This operation can be performed by first obtaining the sum $(a+b+c)$ by utilizing the registers $R_1$ and $R_2$ as a cooperating pair of registers as described hereinabove. Once this sum has been obtained, it can be transferred to one of the storage registers $S_1$ through $S_9$ after which the sum $(d+e+f)$ is obtained by the cooperating pair of registers $R_1$ and $R_2$. Once this has been accomplished, the sum $(a+b+c)$ is removed from the storage register in which it had been placed, and is transferred to the register $R_1$ or $R_2$ which is active and which will not contain the sum $(d+e+f)$. A multiply operation is then given to obtain the product $(a+b+c)$ times $(d+e+f)$, which product will be placed in the active register, which can be either $R_1$ or $R_2$, which causes the sum $(a+b+c)$ previously entered to be erased.

It will be obvious to those skilled in the art that—providing the product described above requires one address, that is, the selection of one of the temporary storage registers $S_1$ to $S_9$—selection of one of the storage registers $S_1$ through $S_9$ is accomplished by the arithmetic and control unit transmitting a pulse along the lead 84 instead of the lead 86 so that the flip-flop 68 is switched in such a manner that its output 83 is activated. The output 83 activates one-half of the inputs to each of the AND gates 71 through 79. Further, the arithmetic and control unit, by way of the cable 87, will activate the other input of one of the AND gates 71 through 79 thereby selecting one of the storage registers $S_1$ through $S_9$. For example, suppose the lead 88 is activated. Since the output 83 of the flip-flop 68 is activated, the AND gate 76 will be enabled, thereby selecting the register $S_6$ as an active register into which data can be transferred from either the storage register $R_1$ or $R_2$, or a register from which data can be transferred to registers $R_1$ or $R_2$, depending upon which is the active register.

If desired, the pair of cooperating registers can consist of one of the registers $R_1$ or $R_2$ and one of the registers $S_1$ through $S_9$. In order to select such a pair of cooperating registers, the arithmetic and control unit produces a pulse on lead 84 so that the flip-flop 68 has its output 83 activated. Further, the arithmetic and control unit activates one of the leads in the cable 87 thereby fully enabling one of the AND gates 71 through 79, for example, AND gate 76 which selects the storage register $S_6$. The selection of either $R_1$ or $R_2$ as one of the cooperating registers is determined by the condition of the flip-flop 67. For example, assume that the output 80 of the flip-flop 67 is activated. By applying a series of sequentially occurring pulses to the lead 84, the outputs 82 and 83 of the flip-flop 68 are alternatively activated which, in turn, alternatively activates the AND gates 69 and 76, thereby sequentially indicating the registers $R_1$ and $S_6$ as the active registers. Accordingly, the cooperating pair of registers is now the register $R_1$ and the register $S_6$. For this condition also, data to be entered is always transmitted to the active register, and the result obtained by the pair of regi.ters is always fetched from the active register.

Once the final result of an arithmetic operation has been obtained in one of two cooperating pair of registers, the result may be transferred to the typewriter by way of the arithmetic and control unit 15 or stored in one of the storage registers $S_1$ to $S_5$ or $S_7$ to $S_9$. It is also possible to transfer information from one of these storage registers to one of the cooperating pair of registers, such as $R_1$ and $R_2$, or $R_1$ or $R_2$ and one of the storage registers $S_1$ through $S_9$. Because of this transfer of information between registers, the routing of which is entirely controlled by the flip-flops 67 and 68, the conditions of which are controlled by pulses appearing on the leads 84, 85 and 86, it is possible to transfer the information to one of the operating registers of a selected pair so as to be subjected to an arithmetic operation, the result of which is entered into the register from which the data was fetched. This permits three operational steps, such as "fetch," "and" and "store" to be replaced by the single instruction "store adding," or when multiplying by a constant factor contained in one of the registers $S_1$ to $S_9$, the two operational steps "fetch" and "multiply" can be replaced by the single instruction "fetch multiplying." These and other similar single instructions are normal arithmetic operations which, instead of being carried out between two selected pairs of operating registers such as $R_1$ and $R_2$, are carried out between a storage register, such as regi.ters $R_1$ or $R_2$ and an additional register, such as one of the registers $S_1$ to $S_9$, the additional register being the active register of the selected pair of operating registers for the storing operation, and the selected storage register $R_1$ or $R_2$ being the active register for the fetching operation. The organization illustrated in FIG. 8 provides means by which computations can be carried out with no or a minimum number of short or single in.tructions while at the same time efficiently utilizing the temporary storage registers $S_1$ to $S_9$.

In accordance with a preferred embodiment of the present invention, twelve storage registers $R_1$, $R_2$, $S_0$ and $S_1$ through $S_9$ were utilized with each storage register having twelve decimal positions. By utilizing a binary-demical code, it was necessary to provide four binary bit positions for each decimal po.ition in each register. A typical organization of such a memory or temporary storage unit is symbolically illustrated in FIG. 9 wherein there is illustrated four planes 91, 92, 93 and 94 of suitable memory elements, such as magnetic cores. Each of the planes 91, 92, 93 and 94 contains twelve rows and twelve columns of magnetic cores, thereby providing one hundred and forty-four magnetic cores in each plane. Each row of cores in each of the planes corresponds to a register and every column in the planes corresponds to a digit position. Since a binary-decimal code is utilized necessitating four binary bit positions for each digit position in a register, four such planes of cores are required with each plane providing a bit position for each decimal posi.ion of each register. Each plane of cores has associated therewith its own individual READ and WRITE circuits indicated by the blocks 95 and 96, respectively. This arrangement permits a decimal number represented by four binary bits to be written into or read out of a decimal position in a selected register in parallel. A particular register is selected by activating one of the leads 97 and a particular digit position within the selected register is selected by activating one of the leads 98. As will be obvious to those skilled in the art, the arrangement of the cores of FIG. 9 into four planes providing a plurality of registers, each having a plurality of digit positions, is well-known in the art and need not be described in detail.

VI. BLOCK SYMBOLS

A. *Gates*

Figure 10:
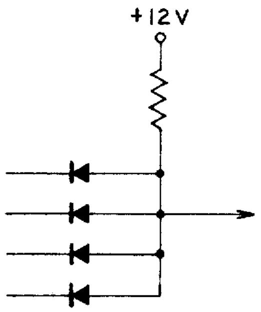
Figure 10A:
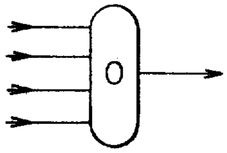
Figure 12:
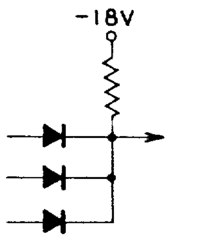
Figure 12A:
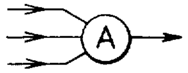

To facilitate the study of the electronic processor described before in conjunction with FIGS. 42 through 62, those block symbols and diagrams which are used frequently throughout the drawings and referred to in the specification will now be described. FIG. 10 illustrates a plurality of diodes coupled together to form an OR gate circuit. FIG. 10A illustrates the symbol utilized herein to represent such an OR gate as consisting of an oval having a plurality of input lines coupled thereto, and a single output line emanating therefrom with the letter O contained within the oval. Where there are three or less inputs, a circle such as that illustrated in FIG. 12A is used rather than the oval of FIG. 10A. FIG. 12 illustrates a plurality of diodes connected together to form an AND gate, which AND gate is illustrated symbolically by FIG. 12A as consisting of a circle having the letter A therein and having a plurality of inputs and a single output. When there are more than three inputs to an AND gate, an oval, such as that illustrated in FIG. 10A, is used rather than the circle of FIG. 12A.

Figure 11:
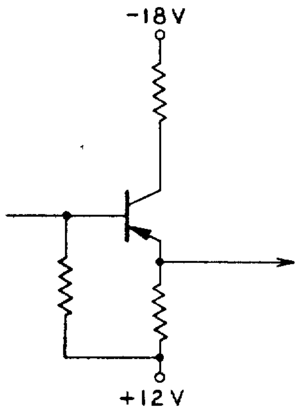
Figure 11A:
Figure 13:
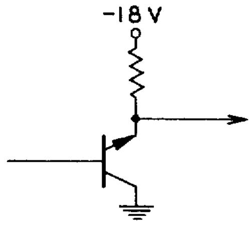
Figure 13A:
Figure 14:
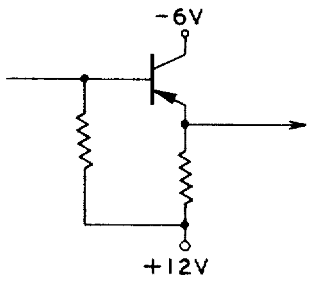
Figure 14A:
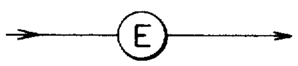

A PNP transistor emitter follower is illustrated schematically in FIG. 14 and is symbolically illustrated in FIG. 14A as comprising a circle having the letter E contained therein and a single input and output lead. FIG. 11 illustrates a PNP emitter follower having a resistor in the collector circuit, and is symbolically illustrated in FIG. 11A as comprising two concentric circles having the letter E contained within the smaller circle. The resistor in the collector circuit of this emitter follower functions to reduce the dissipation across the PNP transistor. FIG. 13 illustrates a NPN transistor emitter follower which is symbolically illustrated by FIG. 13A as comprising a circle containing the letters NE therein. Reference to FIGS. 11 and 14 will show that when the PNP emitter follower is saturated, the output is at a negative potential, whereas when the NPN emitter follower of FIG. 13 is saturated, the output is at substantially ground potential.

Figure 16:
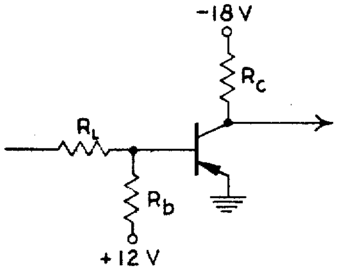
Figure 16A:
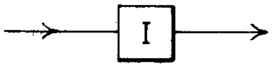
Figure 17:
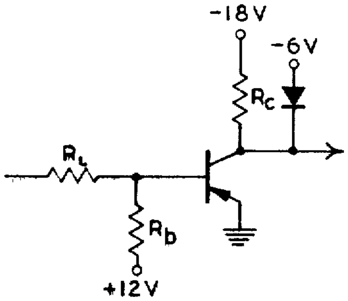
Figure 17A:
Figure 18:
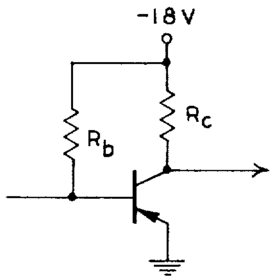
Figure 18A:
Figure 19:
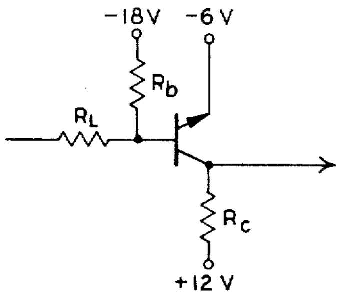
Figure 19A:
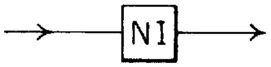

FIG. 16 illustrates a PNP transistor inverter circuit, which is symbolically represented in FIG. 16A by a rectangular or square box containing the letter I therein and having a single input and output lead. FIG. 17 illustrates another PNP inverter circuit, the output of which is clamped by a diode, which inverter is illustrated symbolically in FIG. 17A by a rectangular or square box containing the letters ID therein. Still another PNP inverter circuit is illustrated in FIG. 18, which inverter includes a resistor $R_b$ coupled between the base of the PNP transistor and the collector supply potential. This resistor ensures that the PNP transistor is always conducting in the absence of a positive potential applied to the base of the transistor. This inverter is illustrated symbolically in FIG. 18A by a rectangular or square box containing two letters II therein. An NPN transistor inverter is illustrated in FIG. 19 and is illustrated symbolically in FIG. 19A as comprising a square with the letters NI contained therein. When the NPN transistor of FIG. 19 is saturated, the output potential of the inverter will be substantially at the negative potential to which the emitter is coupled, whereas when the PNP transistors in FIGS. 16, 17 and 18 are saturated, the outputs of these inverters will be substantially at ground potential.

Figure 15:
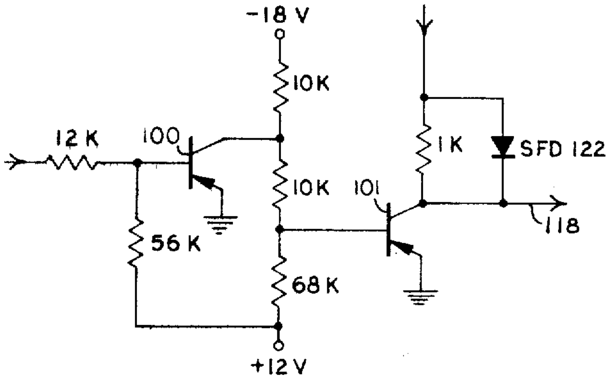

FIG. 15 illustrates a pulse gate circuit, which includes two interconnected PNP transistors 100 and 101. The operation of this circuit is such that a negative signal or voltage appearing on the input lead coupled to the base of the transistor 100 will also appear on the output lead 118 coupled to the collector of the transistor 101 if, and only if, a negative potential also appears on the enabling lead coupled to the collector of the transistor 101 by way of a resistor and diode. In the absence of a negative potential on the input lead, the transistor 100 is rendered nonconductive and ground, or substantially zero potential will appear on the output terminal or lead 118.

Figure 15A:
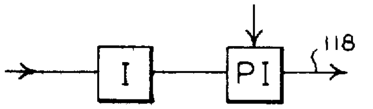

For purposes of describing the present invention, a logic ONE is defined as a negative level potential and a logic ZERO is defined as being a substantially zero or positive potential. As is well known to those skilled in the art, which voltage or potential level is considered to be a logic ONE and which potential is considered to be a logic ZERO is a wholly arbitrary decision made by the designer. Assuming that a negative potential appears on the enabling lead of FIG. 15, then a logic ONE or negative pulse applied to the input lead causes the transistor 100 to conduct which, in turn, causes the transistor 101 to be rendered nonconductive. When nonconductive, the potential appearing on the output lead 118 is substantially equal to the negative potential appearing on the enabling lead. A logic ZERO applied to the input terminal causes the transistor 100 to be nonconductive due to the positive input potential applied to its base which, in turn, causes the potential appearing on the base of the transistor 101 to be negative thereby rendering the transistor 101 conductive if the potential applied to the enabling terminal is also negative. When the transistor 101 is conducting, the potential seen on the output lead is at substantially ground potential or a logic ZERO because the emitter of this transistor is connected to ground. The pulse gate circuit of FIG. 15 is represented symbolically in FIG. 15A by two interconnected rectangular or square boxes. One box contains the letter I therein and the other box contains the letters PI therein. The pulse gate circuit is enabled whenever a negative or logic ONE signal appears on the enabling lead associated with the other box containing the letters PI.

B. *Amplifiers and switches*

Figure 24:
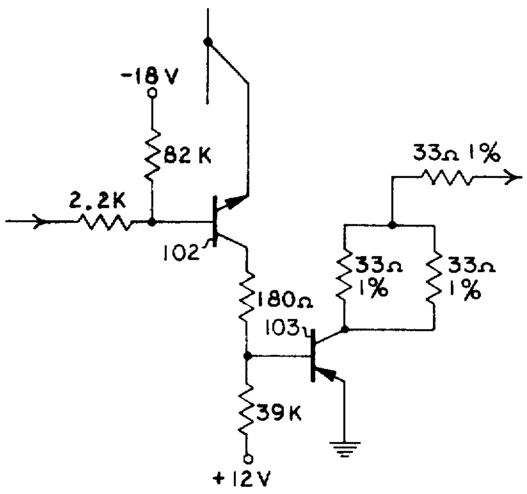
Figure 24A:
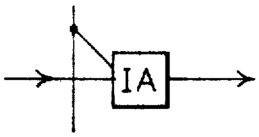

FIG. 24 illustrates an inhibit or WRITE amplifier including an NPN transistor 102 which has its collector coupled to the base of a PNP transistor 103. The operation of this circuit is such that current will flow in the output line coupled to the collector of the PNP transistor 103 if, and only if, a logic ZERO is present on the input lead coupled to the base of the NPN transistor 102. In the event a logic ONE or negative signal appears on the input lead, the circuit is not to inhibit, that is, a current is not to flow in the output lead. For example, a logic ONE or negative potential on the input lead causes the NPN transistor 102 to be nonconductive which, in turn, causes the base of the PNP transistor 103 to be positive with respect to its emitter, thereby causing the PNP transistor to be nonconducting which prevents any current flow in the output lead. However, when a logic ZERO or positive pulse appears on the input lead, the NPN transistor is conductive which, in turn, causes the base of the PNP transistor to be negative with respect to its emitter, thereby causing it to conduct which, in turn, causes current to flow in the output lead. This output current is utilized in a well-known manner to inhibit the writing of a ONE in a selected magnetic core whenever a logic ZERO appears on the input lead and the absence of this current enables the writing of a logic ONE in a particular magnetic core position whenever a logic ONE appears on the input lead. This inhibit amplifier is illustrated symbolically in FIG. 24A which shows a rectangular or square box having the letters IA contained therein and a single input and output lead denoted by the arrows into and out of the box, respectively.

Figure 25:
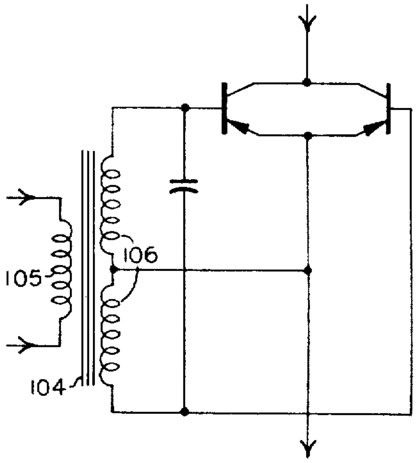
Figure 25A:
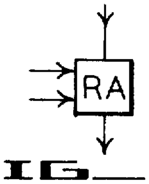

FIG. 25 is a schematic illustration of a READ amplifier wherein the transformer core 104 represents a magnetic core in one of the temporary storage registers previously described, and the windings 105 and 106 represent wires threading the core. Switching of the core due to current in the winding 105 will produce a voltage or current in the windings 106 which will be amplified by the two PNP transistors having a common emitter connection if, and only if, a negative or logic ONE potential is applied to the enabling terminal or lead to which the collector of each of the PNP transistors are coupled. That is, a negative potential on the enabling lead enables the READ amplifier, whereas the absence of a negative potential on the enabling lead disables the READ amplifier so that any voltage or current appearing in the windings 106 is not acted upon to produce an output current in the output line coupled to the emitters of the two transistors. The READ amplifier of FIG. 25 is illustrated symbolically in FIG. 25A by a square or rectangle having the letters RA contained therein and with the lead entering the top of the box being the enabling lead, the lead leaving the bottom of the box being the output lead and the two leads entering the side of the box being the input leads.

Figure 27:
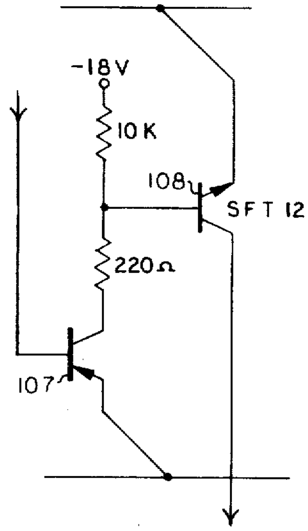
Figure 27A:
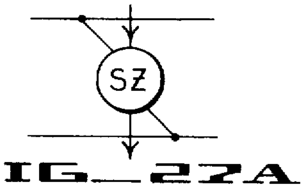

FIG. 27 is a schematic representation of a storage switch which functions to activate a selected one of the twelve storage registers previously discussed. The operation of the circuit is such that a logic ONE or negative signal on the input lead coupled to the base of the PNP transistor 107 renders both the PNP 107 and NPN 108 transistors conductive thereby producing a current in the output lead coupled to the collector of the NPN transistor 108. In the absence of a logic ONE signal on the input lead, both the transistors are rendered nonconductive thereby causing no current to appear in the output lead. The circuit of FIG. 27 is represented symbolically in FIG. 27A by a circle having the letters S and Z contained therein and a single input and output lead.

Figure 26:
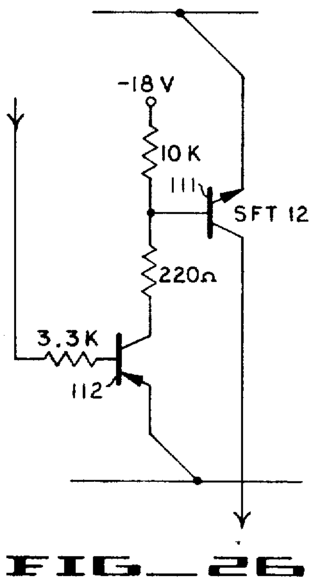
Figure 26A:
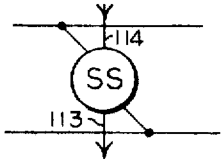

FIG. 26 illustrates schematically another storage switch which is utilized to activate a particular decimal position in a selected register. The operation of this circuit is such that a logic ONE on the input lead coupled to the base of the PNP transistor 112 renders both of the transistors 112 and 111 conductive, thereby producing a current in the output lead coupled to the collector of the NPN transistor 111. Alternatively, the absence of a logic ONE on the input lead will cause the PNP and the NPN transistors to be both nonconductive, thereby preventing any current flow in the output lead. The circuit of FIG. 26 is represented symbolically in FIG. 26A by a circle having the letters SS therein, with the leads 114 and 113 representing the input and output leads, respectively.

Figure 20:
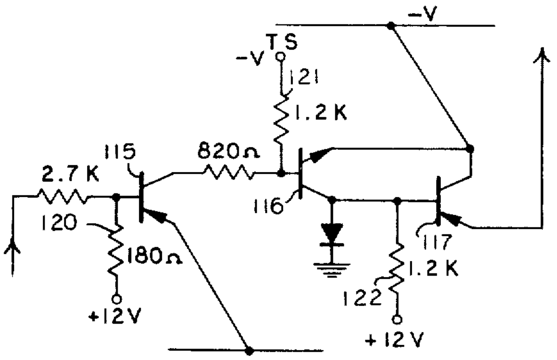
Figure 20A:
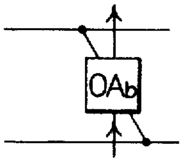

FIG. 20 illustrates schematically an output amplifier circuit which is utilized to activate selected type bars of the input-output typewriter under the control of the electronic procesor. The amplifier circuit includes a first PNP transistor 115, a NPN transistor 116, and a second PNP transistor 117. In the absence of a logic ONE or negative signal on the input lead coupled to the base of the first PNP transistor 115, this transistor is rendered nonconductive by a positive voltage on its base applied thereto by way of the resistor 120. The NPN transistor 116 is then rendered nonconductive by the negative voltage applied to its base by way of the resistor 121 and the second PNP transistor 117 is rendered nonconductive by the positive potential applied to its base by way of the resistor 122. Application of a logic ONE signal to the input lead renders the first PNP transistor 115 conductive, which causes the base of the NPN transistor 116 to become positive thereby rendering it conductive. Conduction of the NPN transistor causes the negative potential applied to its emitter to be seen at the base of the second PNP transistor 117 which renders the second PNP transistor conductive. Since the second PNP transistor is a virtual short circuit when conductive, the negative potential applied to its collector is seen on the output lead which is coupled to the emitter of the second PNP transistor 117. It is clear then that when the output amplifier is not activated by a logic ONE on the input lead, no potential will appear on the output lead. However, when the input lead of the output amplifier has a logic ONE applied thereto, the amplifier is activated thereby causing a negative potential to appear on the output lead. The circuit of FIG. 20 is illustrated symbolically in FIG. 20A by a square or rectangular box having the letters OA*b* contained therein and having single input and output leads.

Figures 21, 21A, 22, 22A, 23, 23A:
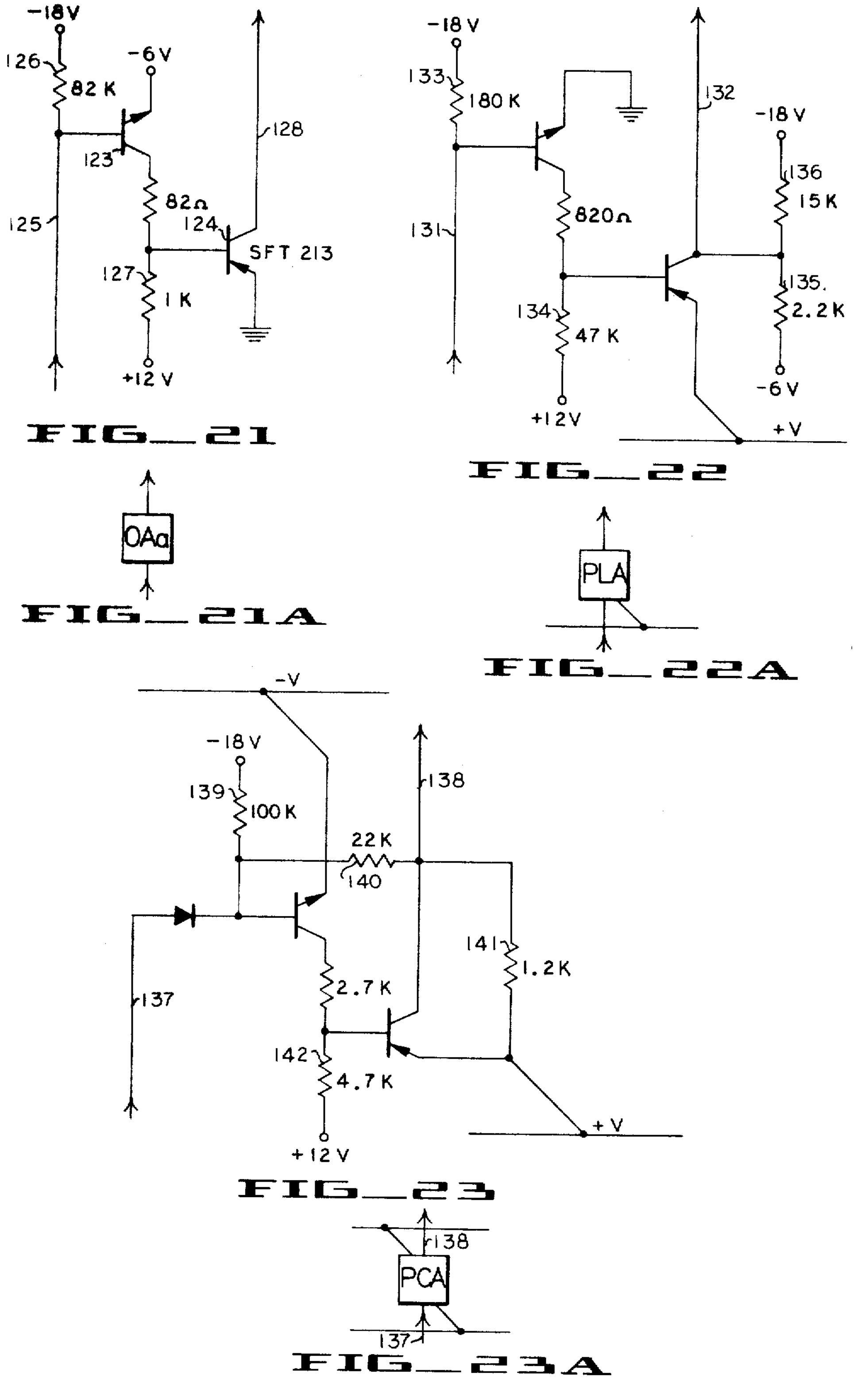

FIG. 21 illustrates still another output amplifier which is utilized in conjunction with the amplifier of FIG. 20 to operate selected type bars of the input-output typewriter under the control of the electronic processor. This output amplifier circuit includes an NPN transistor 123 having its base coupled to an input lead 125 and its collector circuit coupled to the base of a PNP transistor 124. In the absence of any potential applied to the input lead 125, the NPN transistor is rendered nonconductive by the negative voltage applied to its base by way of the resistor 126. When the NPN transistor is nonconductive, the PNP transistor is also nonconductive due to the positive potential applied to its base by way of the resistor 127. The appearance of a positive potential or logic ZERO signal on the input lead 125 causes the NPN transistor 123 to be conductive which causes the base of the PNP transistor 124 to become negative thereby causing the PNP transistor to be conducting. Conduction of the PNP transistor causes the potential on the output lead 128 to become substantially ground potential to which the emitter of the PNP transistor is connected. The circuit of FIG. 21 is represented symbolically in FIG. 21A by a rectangle or square having the letters OA*a* contained therein.

FIG. 22 schematically illustrates a program line amplifier PLA which includes an NPN transistor having its base coupled to an input lead 131 and its collector coupled to the base of a PNP transistor, the collector of which is coupled to an output lead 132. In the absence of a positive potential on the input lead 131, the NPN transistor is rendered nonconductive by the negative potential which is applied to one end of the resistor 133. When the NPN transistor is nonconductive, a positive potential is applied to the base of the PNP transistor by way of the resistor 134 thereby rendering the PNP transistor nonconductive which causes the potential appearing on the output lead 132 to be negative due to the negative potential applied across the resistors 135 and 136. Application of a positive potential to the input lead 131 renders the NPN transistor conductive which causes the base of the PNP transistor to become less positive than the positive potential to which the emitter of this transistor is coupled thereby causing the PNP transistor to conduct. Conduction of the PNP transistor renders it a virtual short circuit which causes the potential appearing on the output lead 132 to be substantially the positive potential to which the emitter of the PNP transistor is coupled. The circuit of FIG. 22 is illustrated in FIG. 22A symbolically by a rectangular or square box having the letters PLA contained therein.

FIG. 23 schematically illustrates a program code amplifier PCA which includes an NPN transistor having its base coupled to an input lead 137 and its collector coupled to the base of a PNP transistor. In the absence of a positive potential on the input lead 137, the potential on the base of the NPN transistor is determined by a voltage divider network comprising three resistors 139, 140 and 141. A negative potential is applied to one end of the resistor 139 and a positive potential is applied to one end of the resistor 141. The values or magnitudes of the three resistors are chosen to be such that when current flows through all three of the resistors, the potential appearing on the base of the NPN transistor is negative thereby rendering this transistor nonconductive. When the NPN transistor is nonconductive a positive potential appears on the base of the PNP transistor by way of the resistor 142 which renders the PNP transistor nonconductive. A positive potential applied to the input lead 137 will cause the NPN transistor to conduct which, in turn, causes the potential on the base of the PNP transistor to become less positive than the positive potential to which the emitter of this transistor is coupled thereby rendering the NPN transistor conductive. Conduction of the PNP transistor causes it to be a virtual short circuit which causes the potential appearing on the output lead 138 to be substantially equal to the positive potential to which the emitter of the PNP transistor is coupled. As illustrated in FIG. 23, the PNP transistor is connected in parallel across the resistor 141, which resistor forms part of the voltage divider network comprising the resistors 139, 140 and 141. When the PNP transistor is conducting it acts as a virtual short circuit and eliminates the resistor 141 from the voltage divider network. The removal of this resistor from the voltage divider network causes the potential seen at the base of the NPN transistor produced by the voltage divider network, which now includes only the two resistors 139 and 140, to be positive thereby rendering the NPN transistor conducting even in the absence or termination of the positive potential which was previously applied to the input lead 137. It is clear then that once the amplifier of FIG. 23 has been turned on or activated by a positive potential applied to the input lead 137, the circuit remains on even after the positive potential applied to the input lead has been removed. The circuit of FIG. 23 is illustrated symbolically in FIG. 23A by a square or rectangular box having the letters PCA contained therein with the leads 137 and 138 being the input and output leads, respectively.

Figure 28:
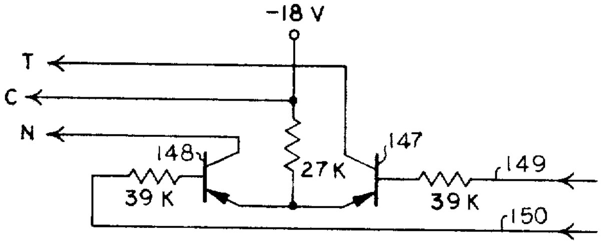
Figure 28A:
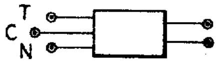

FIG. 28 is a schematic illustration of an electronic relay or switch circuit which includes two PNP transistors having a common emitter connection. This circuit is activated by first applying a positive potential to the common C lead after which the application of a positive potential to the input lead 149 and a negative potential to the input lead 150 renders the PNP transistor 147 nonconductive and the PNP transistor 148 conductive thereby causing current to flow through the normal N output lead, through the PNP transistor 148, and through the common C output lead. Alternatively, application of a negative potential to the input lead 149 and a positive potential to the other input lead 150 renders the transistor 148 nonconductive and the transistor 147 conductive, resulting in current flow through the transfer T output lead, the transistor 147, and the common C output lead. The positive and negative potentials applied to the input leads 149 and 150 are obtained by coupling these leads to opposite sides of a flip-flop, such as the manual selector flip-flop 49 described hereinabove in conjunction with FIG. 6. As will be obvious to those skilled in the art, switching or changing the condition of the flip-flops to which the outputs 149 and 150 are coupled will switch the electronic relay between its two stable states; that is, current can be switched from the normal N output lead to, and back from, the transfer T lead. This circuit is utilized as the electronic relays 50 and 51 discussed above in conjunction with FIG. 6. The circuit of FIG. 28 is represented symbolically in FIG. 28A by a rectangular box having two input leads, a common C output lead, a normal N output lead, and a transfer T lead.

C. *Bistable devices*

Figure 29:
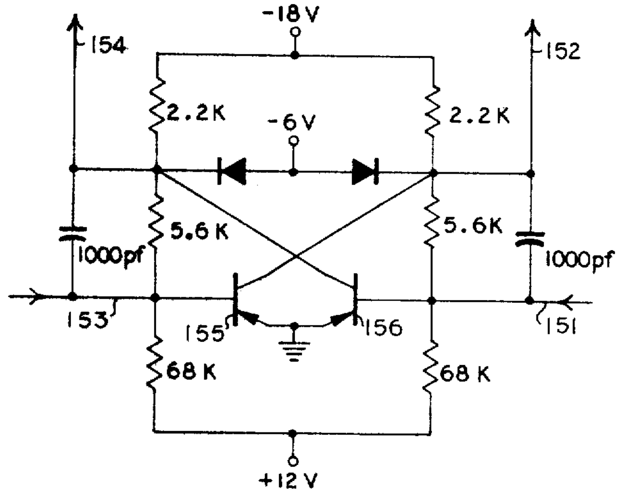
Figure 29A:
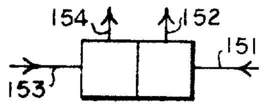

Various bistable devices, such as flip-flops, are utilized in the electronic processor. One such flip-flop is illustrated symbolically in FIG. 29A as comprising a rectangular block divided into two substantially equal sections or squares. The right-hand section is arbitrarily designated as the set side of the flip-flop, and the left-hand section is designated as the reset side; where drawn upright the top section is the set side and the bottom section is the reset side. The operation of the flip-flop is such that a logic ONE or negative potential appearing on the set input lead 151 sets the flip-flop thereby causing a logic ONE to appear on the set output lead 152 and a logic ZERO to appear on the reset output lead 154. Likewise, a logic ONE applied to the reset input lead 153 causes a logic ONE to appear on the reset output lead 154 and a logic ZERO to appear on the set output lead 152. A transistor circuit for realizing the flip-flop of FIG. 29A is illustrated in FIG. 29 as comprising two PNP transistors 155 and 156 having a common emitter connection which is coupled to ground. The operation of this circuit is such that a logic ONE appearing on the set input lead 151, which corresponds to the set input lead 151 of FIG. 29A causes the PNP transistor 156 to be conductive which, in a well-known manner, causes the other PNP transistor 155 to be nonconductive. Conduction of the transistor 156 causes the potential appearing on the reset output lead 154 to be at substantially ground potential, that is, at a logic ZERO, whereas nonconduction of the transistor 155 causes the potential appearing on the set output lead 152 to be negative, that is, a logic ONE. Likewise, a logic ONE applied to the reset input lead 153 renders the transistor 155 conductive and the transistor 156 nonconductive which, in turn, causes the potential appearing on the reset output lead 154 to be a logic ONE, and the potential appearing on the set output lead 152 to be a logic ZERO.

Figure 30:
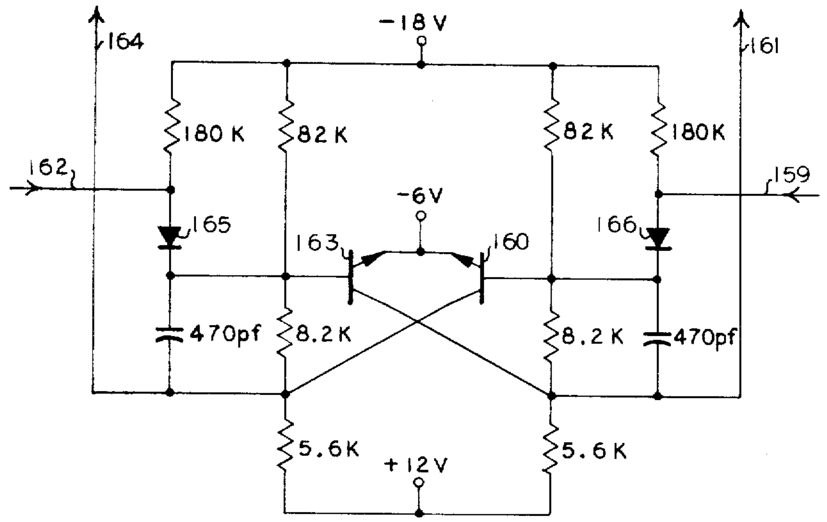
Figure 30A:
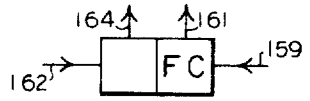

Another transistor flip-flop circuit is illustrated in FIG. 30 which shows two NPN transistors having a common emitter connection which is coupled to a negative potential. The operation of this circuit is such that a positive potential or logic ZERO applied to the set input lead 159 renders the transistor 160 conductive which results in the transistor 163 being nonconductive. Conduction of the transistor 160 causes the reset output lead 164 to have a logic ONE thereon and the set output lead 161 to have a logic ZERO thereon. Likewise, application of a positive potential to the reset input lead 162 renders the transistor 163 conductive and the transistor 160 nonconductive. This results in a logic ZERO on the reset output lead 164 and a logic ONE on the set output lead 161. Due to the diodes 165 and 166, the transistors 163 and 160 are responsive to a positive input voltage only. The circuit of FIG. 30 is illustrated symbolically in FIG. 30A by a rectangular box divided into two substantially equal sections with the letters FC contained within the right-hand or set section. The leads 159 and 162 are the set and reset input leads, respectively, and the leads 161 and 164 are the set and reset output leads, respectively. This flip-flop circuit may be utilized as the field code flip-flops 45, 46 and 47 discussed hereinabove in conjunction with FIG. 6.

Figure 31:
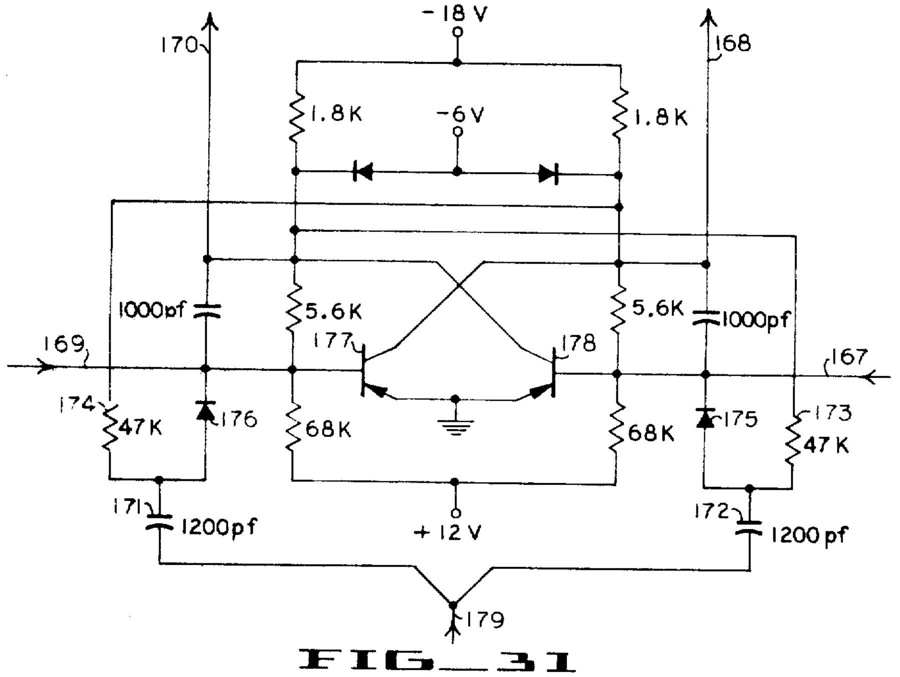

Another transistor flip-flop is schematically illustrated in FIG. 31 as comprising two PNP transistors 177 and 178 having a common emitter connection which is coupled to ground. The operation of this circuit is such that a logic ONE appearing on the set input lead 167 produces a logic ONE on the set output lead 168 and a logic ZERO on the reset output lead 170. Likewise, a logic ONE appearing on the reset input lead 169 produces a logic ONE on the reset output lead 170 and a logic ZERO on the set output lead 168. An A.C. gate is coupled to the base of each of the two PNP transistors, which A.C. gates include diodes 175 and 176 and a differentiating circuit which comprises capacitors 171 and 172 and resistors 173 and 174. The input to each of the A.C. gates is commonly coupled to a single input lead 179. The operation of the A.C. gates is such that a logic ONE pulse appearing on the single input lead 179 has its leading edge differentiated into a negative spike of voltage and its trailing edge differentiated into a positive spike of voltage. The negative spike is not applied to the base of the two PNP transistors 177 and 178 because it back-biases the diodes 175 and 176. However, the positive spike of voltage corresponding to the trailing edge of the logic ONE input pulse forwardly biases the diodes 175 and 176 thereby causing the positive spike of voltage to be applied to the base of each of the PNP transistors 178 and 177. As will be obvious to those skilled in the art, simultaneously applying a positive voltage spike to the base of each of the transistors 177 and 178 will render the previously conductive transistor nonconductive which results in the previously nonconductive transistor becoming conductive. That is, application of a logic ONE pulse to the input lead 179 causes the flip-flop to switch to its other stable state regardless of which of its two stable states the flip-flop was in prior to the application of the logic ONE pulse to the input lead 179.

Figure 31A:
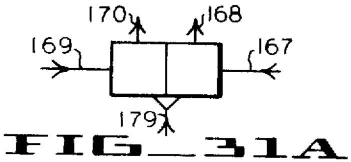

As is also true of the flip-flops illustrated in FIGS. 29 and 30, the flip-flop of FIG. 31 can be switched by applying the proper potential to either the set input lead 167 or the reset input lead 169. However, in order to switch the flip-flop of FIG. 31 by way of the input lead 179, a positive-going A.C. potential, such as is supplied by the trailing edge of a logic ONE pulse, must be applied thereto. The circuit of FIG. 31 is illustrated symbolically in FIG. 31A by a rectangle divided into substantially equal sections with leads 167 and 169 being the set and reset input leads, respectively, and leads 168 and 170 being the set and reset output leads, respectively. The A.C. input of the flip-flop is illustrated by the lead 179 and is shown as being applied to both the set and reset sides of the flip-flop.

Figure 32:
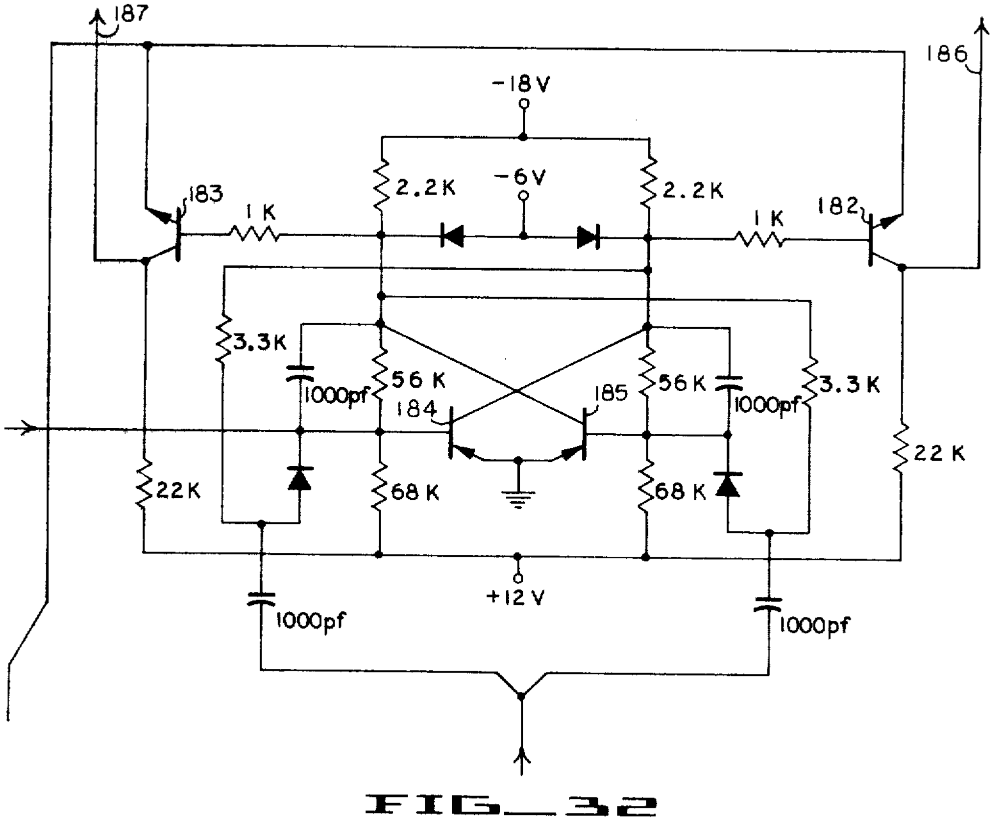
Figure 32A:
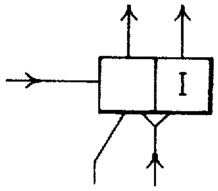

A flip-flop similar to that illustrated in FIG. 31 but having the reset and set outputs inverted is illustrated schematically in FIG. 32. The NPN transistors 182 and 183 invert the normal output of the flip-flop which includes the two PNP transistors 184 and 185 so that when the set side of the flip-flop contains a logic ONE, the set output of the flip-flop appearing on lead 186 is a logic ZERO and the reset output on lead 187 is a logic ONE. Likewise, when the reset side of the flip-flop contains a ONE, a logic ZERO appears on the reset output lead 187 and a ONE appears on the set output lead 186. This flip-flop is illustrated symbolically in FIG. 32A as containing the letter I in the set side of the flip-flop. This flip-flop may be utilized together with similar flip-flops to construct the instruction counter discussed hereinabove in conjunction with FIG. 6 and identified by the reference character 42.

Figures 33, 33A:
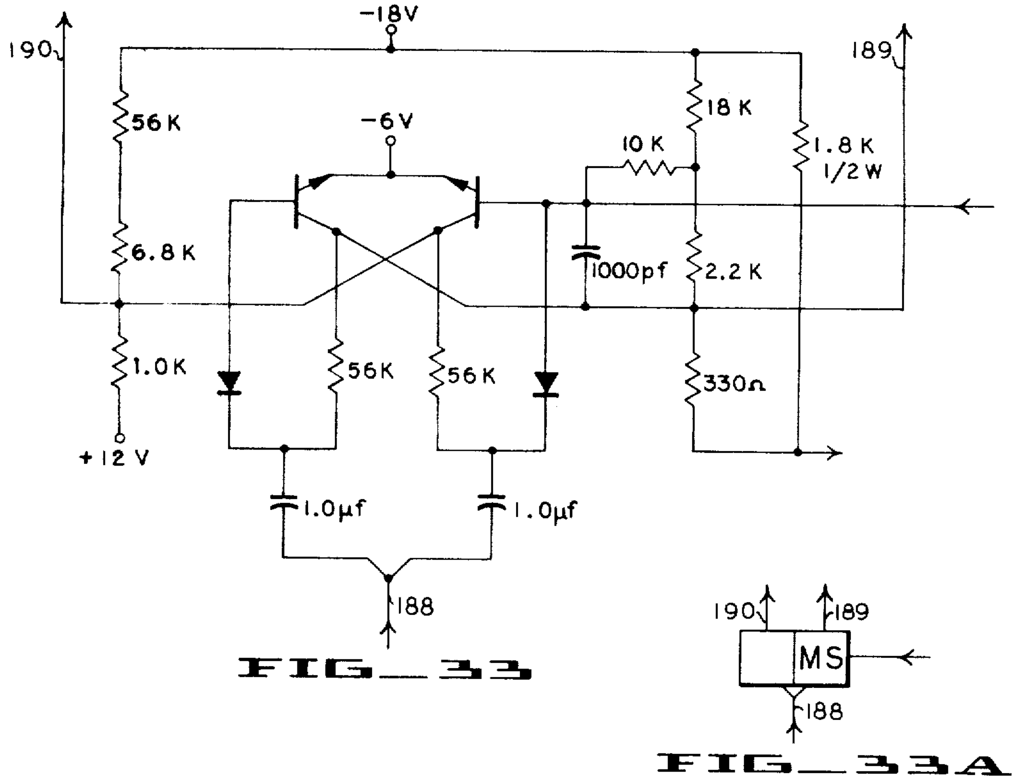

Another flip-flop similar to the flip-flop discussed hereinabove in conjunction with FIG. 31 is illustrated schematically in FIG. 33 as comprising two NPN transistors having a common emitter connection which is coupled to a negative potential. A set input lead is coupled to the set side of this flip-flop with no comparable input lead being coupled to the reset side of the flip-flop. An A.C. gate, however, is associated with the set and reset side of this flip-flop such that a logic ONE pulse applied to the input terminal 188 will switch the flip-flop in a manner as described above. When a logic ONE is in the set side of this flip-flop, a logic ONE appears on the set output lead 189 and a logic ZERO or positive potential appears on the reset output lead 190. Likewise, a logic ONE in the reset side of this flip-flop produces a logic ONE on the reset output lead 190 and a logic ZERO or positive potential on the set output lead 189. As discussed hereinabove, a logic ZERO as used in describing the present invention may comprise a substantially ground potential or a positive potential, whereas a logic ONE is defined as comprising a negative potential. The circuit of FIG. 33 is symbolically illustrated in FIG. 33A and identified by the letters MS in the set side of the flip-flop. This flip-flop could be utilized as the manual selector flip-flop described hereinabove in conjunction with FIG. 6 and identified by the referenced numerals 48 and 49.

Figure 34:
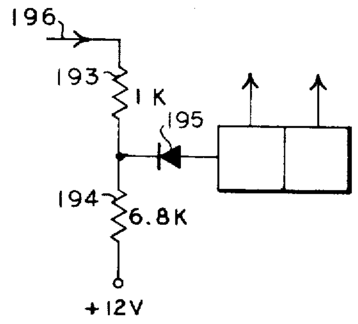
Figure 34A:
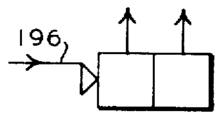

FIG. 34 illustrates a flip-flop having a positive decoupled input with the positive decoupling circuit comprising a voltage divider including the resistors 194 and 193 and a diode 195 coupled between the junction of the two resistors and the input of the flip-flop. The operation of the positive decoupling input circuit is such that a positive input signal appearing upon the input lead 196 will not affect the flip-flop because of the diode 195 being back-biased. However, a negative potential applied to the input lead 196 will cause the diode to conduct thereby becoming a virtual short circuit which causes the negative input potential to be applied to the reset side of the flip-flop thereby setting a ONE into the reset side if the reset side of the flip-flop previously contained a ZERO. The positive decoupling circuit of FIG. 34 is illustrated symbolically in FIG. 34A by a triangle having its apex coupled to the reset input side of the flip-flop with the input lead 196 coupled to one end of the base of the triangle. Although FIGS. 34 and 34A illustrate the positive decoupling input as being applied to the reset side of the flip-flop, it will be obvious to those skilled in the art that the decoupled input may also be applied to the set side of the flip-flop.

Figure 35:
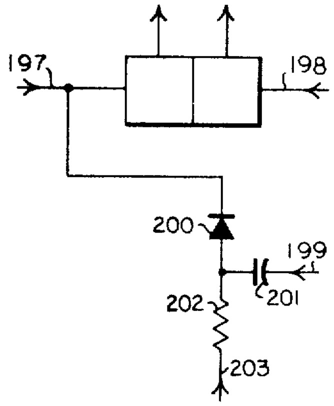
Figure 35A:
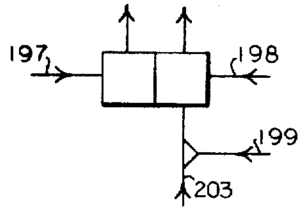

A flip-flop having a gated A.C. input is illustrated in FIG. 35 wherein the leads 198 and 197 are the set and reset input leads, respectively. Coupled to the reset input lead is a gated A.C. input which comprises a diode 200 and a differentiating circuit which includes a capacitor 201 and a resistor 202. A logic ONE pulse applied to the A.C. input lead 199 will have its leading edge converted into a negative voltage spike by the differentiating circuit, and its trailing edge converted into a positive voltage spike. The negative voltage spike back-biases the diode 200 and will not be applied to the reset input of the flip-flop. The positive voltage spike, on the other hand, will forwardly bias the diode 200 thereby causing the positive voltage spike to be applied to the reset input 197 if a negative disabling potential is not present on the enabling lead 203. That is, a logic ZERO applied to the enabling lead 203 will result in the positive pulse or spike of voltage being applied to the reset input lead 197, which positive spike of voltage corresponds to the trailing edge of a logic ONE input pulse on the lead 199. A logic ONE or negative potential on the enabling lead 203, however, will backwardly bias the diode 200 thereby preventing the positive voltage spike produced by differentiating a logic ONE pulse applied to the A.C. input lead 199 from being applied to the reset input 197 of the flip-flop. The positive voltage spike, if applied to the reset input, will set a ZERO in the reset side of the flip-flop and a ONE in the set side, thereby causing a ONE to appear on the set output lead and a ZERO on the reset output lead. The gated A.C. input of FIG. 35 is illustrated symbolically in FIG. 35A wherein the lead 203 is the enabling lead to which a logic ZERO must be applied so that the trailing edge of a logic ONE pulse applied to the A.C. input lead 199 will cause a ONE to be placed in the set side of the flip-flop and a ZERO in the reset side.

Figure 36:
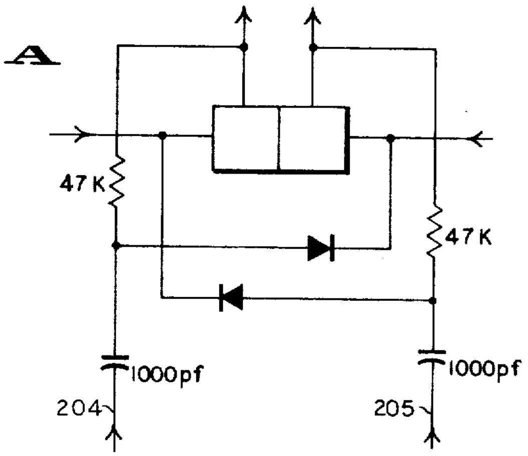
Figure 36A:
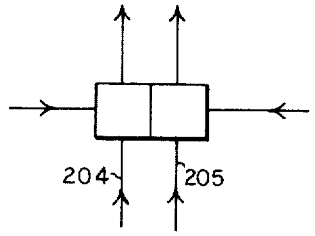

FIG. 36 illustrates a flip-flop having a separate A.C. gate for the set and reset input. Unlike the flip-flop of FIG. 31, the inputs to the two A.C. gates of FIG. 36 are not commonly connected to a single input lead, Rather, the trailing edge of a ONE pulse applied to the A.C. reset input 204 produces a ZERO in the set side of the flip-flop and a ONE in the reset side. Likewise, the trailing edge of a logic ONE pulse applied to the set A.C. input lead 205 produces a ONE in the set side of the flip-flop and a logic ZERO in the reset side. The flip-flop of FIG. 36 is illustrated schematically in FIG. 36A with the leads 205 and 204 being the A.C. inputs.

FIG. 37A symbolically illustrates another flip-flop which is interconnected to other similar flip-flops to produce a counter that may be stepped either up or down. As utilized in the present invention, the A.C. input lead 213 is coupled to the reset output of a preceding flip-flop and the A.C. input lead 212 is coupled to the set output of the preceding flip-flop. Correspondingly, the reset output 211 is coupled to the A.C. reset input of a following flip-flop and the set output 210 is coupled to the A.C. set input of the following flip-flop. The operation of these interconnected flip-flops is such that a logic ZERO on the enabling lead 208 and a logic ONE on the enabling lead 209 causes the interconnected flip-flops to count up while a logic ONE on the enabling lead 208 and a logic ZERO on the enabling lead 209 causes the interconnected flip-flops to count down. A transistor flip-flop circuit for realizing the flip-flop of FIG. 37A is schematically illustrated in FIG. 37.

D. *One-shot circuit*

Figures 38, 38A:
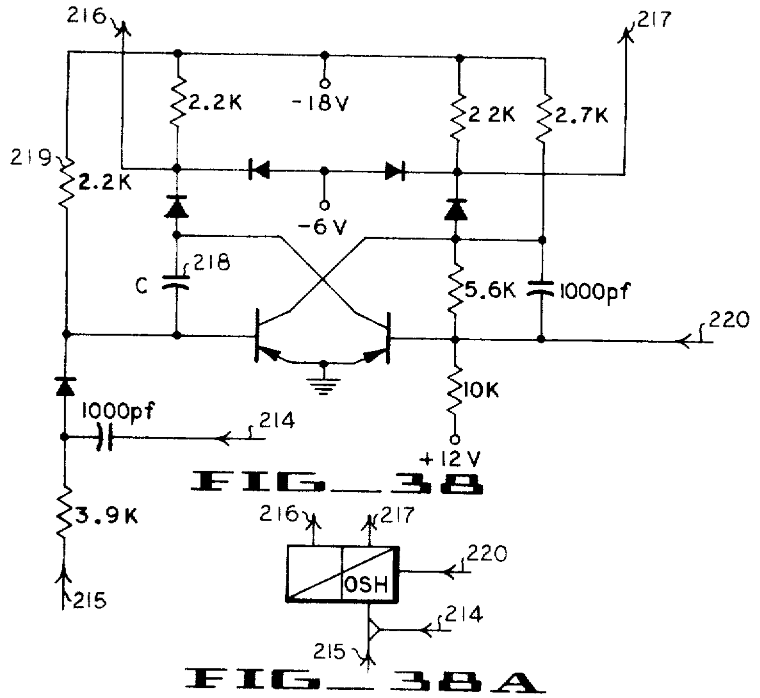
Figures 32, 32A:
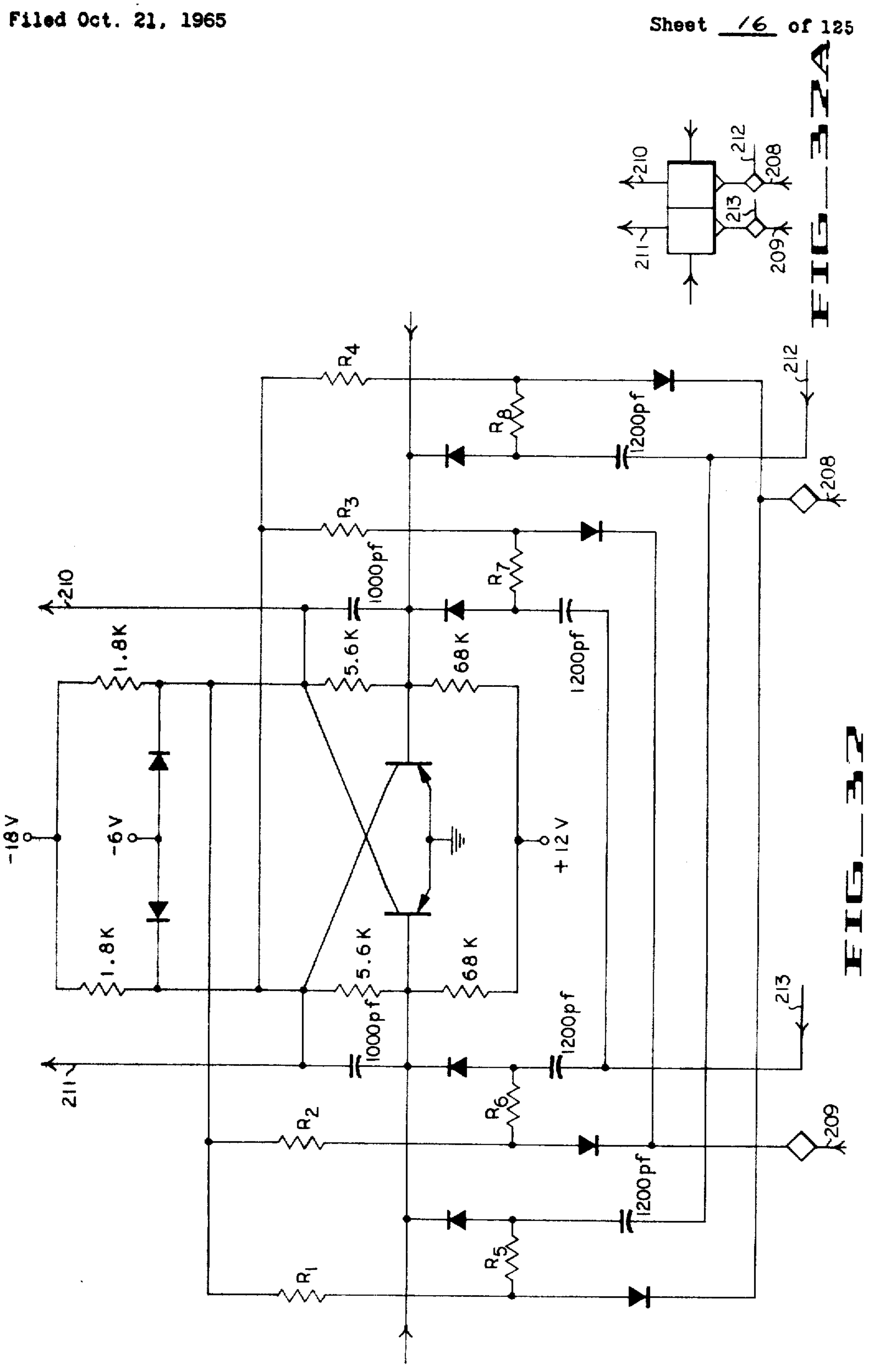

FIG. 38 is a schematic illustration of a one-shot oscillator having a gated A.C. input. The operation of this circuit is such that a logic ZERO on the enabling lead 215 will enable the trailing edge of a logic ONE pulse applied to the A.C. input lead 214 to activate the one-shot oscillator which includes two PNP transistors. Activation of the one-shot circuit produces a pulse on the output leads 216 and 217, the width of which is determined by the value of the capacitor 218 and the resistor 219. A negative or logic ONE potential on the enabling lead 215 will prevent the one-shot oscillator from being activated by a pulse, such as logic ONE pulse, appearing on the input lead 214 in a manner as described hereinabove in conjunction with the gated A.C. input of the flip-flop described in conjunction with FIGS. 35 and 35A. The one-shot circuit can also be activated by an A.C. or D.C. potential on the input lead 220. The circuit of FIG. 38 is illustrated symbolically in FIG. 38A which shows a rectangular box divided into two substantially equal sections with a diagonal line running between opposite corners of the rectangle and with the letters OSH contained within the right-hand portion of the rectangle.

VII. POWER SUPPLY

A. *Voltages*

A power supply for providing suitable operating potentials for the electronic processor is illustrated in FIGS. 40 and 41 wherein a regulated negative eighteen volts is available on the lead 225, a regulated negative six volts is available on the lead 226, and a regulated positive twelve volts is available on the lead 227. Fifty volts of unregulated positive and negative potential is available at the leads 228 and 229, respectively, and 1.5 volts of A.C. potential for application to various indicator lights is available between the lead 230 and A.C. ground. The A.C. input to the power supply is applied between the leads 231 and 232 and preferably comprises 110 volts ±10% of 50–60 cycles A.C.

B. *Protection Circuit*

FIG. 39 is a schematic illustration of a protective circuit utilized in conjunction with the power supply of FIGS. 40 and 41 to protect the magnetic core memory whenever the power supply is switched on or off and to monitor the regulated voltage outputs so that the power supply will be automatically turned off whenever the regulated voltages exceed a predetermined maximum value or fall below a predetermined minimum value. The transistors 234 and 235 and the plurality of diodes 233 form a circuit that monitors the regulated voltages such that when the magnitude of one or more of the regulated voltages exceeds a certain amount, or falls below a certain amount, the leads 236 and 237 are activated to turn off the power supply. A one-shot oscillator circuit, which includes the transistors 238 and 239, cooperates with the transistor circuit 240 to provide a 1.2 second delay that prevents application of operating potential to the core memory until the lapse of 1.2 seconds after turning the power supply on. The transistor 241 and its associated circuit elements function to protect the core memory whenever the power supply is turned off manually or by the protective circuits comprising the transistors 235 and 234 and the plurality of diodes 233.

VIII. LOGIC DIAGRAM

FIGS. 42 through 62 constitute a logic diagram of the electronic processor. The direction of information flow of the various leads illustrated throughout these drawings is indicated by arrows. For example, the arrow 246 on the lead 247 of FIG. 42 indicates that electrical information or signals appearing upon the lead 247 are applied to the set and reset side of flip-flop A*a*. Likewise, the arrow 248 on the lead 249 of FIG. 42 indicates that electrical information on the lead 249 flows away from the OR gate 250. The signals, data or information applied to the various leads are identified by letters or a combination of letters and numbers. These letters and/or combination of letters and numbers are located adjacent and above the leads on which the data or signals occur and have been chosen, when possible, to have some relationship to the function of the signal which they represent. For example, a PR pulse represents a "pulse reset" pulse, a D10 signal represents the "tenth digit position" of a core memory register, and an S(A) signal represents a "step the A counter" pulse or signal. Generally, the presence of a logic ONE or negative potential on any lead corresponds to the presence of the associated signal on that lead, whereas the presence of a logic ZERO or positive potential on a lead corresponds to the absence of the associated signal.

Figure 48:
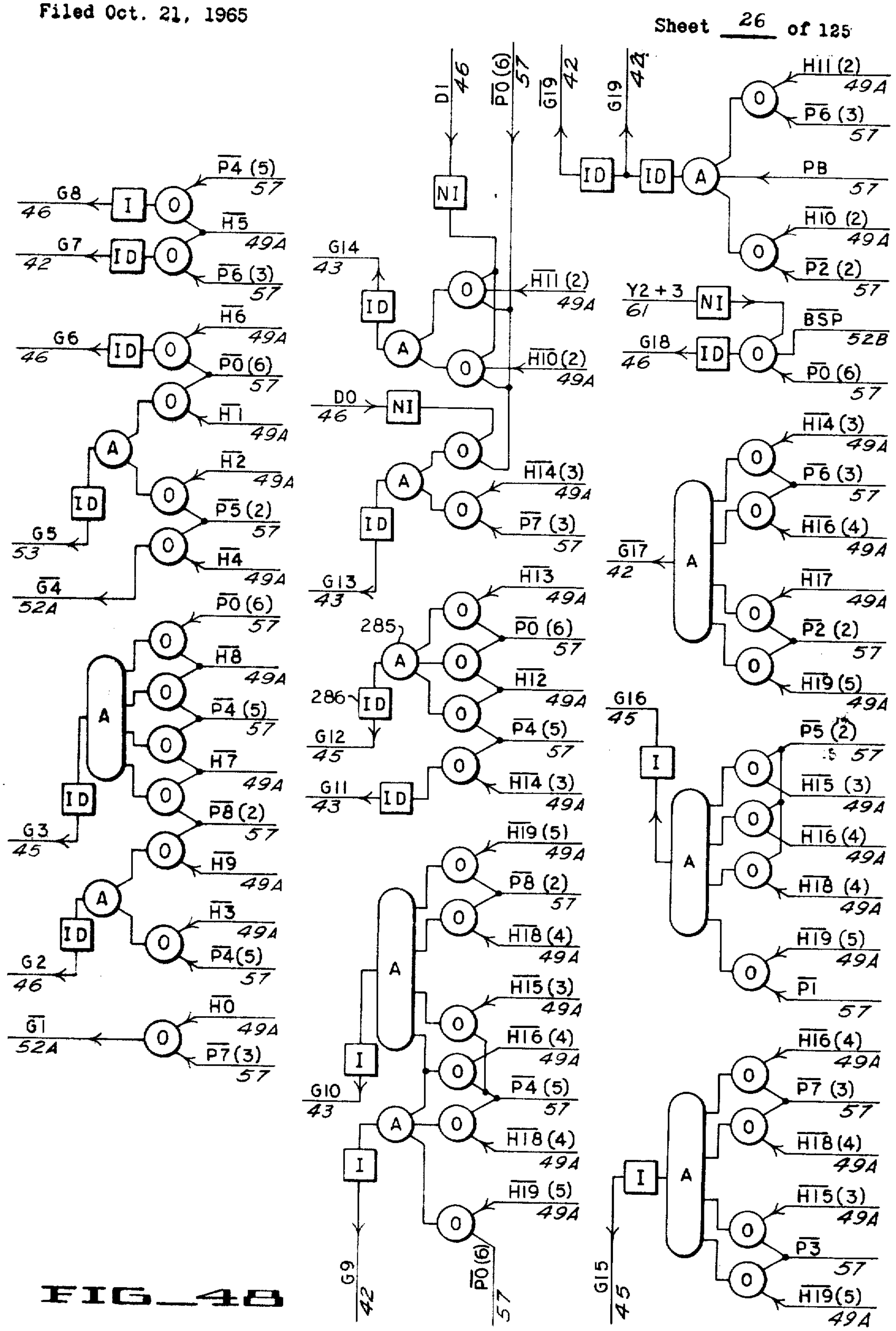

All circuit leads (interconnections) between figures terminate at the margin of each figure with one exception: FIG. 48 contains a number of leads which terminate within the figure proper. However, identifying legends are associated with those leads terminating within FIG. 48 to distinguish them from other circuit connections.

The various combinations of vertical letters and numbers appearing above each lead, hereinafter referred to as the signal code, serve to identify the signal carried by the lead above which they appear as discussed above. The various combinations of slanted letters and numbers appearing adjacent and below the lead, hereinafter referred to as the figure reference code, designate the various figure numbers to which the subject lead is connected.

Figure 46:
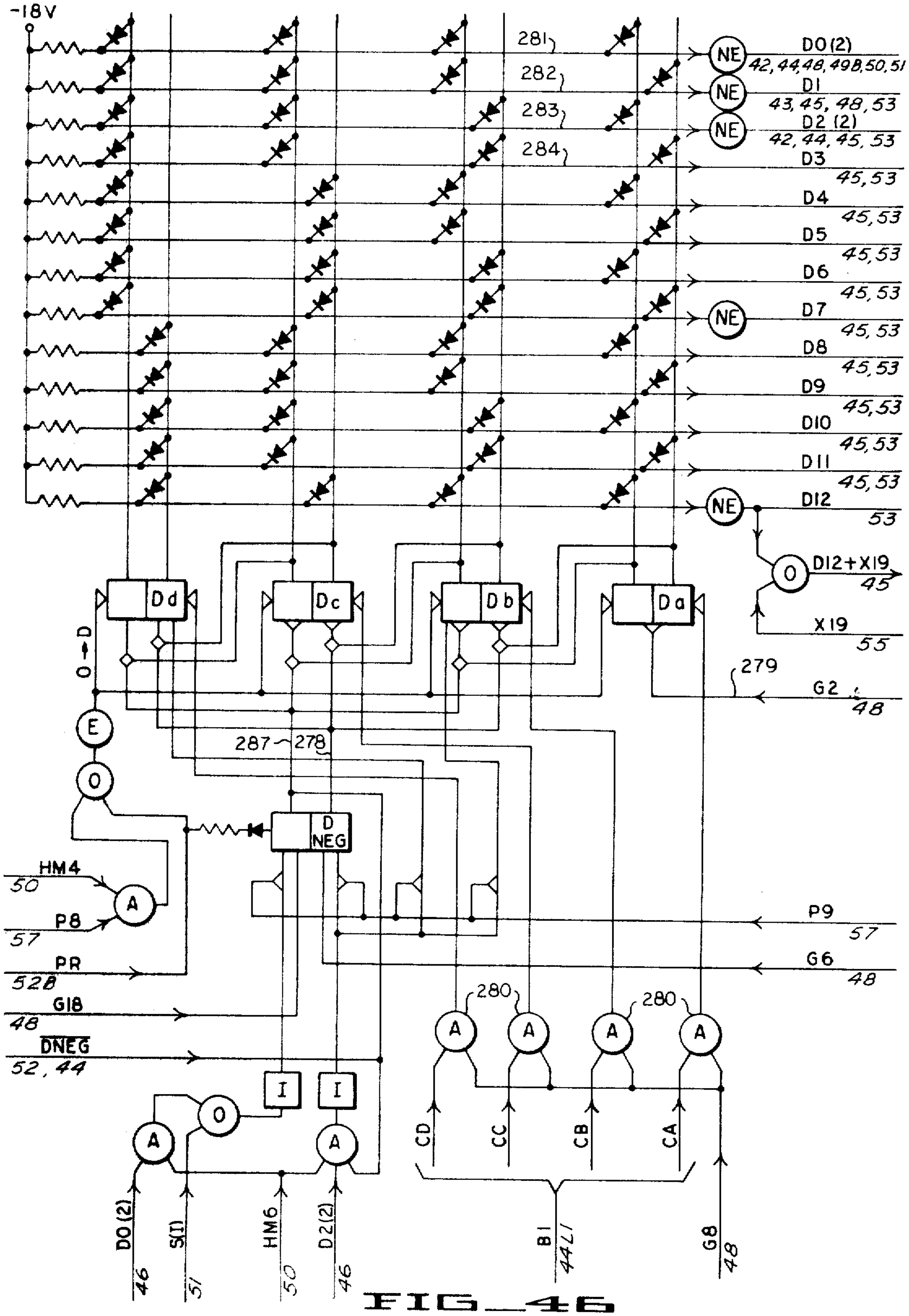
Figures 42, 42A:
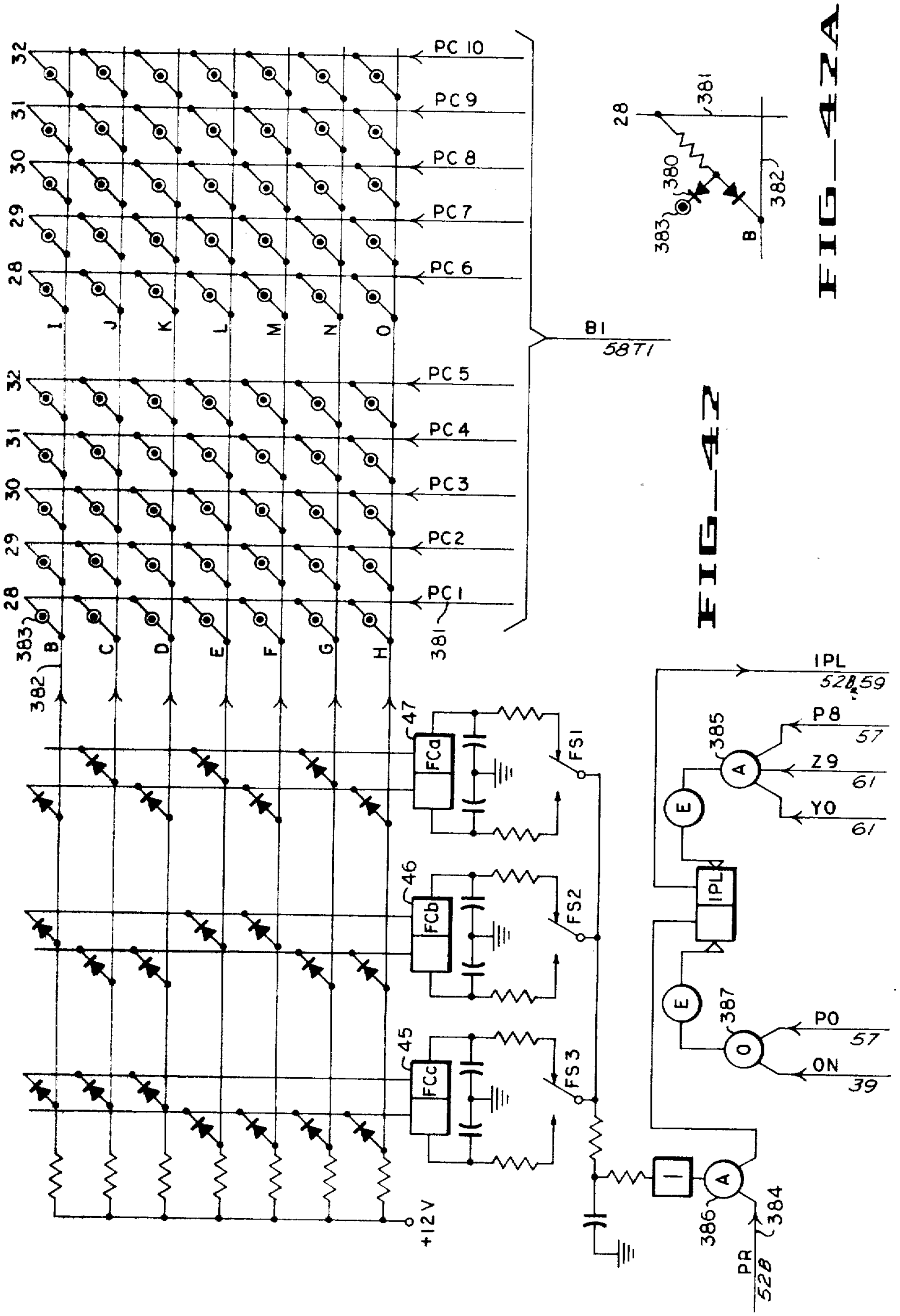

There are a number of variations in the basic code patterns such as the following: "barred" expressions represent an inverted signal, e.g., $\overline{\text{M15}}$, FIG. 42; a plus sign (+) denotes an "OR" function, e.g., Y2+3, FIG. 43; combined reference codes incorporate bracketed legends wherein the legend within the bracket serves as an additional reference aid, e.g., L1[K0] (FIG. 52A); codes joined by a period (.) indicate an "AND" function, e.g., CP·HM7 (FIG. 50); signal codes incorporating a dash ( ) denote a plurality of signals, e.g., Y8–12 denotes the signals Y8 through Y12 (FIG. 51); letters in parentheses denote the element operated upon, e.g., S(I) denotes that the instruction counter I is stepped S (FIG. 46); numbers in parentheses indicate the number of times the adjacent signal appears on the subject figure, e.g., D0(2) (FIG. 46).

Figure 58:
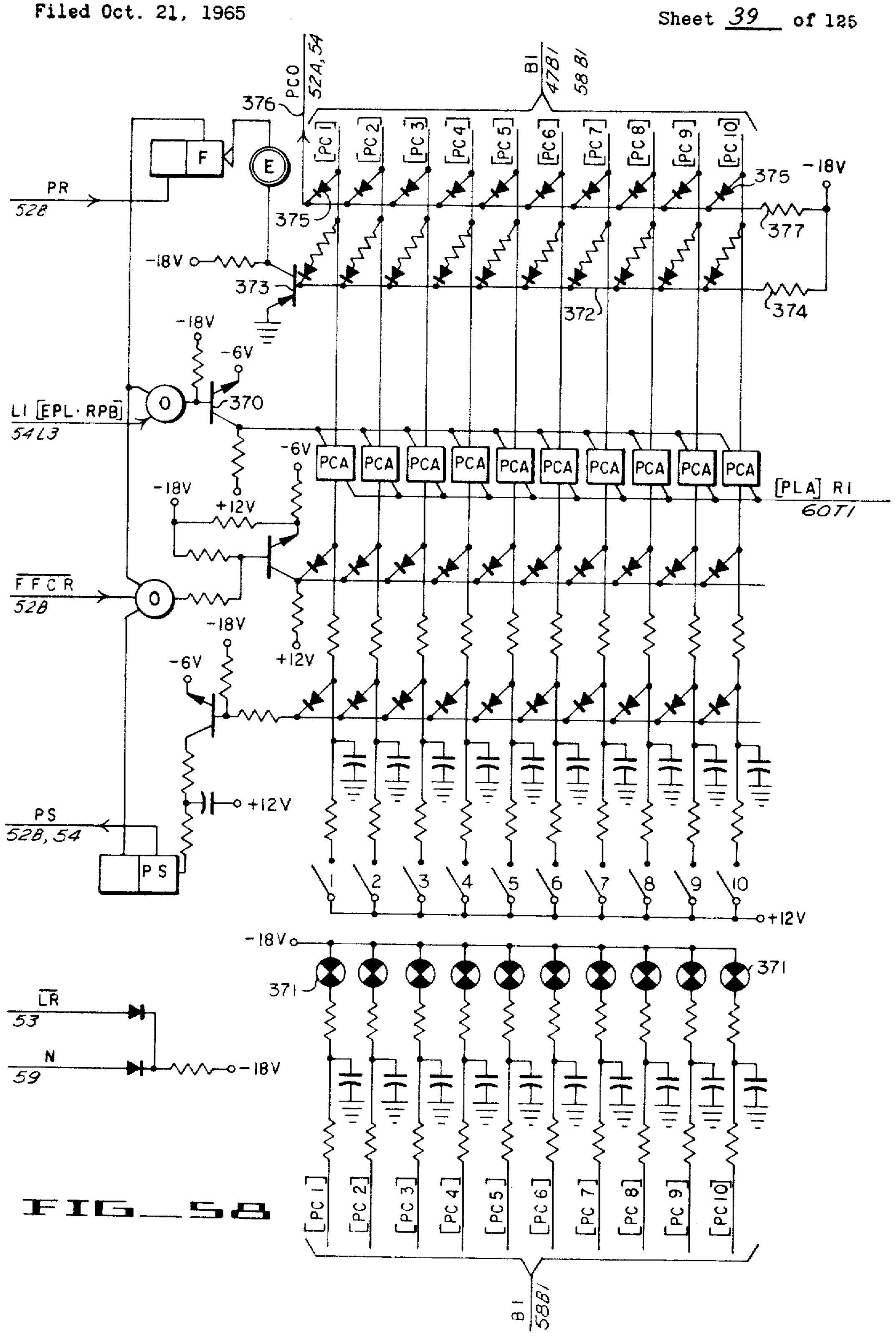

Intra-figure lead references may have a designation wherein the reference code refers to the same figure upon which the lead or leads appear, e.g., the reference code 58B1 appearing under the designation B1 indicates that the cable B1 refers to the designation B1 on the same figure, i.e., FIG. 58. A particular adaptation of the reference code will be found at the lead labeled R1 on FIG. 42. Here, the label R1 designates a group of leads which are treated as a cable. The group of leads carry the signals CM*a* through CM*d*, inclusive, and correspond to a similarly labeled group of leads terminating at R1 on FIG. 45, as indicated by the reference code 45R1 below the lead R1 on FIG. 42.

(1) *A counter*

Figure 42:
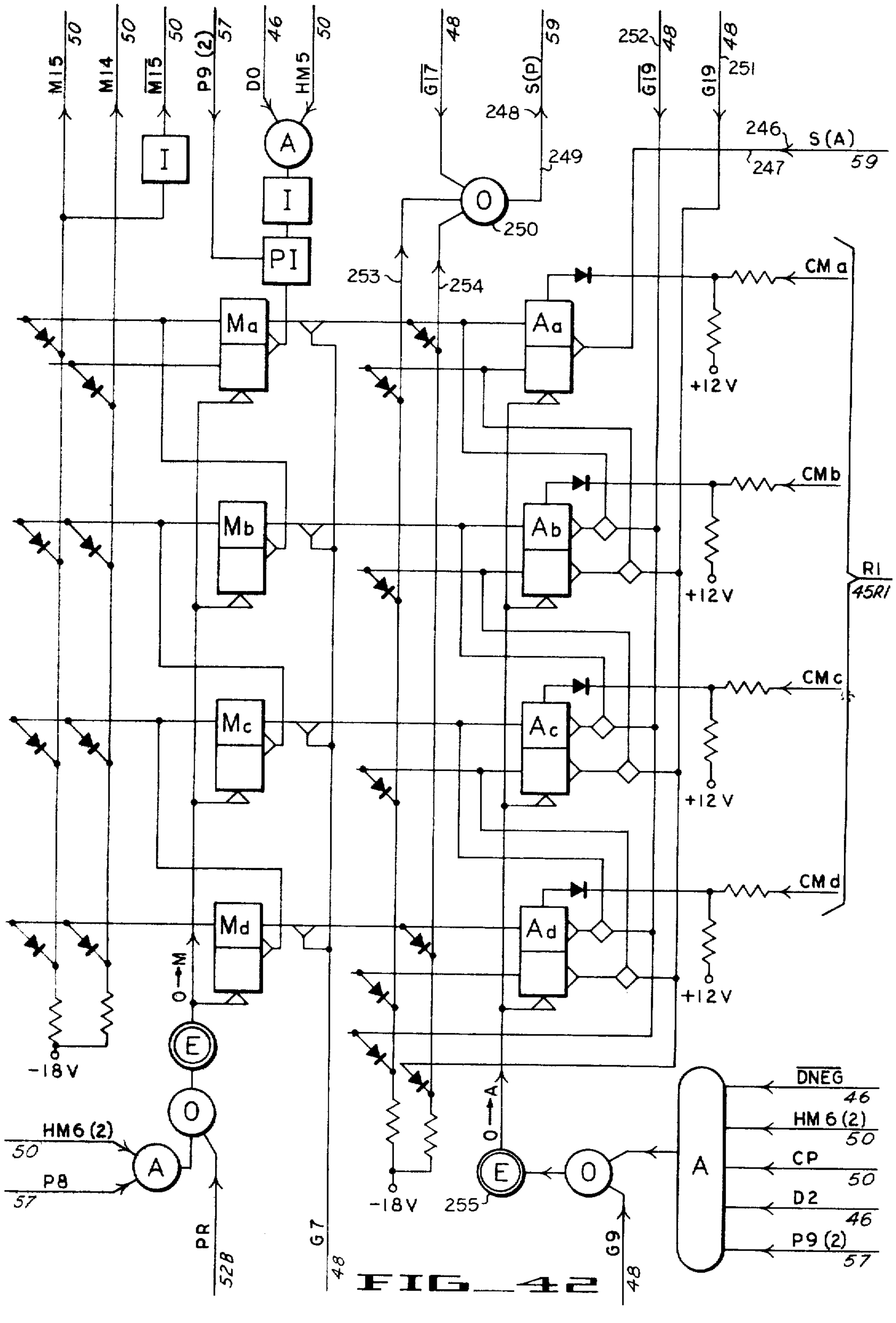

Before considering the realization of specific instructions or functions in connection with FIGS. 42 through 62, each of the figures will be briefly described. Referring now to FIG. 42, which illustrates an A and M counter, it is shown that the A counter comprises four interconnected flip-flops A*a*, A*b*, A*c* and A*d*. Since the A counter comprises four bistable elements which are not permuted, it constitutes a scale of "sixteen" counter. Each flip-flop in the A counter is capable of storing one bit position of a four bit binary number such as is used in a decimal-binary code. The presence of a G19 signal on the lead 251 enables the A counter to be counted up in response to S(A) pulses appearing on the input lead 247 whereas the presence of a $\overline{\text{G19}}$ signal on the lead 252 enables the A counter to count down in response to S(A) pulses appearing on the lead 247. The leads 253 and 254 located adjacent the A counter each constitute the output lead of a negative AND gate. The inputs to these AND gates are the electrical signals appearing on the leads emanating from the set and reset outputs of the A counter flip-flops which are coupled to the output lead 253 or lead 254 by way of a diode. For example, the flip-flop A*a* has its set output coupled to the AND gate associated with the lead 254 and has its reset output connected to the AND gate associated with the lead 253. When a count of "9" is contained within the A counter, a logic ONE appears on the set output of flip-flops A*a* and A*d* and a ZERO appears on the set outputs of the flip-flops A*b* and A*c*. Accordingly, if a G19 signal appears on the lead 252 at the same time that a "9" is contained in the A counter, the negative AND gate associated with the output lead 254 is activated thereby causing a "step the P counter" S(P) pulse or signal to be passed through the OR gate 250 and appear on the lead 249. Likewise, when the A counter contains a logic ZERO, the reset side of each of the four flip-flops contains a logic ONE and if, at the same time, a $\overline{\text{G19}}$ signal is present on the lead 252, the AND gate associated with the output lead 253 will be activated, passing a "step the P counter" S(P) pulse to the lead 249 by way of the OR gate 250.

The four binary bits CM*a*, CM*b*, CM*c* and CM*d* representing a decimal number and located in a selected digit position of a selected register in the core memory can be simultaneously transferred in parallel to the A counter by each of the four binary bits being applied to the set side of the appropriate flip-flops A*a*, A*b*, A*c* and A*d*. That is, when a decimal digit is read out of the core memory in four bit binary form, it is first entered into the A counter. A logic ONE appearing on the output of the emitter follower 255 is applied to the reset side of each of the four flip-flops comprising the A counter to set the A counter to "0."

Coupled to the A counter are four flip-flops, M*a*, M*b*, M*c* and M*d*, which are interconnected to form a scale of sixteen counter which is designated as the multiplier M counter. Two negative AND gates are associated with the set and reset outputs of the four flip-flops comprising the M counter, such that an M15 signal is produced whenever a count of "15" is contained within the M counter, and an M14 signal is generated whenever a count of "14" is contained within the M counter. The set side of each of the flip-flops comprising the M counter contains a gated A.C. input such that the appearance of a G7 signal will cause a logic ONE to appear in the set side of each of the M counter flip-flops if a logic ZERO is contained in the set side of a corresponding A counter flip-flop. In other words, the occurrence of a G7 signal causes the "15's" complement of the number in the A counter to appear in the M counter. The M counter is utilized to perform a MULTIPLICATION operation as is described below.

(2) *B Counter*

Figure 43:
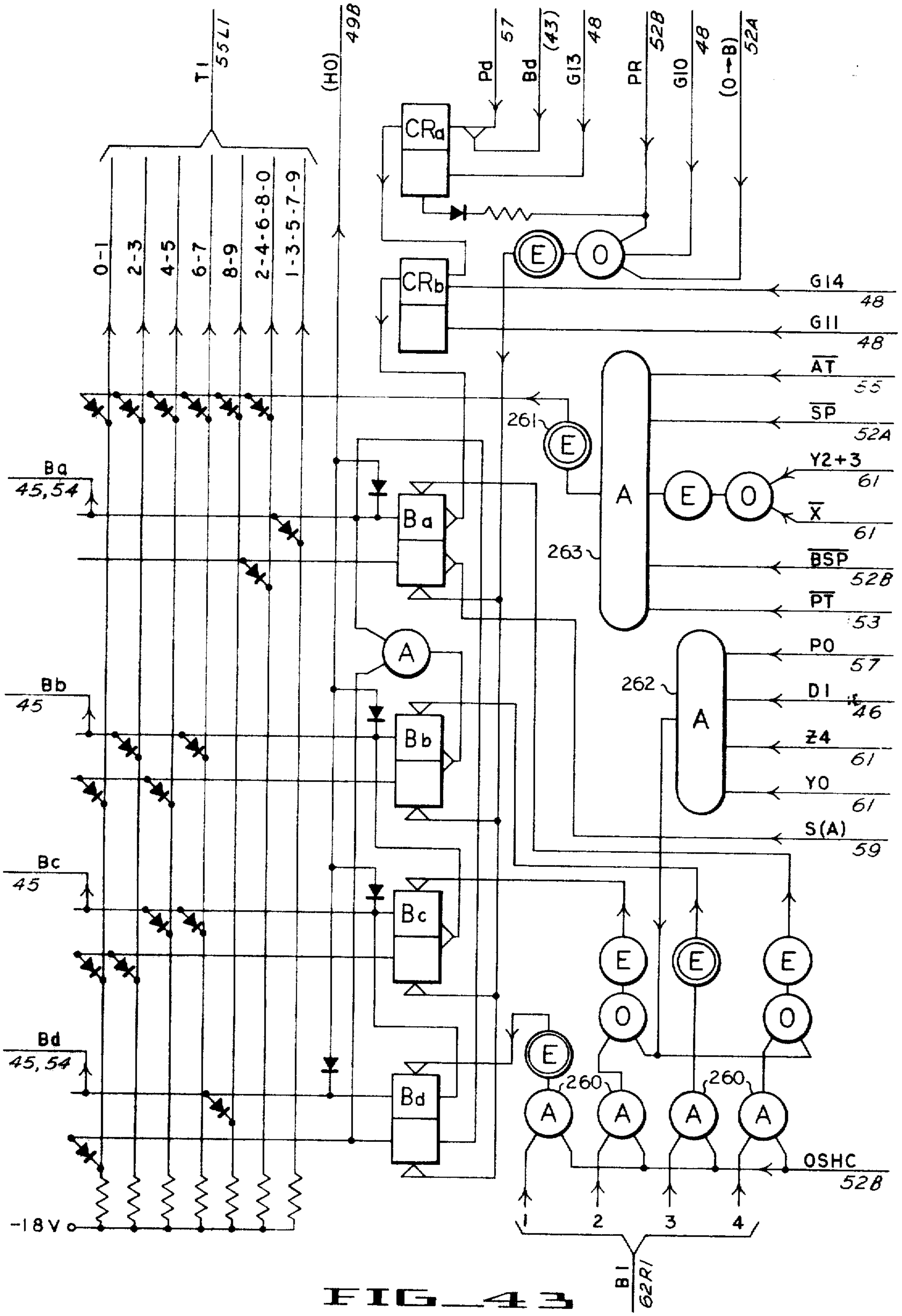

FIG. 43 illustrates a B counter comprising four interconnected flip-flops B*a*, B*b*, B*c* and B*d* which are permuted in a well-known manner to provide a scale of "ten" counter. Unlike the A counter, the B counter only counts up in response to S(A) pulses appearing on the input lead to the B*a* flip-flop. The B counter cooperates with the A counter to perform arithmetic functions, such as addition and subtraction. Also, the B counter serves as a buffer when writing information into the core memory, whereas the A counter operates as a buffer when reading information out of the core memory. Numeric data from the typewriter keyboard in a four bit binary code is applied to the B counter by way of the four AND gates 260. A number in the B counter may be transferred as an output to the typewriter by way of the plurality of negative AND gates located adjacent to the B counter, which AND gates have as their inputs selected set and reset outputs of the four flip-flops comprising the B counter. The outputs of these pluralities of AND gates are coupled to an output circuit illustrated in FIGS. 55 and 56. One input to each of these AND gates is supplied by the output of the emitter follower 261. Accordingly, when the output of this emitter follower is not a logic ONE, none of the plurality of AND gates can produce an output and a number in the B counter cannot be transferred to the typewriter as an output.

Located between the plurality of AND gates and the B counter is an OR gate, the inputs of which are the set outputs of each of the flip-flops comprising the B counter. A signal (H0) appearing on the output of the OR gate will result in a space SP flip-flop (FIG. 52A) being reset, which causes the typewriter to space one time whenever the output to the typewriter is a space rather than the number contained in the B counter. Two flip-flops CR*a* and CR*b* associated with the B counter perform a carry function when the A and B counters are utilized in performing arithmetic operations. The set output of the CR*b* flip-flop is applied to the input of the B*a* flip-flop of the B counter, whereas the input to the CR*a* flip-flop is supplied by the set output of the B*d* flip-flop.

(3) *C Counter*

Figure 44:
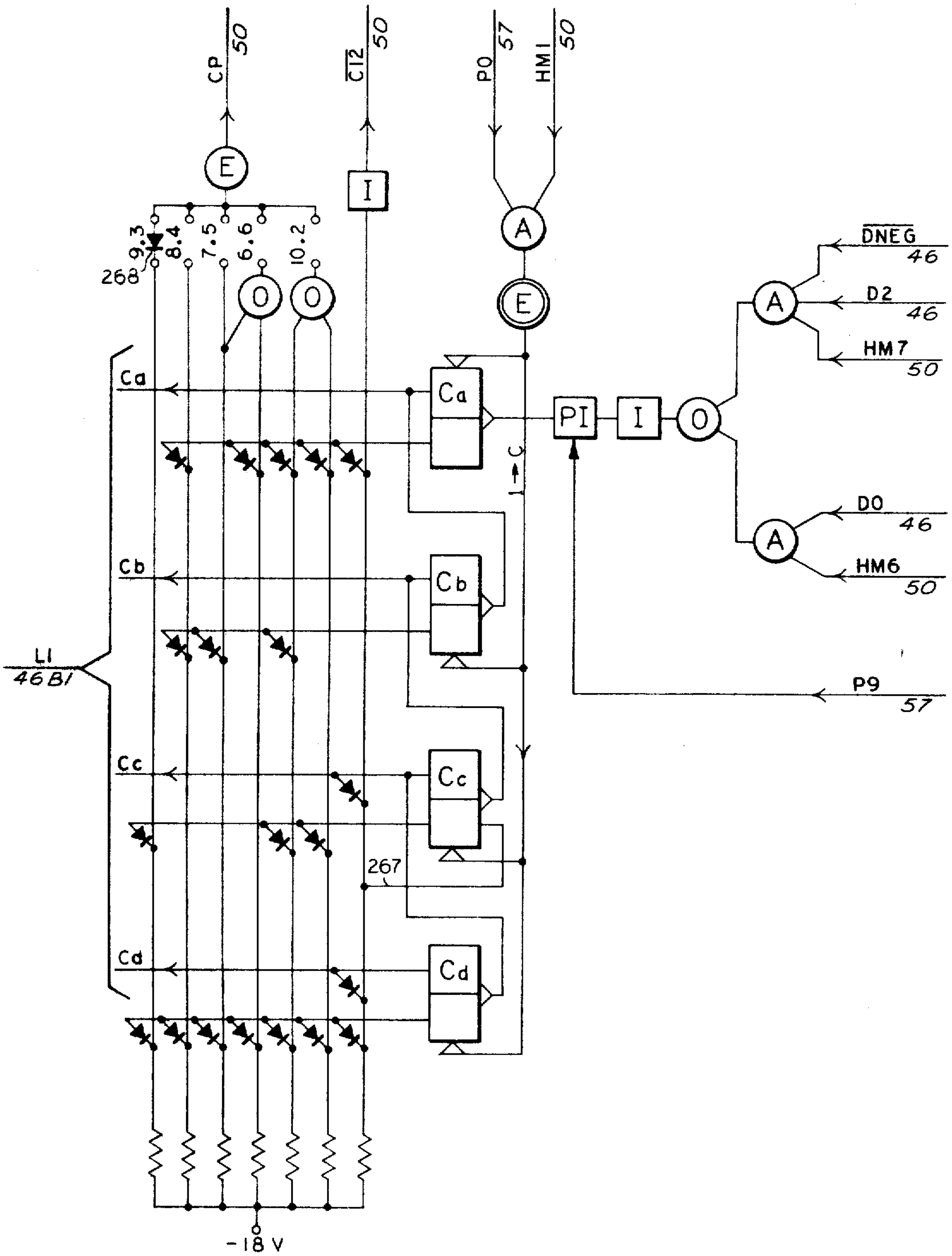

FIG. 44 illustrates a cycle C counter which controls a shifting operation when multiplication is performed, and comprises four interconnected flip-flops, C*a*, C*b*, C*c* and C*d*, which are permuted by the feedback lead 267 to provide a scale of twelve counter. The set output of each of the flip-flops comprising the C counter is coupled to a digit D counter illustrated in FIG. 46. A plurality of negative AND gates have as their inputs selected set and reset outputs of the four flip-flops, C*a*, C*b*, C*c*, and C*d*. One AND gate has its output applied by way of the diode 268 to an emitter follower to produce a cycle pulse CP whenever a "1," "2" or "3" is contained within the cycle counter. The outputs of the other AND gates do not produce CP pulses because they are not coupled to this emitter follower due to the open circuits adjacent the numbers "8.4," "7.5," "6.6" and "10.2." These numbers and the number "9.3" adjacent the diode 268 represent the number of numerals to the left and right of the decimal point. For example, as described above the core memory comprises twelve registers, each having twelve digit positions. The electronic processor is designed to have three, four, five, six or two decimal positions to the right of the decimal point. The diode 268 located near the number "9.3" indicates that three digits to the right of the decimal point and nine digits to the left of the decimal point has been selected. If it was desired to have six digits to the right of the decimal point and six digits to the left, the diode 268 would be removed and a diode would be inserted in the open circuit adjacent the number "6.6." Likewise, the other available digit positions to the left and right of the decimal point could be selected by connecting a diode across the open circuit associated with the particular number of left and right of decimal positions.

(4) *Core memory*

Figure 9:
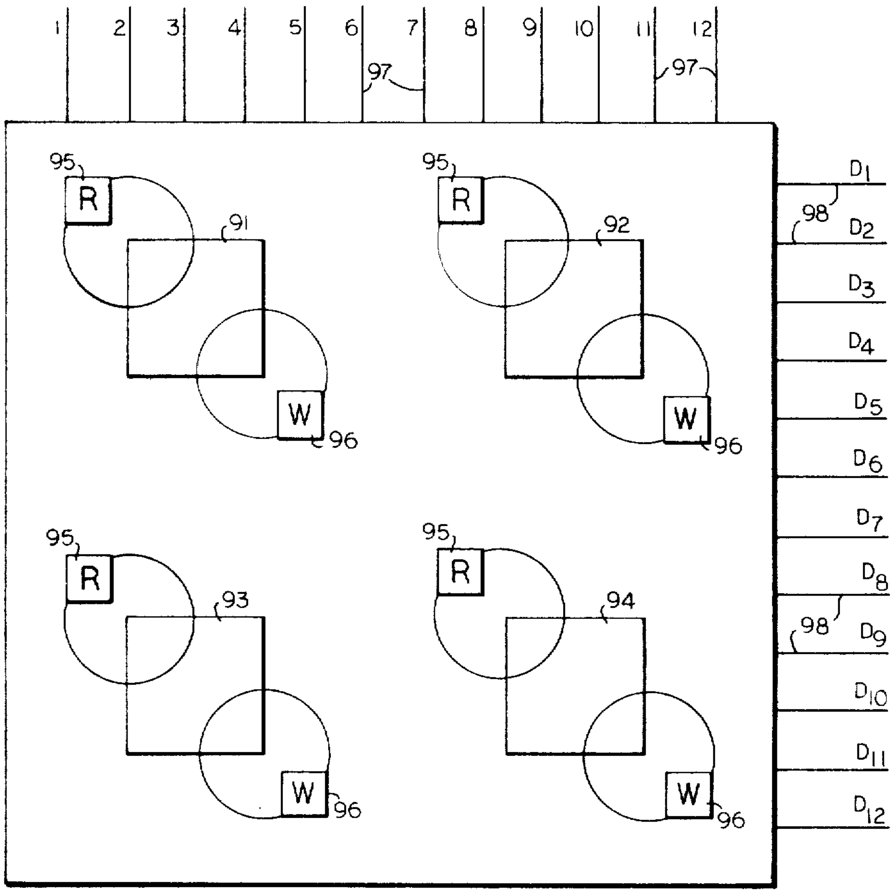
FIG. 9 illustrates symbolically the layout of a memory unit utilized in this invention.
Figure 45:
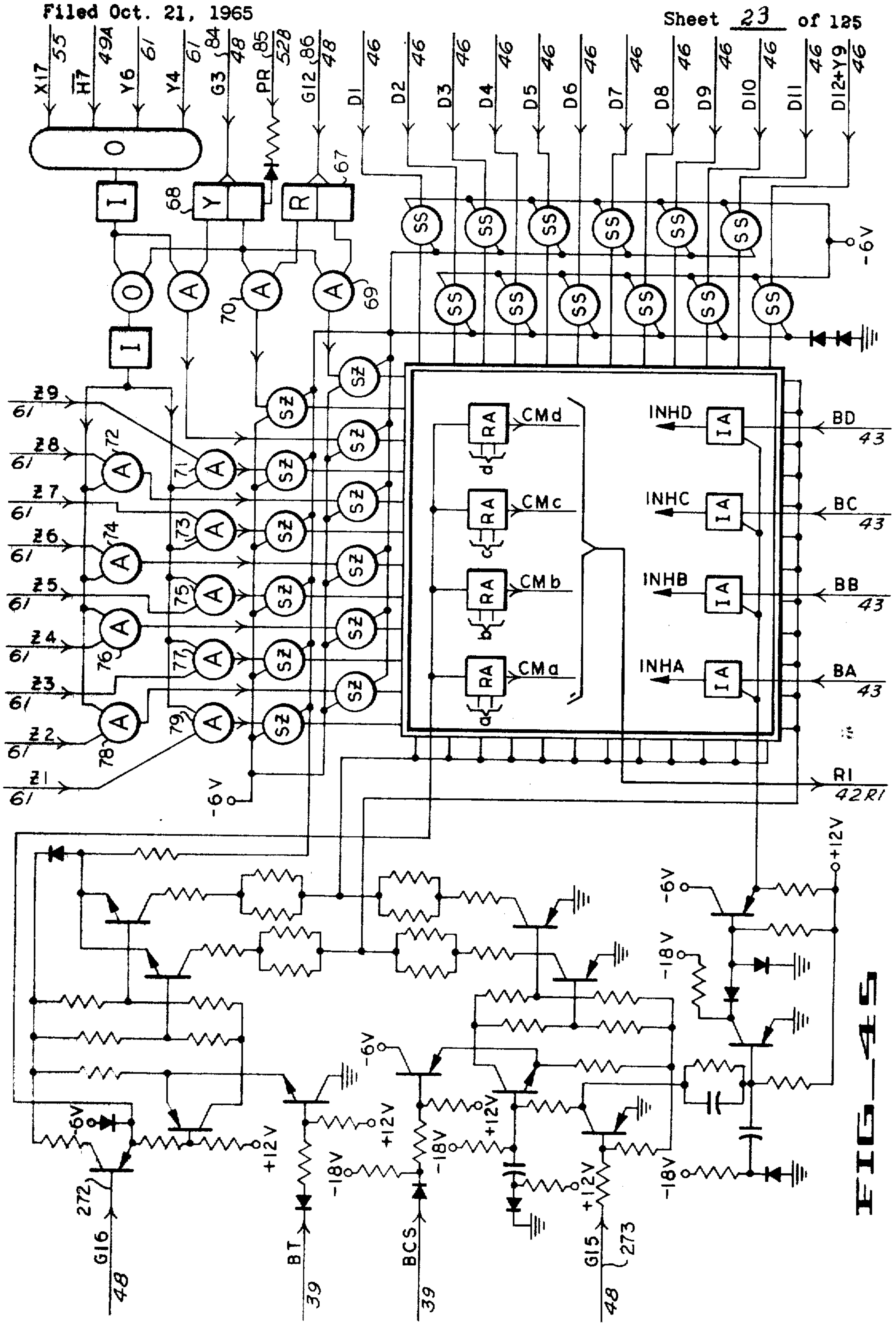

FIG. 45 illustrates the core memory arrangement discussed hereinabove in conjunction with FIGS. 6, 8 and 9 and comprises twelve registers, each having twelve decimal digit positions. Each decimal digit position comprising four binary bits has associated therewith a storage switch SS with the signal codes D1 through D12 indicating one of the twelve decimal digits. Each storage register has a storage switch SZ associated therewith. Going from left to right, the first nine storage switches SZ are associated with the storage registers $S_9$ through $S_1$, respectively. The next storage switch is associated with the storage register $S_0$ which is utilized in multiplication, and the last two storage switches are associated with the $R_2$ and $R_1$ registers, respectively. The flip-flops 67 and 68 and the AND gates 69 through 79 were previously described in conjunction with FIG. 8.

The presence of a G16 signal on the lead 272 activates the READ circuits such that the four binary bits representing the decimal in the selected digit location are amplified by the four READ amplifiers RA and applied to the A counter. A G15 pulse on the lead 273 activates the WRITE circuits and the four inhibit amplifiers IA, each corresponding to one binary bit position of the four bit binary number, with the input to the inhibit amplifiers being supplied by the B counter. As will be apparent from an inspection of FIG. 45, the four binary bits representing a single decimal number or digit are read out of and written into the core memory simultaneously. That is, in parallel.

(5) *D Counter*

FIG. 46 illustrates a digit D counter, which comprises four interconnected flip-flops, D*a*, D*b*, D*c* and D*d* which are not permuted so as to provide a scale of sixteen counter. When the D negative flip-flop is set, the resulting logic ONE signal appearing on the lead 278 causes the D counter to count down in response to G2 pulses appearing upon the A.C. input lead to the D*a* flip-flop. Likewise, when the D negative flip-flop is reset, the resulting logic ONE signal on the lead 287 causes the D counter to count up in response to G2 pulses. A number contained within the C counter (FIG. 44) can be transferred or set into the D counter by way of the AND gates 280 whenever a G8 signal appears. Thirteen negative AND gates have as their inputs selected set and reset outputs of the four flip-flops comprising the D counter. Each AND gate is associated with one of the first thirteen counts which may be contained in the D counter. For example, if the D counter contains a "0," a "0" digit D0 pulse appears upon the lead 281, if the digit "1" is contained within the D counter, a first digit D1 signal appears upon the lead 282, if the digit counter contains the number "2," a second digit D2 signal appears upon the lead 283, if the D counter contains a "3," a third digit D3 signal appears upon the lead 284, etc. Since the D counter is a scale of sixteen counter and only thirteen AND gates are provided for the first thirteen counts which may be contained within the D counter including the "0" count, there is no output from any of the AND gates whenever a count of "13," "14" and "15" is contained within the D counter. Each of the digit pulses D1 through D12 represents the corresponding one of the twelve digit positions in the registers contained within the core memory, and these digital signals are utilized to control and indicate the selected digit position in a selected register being looked at, or operated upon.

(6) *G signal generator*

FIG. 48 illustrates the gating circuits which comprise the G signal generator discussed hereinabove in conjunction with FIG. 6. For the most part, the inputs to the gating circuits are H signals which are D.C. level signals and P pulses which are generated by the P counter of FIG. 57. Since the gating circuits are activated by a D.C. input and a pulse input, the output G signals are logic ONE pulses which have a duration equal to the duration of the P pulses. The function of the G signals are as follows: the $\overline{G1}$ signal resets the space SP flip-flop (FIG. 52A); the G2 signal steps the digit D counter S(D); the G3 signal steps the Y flip-flop 68 (FIGS. 8 and 45); the $\overline{G4}$ signal will set the space SP flip-flop; the G5 signal will step the sense decimal flip-flop SD (FIG. 53); the G6 signal sets the D negative flip-flop thereby causing the D counter to count up; a G7 signal causes the number in the A counter to be transferred into the M counter; a G8 signal causes the number in the cycle C counter to be transferred into the digit D counter; a G9 signal will set a "0" into the A counter; A G10 signal will set a "0" into the B counter; a G11 signal will reset the carry flip-flop CR*b*; a G12 signal will step the register R flip-flop 67 (FIG. 45); a G13 signal will reset the carry flip-flop CR*a*; a G14 signal will set the carry flip-flop CR*b*; a G15 signal will enable data to be written into the core memory; a G16 signal will enable data in the core memory to be read out; a $\overline{G17}$ signal will stop the setting of the P counter (FIG. 57); a G18 signal will reset the D negative flip-flop thereby causing the digit D counter to count down; a $\overline{G19}$ signal will cause the A counter to count down; and a G19 signal will cause the A counter to count up.

(7) *H signal generator*

Figure 49A:
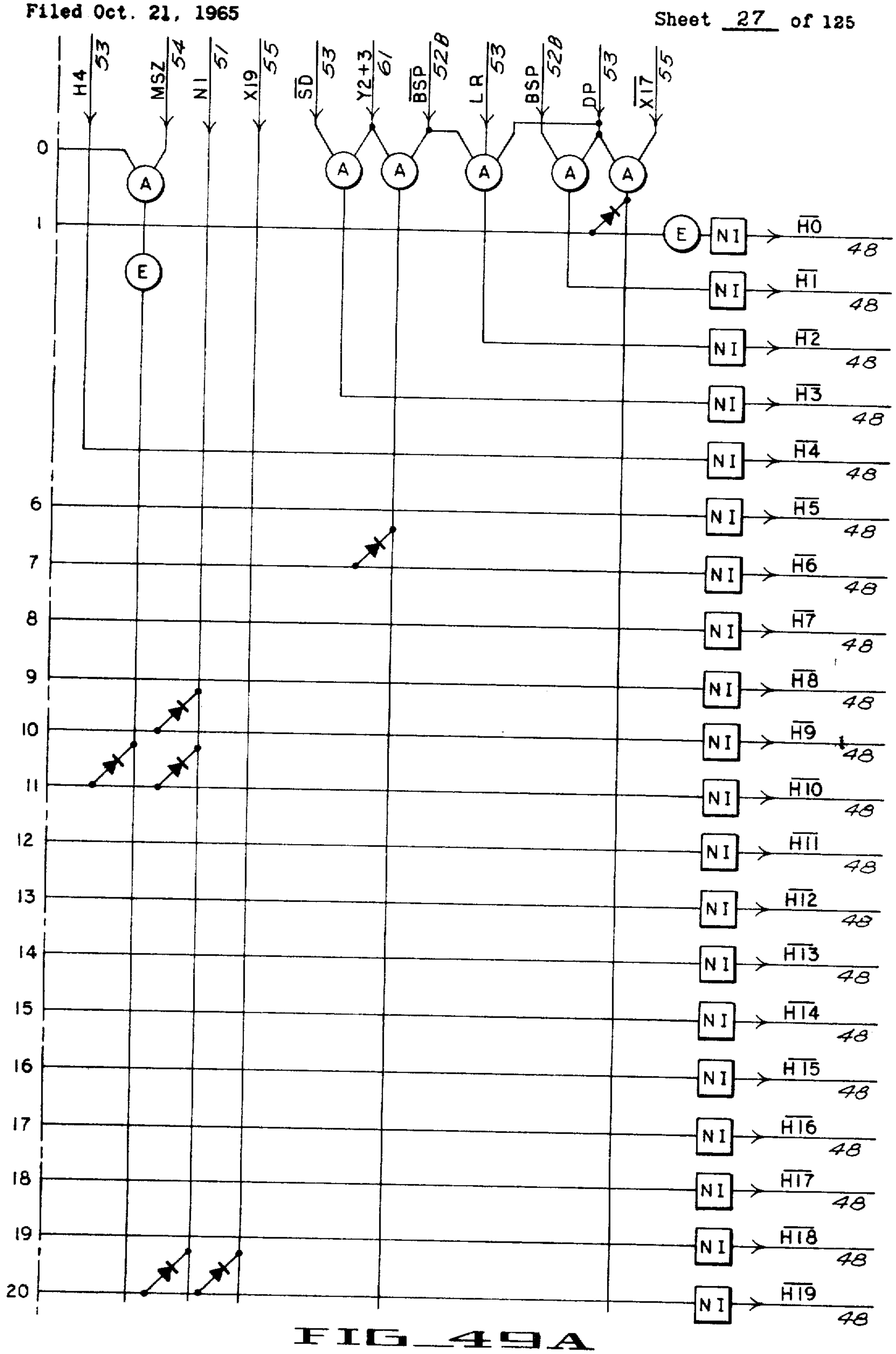
Figure 49B:
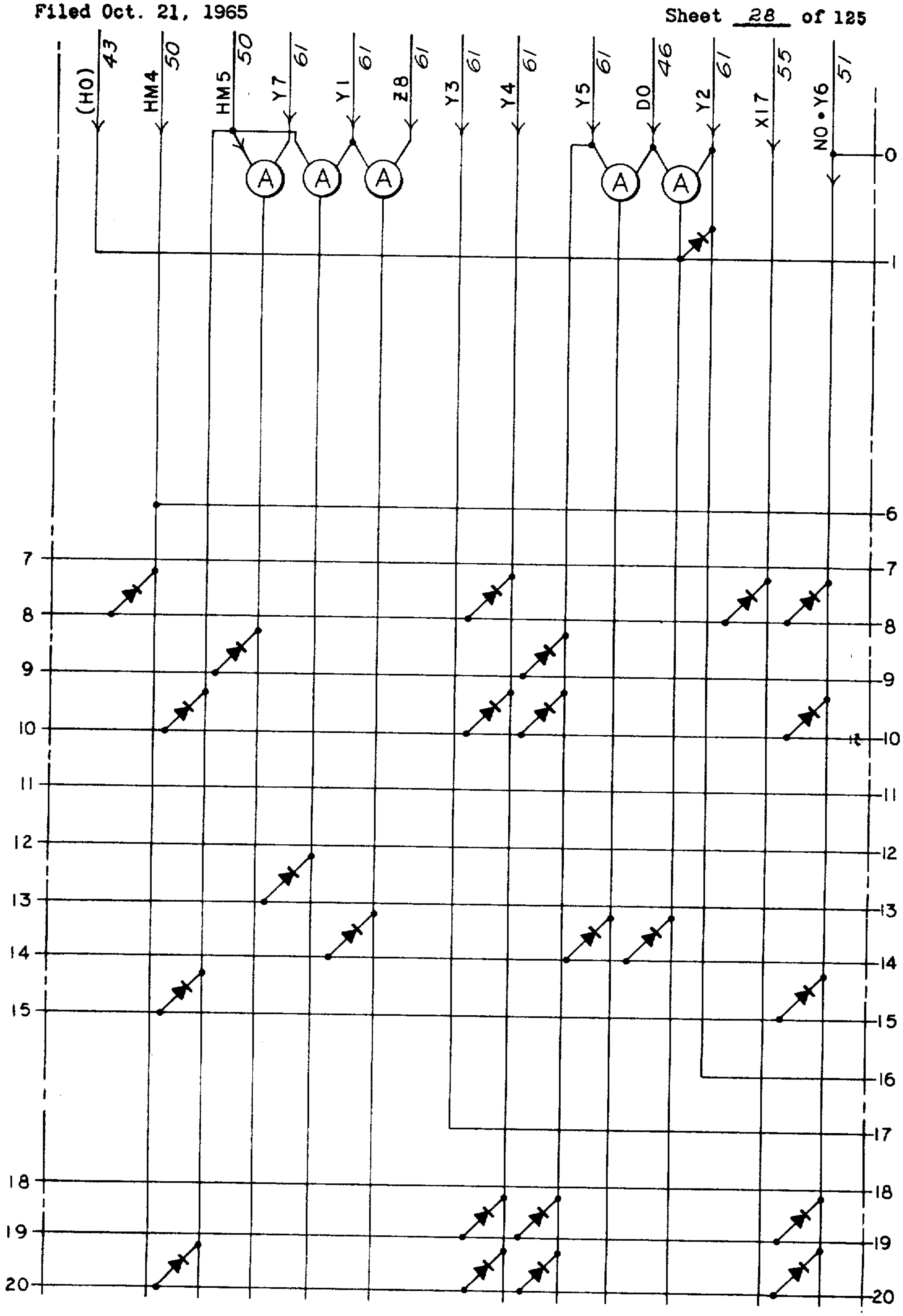
Figure 49C:
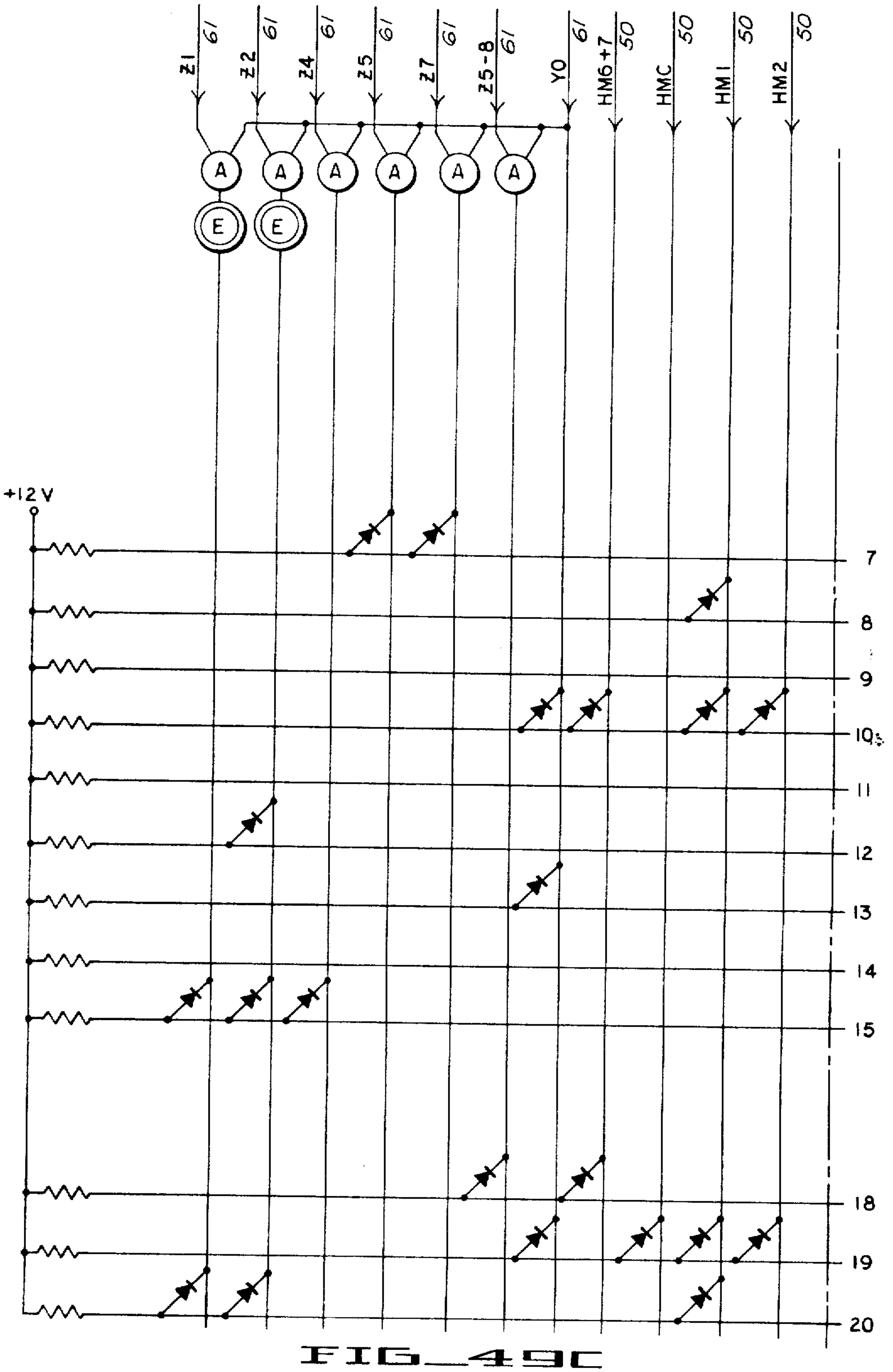

FIGS. 49A, 49B and 49C taken together constitute the H signal generator discussed hereinabove in conjunction with FIG. 6. The inputs to the H signal generator are generally applied to the vertical leads and comprise, in part, Z and Y signals which are D.C. level signals. Each of the vertical leads are coupled to a selected one or ones of the horizontal leads to form a matrix such that the horizontal leads represent the various outputs of the H signal generator. The H signals comprising the output of the H signal generator are applied to the G signal generator which, in conjunction with the P pulses, generate the G pulses described above. Each output of the H signal generality of $\overline{H}$ signals, $\overline{H0}$ through $\overline{H19}$.

(8) *Multiplication phase counter*

Figure 50:
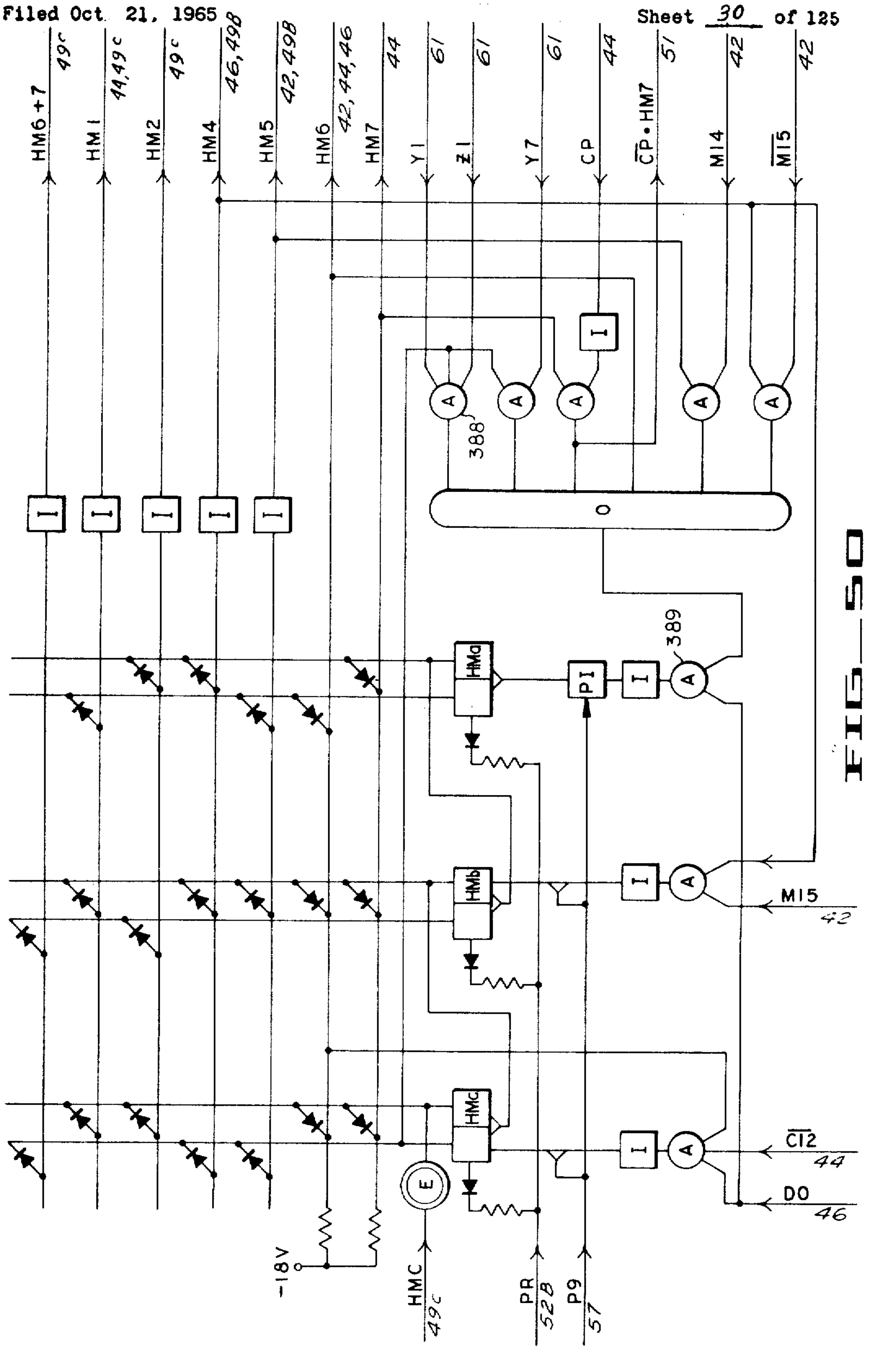

FIG. 50 illustrates a multiplication phase counter HM which is utilized during the arithmetic operation of multiplication and comprises three interconnected flip-flops HM*a*, HM*b* and HM*c*. The set and reset outputs of the three flip-flops serve as the inputs to selected AND gates with the five uppermost AND gates being positive AND gates, and the two lowermost AND gates being negative AND gates. Multiplication as performed by the electronic processor may be divided or broken down into six separate phases or steps. The function of the phase counter HM is to determine and indicate which phase is taking place at any given time. This is accomplished by the outputs of the AND gates denoting a particular phase or step of the multiplication operation. For example, when the fourth phase is being performed, an HM4 signal is present, when the sixth phase is being performed, an HM6 signal is present, etc.

(9) *Instruction counter*

The instruction I counter discussed hereinabove in conjunction with FIG. 6 is illustrated in detail in FIG. 51 as comprising four interconnected flip-flops I*a*, I*b*, Ic and I*d*, which are not permuted so as to provide a scale of sixteen counter. As described above in conjunction with FIGS. 32 and 32A each of the four flip-flops comprising the instruction counter have their set and reset outputs inverted such that when a flip-flop is set, a logic ZERO appears on the set output lead and a logic ONE on the reset output lead. Conversely, when a flip-flop is reset, a logic ONE appears on the set output lead and a logic ZERO on the reset output lead. Also, a logic ZERO on the output of any of the I counter flip-flops is a positive potential whereas a logic ONE is a negative potential. Fifteen AND gates are associated with the instruction counter and have as their inputs selected set and reset outputs from the I counter flip-flops. Each of these AND gates are associated with one of the first fifteen digits ("0" through "14") which may be contained within the I counter. For example, when the instruction counter contains a "0," the output lead 290 is activated; when the instruction counter contains a "1," the next lead 291 is activated; when the instruction counter contains a "2" the next or lead 292 is activated; and when the instruction counter contains a "3," the lead 293 is activated, etc. Although the instruction I counter is a scale of sixteen counter, only fifteen AND gates are utilized so that when the I counter contains the digit "15," there is no output from any of the plurality of AND gates. This is so because the first count or step of the counter corresponds to a "0." The instruction counter I is stepped—that is, caused to count by applying pulses to the A.C. input lead of the I*a* flip-flop. Also, the instruction counter I is only capable of counting up.

Figure 51:
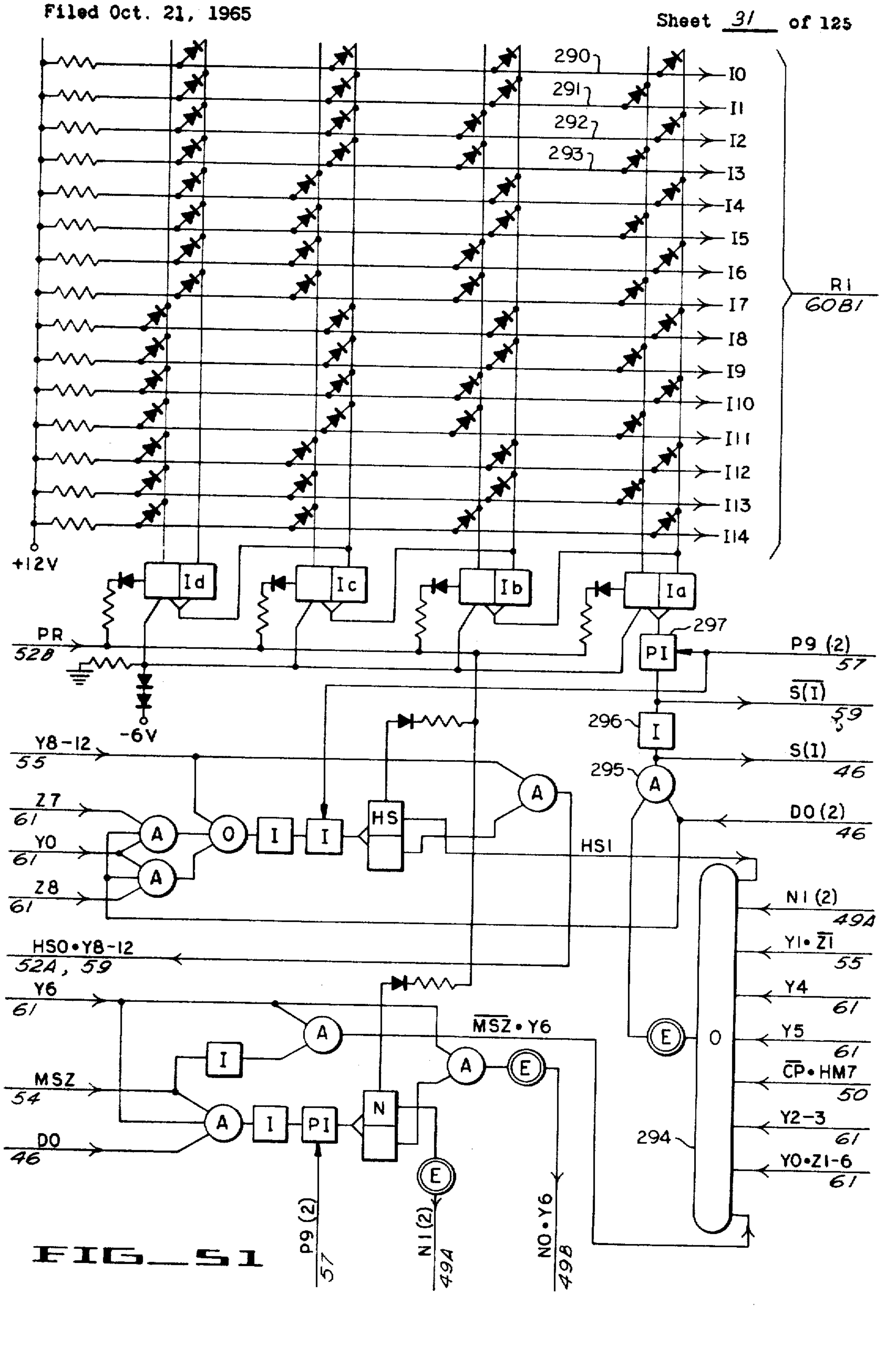
Figure 59:
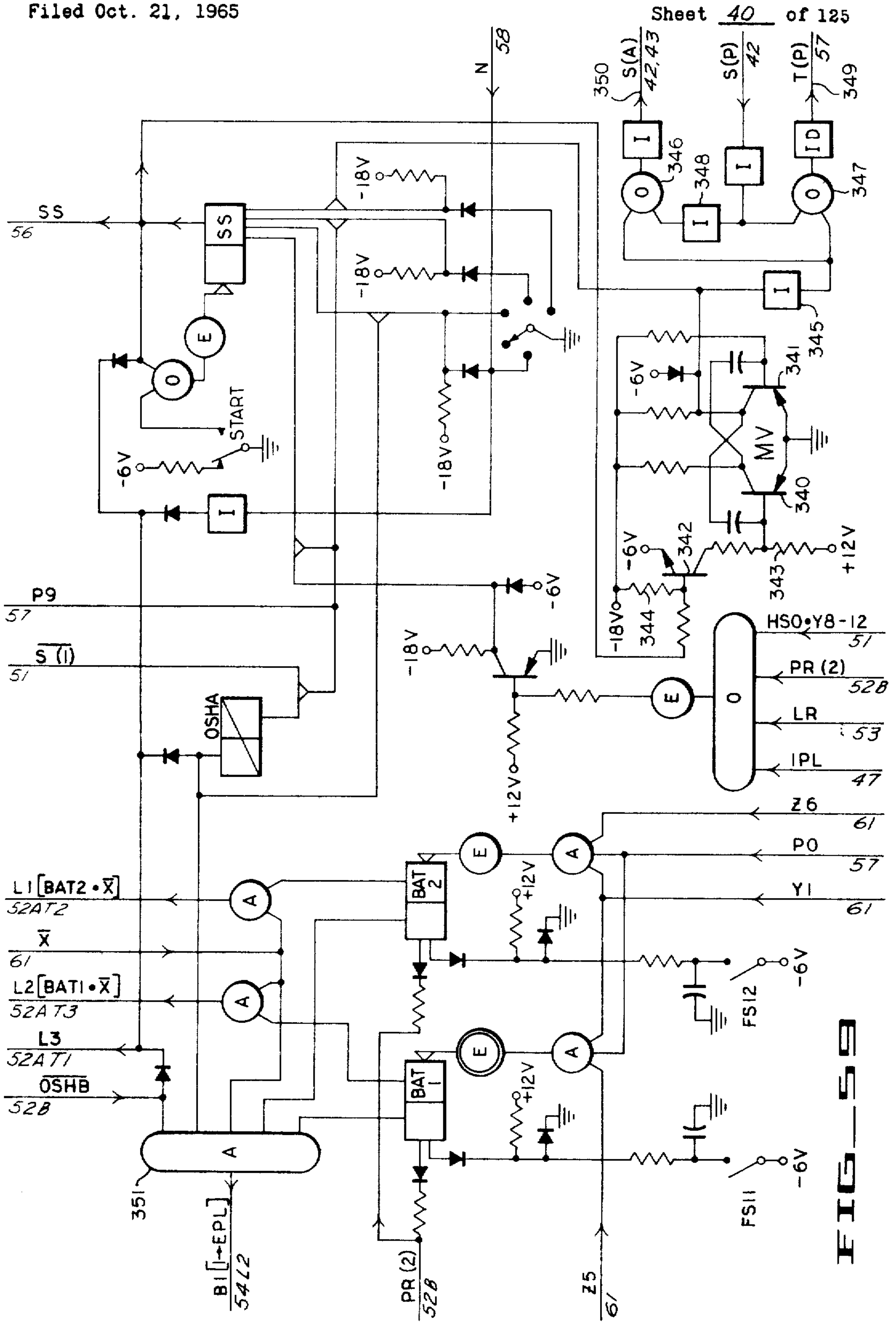

FIG. 51 also illustrates an HS flip-flop, the set output of which is utilized to step the instruction counter and the reset output of which is utilized to disable a free-running pulse generator (FIG. 59). FIG. 51 also illustrates an N flip-flop which is utilized in conjunction with the manual selector switch MSZ.

(10) *Input*

Figure 52A:
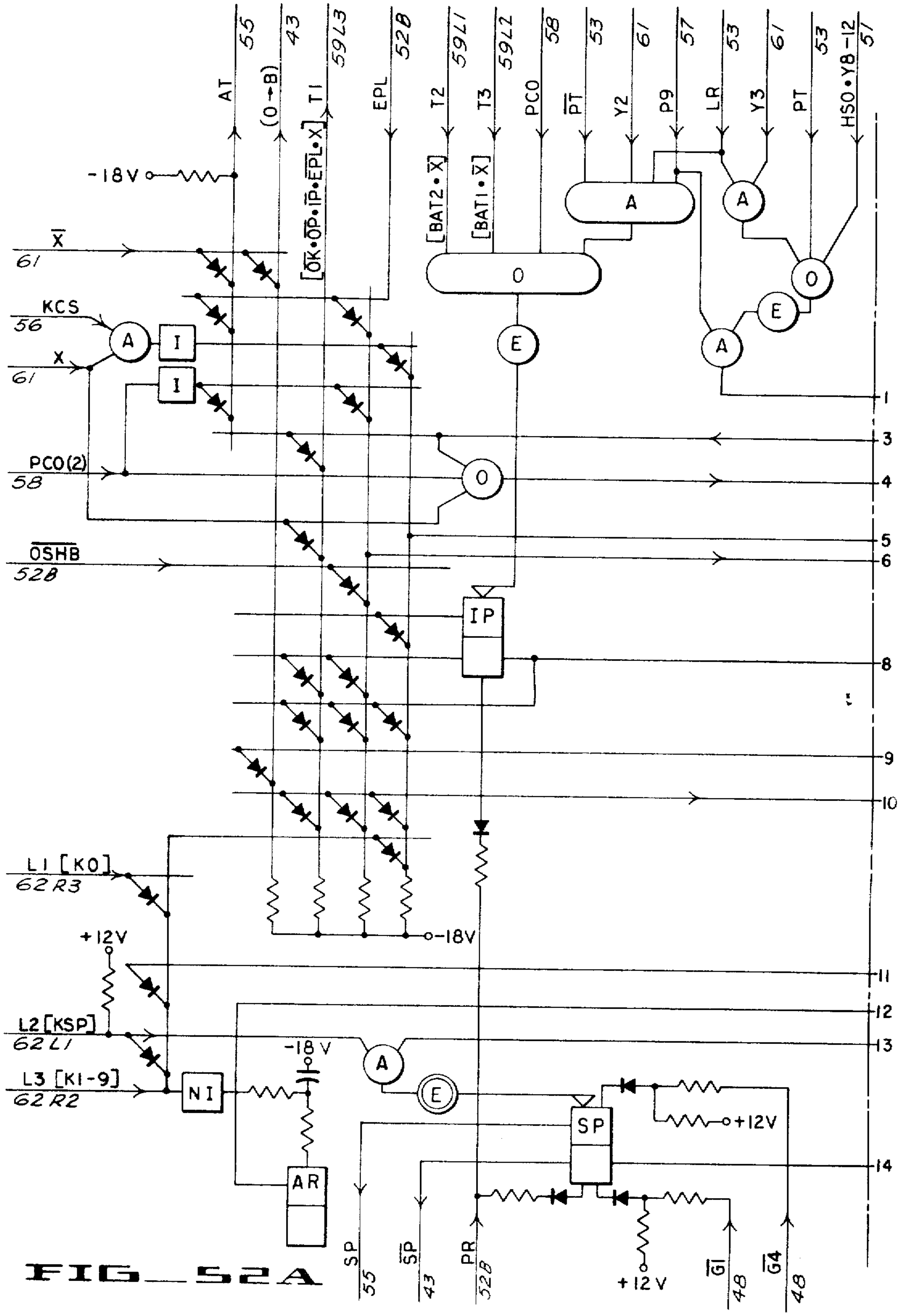
Figure 52B:
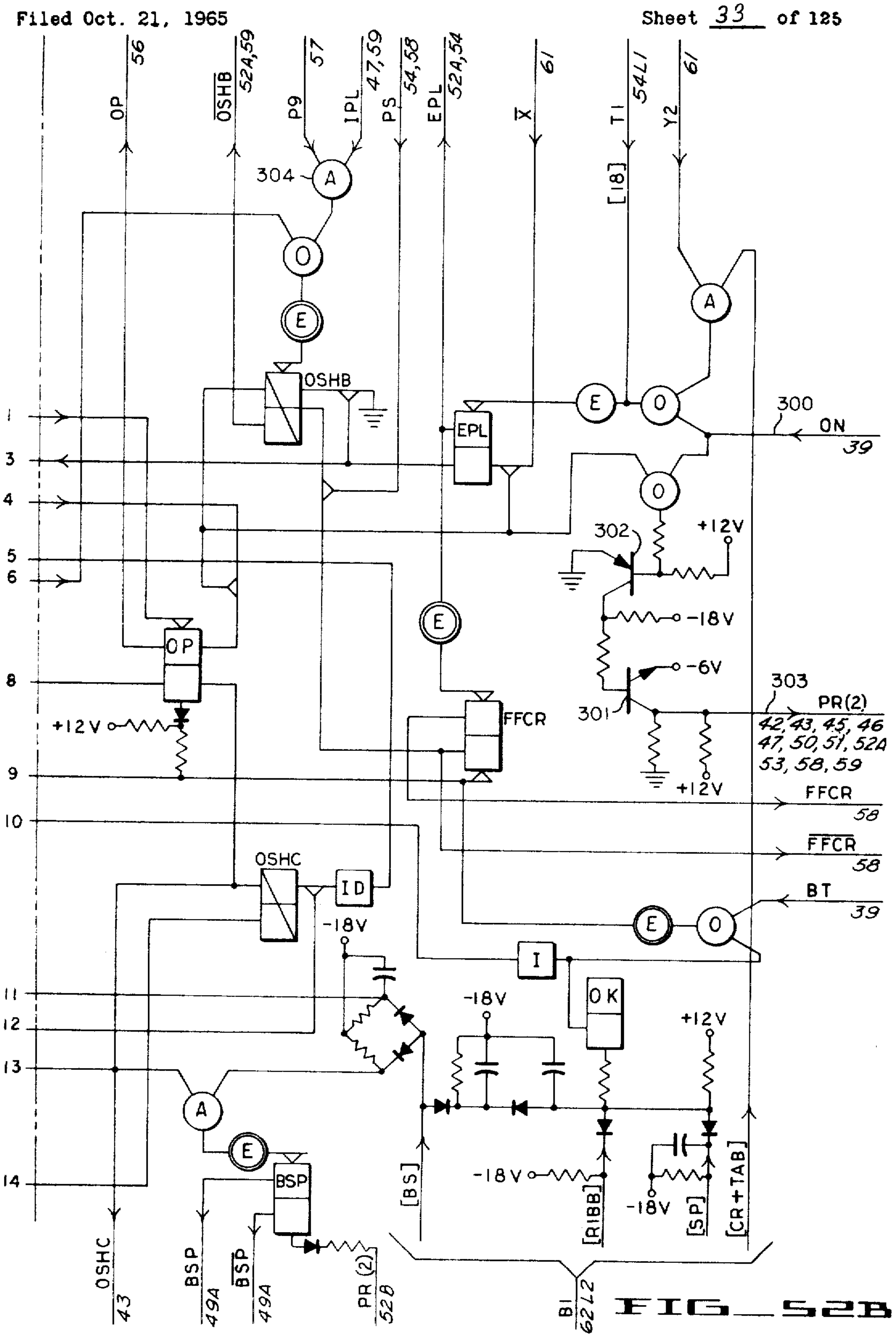

FIGS. 52A and 52B taken together comprise an input circuit which enables the electronic processor to receive data from the typewriter keyboard. Whenever the electronic processor is turned on, a signal appears upon the lead 300 (FIG. 52B) and is applied to the base of the transistor 302 which, in conjunction with the transistor 301, constitute a cascaded transistor amplifier to produce a pulse reset PR pulse on the output lead 303. Activation of the one-shot circuit OSHB also causes a pulse reset PR pulse to appear on the output lead 303. This PR pulse is applied to various flip-flops and counters throughout the electronic processor to set these various elements into their normal positions. More specifically, a PR pulse will accomplish the following: reset the sense decimal point SD flip-flop; reset the carry flip-flop CR*a*; set "0" into the B counter; set "0" into the instruction counter; set "0" into the HM counter; reset the block automatic tab BAT1 flip-flop (FIG. 59); reset the block automatic tab BAT2 flip-flop (FIG. 59); set the start-stop SS flip-flop (FIG. 59) if a P9 pulse is present; reset the space SP flip-flop; reset the backspace BSP flip-flop (FIG. 52B); set "0" into the M counter; reset the F flip-flop (FIG. 58); will switch the three field code flip-flops FC*a*, FC*b* and FC*d* if the iterate program line IPL flip-flop is reset (FIG. 47); set "0" into the D counter; reset the D negative flip-flop associated with the D counter; reset the Y flip-flop 68 (FIG. 45); reset the HS flip-flop and reset the N flip-flop.

(11) *Left and right of decimal (LRD)*

Figure 53:
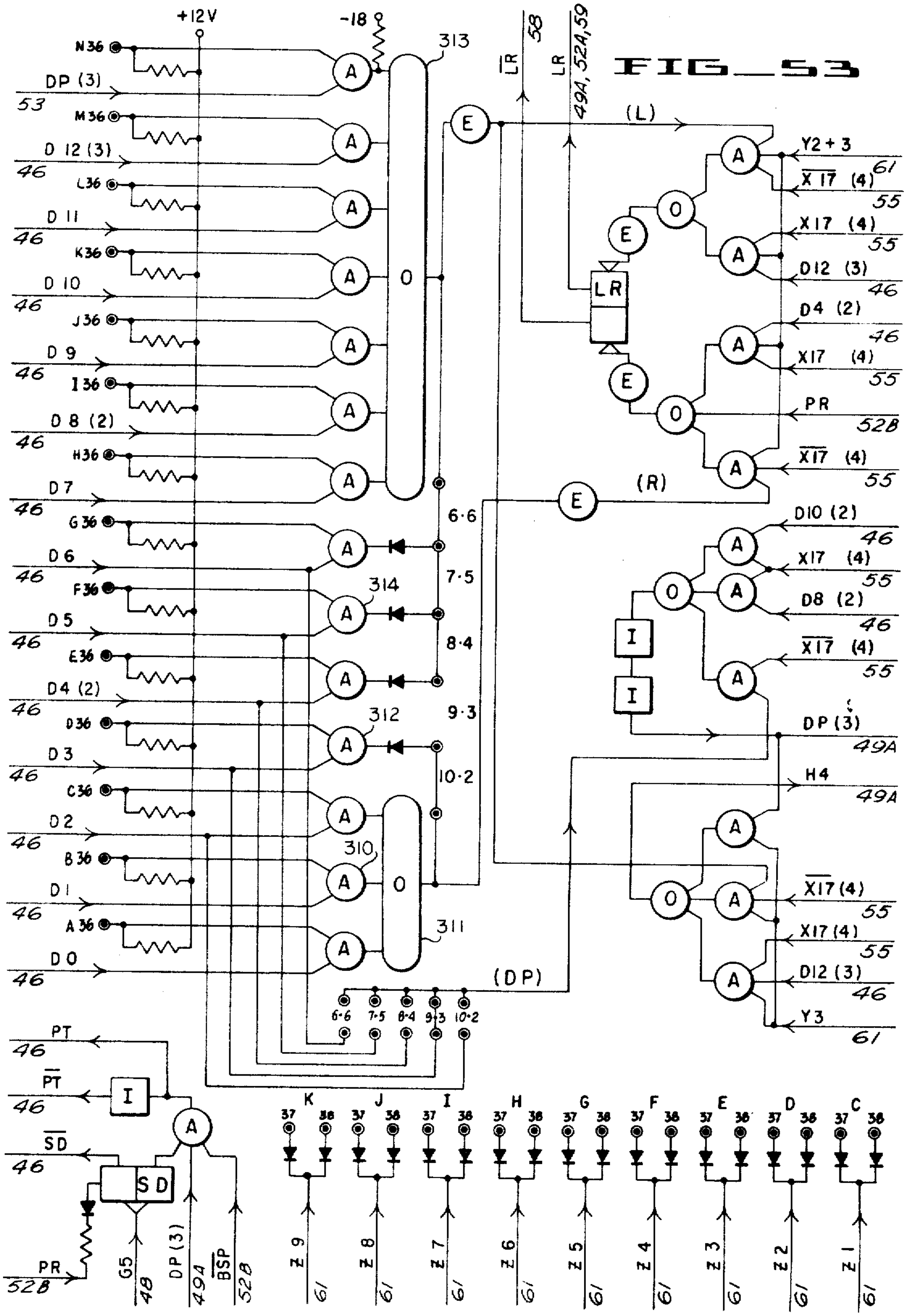
Figure 61:
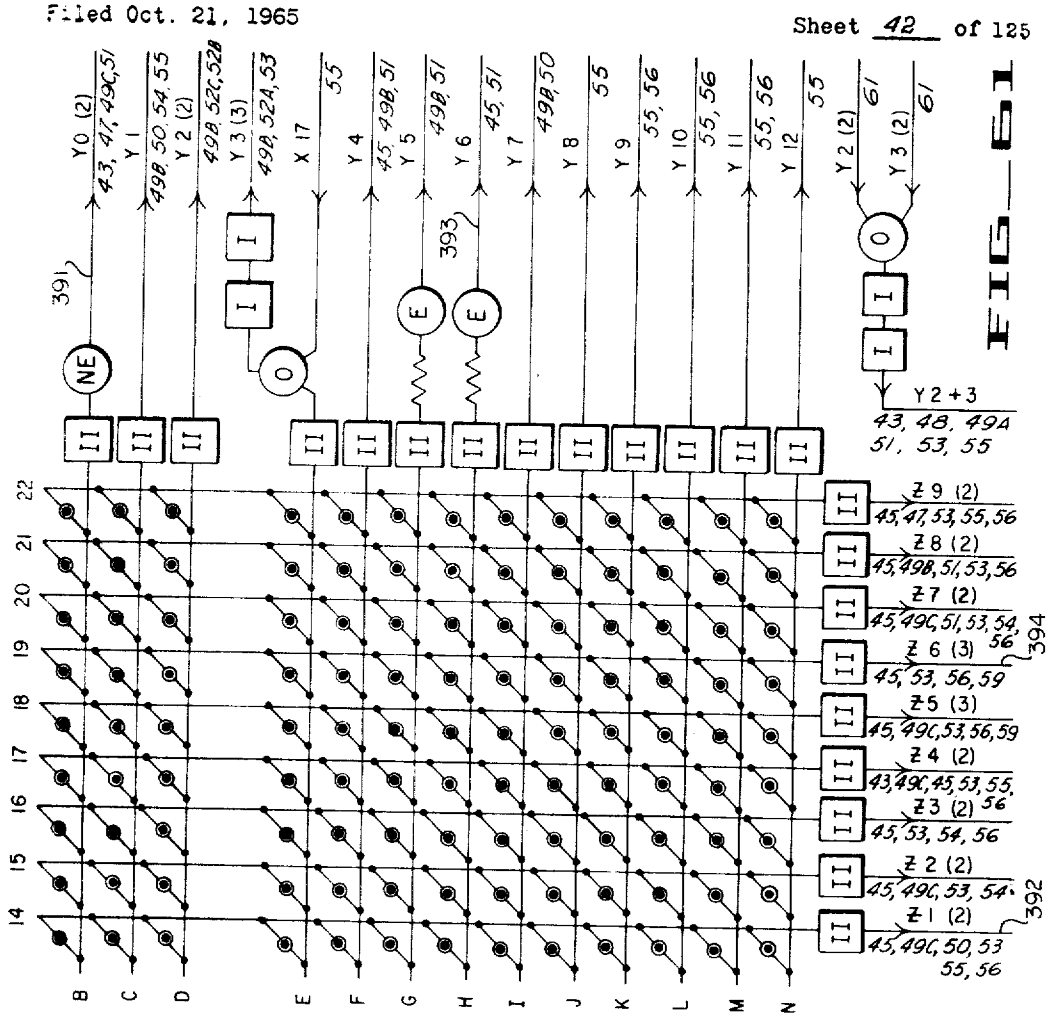

FIG. 53 illustrates the left and right of the decimal point circuit which determines how many digits to the left and to the right of the decimal point will be utilized. As described above, each register contains twelve digit positions and the decimal point is located between the third and fourth digit positions, thereby providing three digits to the right of the decimal point and nine digits to the left of the decimal point. The various billing or accounting forms which may be utilized with the apparatus comprising the subject invention contain various columns into which various data is entered by the operator or under the control of the electronic processor. The information placed in these columns is very often such that twelve digit positions are not needed and often no digit positions to the right of the decimal point are needed at all. It is imperative then, when numeric data is entered into the electronic processor, or out of the electronic processor to the typewriter as an output, that the numeric data be accurately controlled as to whether it is located to the left of the decimal point, to the right of the decimal point, or surrounds the decimal point. For example, assume that data is being entered into the electronic processor from the typewriter keyboard at a column wherein only two digit positions to the left and right of the decimal point are required. The instruction patchboard of FIG. 61 is patched so as to provide one of the Z signals Z1 through Z9. Each of these Z signals may be applied to a pair of diodes which have their anodes coupled to a hub. Assuming that the program is such that the Z1 signal is activated, then a patch from the hub C37 to the hub C36 of FIG. 53 establishes the least significant digit to be entered as being D2 or two digits to the right of the decimal point. By patching the hub C38 to the hub F36, the most significant digit is determined as being D5, or two digits to the left of the decimal point. This patching determines the number, length or field of the numeric data which can be entered from the typewriter for the particular Z signal and properly positions the incoming data within the twelve available digit positions in one of the registers located in the core memory.

Assume now that information is to be typed out by the typewriter under the control of the electronic processor such that three positions to the right and left of the decimal point comprise the output number length. Again the program patching provides one Z signal from the instruction patchboard, which can be any one of the Z signals Z2 through Z9. A Z1 signal cannot be used for this left and right of decimal configuration for a Z1 signal has already been patched to provide two digits to the left and right of the decimal point. Assume that the program provides a Z9 signal; by patching the hub K38 to the hub G36, the most significant digit position has been defined as D6 which is three digits to the left of the decimal point. By patching the hub K37 to the hub B36 the least significant digit has been defined as the third digit to the right of the decimal point, or D1. Once a particular Z signal is patched to provide a predetermined left and right of decimal setting, the same Z signal can be utilized by programming to provide this left and right of decimal setting for other columns in the billing or accounting form being used where the same left and right of decimal settings or number lengths are desired.

The operation of the core memory is such that each digit position, of the twelve digit positions available in a register, is looked at, that is, written into or read out of, sequentially under the control of the digit counter. When the digit counter contains a "0," the processor is looking outside of the core memory since the memory does not contain a "0" digit position. However, when the digit counter contains a "1," a D1 signal is generated which represents the first or least significant digit position of the twelve possible digit positions. This D1 signal is applied as an input to the AND gate 310, which AND gate will be activated if the hub B36 is coupled to one of the hubs associated with a pair of diodes having a Z signal applied thereto. When activated, the AND gate 310 produces an (R) pulse on the output of the OR gate 311, which indicates that the least significant digit of the desired number length has been reached. Correspondingly, if the number being entered from the typewriter or being applied to the typewriter from the electronic processing unit as an output has its least significant digit, the "third" digit position, that is, the first digit to the right of the decimal point, no (R) pulse will appear at the output of the OR gate 311 until the digit D counter contains the number "3" so as to produce a D3 pulse which, together with the appropriate Z signal applied to the hub D36, will enable the AND gate 312 to produce an (R) pulse which will indicate the position of the least significant digit with respect to the decimal point. In a like manner, when the most significant digit is reached, one of the AND gates associated with the digit signals D4 through D12 representing the "fourth," "fifth," "sixth," "seventh," "eighth," "ninth," "tenth," "eleventh" and "twelfth" digit positions, respectively, will cause an (L) pulse to appear on the output of the OR gate 313 which will indicate that the most significant digit position of the number length has been reached.

As described above, other left and right of decimal configurations are obtainable other than nine positions to the left and three positions to the right of the decimal point. When other configurations are desirable, it is only necessary to couple the output of the AND gates associated with the digit signals D1 through D12 so as to provide an (R) or an (L) signal. For example, if it is desired to have six digits to the left of the decimal point and six digit positions to the right of the decimal point, the outputs of the AND gates associated with the digits D0 through D6 are coupled together so as to produce an (R) signal when any one of them is activated. Likewise, the outputs of the AND gates associated with the digit signals D7 through D12 are coupled together so as to provide an (L) signal when any one of them is activated. The (R) signal is applied to the reset side of the left and right LR flip-flop to place this flip-flop into its reset condition which indicates that the number field has been entered. When the (L) signal occurs, it is applied to the set side of the LR flip-flop. When set, the LR flip-flop indicates that the number field is no longer present.

(12) *Manual selector switches*

Figure 54:
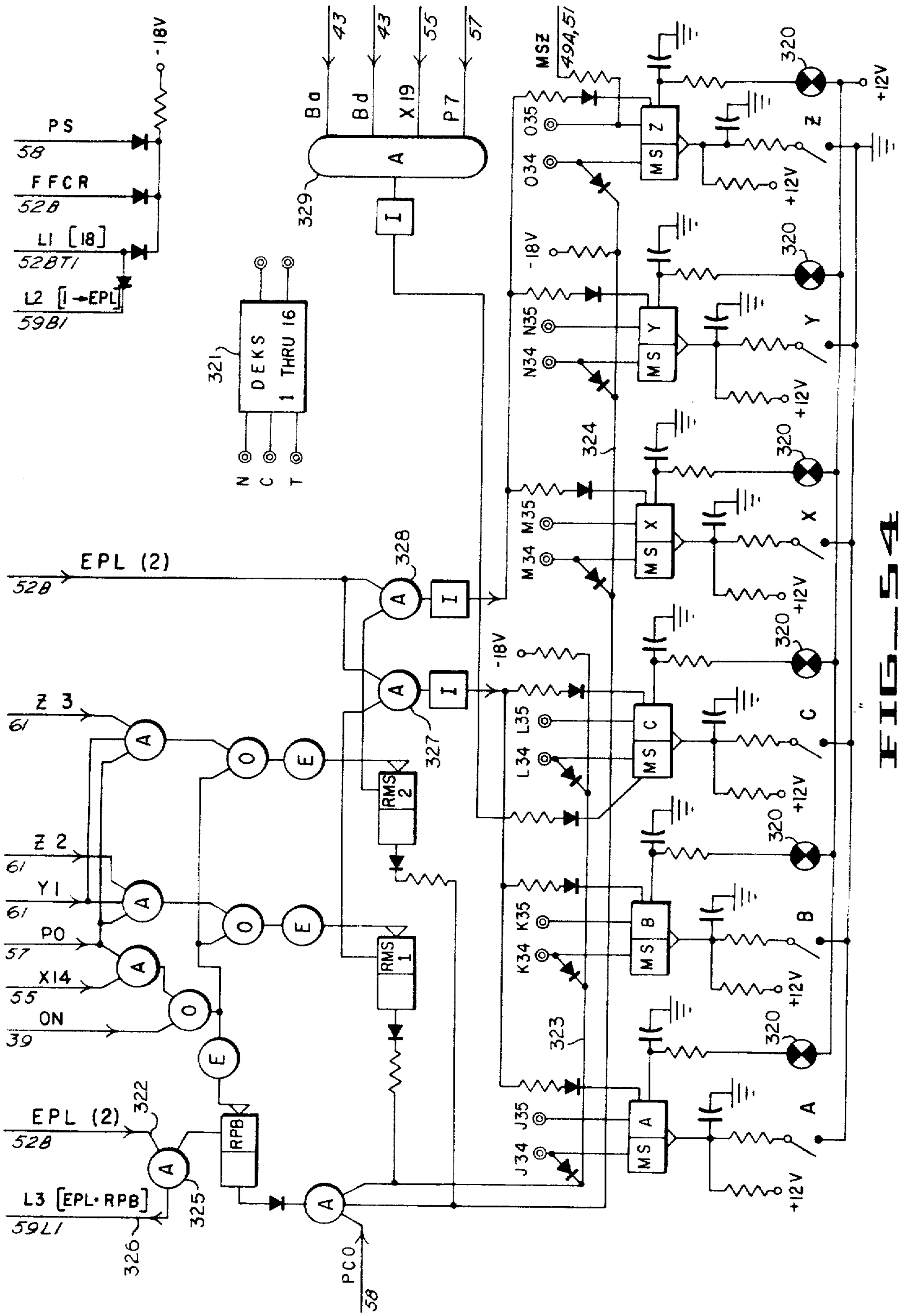

FIG. 54 illustrates the six manual selector switches A, B, C, X, Y and Z located in front and to the right of the typewriter keyboard, as illustrated in FIG. 3. A flip-flop MSA, MSB, MSC, MSX, MSY and MSZ is associated with each of the manual selector switches A, B, C, X, Y and Z, respectively. Each of the manual selector flip-flops is normally reset so that depression of one of the manual selector switches causes its associated flip-flop to become set. A second depression of the same manual selector switch will cause its associated flip-flop to again become reset. Accordingly, once a manual selector switch has been selected, it can be released by a second depression of the switch. An indicator lamp 320 is associated with the set side of each of the manual selector flip-flops so that whenever any of the flip-flops are in a set condition, the indicator lamp 320 associated therewith will light up. These indicator lamps are located beneath translucent covers associated with the manual selector switches A, B, C, X, Y and Z so that when one of the manual selector switches has been selected (its associated flip-flop set), the manual selector switch is lit up. When the manual selector flip-flops are in their normal or reset condition, the indicator lamps will not be lit, thereby indicating that the associated manual selector switch is not selected. The set and reset outputs of the six manual selector flip-flops are coupled to a plurality of hubs J34 through O35 on a patchboard such that each pair of outputs associated with each manual selector flip-flop may be patched to the two inputs of an electronic switch or relay 321. The function and operation of this electronic switch or relay have been described above in conjunction with FIGS. 6, 28 and 28A. Sixteen such electronic relays were utilized in practicing the present invention, with none, some, or all being capable of being patched to none, one, some or all of the manual selector flip-flops. When in a reset condition, the electronic relay associated with any particular manual selector flip-flop will be in its normal position, whereas when the associated manual selector flip-flop is set the associated relay will be in its transferred condition and one, some or all of the manual selector switches may be selected at one time. As described above, the six manual selector switches, in conjunction with the electronic relays, make it possible to select alternative instructions or program lines even in the middle of a program line being performed.

When the first reset manual selector flip-flop RMS1 is set and an end of program line EPL pulse appears on the lead 322, each of the manual selector flip-flops, MSA, MSB and MSC will be reset. The reset outputs of each of these flip-flops serve as the inputs to a negative AND gate, and when all are reset, produce an output by way of this AND gate on the lead 323 that will reset the RMS1 flip-flop. Likewise, when the second reset manual selector flip-flop RMS2 is set and an EPL signal appears on the lead 322, each of the manual selector flip-flops MSX, MSY and MSZ will be reset. The reset outputs of each of these flip-flops also serve as the inputs of a negative AND gate, and when all are reset, will produce an output on the lead 324 which will reset the RMS2 flip-flop. This safety feature ensures that the manual selector flip-flops are truly reset before the flip-flop which resets them is placed into its normal or reset condition. Whenever the release program bank flip-flop RPB is set and an EPL signal appears upon the lead 322, an output signal from the AND gate 325 appears on the lead 326 which will release any of the ten program keys illustrated in FIGS. 3, 6 and 58 which may be selected. As described above, only one of these ten program keys can be selected at any one time.

(13) *Output*

Figure 55:
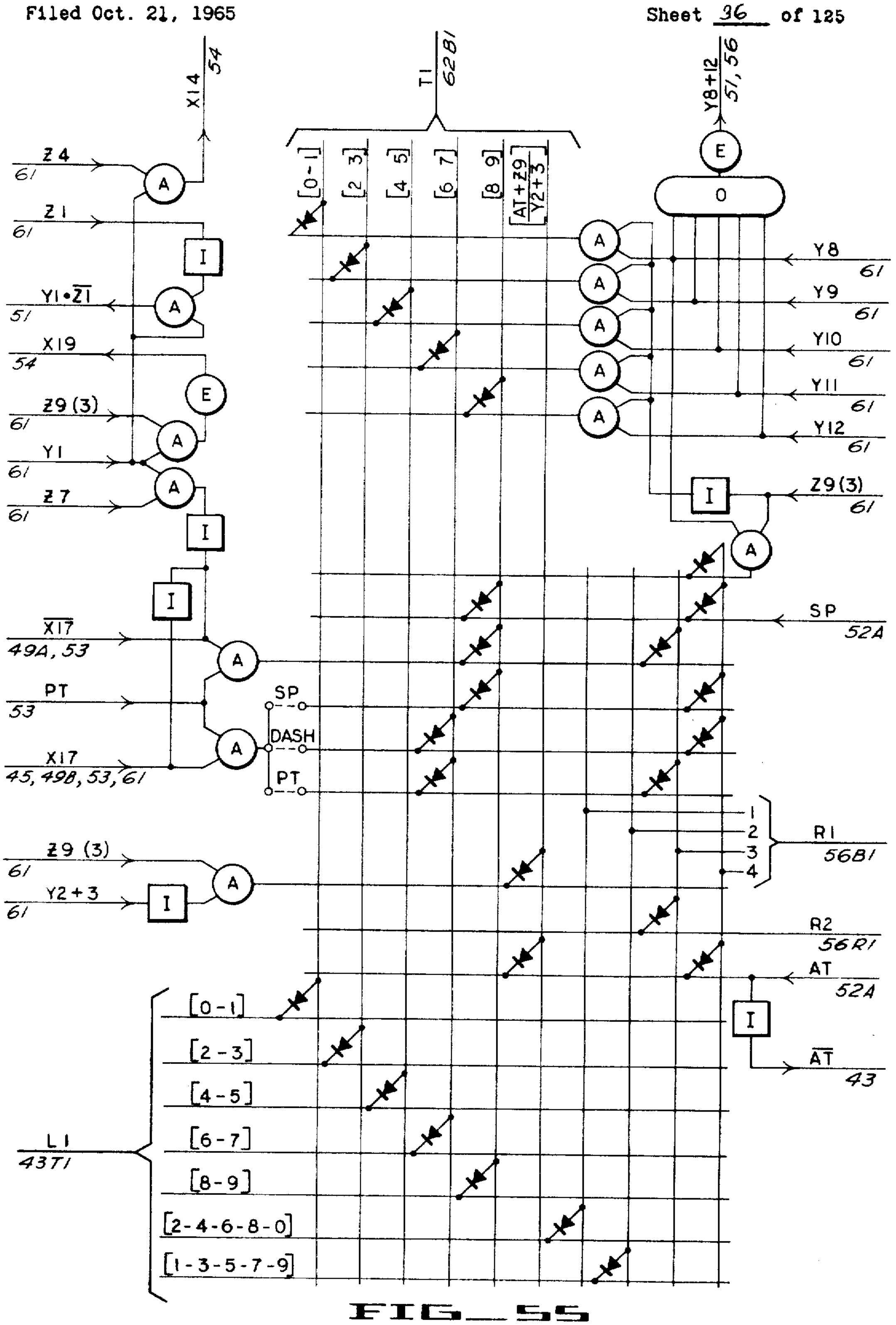
Figure 56:
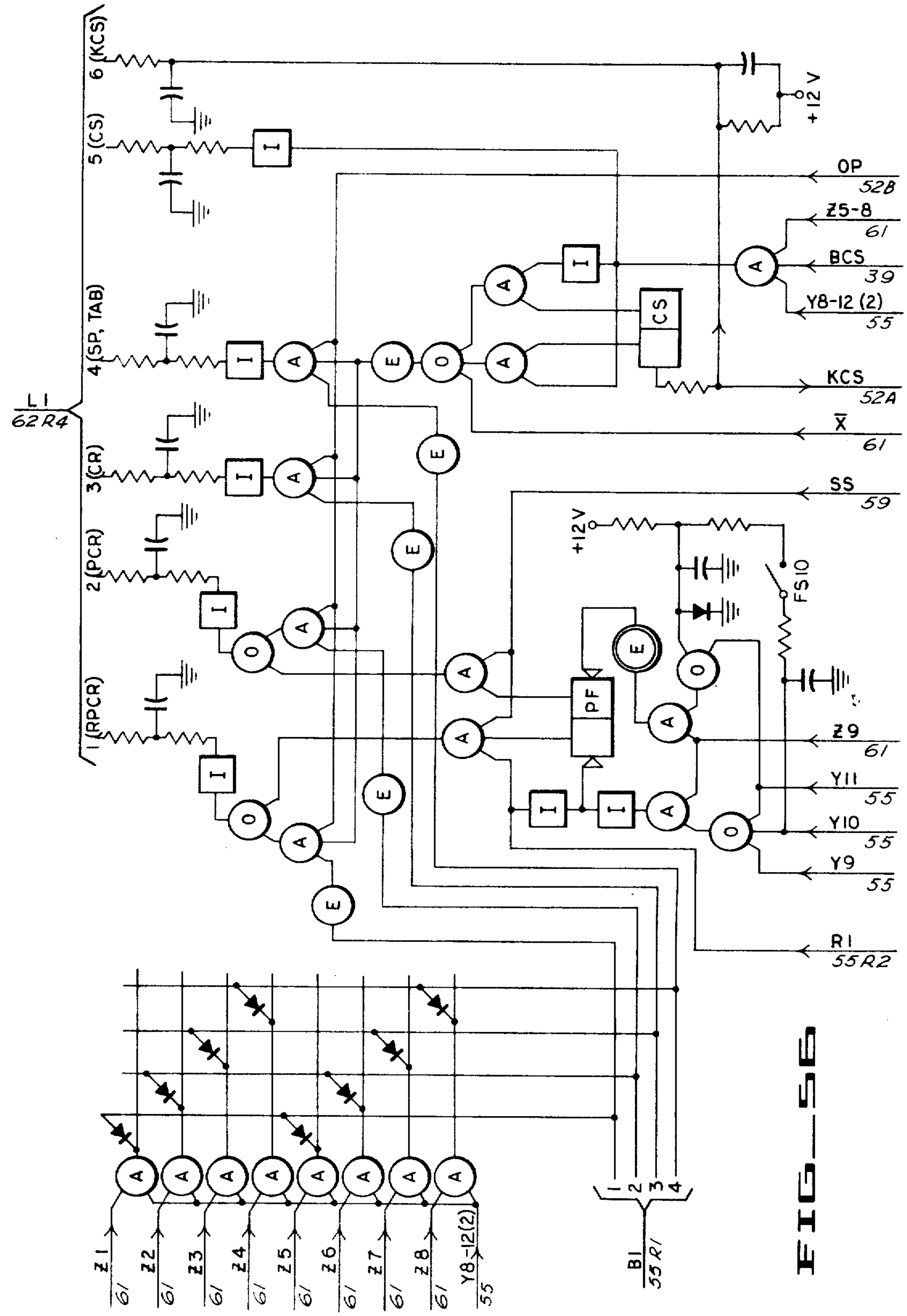
Figure 52:
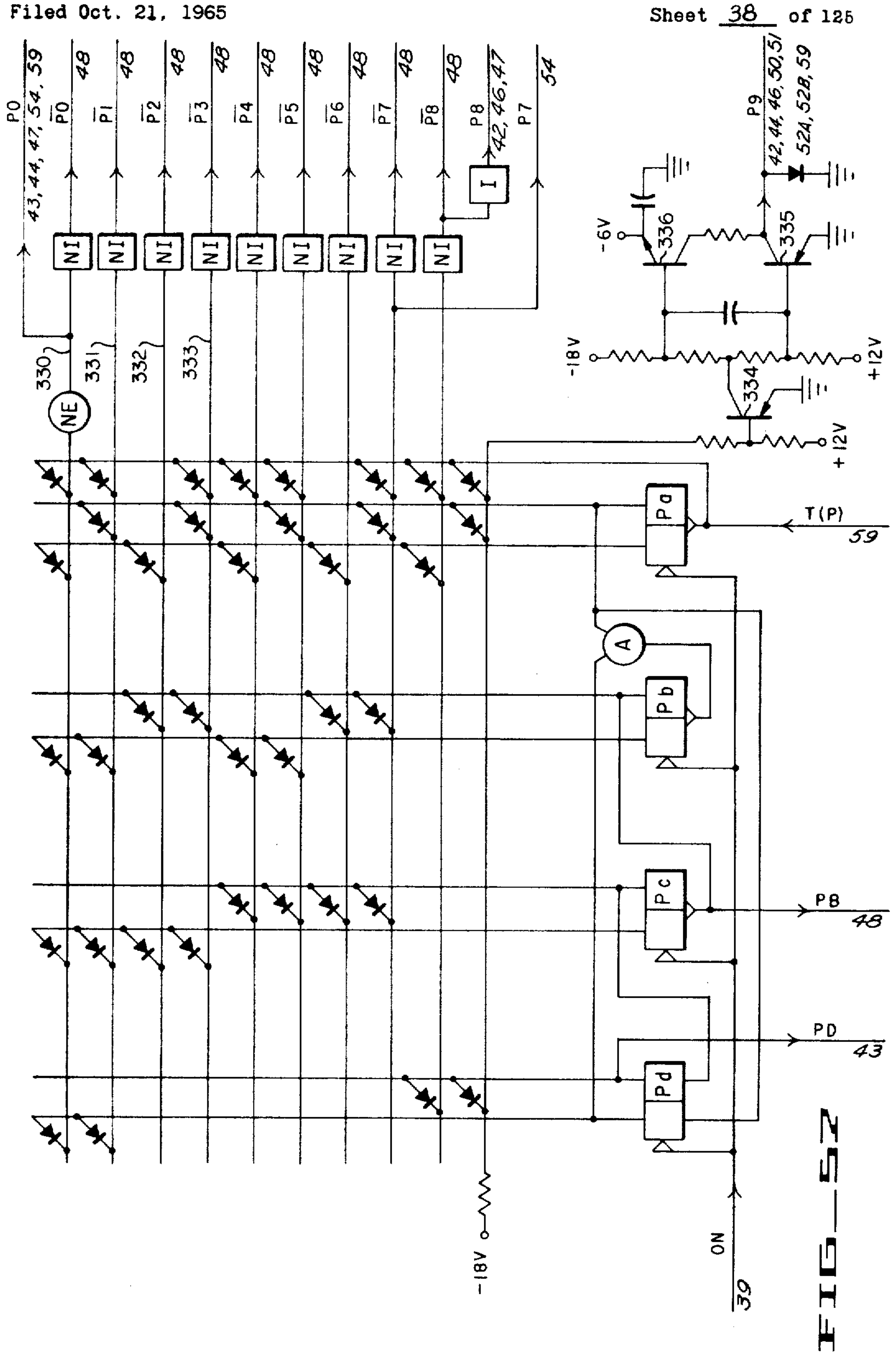

FIGS. 55 and 56 taken together comprise an output circuit which permits data in the B counter to be applied as an output to the typewriter. This output circuit also enables the typewriter to type a preselected number comprising a plurality of digits, or causes the typewriter to tab, space, case shift, perform a carriage return, etc., under control of the electronic processor.

(14) *P pulse generator*

FIG. 57 illustrates the P counter and associatad AND gates described hereinabove in conjunction with FIGS. 6 and 7. The P counter comprises four interconnected flip-flops, P*a*, P*b*, P*c* and P*d* which are permuted so as to provide a scale of ten counter which counts up in response to T(P) pulses applied to the A.C. input of the P*a* flip-flop. Located above the P counter are ten AND gates, each having as inputs selected set and reset outputs of the four flip-flops comprising the P counter. Each of these AND gates are associated with one of the ten digits which may be contained in the P counter such that a P0 pulse is produced on the lead 330 when the counter contains a "0." A P1 pulse is produced on the lead 331 when the counter contains a "1"; a P2 pulse appears on the lead 332 when the counter contains a "2"; a P3 pulse appears on the lead 333 when the counter contains a "3," etc. The T(P) pulses which are applied to the P*a* flip-flop are also applied to the AND gates associated with the digits "0," "1," "3," "4," "5," "7," "8" and "9" such that the P pulses corresponding to these counts in the P counter have a width equal to the width of the T(P) pulses applied to the P*a* flip-flop. The T(P) pulses are not applied to the AND gates associated with the counts of "2" and "6" so that the P2 pulse and P6 pulse have a width equal to the time that a "2" or "6," respectively, is contained within the P counter. This is illustrated in FIG. 7 which shows the P2 and P6 pulses as having a variable width. The ten P pulses, P0 through P9, are utilized to time the various operations performed by the electronic processor and as such, constitute timing pulses. Arithmetic functions, such as addition, subtraction, etc., takes place during a P2 and/or a P6 time, therefore, these pulses have a width which is sufficient for these arithmetic operations to be completed. The outputs from the ten AND gates are inverted to cause the P pulses to be bar signals. Since the P9 signal is applied to a wide variety of circuits throughout the electronic processor, it is amplified by the amplifier comprising the three transistors 334, 335 and 336.

(15) *Square wave generator*

A pulse generating circuit is illustrated in FIG. 59 as including a free-running multivibrator MV which comprises two interconnected PNP transistors 340 and 341. In accordance with a preferred embodiment of the present invention, the free-running multivibrator was designed to have a frequency of about twenty-five thousand cycles per second. The base of the PNP transistor 340 is coupled to the collector circuit of an NPW transistor 342 which, in turn, has its base coupled to the set output of a start/stop SS flip-flop. When the SS flip-flop is set, a logic ONE is applied to the base of the NPN transistor which renders it nonconducting and causes a positive potential to be applied to the base of the PNP transistor 340 by way of the resistor 343 which causes the free-running multivibrator to be disabled. The pulse generator is turned off, that is, disabled, whenever an input from the typewriter is being entered into the electronic processor and when an output from the electronic processor is being applied to the typewriter. Resetting of the SS flip-flop causes a logic ZERO to be applied to the base of the NPN transistor 342 which enables this transistor to be conducting due to the negative potential applied to its base by way of the resistor 344. Conduction of the NPN transistor places a negative potential on the base of the PNP transistor 340 which enables the free-running multivibrator.

The pulse or square wave output of the free-running multivibrator is applied by way of the inverter 345 to an electronic switch which comprises two OR gates 346 and 347 and another inverter 348. This electronic switch corresponds to the electronic switch 23 discussed hereinabove in conjunction with FIG. 6. The operation of the electronic switch is such that when the S(P) signal appearing on the enabling lead is at a logic ONE level, the output of the multivibrator appears on the output lead 349 as T(P) pulses which are applied to and step the P counter of FIG. 57. Conversely, when the S(P) signal appearing on the enabling lead is at a logic ZERO level, the output of the multivibrator appears on the other output lead 350 as S(A) pulses which are applied to and step the A and B counters shown in FIGS. 42 and 43, respectively.

(16) *Block automatic tabulation*

As described above, as soon as a program line is released after having been carried out, the electronic processor will cause the typewriter to automatically tabulate. This automatic tabulation will be prevented if, after completion of the program line, a new program line is selected by the combination of a depressed program key and a new field switch combination. Also, an automatic tabulation will occur whenever the combination of a depressed program key and field switch combination has not been wired to select a program line. This means that a depressed program key and field switch combination actually wired to select a program line will cause that program line to be selected and carried out by the typewriter automatically tabulating in order to find the proper field switch combination that, in conjunction with the depressed program key, selects the desired program line.

After a selected program line has been completed, it may be necessary or desirable to type descriptive or other nonnumeric material into a column on a particular form being utilized with the typewriter. For this type of operation, it is desirable that the typewriter not automatically tabulate to a following column in order to pick up or select a new program line. The automatic tabulation can be prevented by programming as the last step of the previous program line a block automatic tab instruction. Such an instruction will set either the first block automatic tab BAT1 or second block automatic tab BAT2 flip-flop illustrated in FIG. 59. Setting of either one of these flip-flops will prevent the typewriter from automatically tabulating. This block automatic tab instruction is terminated by resetting the previous set BAT flip-flop. This is accomplished by a cam on the actuator rack engaging the appropriate field switch FS11 or FS12. The cams on the actuator rack which will activate the field switches FS11 and FS12 are positioned so that they correspond to the far right-hand portion of the column into which nonnumeric information is to be typed. If, upon completing this typing operation, the cam has not yet engaged one of the field switches FS11 or FS12, the operator need only depress the tab key of the typewriter which will move the carriage and ensure that the cam activates the selected field switch, thereby ending the block automatic tab instruction. Once the block automatic tab instruction has been terminated, a new program line can then be selected.

(17) *Typewriter keyboard switches*

Figure 62:
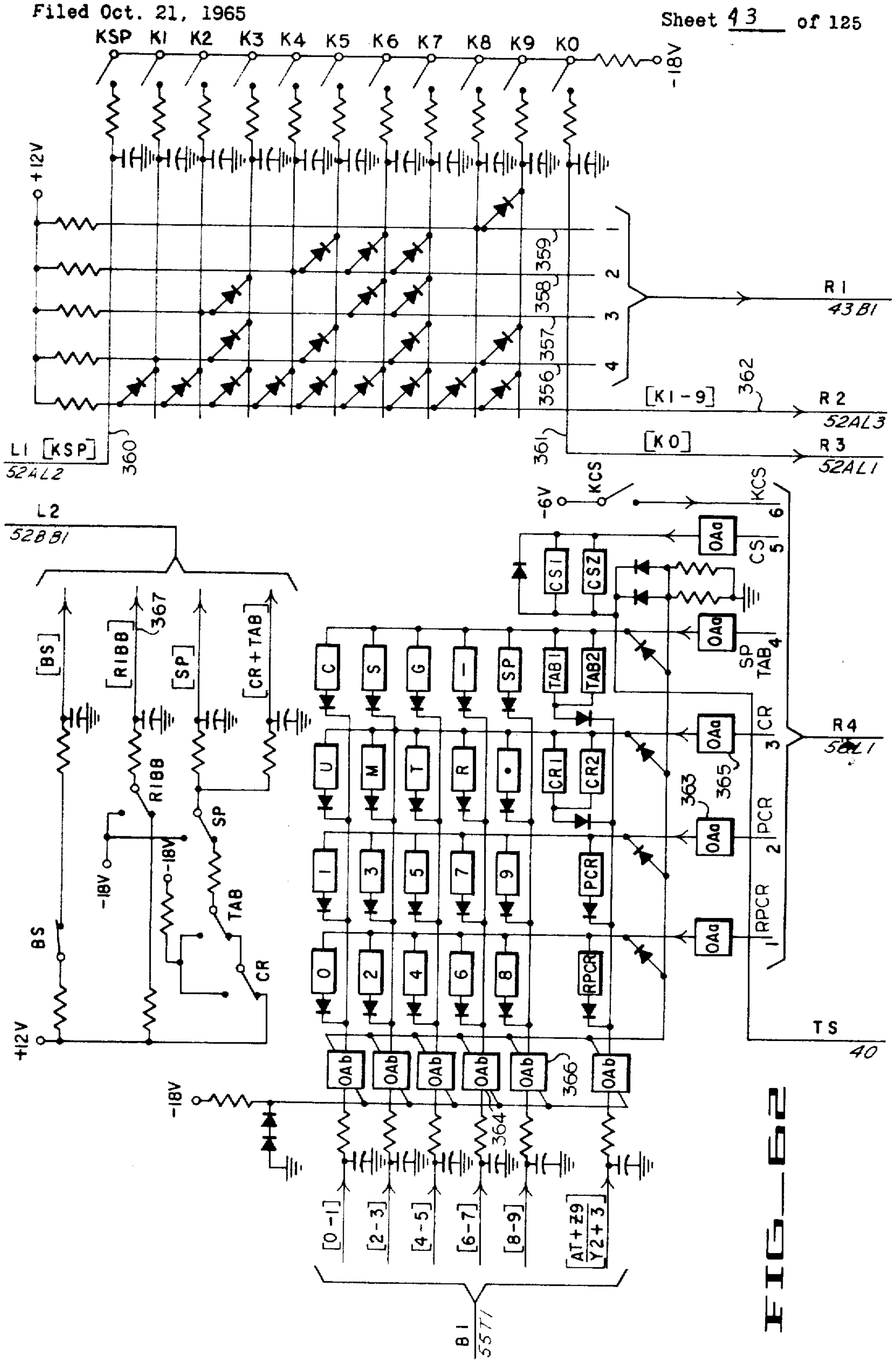

FIG. 62 illustrates the electrical switches associated with the space KSP key and the ten numeric K0 through K9 keys of the typewriter. Whenever the space or any one of the ten numeric keys of the typewriter keyboard are depressed, its associated electrical switch closes thereby causing a negative potential to appear on an associated electrical conductor or lead. The negative potential resulting from a depression of any of the numeric keys K0 through K9 is applied to a matrix which converts the negative potential resulting from a numeric key depression into a four bit binary number which appears on the four output leads 356, 357, 358 and 359. For example, if the number "3" key K3 of the typewriter keyboard is depressed, a logic ZERO appears on the two output leads 358 and 359 and a logic ONE will appear on the two output leads 356 and 357, which logic levels correspond to a binary "3." Conversely, if the number "7" key K7 is depressed, a logic ZERO appears on the output lead 359 and a logic ONE appears on the three output leads 358, 357 and 356. The four output leads 356, 357, 358 and 359 are coupled to the B counter of FIG. 43 so that depression of a number on the typewriter keyboard causes that number to be entered into the B counter and, subsequently, from the B counter into the core memory. As discussed above, depression of a numeric key does not activate the associated type bar. Rather, the electronic processor activates the type bar corresponding to the number in the B counter. Depression of the space key KSP on the typewriter keyboard produces a negative potential on the lead 360 and depression of the digit "0" K0 key causes an output on the lead 361, whereas depression of any of the number keys K1 through K9 causes a negative potential to appear on the lead 362. These three leads are coupled to the input circuit of FIG. 52 and indicate when an entry is being made from the typewriter.

FIG. 62 also illustrates various electrical switches associated with other function keys on the typewriter keyboard, such as the backspace BS key, the space SP key, the carriage return CR key, the tabulate TAB key and a ribbon contact RIBB switch. The ribbon RIBB switch has its contacts closed by the type bar associated with any of the numeric, symbol and alphabetical keys approaching the platen of the typewriter. The ribbon RIBB switch will remain closed, causing a positive potential to appear on the lead 367 until the type bar strikes the ribbon and falls back a predetermined distance from the platen of the typewriter, at which time the ribbon switch is again opened.

FIG. 62 also illustrates a plurality of solenoids arranged in columns and rows, which solenoids can be activated by the electronic processor. A solenoid is provided for each of the ten numeric type bars of the typewriter as well as for certain preselected alphabetical and symbolic type bars. The selected letters of the alphabet, such as U, M, T, R, C, S and G, whose type bars can be activated by the electronic processor, are chosen because these letters have a special significance for billing and accounting purposes, making it desirable for the electronic processor to be able to automatically type these letters in conjunction with its numeric output so as to clearly identify and give meaning to certain numeric outputs from the electronic processor. As will be obvious to those skilled in the art, other or different letters may be selected to be actuated by the electronic processor as necessitated or required by the particular forms used in conjunction with the typewriter. Further, solenoids are provided for various typewriter functions, such as restore partial carriage return (RPCR), partial carriage return (PCR), carriage return (CR), space (SP), tabulate (TAB) and case shift (CS), which typewriter functions may be controlled by the electronic processor. The operation of this solenoid circuit is such that activation of the OA*b* amplifier 364 and the OA*a* amplifier 363 by the output circuit of FIGS. 55 and 56 causes the solenoid associated with the number "7" to be activated, thereby causing the number "7" type bar of the typewriter to be actuated so as to print or type the number "7." Likewise, activation of the OA*b* amplifier 366 and the OA*a* amplifier 365 causes the typewriter to type a period or decimal point. A solenoid is selected or activated by being connected between the output of both an OA*b* and an OA*a* amplifier. As will be obvious from an inspection of FIG. 62, only one such solenoid, or a pair of solenoids connected in parallel, will be selected for each pair of OA*a* and OA*b* amplifiers which are activated.

(18) *Ten program keys*

FIGS. 58, 47, 60 and 61 illustrate the ten program keys, the program code patchboard and associated field switches, the program line patchboard and the instruction patchboard, respectively, which were discussed hereinabove in conjunction with FIG. 6. Referring now to FIG. 58, which illustrates the circuitry associated with the ten program keys, it is shown that a program code PCA amplifier is associated with each of the ten program keys. Depression of any one of the ten program keys causes a positive potential to be applied to the input of its associated PCA amplifier thereby turning that PCA amplifier on. When turned on, a positive potential appears on the output of the PCA amplifier. As discussed hereinabove, once turned on, a PCA amplifier will remain on. Therefore, each of the ten program keys are of the nonlatching type. Accordingly, unlike the six manual selector keys, a program line key cannot be released by a subsequent depression of the same key. The PCA amplifier associated with a depressed program key can be turned off or released by the program line associated with the depressed program key being fully carried out, at which time both an end of program line EPL and release program bank RPB signals are generated and render the transistor 370 nonconducting. When nonconductive, the positive potential applied to the collector of this transistor is also applied to the PCA amplifiers which renders the PCA amplifiers inoperative. The output of each PCA amplifier is returned by way of the cable B1 to an indicator lamp 371 which is associated with each of the ten program keys, such that depression of any one of the ten program keys causes its associated indicator lamp to be lit. The indicator lamps are located below the translucent cover of the program keys so that illumination of any of the indicator lamps readily indicates to the operator which one of the ten program keys has been selected.

As discussed hereinabove, only one of the ten program keys may be selected at any one time, and the depression or selection of two or more program keys simultaneously, or sequentially, while the previously depressed program key is still active, will result in none of the ten program keys being selected. This is accomplished by coupling the output of each of the PCA amplifiers to the horizontal lead 372 by way of a series resistor and diode network. One end of the lead 372 is coupled to the base of a PNP transistor 373 and the other end of the lead 372 is coupled, by way of a resistor 374, to a source of negative potential. When the PCA amplifier is turned on, current will flow from the output of its PCA amplifier through its associated resistor and diode network and through the resistor 374 to the negative potential. The voltage drop appearing across the resistor 374 when one PCA amplifier is turned on is such that the PNP transistor 373 remains conductive. However, when two or more of the ten program keys are depressed simultaneously, or sequentially, before the previously depressed program key is released, then two or more PCA amplifiers will be on at the same time. For this condition, the voltage across the resistor 374 is sufficiently positive and to render the transistor 373 nonconducting. When nonconducting, the negative potential applied to the collector of the transistor 373 sets the F flip-flop, causing a logic ONE to appear on its set output lead which renders the NPN transistor 370 nonconducting. When nonconducting, the positive potential applied to the collector of transistor 370 is applied to the PCA amplifiers thereby rendering them inoperative. It is clear then, that only one PCA amplifier can be turned on at any one time.

The output of each PCA amplifier is also coupled by way of a unidirectional current device, such as a diode 375, to the horizontal lead 376. When none of the PCA amplifiers are turned on in response to their associated program key being depressed, a PC0 signal appears on the lead 376 which is at a logic ONE level because it is coupled by way of a resistor 377 to a negative potential. However, when one of the PCA amplifiers is turned on, the diode associated with the output of the enabled PCA amplifier will conduct, causing the potential PC0 on the lead 376 to become a logic ZERO. The PC0 signal, therefore, is an indication of whether a program key has been selected. The output of each of the PCA amplifiers is coupled by way of the vertical leads emanating from the PCA amplifiers to FIG. 47.

(19) *Field code switches*

Referring now to FIG. 47 there is illustrated in detail the program code patchboard and the associated three field switches, FS1, FS2 and FS3, three field code flip-flops, FC*a*, FC*b* and FC*c*, and the plurality of AND gates which have as their inputs selected set and reset outputs of the three field code flip-flops. The program code patchboard comprises ten columns and seven rows of hubs which can be patched to another patchboard such as the program line patchboard of FIG. 60. Each column of hubs are commonly connected to one of the PCA outputs of FIG. 58 and each of the hubs in a row are commonly connected to one of the outputs of the seven AND gates which are associated with the outputs of the three field code flip-flops. One of the hubs is selected or activated whenever the vertical lead to which it is coupled is activated by a positive potential appearing thereon, due to the associated PCA amplifier being turned on in response to a depression of a program key, and the horizontal line to which the hub is connected being negative due to its associated AND gate having a negative output. The hubs are illustrated in FIG. 47 as a circle having two diagonal lines emanating therefrom, said diagonal lines being connected to an output of a PCA amplifier and an AND gate. FIG. 47A illustrates in detail the circuitry associated with each hub as comprising a series resistor and diode network, which is coupled between a PCA output and an AND gate output. Coupled to the junction of the resistor and diode is another diode 380 which has its anode connected to the junction and its cathode connected to the hub 383 into which one end of a patch lead may be inserted. When the associated PCA amplifier is turned on, a positive potential appears on the lead 381. However, if the associated AND gate does not have a negative output, a logic ZERO or positive potential also appears on the lead 382, which combination of potentials prevents a positive potential from appearing on the hub 383. Likewise, when the associated AND gate is activated, causing a negative potential to appear on the lead 382, a positive potential will not appear at the hub 383 when the associated PCA amplifier is off. However, when both the associated AND gate and the PCA amplifier are activated, a positive potential appears on the lead 381 and a negative potential appears on the lead 382 which causes a positive potential to appear at the hub 383, which causes the hub to be activated, that is, selected by the combination of a depressed program key and field switch combination.

The three field switches FS1, FS2 and FS3 are illustrated in FIG. 47 in their normal positions so that the occurrence of a PR pulse on the line 384, at the same time that the IPL flip-flop is reset, causes each of the three field code flip-flops FC*a*, FC*b* and FC*c* to be set, thereby causing a logic ONE to appear on the set output lead of each of the flip-flops. As will be apparent from a consideration of FIG. 47, none of the AND gates coupled to the outputs of the field code flip-flops are designed to be activated whenever each of these flip-flops are in a set condition. Accordingly, none of the hubs on the program code patchboard can be selected until at least one of the three field switches are in a position which will cause the occurrence of a PR pulse to set a field code flip-flop into a reset condition. The use of three field code flip-flops provides seven different combinations wherein one or more of the flip-flops are in a reset condition. An AND gate is provided for each of these seven possible flip-flop conditions other than the condition wherein each flip-flop is set. These seven field switch combinations, together with the ten program keys, provide seventy different combinations of field switch positions and program key selections which may be utilized to select a program line. The hubs on the program code patchboard of FIG. 47 may be patched to the program line patchboard which is illustrated in FIG. 60.

(20) *Program lines*

Figures 60, 60A:
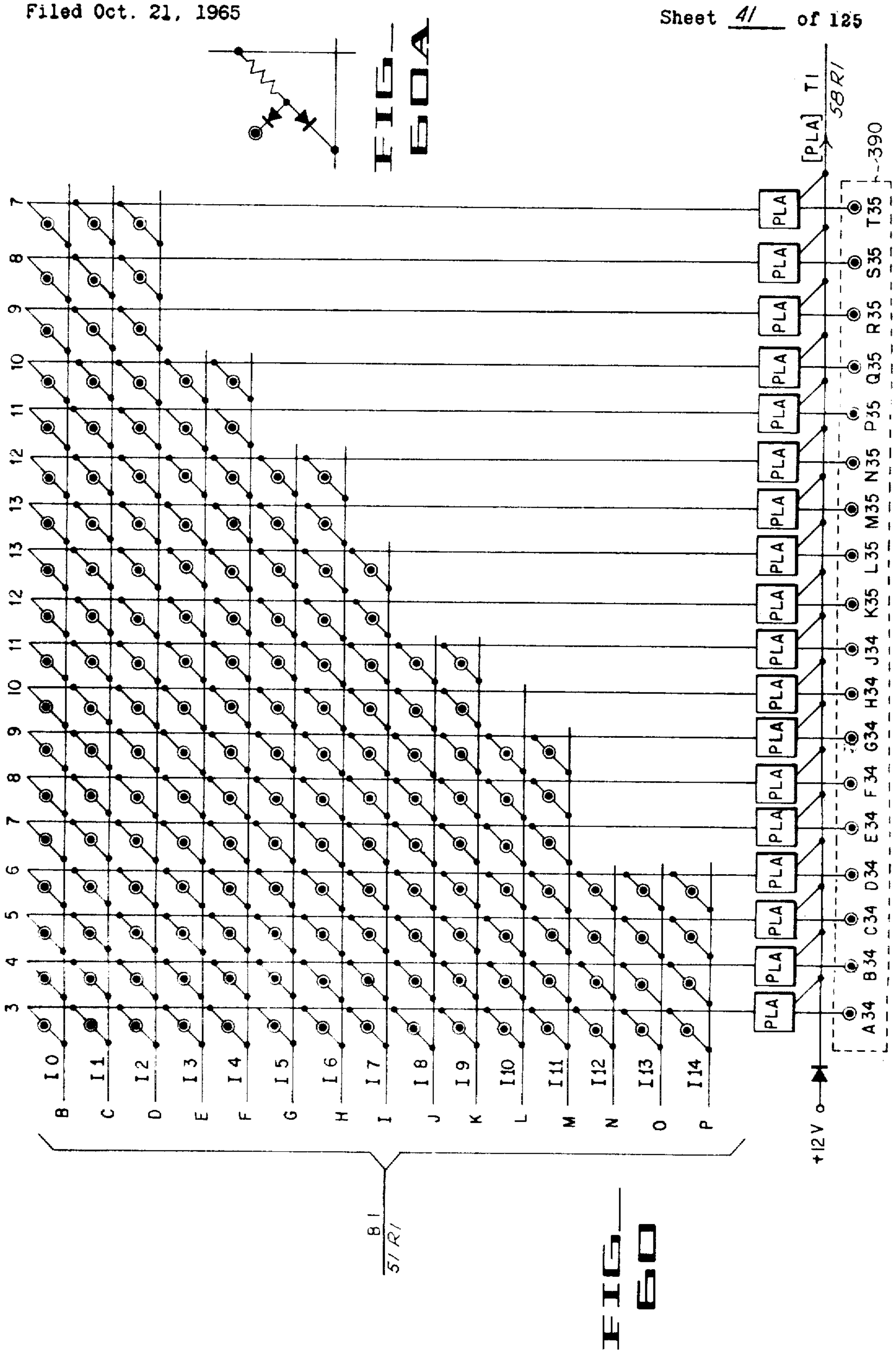

Referring now to FIG. 60, there are illustrated eighteen program lines, each denoted by one of the eighteen vertical lines and each having a program line PLA amplifier associated therewith. Going from left to right, four program lines contain fifteen steps or instructions, three program lines contain twelve steps, two program lines contain ten steps, two more program lines contain eight steps, two other program lines contain seven steps, still another two program lines contain five steps, and the last three program lines contain three steps. Therefore, these eighteen program lines provide for a total of one hundred sixty-five steps or instructions. Each hub illustrated on the instruction patchboard may be patched to the program line patchboard of FIG. 61. Therefore, each hub on the program line patchboard corresponds to a particularly patched instruction on the instruction patchboard. Any individual hub is selected or activated by having the program line to which it is coupled activated by the output of the associated PLA amplifier, and the horizontal line to which it is coupled activated by the output of the instruction counter to which each of the fifteen horizontal lines are coupled. As discussed above, the instruction counter is stepped sequentially thereby causing each of the horizontal lines to be activated in a sequential manner beginning at the top and ending at the bottom. That is, once a program line PLA amplifier has been activated, each of the instructions represented by the hubs coupled to that program line will be activated sequentially by the output of the instruction counter of FIG. 51. Although the subs of FIG. 60 are illustrated by a circle having two diagonal lines emanating therefrom, each hub contains two diodes and a resistor, as illustrated by FIG. 60A and described in conjunction with the program code patchboard. The input terminal of each of the PLA amplifiers terminates at a hub on the patchboard 390, each of which hubs are patched to one or more of the hubs on the program code patchboard of FIG. 47 so that the combination of a depressed program key and field switch combination which activates a hub on the program code patchboard will activate the program line on the program line patchboard to which the activated hub on the program code patchboard is coupled to by way of a patch lead. When one of the hubs on the program line patchboard is activated, it has a positive potential applied thereto which may be applied to a hub on the instruction patchboard of FIG. 61 by way of a patch lead.

(21) *Instruction patchboard*

Figures 61A, 61B:
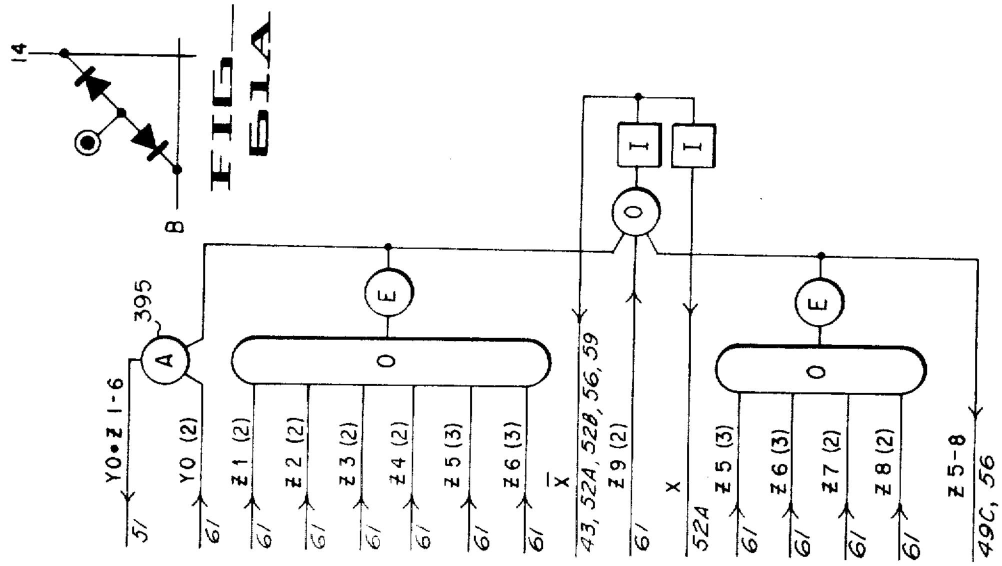

Refering now to FIG. 61 there is illustrated an instruction patchboard which comprises a plurality of columns and rows of hubs. Each hub is coupled to the junction of two diodes, as illustrated by FIG. 61A, so that when a hub on the instruction patchboard is activated, by the hub on the program line patchboard to which it is coupled, also being activated, a positive potential is caused to appear on the vertical and horizontal line associated with the activated hub on the instruction patchboard. For example, if the hub B14 is activated, a Y0 signal is produced on the horizontal lead 391 and a Z1 signal is produced on the vertical line 392. Conversely, when the hub H19 is activated, a Y6 signal appears on the horizontal lead 393 and a Z6 signal appears upon the lead 394. Each of the vertical and horizontal leads which intercouple the hubs of the instruction patchboard into a plurality of rows and columns has an inverter associated therewith so that the Z and Y signals appear as logic ONE signals when their corresponding hub is activated. As will be apparent from a consideration of FIG. 61, each hub on the instruction patchboard generates a pair of Y and Z signals which completely identifies the selected hub inasmuch as activating any other hub will not prdouce the identical pair of Y and Z signals.

FIG. 61 also illustrates a gating circuit which utilizes the Y2 or Y3 output of the instruction patchboard to produced a Y2 or Y3 $(Y2+Y3)$ signal.

FIG. 61B illustrates a gating circuit which is utilized to produce an X or a $\bar{X}$ signal. An X signal indicates that an instruction on the instruction patchboard has been activated. The $\bar{X}$ signal, on the other hand, when at a logic ONE level, indicates that no instruction on the instruction patchboard has been activated and will, if other conditions are present, cause the typewriter to automatically tabulate. The circuit of FIG. 61B also provides a Y0 and a Z1–6 signal which is utilized to step the instruction counter. Also the circuit of FIG. 61B provides a Z5–8 signal.

To recapitulate, depression of one of the ten program keys together with the proper field switch combination will activate a program line. The instructions associated with the selected program line are sequentially carried out or performed under the control of the instruction counter, with each hub on the selected program line being patched, by way of a patch lead, to the desired hub on the instruction patchboard. As discussed hereinabove, the program line may be changed and/or modified at will by using the manual selector switches in conjunction with the electronic relays.

Each hub on the various patchboards has been illustrated as being capable of receiving only one patch lead. However, as will be obvious to those skilled in the art, each hub may be adapted to receive a plurality of patch leads. For example, various hubs on various program lines may be patched to the same hub on the instruction patchboard if the instruction patchboard hub is adapted to receive a plurality of patch leads. This is permissible because only one hub on the program line patchboard can be activated at any one time.

IX. INSTRUCTIONS

The instructions which are performed by the apparatus comprising the present invention are not made up of an operation and an address as do many prior art computing systems, but rather consist of a single instruction indicating the operation to be carried out and sometimes also the storage concerned. As discussed hereinabove in conjunction with FIGS. 6 and 61, each hub on the instruction patchboard section corresponds to an instruction which can be performed by the electronic processor. The columns of hubs in FIG. 61 are identified by the numerals "14" through "22" with the left-hand column being designated by the numeral "14," and the right-hand column of instruction hubs by the numeral "22." The rows of hubs are identified by the letters B through N, where B identifies the uppermost row and the letter N identifies the lowermost row of hubs on the instruction patchboard section. Accordingly, each hub location on the instruction patchboard can be identified by a number-letter code, for example B14 identifies the hub located in the upper left corner of the instruction patchboard section, whereas N22 is the hub located in the lowermost right-hand corner of the instruction patchboard section. Further, H18 identifiies the hub located approximately at the center of the instruction patchboard section. As discussed above, when activated, each hub on the instruction patchboard produces Y and Z signals which identify the instructions associated with the activated hub.

The instructions can be divided into the five groups: I—arithmetic instructions; II—transfer instructions; III—input and output instructions; IV—miscellaneous instructions; and V—typewriter instructions. The instructions in each of these five groups are set forth hereinbelow such that the lefthand column designates the hub location of the particular instruction which is identified in the second, or middle, column and a brief description of the sequence performed by the electronic processor in accomplishing the instruction set forth in the middle column is contained in a third, or right-hand, column. As used hereinbelow in conjunction with the specification and the drawings, the letters RA and RP are utilized to define the active and passive registers, respectively, whenever the registers $R_1$ and $R_2$ constitute a cooperating pair of registers. It is understood, however, that the designation RA (active register) and RP (passive register) designate activity and passivity as of the beginning of an instruction sequence and does not indicate that the activity or passivity of the registers $R_1$ and $R_2$ has not changed during the performance of the instruction sequence. Rather, in most cases, the activity and passivity of the $R_1$ and $R_2$ registers will be interchanged during the performance of an instruction sequence. That is, RA and RP, as used hereinbelow, designate the active and passive registers, respectively, just prior to the performance of an instruction sequence. The instructions performed by the apparatus comprising the present invention are as follows:

A. *Arithmetic instructions*

| Hub location | Instruction | Instruction sequence |
|---|---|---|
| B14 | Add | (1) Add contents of RP to contents of RA.<br>(2) The sum remains in RA.<br>(3) The contents of RP remains unchanged. |
| B15 | Subtract | (1) Subtract contents of RA from contents of RP.<br>(2) The difference remains in RA.<br>(3) The contents of RP remains unchanged. |
| B17 | Add 5 | (1) Add a "5" to the least significant decimal position of RA.<br>(2) The sum remains in RA |
| C14 | Multiply | (1) Multiply contents of RP (multiplicand) with contents of RA (multiplier).<br>(2) The product remains in RA.<br>(3) The contents of RP remains unchanged. |
| H14 through 22 | Store accumulative | (1) Add contents of RA to contents of a Storage, $S_1$ through $S_9$.<br>(2) The sum remains in the addressed Storage.<br>(3) The contents of RA and RP remains unchanged.<br>*If Manual Selector Z is selected prior to this Instruction, the sequence will be as follows: |
| H14 throgh 22 | Store negative | (1) Manual Selector Z manually.*<br>(2) Subtract contents of RA from contents of a Storage $S_1$ through $S_9$.<br>(3) The difference remains in the addressed Storage.<br>(4) The contents of RA and RP remains unchanged. |
| I14 through 22 | Retrieve multiply | (1) Multiply contents of Storage $S_1$ through $S_9$, and contents of RA.<br>(2) The product remains in RA.<br>(3) The contents of the addressed Storage remains unchanged. |
| B16 | Clear | (1) Clear RA. |
| B18 | Shift Right 1 | (1) Shift contents of RA, one decimal place right. |
| B19 | Shift Left 1 | (1) Shift contents of RA, one decimal place left. |
| B20 | Shift Right 2 | (1) Shift contents of RA, two decimal places right. |
| B21 | Shift Left 2 | (1) Shift contents of RA, two decimal places left. |
| C21 | Invert | (1) RA becomes RP and RP becomes RA. |

B. *Transfer instructions*

| Hub location | Instruction | Instruction sequence |
|---|---|---|
| F14 through 22 | Transfer to Storages. | (1) Transfer contents of RA to Storage, $S_1$ through $S_9$. Prior contents of Storage are destroyed.<br>(2) The contents of RA remains unchanged. |

B. *Transfer instructions*—Continued

| Hub location | Instruction | Instruction sequence |
|---|---|---|
| G14 through 22 | Transfer from Storages. | (1) Invert RA and RP—automatic from Instruction.<br>(2) The contents of a Storage, $S_1$ through $S_9$, transfers to RA. Prior contents of RA, which were RP, are destroyed.<br>(3) The contents of the Storage, $S_1$ through $S_9$, remains unchanged. |

C. *Input and output instructions*

| | | |
|---|---|---|
| D14 through 22 | Entry | (1) Invert RA and RP—automatic from Instruction.<br>(2) Enter number from Typewriter to RA, under control of LRD patterns 1 through 9. Prior contents of RA, which were RP, are destroyed. |
| E14 through 22 | Readout | (1) Transfer contents of RA to Typewriter, under control of LRD pattern 1 through 9.<br>(2) The contents of RA remains unchanged. |

D. *Miscellaneous instructions*

| Hub location | Instruction | Instruction sequence |
|---|---|---|
| C15 | Release Selectors 1. | (1) Release the first group of Selector Keys—ABC. |
| C16 | Release Selectors 2. | (1) Release the second group of Selector Keys—XYZ. |
| C17 | Release Program and Selector Keys. | (1) Release all Program and Selector Keys. |
| C18 | BAT1 | (1) Block Auto Tab (this Instruction prevents auto tabulation, until Carriage Position Switch 11 is operated). |
| C19 | BAT2 | (1) Block Auto Tab (this Instruction prevents auto tabulation, until Carriage Position Switch is operated). |
| C20 | TAD | (1) Type Automatic Date from Storage 7. |
| B22 | Iterate | (1) Repeat the Program Line. Must be last Instruction of the program. |
| C22 | RA | (1) Test for RA being negative (most significant digit of RA would be "9"). If RA is negative, Selector C is set (immediately). The output of Selector C could be wired to an Electronic Switch to cause jump or transfer to another Program Line. Selector C would be reset by programmed Instructions. |

E. *Typewriter instructions*

The following are the instructions which will cause typewriter printing and functions:

| Hub location | Key position | Lower case character | Hub location | Key position | Upper case character |
|---|---|---|---|---|---|
| J14 | 35— | 0 (zero) | *J18 | 35 | ) |
| J15 | 0 | 1 | *J19 | 0 | ½ |
| J16 | 25 | U | *J20 | 25 | = |
| J17 | 12 | C | *J21 | 12 | |
| K14 | 3 | 2 | *K18 | 3 | a |
| K15 | 7 | 3 | *K19 | 7 | # |
| K16 | 28 | M | *K20 | 28 | |
| K17 | 6 | S | *K21 | 6 | / |
| L14 | 11 | 4 | *L18 | 11 | $ |
| L15 | 15 | 5 | *L19 | 15 | % |
| L16 | 17 | T | *L20 | 17 | , (comma) |
| L17 | 18 | G | *L21 | 18 | " (double quotes) |
| M14 | 19 | 6 | *M18 | 19 | ¢ |
| M15 | 23 | 7 | *M19 | 23 | & |
| M16 | 13 | R | *M20 | 13 | × (multiply) |
| M17 | 32 | — (minus) | *M21 | 32 | _ (underscore) |
| N14 | 27 | 8 | *N18 | 27 | * |
| N15 | 31 | 9 | *N19 | 31 | ( |
| N16 | 36 | . (period) | *N20 | 36 | ' (single quote) |
| J22 | | Tab | | | |
| K22 | | CR | | | |
| L22 | | PCR 1 | | | |
| M22 | | PCR 2 | | | |
| N17 | | Space | N21 | | Space |

*These instructions will cause the typewriter to automatically shift, print the character and restore to unshift condition.

It should be noted that several of the instructions set forth above have several hubs associated therewith. For example, in group C an entry instruction is performed by activating any one of the hub locations D14 through D22, which comprise all of the hubs in the row identified by the letter D. As discussed hereinabove, a different left and right of decimal point LRD pattern can be patched for each of the Z signals, Z1 through Z9. Since a different Z signal is associated with each of the nine hubs, D14 through D22, a different LRD pattern can be associated with each of the hubs D14 through D22. Accordingly, although activation of any of the nine hubs D14 through D22 causes an entry instruction to be performed, each of these hubs may have a different LRD pattern which determines which of these hubs are activated for any given column on the billing/accounting form during a data entry operation.

Figure 63A:
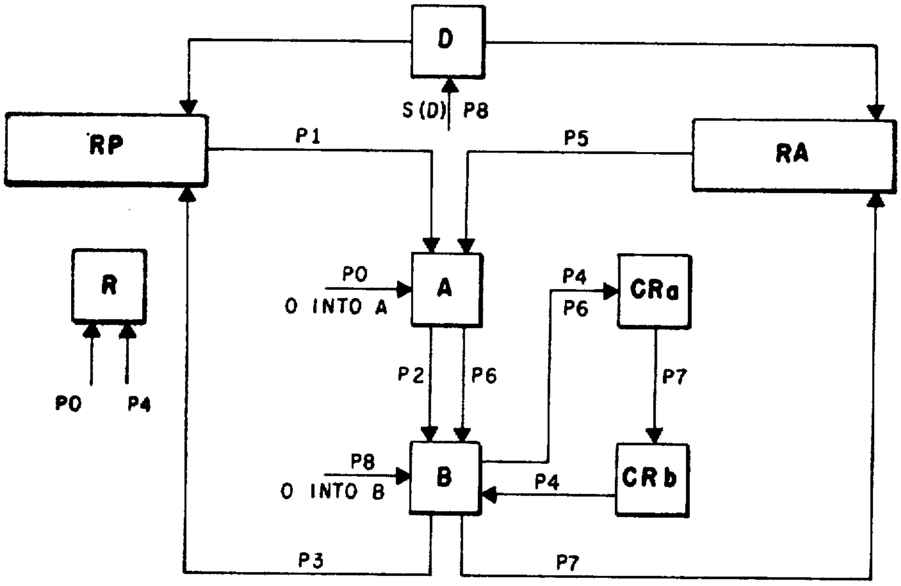
Figure 63B:
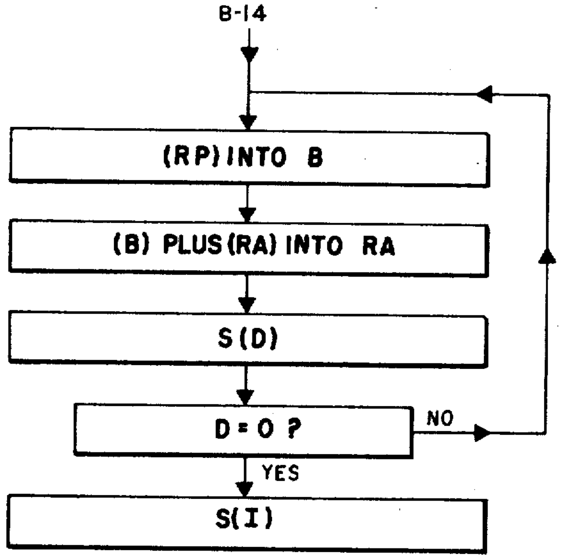

Included in the drawings is a detailed operational chart for each of the instructions which can be performed by the electronic processor. Associated with many of these detailed operational charts is a logic and simplified flow diagram. Each operational chart is identified by a figure number, for example FIG. 63 is the operational chart for the add instruction. When present, the logic diagram corresponding to a given instruction is identified by the figure number of its corresponding operational chart figure number and the letter A, for example, FIG. 63A is a logic diagram corresponding to the add instruction. Likewise, the flow diagram corresponding to a particular instruction is identified by the figure number of its operational chart and the letter B, for example, FIG. 63B is the flow diagram of the add instruction. Occasionally, a single instruction may be conveniently broken down into a plurality of phases. For example, multiplication can be divided into six separate steps or phases. Each phase has associated therewith its own particular operational chart and each chart has a figure number which distinguishes it from the others. For example, the six phases associated with the multiplication instruction are described by the following operational charts: FIGS. 72–1, 72–2, 72–3, 72–4, 72–5, 72–6, respectively. Likewise, the logic diagrams associated with these operational charts are identified by the FIGS. 72–1A, 72–2A, 72–3A, 72–4A, 72–5A and 72–6A. Likewise, the flow diagrams for these several phases are identified by the FIGS. 72–1B, 72–2B, 72–3B, 72–4B, 72–5B, 72–6B, respectively.

The upper portion of each operational chart identifies the hub on the instruction patchboard associated with that particular instruction and gives a brief description of the instruction and the command level signals that are required to perform the instruction. For example, with reference to FIG. 63, which is the operational chart for the add instruction, shows that the hub on the instruction patchboard corresponding to the add instruction is the B14 hub and that addition is accomplished by adding the contents of the active RA register and the passive RP register, with the result appearing in the active RA register. Further, the H signals necessary to accomplish this addition are identified as being H9, H12, H14, H18 and H19. The main body of each operational chart comprises three columns. The left column includes one or more figure numbers selected from the group of FIGS. 42 through 62 which, together, constitute a complete logic diagram of the electronic processor. The center column describes various operations, such as stepping a particular counter, setting or resetting a particular flip-flop, etc., and the third column contains the signals which are obtained by the operations set forth in the second column. How an instruction is realized or accomplished by the electronic processor, illustrated by FIGS. 42 through 62, can readily be understood by reading the contents of the operational charts from left to right and top to bottom. For example, beginning at the top of the left-hand, or figure, column of an operational chart, reference to a particular figure number is made. Going to the right, the operation or middle column identifies an operation which can be performed by the logic circuitry shown in the figure set forth in the first, or figure, column. Going again to the right, the signal column identifies the signal which is produced by the operation set forth in the operation, or center, column. Repeating this procedure, going down the entire operational chart, describes in detail how a particular instruction is realized by the electronic processor. Reference to the source of P pulses and H signals, FIG. 57 and FIGS. 49A, 49B and 49C, respectively, shows that these signals normally occur as barred, or inverted, signals. However, for purposes of simplicity, these signals are identified in FIGS. 63 through 91 and in the specification describing these figures as being unbarred signals.

(1) ADD

The operational charts can be best understood by utilizing one of them to describe in detail an instruction which can be performed by the electronic processor. Referring now to FIG. 63, which is the operational chart for an add instruction, the first figure referred to is FIG. 61 which illustrates the instruction patchboard. The operation of patching selected ones of the hubs on the instruction patchboard permits the signals of an activated B14 hub to be obtained. Selection of program lines and their associated instructions has been described hereinabove and need not be repeated at this time, it being understood that selected ones of the instruction hubs on the instruction patchboard are activated by selecting and carrying out a program line. As will be obvious from a perusal of FIG. 61, an activated B14 hub yields a Y0 and Z1 signal.

The next figures referred to are FIGS. 49A, 49B and 49C which, together, illustrate in detail the H signal generator. The Y0 and Z1 signals produced by an activated B14 hub, when applied to the H signal generator, cause the Y0 signal to generate H9, H12 and H18 signal levels, whereas the presence of a Y0 and Z1 signal produce H14 and H19 signals. As discussed hereinabove in conjunction with FIG. 6, the H signals are D.C. level signals which are applied to the G signal generator which is illustrated in detail in FIG. 48.

It should be understood at this point that just prior to activation of the B14 hub, the various counters, flip-flops, etc., in the electronic processor were set or reset, as the case may be, into their normal positions in a manner as described. The digit D counter illustrated in FIG. 46 and which, as discussed above, is a scale of sixteen counter, will be assumed to contain a "0." As previously described, the D counter produces thirteen outputs comprising the D signals D0 through D12 with the twelve D signals, D1 through D12 representing the twelve separate digit positions present in each of the twelve storage registers contained within the core memory. Accordingly, when a "0" is contained within the D counter, a D0 signal is generated which causes the electronic processor to be looking outside of the core memory. As will be obvious from the description which follows, the sequence of steps set forth in the operational chart of FIG. 63 is repeated one time for each count that may be contained in the D counter, that is, the sequence of steps set forth in FIG. 63 is repeated at least sixteen times. The first sequence occurs when the digit D counter contains a "0" and the electronic processor is not looking at the core memory. However, once the first sequence is complete, the digit counter is stepped and a D1 signal is generated and the next twelve sequences correspond to one of the digit positions which are contained in each of the twelve registers of the core memory. Even though the D counter does not generate a D13, D14 or D15 signal, the sequence illustrated in FIG. 63 is performed once for each of these counts in the D counter until the D counter is stepped back to "0," at which time the add instruction associated with the B14 hub will be complete. It is clear then, that even though there are a maximum of twelve digit positions in a register for which the sequence illustrated in FIG. 63 may be performed, this sequence is actually performed at least sixteen times, once for each count which may be contained in the D counter.

The next figure referred to in the add instruction operational chart is FIG. 48 which illustrates the G signal generator. The occurrence of a P0 pulse and the H19 signal produce a G9 pulse which is applied to the reset side of each of the flip-flops comprising the A counter illustrated in FIG. 42 to set the A counter to "0."

Referring again to FIG. 48, which illustrates the G signal generator, the presence of the P0 pulse and the H12 signal, causes the output of the AND gate 285 to be at a logic ZERO level, thereby causing the output of the inverter 286 to a logic ONE which denotes the presence of a G12 signal. Like all the other G signals, the G12 signal has a duration equal to the P pulse which gives rise to the particular G pulse. The G12 signal operates to step the R flip-flop, which is illustrated in FIGS. 8 and 45, where it is identified by the reference numeral 67. As described hereinabove, switching of the flip-flop 67 causes the activity and passivity of the registers $R_1$ and $R_2$ to be reversed. For example, assume that prior to the occurrence of the G12 signal, $R_1$ was the active register and $R_2$ was the passive register. Switching of the flip-flop 67 by the G12 pulse will cause the $R_2$ register to become the active register and the $R_1$ register to become the passive register.

Subsequent to the occurrence of the P0 pulse, a P1 pulse is supplied by the P counter which, in combination with the H19 signal, causes a G16 signal to be generated. This G16 signal enables the READ circuits of FIG. 45, causing a readout to occur from the memory. If the digit D counter of FIG. 46 contains any count "1" through "12" therein, a readout will occur. If any other count is contained within the D counter, the electronic processor, in effect, is looking outside of the core memory and no readout will occur. Likewise, which of the twelve digit positions is caused to be read out by the G16 signal is determined by which of the twelve counts ("1" through "12") is contained within the D counter. The readout, if any, is from the now active register which, as discussed above, is either the register $R_1$ or $R_2$, the activity and passivity of which was reversed by the G12 signal during the occurrence of the P0 signal. The four binary bits representing the digit read out of the core memory by the readout RA amplifiers are applied in parallel to the A counter so that the digit previously stored in the selected digit position of the active register now appears in the A counter due to the occurrence of the G16 signal.

Subsequent to the P1 pulse, a P2 pulse is generated which, in conjunction with the H19 signal, causes the G signal generator of FIG. 48 to produce a $\overline{G17}$ signal. The $\overline{G17}$ signal is a logic ZERO signal which causes the output of the OR gate 250 of FIG. 42 to be at a logic ZERO level if, and only if, a logic ZERO appears on the AND gate output leads 253 and 254. Whether these AND gate outputs are at a logic ZERO or not is determined by the count or digit within the A counter and the presence or absence of a G19 and/or $\overline{G19}$ signal. Reference to FIG. 48 will show that the $\overline{G19}$ signal is at a logic ONE level each time a P2 signal occurs and an H10 signal is absent. Likewise, the $\overline{G19}$ signal is at a logic ONE level whenever a P6 pulse appears and an H11 signal is absent. Further, the presence of a P2 pulse and H10 signal causes the G19 signal to be a logic ONE and the presence of a P6 pulse and H11 signal causes the G19 signal to be a logic ONE. As discussed hereinabove, when the $\overline{G19}$ signal is a logic ONE, the A counter is capable of counting down, whereas when the G19 signal is a logic ONE, the A counter is capable of being counted up. Since neither an H10 or H11 signal is generated by the add operation, the $\overline{G19}$ signal is a logic ONE and permits the A counter to be counted down. Since $\overline{G19}$ is a logic ONE, a logic ONE will appear on the output lead 253 only when a "0" count is contained within the A counter. Correspondingly, since G19 signal is a logic ZERO, a logic ONE cannot appear on the lead 254 regardless of the count in the A counter. However, if G19 were a logic ONE, a logic ONE would appear on the lead 254 only when a count of "9" wes present in the A counter.

Assume now that the number or digit transferred to the A counter from the core memory, due to the occurrence of a G16 pulse during P1 time, is some digit other than "0." For this condition, the presence of a $\overline{G17}$ signal causes the "step the P counter" S(P) signal level appearing on the output of the OR gate 250 of FIG. 42 to be at a logic ZERO level. As indicated by the operational chart of FIG. 63, this logic ZERO level signal S(P) operates on the electronic switch illustrated in FIG. 59 to provide "step the A counter" S(A) pulses and to prevent the generation of "step the P counter" T(P) pulses. That is, the S(P) signal being at a logic ZERO causes the square wave output of the free-running multivibrator MV illustrated in FIG. 59 to appear as S(A) pulses rather than T(P) pulses. These S(A) pulses are applied to the A*a* flip-flop of the A counter of FIG. 42 and count the A counter down. Simultaneously, these S(A) pulses are also applied to the B*a* flip-flop of the B counter of FIG. 43 and count the B flip-flop up. When the A counter of FIG. 42 is counted down to "0" by the S(A) pulses, the reset side of each of the flip-flops comprising the A counter are at a logic ONE which, in conjunction with the $\overline{G19}$ signal also being a logic ONE, causes a logic ONE to appear on the lead 253. This causes the output of the OR gate 250 to be a logic ONE which is applied to the electronic switch of FIG. 59 and causes the square wave output of the free-running multivibrator MV to appear as T(P) pulses and not as S(A) pulses.

Since the S(A) pulses are applied simultaneously to the A and B counters, the digit that was transferred from the core memory into the A counter has now been transferred into the B counter. For example, if the digit "5" was transferred into the A counter, it took five square wave outputs from the free-running multivibrator to step the A counter down to "0." These same five square wave outputs were also simultaneously applied to the B counter and counted the B counter up to "5," thereby causing the digit in the A counter to be transferred to the B counter. Since T(P) pulses were not generated while the A counter was being counted down and the B counter counted up, and since the T(P) pulses step the P counter of FIG. 57, the P counter contained a count of "2" during the time required to count the A counter down to "0." That is, a P2 pulse during the performance of the add instruction has a length which is variable and determined by the digit in the A counter which determines how long it takes to count the A counter down to "0." This is illustrated by the wave shapes shown in FIG. 7 which indicate that the P2 pulse has a variable width.

The occurrence of a P3 pulse, together with an H19 signal, causes the G signal generator to produce a G15 signal. This G15 signal enables the WRITE circuits of FIG. 45, causing the inhibit amplifiers IA to transfer the digit in the B counter back into the core memory. This is done without destroying the information, or digit, in the B counter and the digit is written into the same digit position of the same register from which it was obtained. That is, the digit position of the active register, indicated by the count in the digit D counter, was read out into the A counter, transferred from the A counter to the B counter and then read back from the B counter into the identical digit position. Accordingly, this causes the readout from the core memory to be nondestructive. Writing the digit back into the memory, however, does not destroy the digit in the B counter.

The subsequent occurrence of a P4 pulse and the H14 signal causes the G signal generator to produce a G11 signal. This G11 pulse operates to reset the carry flip-flop CR$b$ of FIG. 43. Had this flip-flop CR$b$ previously been set due to a previous addition, this resetting will cause a "1" to be transferred into the B counter to increase the count therein by "1." That is, had the last previous operation of the sequence illustrated in FIG. 63 resulted in a carry, this carry is now transferred into the B counter by the occurrence of the G11 pulse. If the CR$b$ flip-flop was set due to a previous carry, and if the number transferred from the A counter to the B counter due to the occurrence of the G17 signal is "9," the carry into the B counter causes the B counter to go to "0" and the carry flip-flop CR$a$ to be set because when the B counter is stepped from "9" to "0," the set output of the B$d$ flip-flop goes from a logic ONE to a logic ZERO which causes a ONE to be placed into the set side of the carry CR$a$ flip-flop. As will now be obvious, if there is no carry in the carry CR$b$ flip-flop when the G11 pulse occurs, or if there is such a carry and the carry does not step the B counter from "9" to "0," a ONE is not set into the carry CR$a$ flip-flop at this time.

The occurrence of a P4 pulse, together with the H12 signal, causes the G signal generator of FIG. 48 to produce a G12 signal which, as described hereinabove, switches the flip-flop 67 of FIGS. 6 and 45 which, in turn, reverses the activity and passivity of the $R_1$ and $R_2$ registers. The subsequent occurrence of the P5 pulse, in conjunction with the H18 signal, produces a G16 signal which, as described hereinabove, causes a readout from the core memory. Since the digit D counter has not been advanced, the readout occurs from the same digit position which was read out during the occurrence of the P1 pulse. However, since the activity and passivity of the $R_1$ and $R_2$ registers have been reversed, the readout is from the corresponding digit position of the register which is now the active register and which was the passive register at the time the P1 pulse occurred. In a manner as described above, the digit read out of the core memory is applied in bit parallel form to the A counter.

The subsequent occurrence of a P6 pulse, together with the presence of the H14 signal, causes the G signal generating circuit to produce a G17 signal which, as described above, causes the S(P) signal to be a logic ZERO. This logic ZERO is applied to the switch illustrated in FIG. 59 to produce S(A) pulses and to inhibit T(P) pulses. The S(A) pulses count the A counter down to "0" and, at the same time, count up the B counter so that the digit transferred into the A counter during the occurrence of the P5 pulse is serially transferred into the B counter during the occurrence of the P6 pulse. Since the time required for the serial transfer of the digit in the A counter into the B counter is determined by the magnitude of the digit so transferred, the P6 pulse has a length which is sufficient to enable this to be accomplished. Accordingly, the P6 pulse, as illustrated in FIG. 7, also has a variable width which is proportional to the magnitude of the digit transferred from the A counter to the B counter.

Since the B counter already contains the digit transferred out of the core memory during the occurrence of the P1 pulse, transferring the number read out of the core memory during the occurrence of the P5 pulse from the A counter to the B counter causes the B counter to contain the sum of these two numbers. That is, during a P2 pulse time, a first number is transferred from the A counter to the B counter and during a P6 pulse time, a second number is transferred from the A counter and added to the number previously placed in the B counter to obtain the sum of the two numbers. If the addition of the two numbers in the B counter causes the count therein to advance beyond "9," a carry, or logic ONE, is transferred from the B$d$ flip-flop of the B counter into the set side of the carry CR$a$ flip-flop. The subsequent occurrence of a P7 pulse, together with the H18 signal, produces a G15 signal which, as described above, causes the number or digit in the B counter to be transferred back into the core memory. Since this number represents the sum of the first two numbers removed from the core memory, an addition has taken place and the results of this addition are stored in the core memory and in the register from which a number was read out during the occurrence of the P5 pulse. In other words, the contents of the register which was passive at the time the B14 hub was activated have been added to the contents of the then active register such that the sum of this addition appears in the then active register and the contents of the originally passive register remains unchanged.

Also, during the occurrence of the P7 pulse, the combination of the P7 pulse and the H14 signal causes the G signal generating circuit to provide a G13 signal which operates to reset the carry CR$a$ flip-flop of FIG. 43. Resetting the carry CR$a$ flip-flop will cause a ONE to be transferred to the carry CR$b$ flip-flop if the carry CR$a$ flip-flop was set prior to the occurrence of the G13 signal or pulse. In other words, if the addition which took place in the B counter during the occurrence of the P6 pulse causes the B counter to be stepped beyond "9," therefore transferring a ONE into the CR$a$ flip-flop, the G13 pulse causes the ONE in the carry CR$a$ fliplflop to be transferred to the carry CR$b$ flip-flop. If such a logic ONE is transferred to the carry CR$b$ flip-flop, the next occurrence of a P4 pulse will generate a G11 signal which will cause this ONE in the CR$b$ flip-flop to be transferred into the B counter as described above. As will now be clear to those skilled in the art, the cooperation of the A and B counters and the carry flip-flops CR$a$ and CR$b$ is such that addition is performed in the B counter and the carry flip-flops together with the B counter constitute a full adder.

The subsequent occurrence of a P8 pulse, together with the H18 signal, causes the G signal generator circuit of FIG. 48 to produce a G10 signal which is applied to the reset side of each of the flip-flops comprising the B counter to set a "0" into the B counter. That is, once the addition of a particular digit position is completed and the result thereof returned to the core memory, the B counter is cleared by the occurrence of a P8 pulse which produces a G10 pulse or signal. Also, the occurrence of the P8 pulse and the H9 signal causes the G signal generator to produce a G2 pulse which will step the digit S(D) counter illustrated in FIG. 46.

Stepping the digit counter one time in response to the occurrence of the G2 signal enables the contents of the next highest digit position in the core memory to be operated upon. As described above, the first, or initial position, of the D counter is "0" which corresponds to a digit position outside of the core memory. The sequence described above is performed for this digit position ("0") after which the digit counter D is stepped to a count of "1," which causes the above sequence to operate on the first digit, or least significant digit position, of the $R_1$ and $R_2$ registers. This process is repeated for the next eleven digit positions in the core memory and also for the additional three counts of the digit counter beyond the count of "12." After the above sequence is completed for the highest count which may be contained in the digit D counter, the digit counter will again be stepped so that it contains a count of "0." As described above, activation of the B14 hub produces a Y0 and Z1 signal which, as illustrated by FIG. 61, are applied to the AND gate 395 to produce a Y0·(Z1–6) signal. This signal is applied to the OR gate 294 of FIG. 51 which causes a logic ONE to be applied as one input to the AND gate 295. Also, since the digit D counter now contains a "0," the D0 signal is at a logic ONE level which causes the other input of the AND gate 295 of FIG. 51 to be at a logic ONE level. Therefore, the output of the AND gate 295 is at a logic ONE which is inverted by the inverter 296 to produce a logic ZERO input to the inverter 297. However, the inverter 297 will only be activated, that is, enabled, upon the occurrence of a P9 pulse. Accordingly, prior to the occurrence of the next P9 pulse, the potential appearing on the output lead of the inverter 297 is a logic ONE. After the digit D counter is stepped back to "0," the P counter again puts out a series of pulses beginning with the P0 pulse and ending with the P9 pulse. Upon the occurrence of the P9 pulse, the inverter 297 is activated thereby causing the potential appearing on its output lead to go from a logic ONE to a logic ZERO. This potential change on the output of the inverter 297 steps the instruction counter I, which comprises the four interconnected flip-flops I*a*, I*b*, I*c* and I*d*. As discussed hereinabove, stepping the instruction counter causes inactivation of the B14 hub and the initiation of the next instruction associated with the selected program line.

When the B14 hub was initially activated, thereby causing the add instruction to be performed, the digit counter also contained a count of "0." The occurrence of the first P9 pulse after the initiation of the add instruction did not step the instruction counter because the occurrence of the first P8 signal generates a G10 signal, as shown by the operational chart of FIG. 63, which G2 signal steps the digit counter to a count of "1" prior to the occurrence of the first P9 pulse. Accordingly, when the first P9 pulse occurs during the performance of the add instruction the digit counter contains at least a count of "1." Therefore, the combination of the presence of a P9 pulse at the same time that the digit D counter contains a "0" will not occur until the digit counter is stepped or counted completely around.

The sequence set forth in the operational chart of FIG. 63 is performed more times than digit positions occur in the core memory and not all of the available digit positions in a memory register need be utilized to store data. For example, the particular LRD pattern for one or more of the core memory registers may be such that only a relatively few of the twelve digit positions are utilized. However, regardless of the number of active or utilized digit positions, the sequence set forth in the chart of FIG. 63 is repeated a number of times determined by the capacity of the D counter. The chart of FIG. 63 also shows that each sequence of the add instruction is synchronized with the P pulses such that each sequence begins with a P0 pulse and is thereafter controlled by the subsequent pulses produced by the P counter.

A single sequence of the add instruction described by FIG. 63 is illustrated by a simplified logic diagram in FIG. 63A wherein it is shown that at time P0, the A counter is set to "0" and the R flip-flop (corresponding to the flip-flop identified by the reference character 67 and illustrated in FIGS. 8 and 45) is switched so as to reverse the active and passive registers. During the occurrence of the P1 pulse, the digit position being looked at (which is determined by the count in the D counter) is transferred from the now active register to the A counter. During the occurrence of the subsequent P2 pulse, the contents of the A counter are transferred to the B counter. During the occurrence of the P3 pulse, the digit now present in the B counter is read back into the now active register digit position from which the number entered into the A counter during the occurrence of the P1 pulse was obtained so as to cause the readout from the active register digit position into the A counter during the occurrence of the P1 pulse to be nondestructive. During the occurrence of the P4 pulse, a carry from the carry CR*b* flip-flop is transferred to the B counter, if such a carry in this flip-flop is present due to the result of a previous add operation. If such a carry is present and causes the count of the B counter to exceed a count of "9," a carry will now be transferred to the carry CR*a* flip-flop. Also, at time P4 the R flip-flop is switched so as to switch the active and passive registers, causing them to correspond to the active and passive condition existing just prior to the activation of the add instruction. During the occurrence of the P5 pulse, the corresponding digit position of the other, and now active, register is transferred to the A counter. During the occurrence of the P6 pulse, the number now in the A counter is transferred and added onto the digit or number previously entered into the B counter such as to obtain the sum of the two digits contained in the like digit positions of the active and passive registers ($R_1$ and $R_2$). Also during this time interval any carry resulting from the add operation taking place in the B counter is transferred to the carry CR*a* flip-flop. During the subsequently occurring P7 pulse, a carry, if present in the carry CR*a* flip-flop, is transferred into the carry CR*b* flip-flop and the resulting sum appearing in the B counter is transferred to the corresponding digit position of the now active storage register ($R_1$ or $R_2$). During the occurrence of the subsequent P8 pulse, a "0" is set into the B counter which destroys the sum previously contained therein and readies the B counter for a subsequent add operation. Also, during the occurrence of the P8 pulse, the digit counter is stepped in order that the next add sequence will operate on the next most significant digit position of the registers $R_1$ and $R_2$.

The logic illustrated by FIG. 63A is repeated for each possible count in the digit D counter which is more than sufficient to include all of the twelve digit positions which are present in each of the twelve registers comprising the core memory. The sequence is first performed, as discussed above, when the digit counter D contains a "0" therein which corresponds to a position outside the core memory, which sequence, when performed, ensures that the A and B counters and the carry flip-flops CR*a* and CR*b* are set to their normal states prior to the occurrence of the sequence at the first significant digit D1 position of the memory registers corresponding to the count of "1" in the D counter.

FIG. 63B illustrates a flow diagram of the add operation and shows that addition is accomplished by entering the number in a particular digit position of the passive register into the B counter after which the number in the corresponding digit position of the active register is added onto the digit previously entered into the B counter from the passive register to obtain the sum of these two digits or numbers. Once this has been accomplished the digit counter is stepped S(D) so that the next digit position of the two registers are added in a like manner. This process continues for every digit position in the active and passive registers, and the necessity for carrying out this add sequence is terminated by the digit counter D containing a "0" therein. After each digit position in the active and passive registers has been operated upon, the instruction counter is then stepped S(I) thereby causing the electronic processor to perform the next instruction on the selected program line.

(2) SUBTRACT

The operational chart, logic diagram and flow chart for the add instruction illustrated in FIGS. 63, 63A and 63B, respectively, have been described in detail in order to ensure a complete understanding of their nature, form and content. As will now be obvious to those skilled in the art, the flow chart broadly describes the realization of the instruction, the logic diagram more specifically describes the realization of the instruction, and the operational chart describes in detail with reference to the detailed logic diagram (FIGS. 42 through 62) the accomplishment of the instruction by the electronic processor. Accordingly, each instruction performed by the electronic processor can be described in detail by providing an operational chart therefor which refers to the detailed logic diagram and describes the function and operation of various circuit elements illustrated therein. An operational chart, logic diagram and flow chart are provided for most of the instructions, and at least an operational chart is provided for every instruction which is performed by the electronic processor. Since the interpretation of the meaning and content of such drawings has been made clear by the above description, a complete and detailed description of the accomplishment of the various instructions performed by the electronic processor is accomplished by providing such drawings. Accordingly, only the salient and most important features of the instructions illustrated and described in FIGS. 64 through 91 will be commented upon hereinbelow.

Figure 64A:
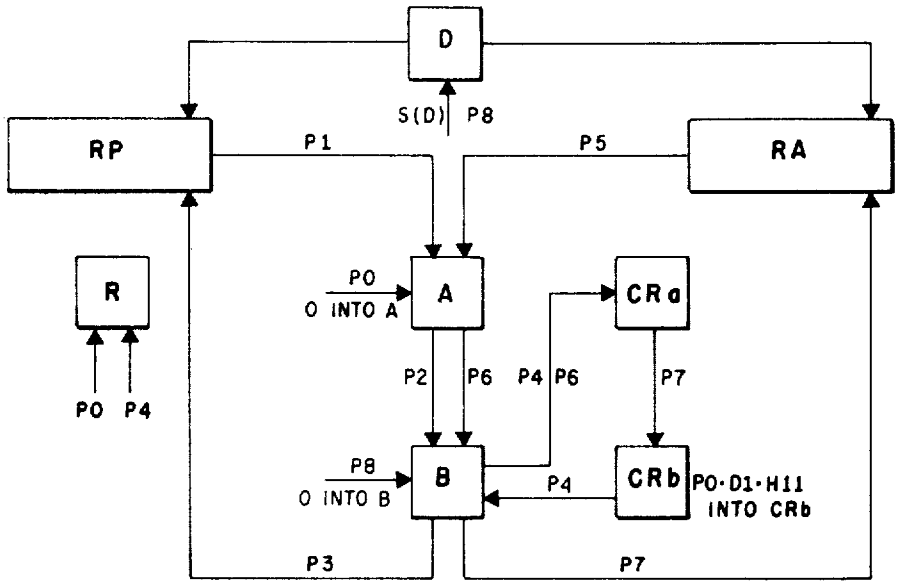
Figure 64B:
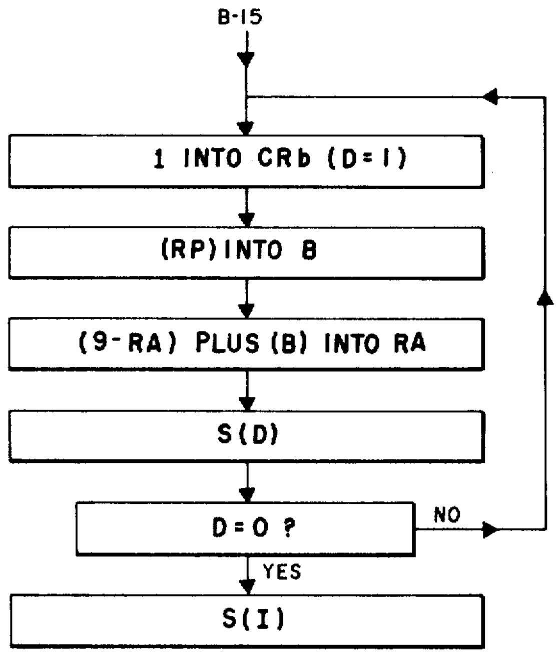

Referring now to FIGS. 64, 64A and 64B, which illustrate an operational chart, logic diagram and flow chart, respectively, for the subtract instruction, and more particularly to FIG. 64, there is illustrated a sequence which is somewhat similar to the add instruction sequence and which is performed once for each position of the digit D counter which is more than sufficient to cause subtraction in each of the twelve digit positions of the core memory. As with the add instruction, the active RA and passive RP registers comprise the registers $R_1$ and $R_2$ as a cooperating pair of registers. The digit read out from each digit position of the initially passive RP register during the occurrence of the P1 pulse during each sequence is read back into each digit position during the occurence of a P3 pulse during each sequence so that the readout from the passive register is nondestructive. Since reading and writing can only take place in conjunction with an active register, the register which is passive RP at the initiation of the subtract instruction is caused to become the active register RA by switching of the R flip-flop prior to reading from, or writing, therein. Further, the result of the subtraction is entered into the register which was active RA prior tn the initiation of the subtract instruction. Subtraction is accomplished by entering a particular digit position of the passive register into the B counter and adding thereto the "9's" complement of the number appearing in the corresponding digit position of the active register. The "9's" complement is obtained by counting the A counter up to "9" after the number from the active register has been entered therein and at the same time applying the pulses which count the A counter up to the B counter thereby causing the "9's" complement of the number in the A counter to be added to the number previously transferred to the B counter. In order to obtain the sum in the active RA register in the form of the "10's" complement a "1" is added to the B counter during the performance of the sequence associated with the first digit D1 position during the occurrence of the P4 pulse. This is accomplished by setting the carry CR*b* flip-flop during the occurrence of the P0 pulse and, subsequently, when the P4 pulse occurs, transferring this ONE from the carry Cr*b* flip-flop into the B counter. It is understood that this happens only once during each subtract instruction during the occurrence of the sequence associated with the least significant digit position D1 of the core memory. As will be obvious to those skilled in the art this permits the number in the RP register to be added to the "10's" complement of the number in the active RA register which results in the difference between the numbers in the passive RP and active RA registers. If each register RP and RA contain "0's" in the first D1 digit position, the "1" set in the B counter causes the B counter to count to "10" when the A counter is counted up from "0" to "9" subsequent to transfering the "0" in the first digit position of the active register RA into the A counter. This results in the B counter producing a carry for the next or second D2 digit position. This carry will continue to be transferred to the next highest digit position until a digit position is reached wherein there is a number in ether the RA or RP register. When such a digit position is reached, this "1" carry causes the "10's" complement of the number in the active register to be added to the contents of the B register during the occurence of a P6 pulse even though the A counter is counted up to "9" rather than "10." Reference to FIGS. 64, 64A and 64B shows that this carry is set into the carry CR*b* flip-flop during the occurrence of the P0 pulse and the sequence associated with the first digit D1 position by a G14 pulse which sets the CR*b* flip-flop.

(3) CLEAR

Figure 65A:
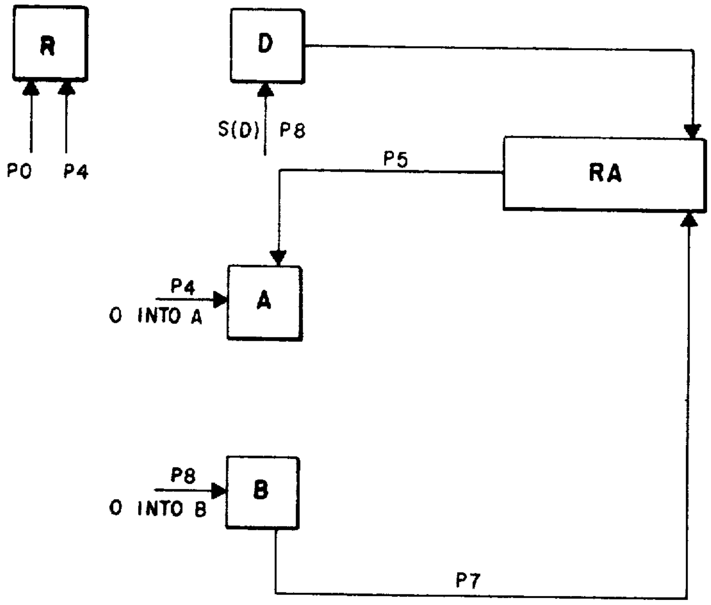
Figure 65B:
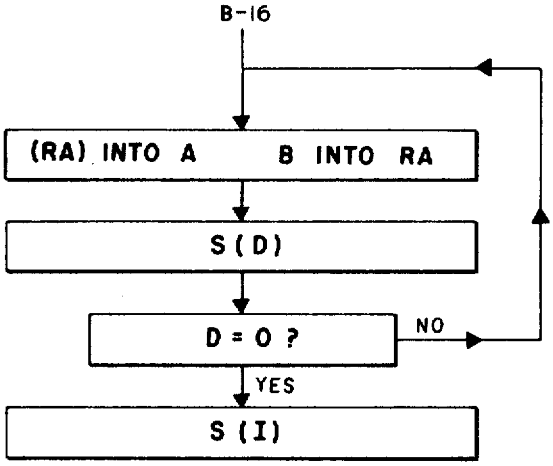

FIGS. 65, 65A and 65B illustrate an operational chart, logic diagram and flow chart, respectively, for the instruction which clears the active RA register. Reference to FIG. 65A shows that this instruction is accomplished by transferring the contents of each digit position of the active RA register into the A counter and transferring the contents of the B counter into each corresponding digit position of the active register after setting the B counter to "0." The contents of the active register transferred to the A counter are effectively destroyed by subsequently setting the A counter to "0." Since this operation is performed for at least each digit position in the register, the entire active register is set to "0" and after this is accomplished, the instruction counter S(I) is stepped to activate the next instruction.

Reference to FIGS. 65 and 65A shows that the P0, P4, P5, P7, P8 and P9 pulses are utilized in performing this instruction. It is clear then that each of the ten pulses (P0 through P9) produced by the P counter need not be utilized by the electronic processor in performing an instruction even though all ten of these pulses will be generated. Accordingly, between termination of the P0 pulse and the beginning of the P4 pulse, the electronic processor is essentially inactive when the instruction for clearing the active $R_2$ register is being performed. Since the sequence illustrated in FIG. 65 is performed for each position of the D counter, it is performed a number of times more than sufficient to clear each of the twelve digit positions of the active register.

The sequence for the clear instruction is first performed when the digit D counter contains a "0" therein. Since there is no corresponding digit position in the active register, the first performance of the sequence results in a "0" being set into the A and B counters. When the digit D counter is stepped to contain a "1," the sequence is repeated and causes any number in that digit position in the active register to be transferred to the A counter during the occurrence of the P5 pulse. This number, if any, is subsequently destroyed in the A counter by setting the A counter to "0" during the occurrence of the P4 pulse when the next sequence is performed corresponding to a count of "2" in the digit counter. Also, during the occurrence of the sequence when the digit counter contains a "1," the contents of the B counter are transferred to the first D1 digit position of the active register which results in a "0" being set therein. Prior to the performance of the next sequence, that is, the sequence associated with the count of "2" in the digit D counter, a "0" is set into the B counter during the occurrence of the P8 pulse so that when the contents of the B counter are set into the active register during the occurrence of the P7 pulse of the following sequence a "0" will be set into the corresponding position of the active register. That is, a "0" is set into the B counter during the performance of each sequence to ensure that the subsequent performance of the sequence results in a "0" being set into the corresponding digit position of the active register from the B counter. Further, the digit or number transferred to the A counter from the active register during the occurrence of the P5 pulse is destroyed therein during the next occurrence of the sequence during the P4 pulse time. In other words, the occurrence of the P4 pulse during any given sequence will wipe out the number transferred, if any, into the A counter by the previous performance of the sequence.

(4) FIVE-CENT ROUND OFF

Figure 66A:
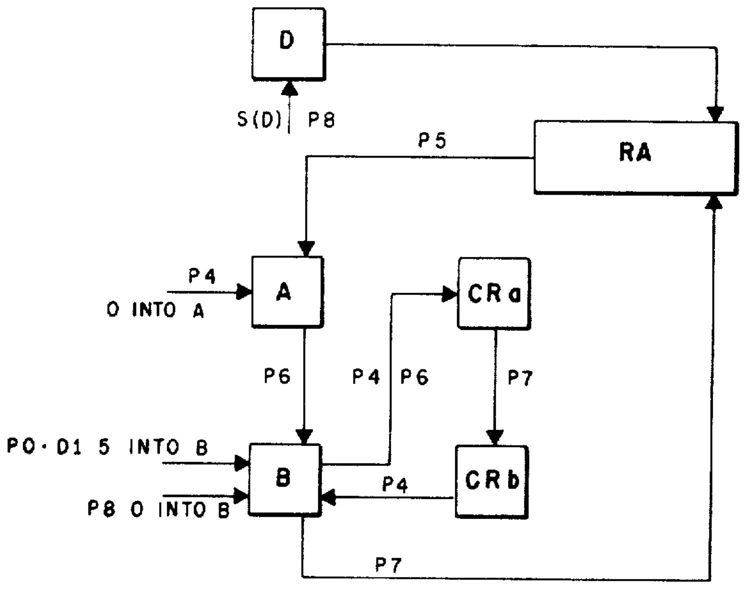
Figure 66B:
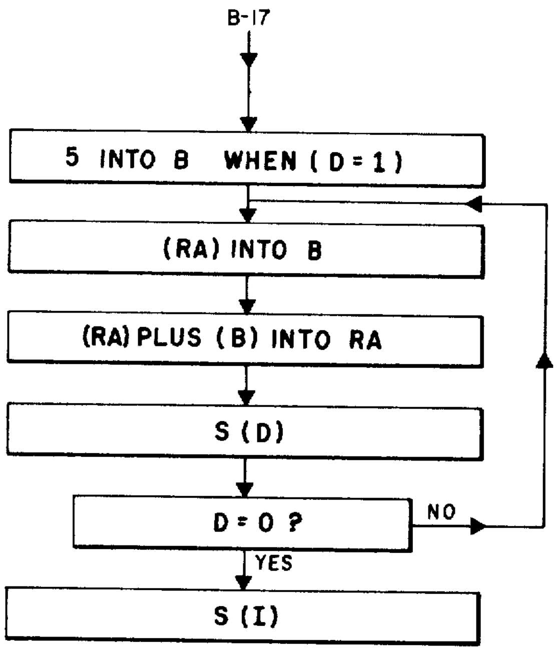
Figure 62A:
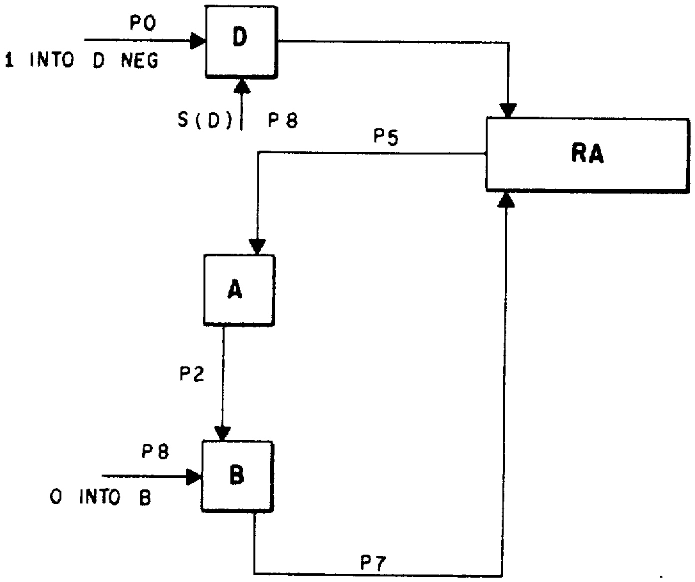
Figure 62B:
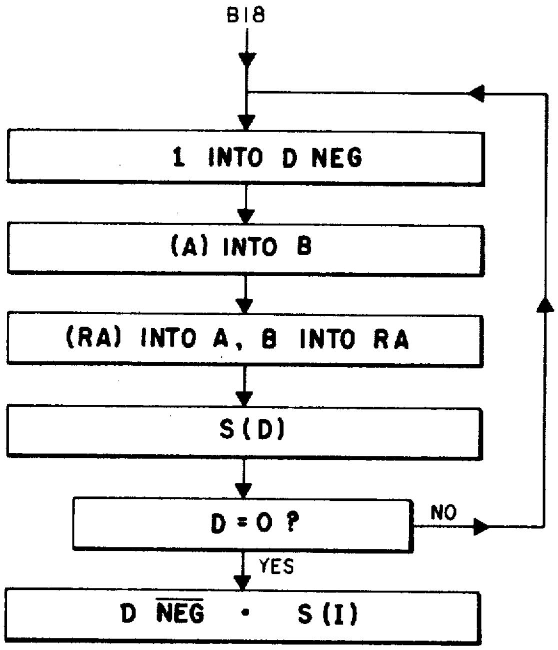

FIGS. 66, 66A and 66B illustrate an operational chart, logic diagram and flow chart, respectively, for the five-cent round off instruction. As described, various left and right of decimal point LRD patterns are available but for purposes of describing the present invention the twelve digit positions of each register are arranged such that three positions are available to the right of the decimal point and nine positions are available to the left of the decimal point. Accordingly, a five-cent round off operation would be performed by adding "5" to the digit position three places to the right of the decimal point, which digit position corresponds to the first digit D1 position of each register. Reference to FIG. 66B shows that this instruction is accomplished by entering the numeral "5" into the B counter when the first digit D1 position of the core memory is being looked at and then subsequently adding the contents of this digit position of the active RA register into the B counter such that the sum of the digit transferred and the number "5" is obtained. Subsequent to this add operation, the sum obtained is placed back into the first digit position of the active RA register. Since this addition can result in a carry which, in turn, may result in one or more additional carries, this sequence, with the exception of entering "5" into the B counter, is repeated at least a number of times equal to the number of digit positions in the active RA register. After the instruction is complete, the instruction I counter is stepped S(I) in order to cause the electronic processor to perform the next instruction.

More specifically, FIGS. 66 and 66A show that the first performance of the sequence occurs when the digit counter contains a "0" which corresponds to a digit position outside of the active register. A "0" is set into the A counter by the occurrence of a P4 pulse and a "0" is set into the B counter by the occurrence of the P8 pulse. During the next occurrence of the sequence corresponding to the first digit D1 position, a "5" is entered into the B counter during the occurrence of the P0 pulse. Reference to FIG. 43 indicates that the AND gate 262 is activated whenever the Y0, Z4, D1 and P0 signals occur simultaneously. Since the digit D counter is stepped once each time the sequence is performed, this particular combination of signals can only occur one time, that is, when the D counter contains a "1." When enabled, the output of the AND gate 262 sets the B*a* and B*c* flip-flops of the four flip-flops B*a*, B*b*, B*c* and B*d* comprising the B counter. Since the B counter was previously set to "0" by the first occurrence of the sequence, the B counter now contains the binary equivalent of the numeral "5," that is, a 0101. During the occurrence of the P4 pulse, the A register is set to "0" even though the A counter was previously set to "0." During the occurrence of the P5 pulse, the numeral in the first digit position of the active register is read out into the A counter and during the occurrence of the subsequent P6 pulse this number in the A counter is transferred into and added upon the "5" previously entered into the B counter. This addition may result in a carry which results in the carry CR*a* flip-flop being set. The occurrence of a P7 pulse causes the sum appearing in the B counter to be applied to the first digit D1 position of the active register and the subsequent occurrence of the P8 pulse sets the B counter to "0." Due to the possibility of a carry resulting in the CR*a* flip-flop during the occurrence of the P6 pulse, the sequence is repeated at least a number of times equal to each digit position in the active register. As will be obvious to those in the art, this ensures that the appropriate carry, if any, is properly added to each of the twelve digit positions in the active register.

(5) SHIFT RIGHT (1)

FIGS. 67, 67A and 67B illustrate an operational chart, logic diagram, and flow chart, respectively, for the instruction which shifts the contents of the active register RA one time to the right which is the equivalent of multiplying a number in the active register by one-tenth. Reference to FIGS. 67, 67A and 67B shows that this instruction is accomplished by causing the D counter to count down so that the most significant digit position D12 is looked at first and the next least significant digits are looked at sequentially until the least significant digit position D1 of the active register is looked at. The number read out of a digit position in the active register during one sequence is stored in the A counter. During the performance of the next sequence when the next least significant digit is being looked at, the number previously transferred to the A counter is transferred to the B counter and from there into the corresponding digit position of the active RA register so that the number previously transferred from the next highest significant digit position now appears in the adjacent or next least significant digit position from which it was obtained. In this manner, each digit position in the active register RA is shifted to the right one time. As will be obvious to those skilled in the art, a number, if any, appearing in the first digit position D1 of the active RA register prior to the initiation of this instruction, will be shifted out of the memory entirely, that is, destroyed.

Reference to FIGS. 67 and 67A shows that the occurrence of a G6 signal during the occurrence of the P0 pulse sets the D negative flip-flop which enables the D counter to count down in response to G2 pulses being applied to the DA flip-flop. The number in a digit position of the active RA register is transferred to the A counter during the occurrence of a P5 pulse and the next occurrence of the sequences set forth in FIG. 67 causes the number in the A counter to be transferred into the B counter during the occurrence of the P2 pulse and to then be transferred from the B counter into the active RA register during the occurrence of the P7 pulse. Also, the occurrence of a P8 pulse causes a "0" to be set into the B counter to wipe out the number previously entered therein and to condition the B counter for the entry of the next number from the next digit position.

(6) SHIFT LEFT (1)

Figure 68A:
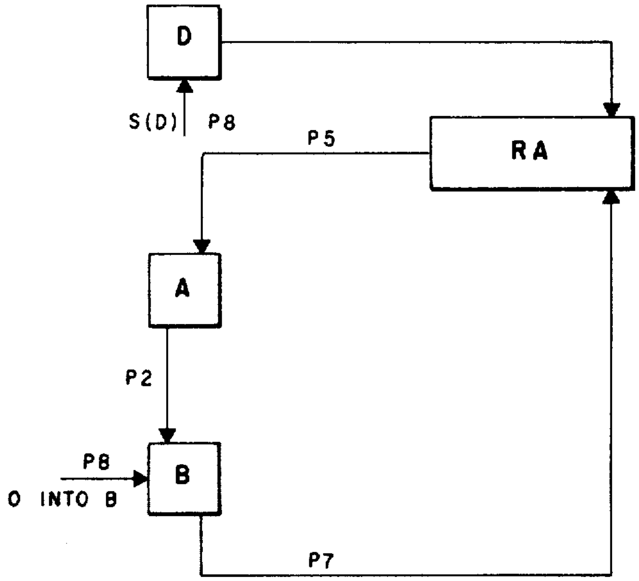
Figure 68B:
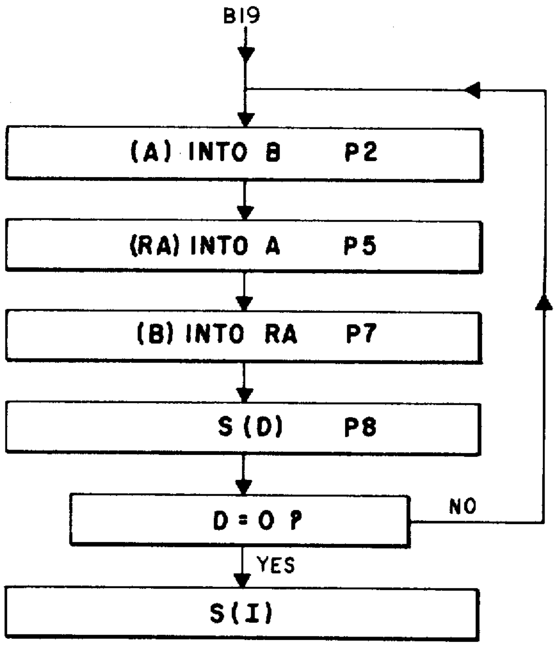

FIGS. 68, 68A and 68B illustrate an operational chart, logic diagram, and flow chart, respectively, for the shift left one-time operation which shifts each digit position of the active register one time to the left and is equivalent to multiplying the number in the active register by "10." This insruction is performed in a manner which is substantially similar to the performance of the shift right instruction except that in order to have the shift take place to the left rather than to the right, the D counter is caused to count up rather than down. This is accomplished by the D negative flip-flop being in a reset condition which is the normal condition of the D negative flip-flop. Reference to FIG. 46 shows that the D negative flip-flop is reset by the occurrence of a "step the instruction counter" S(I) signal which occurs simultaneously with a P9 pulse. As is shown by FIG. 67, a P9 pulse and a "step the instruction counter" S(I) signal are generated simultaneously at the termination of a shift right operation. That is, the performance of the shift right operation will set the D negative flip-flop, however, upon termination of the shift right operation the D negative flip-flop is reset (its normal position) which permits the D counter to count up.

(7) SHIFT RIGHT (2)

Figure 69A:
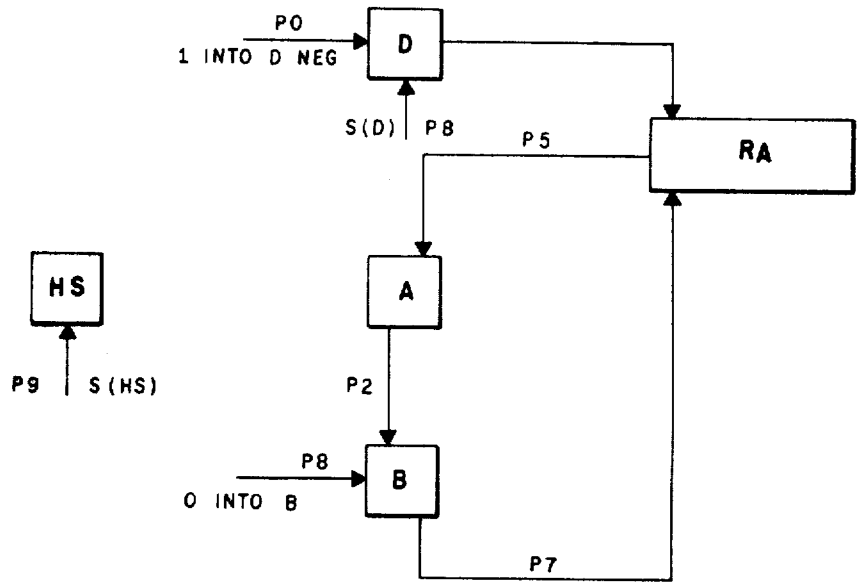
Figure 69B:
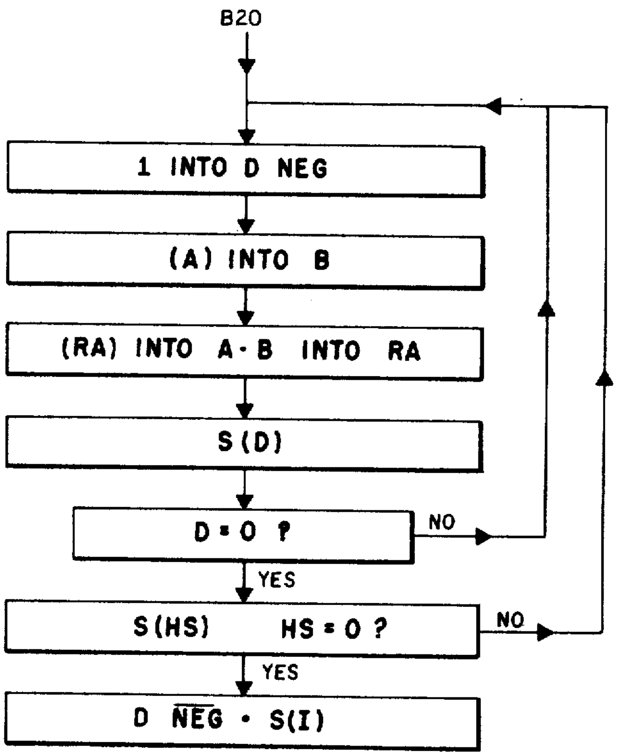
Figure 20A:
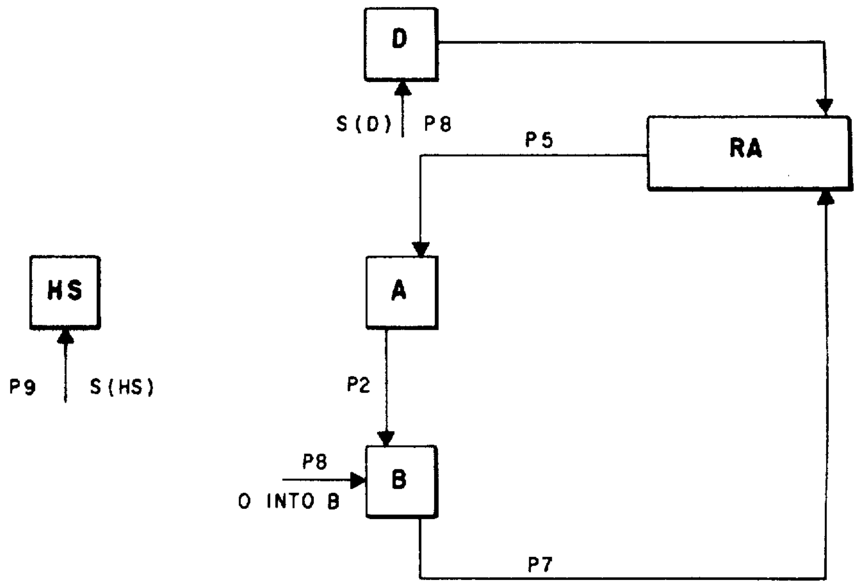
Figure 20B:
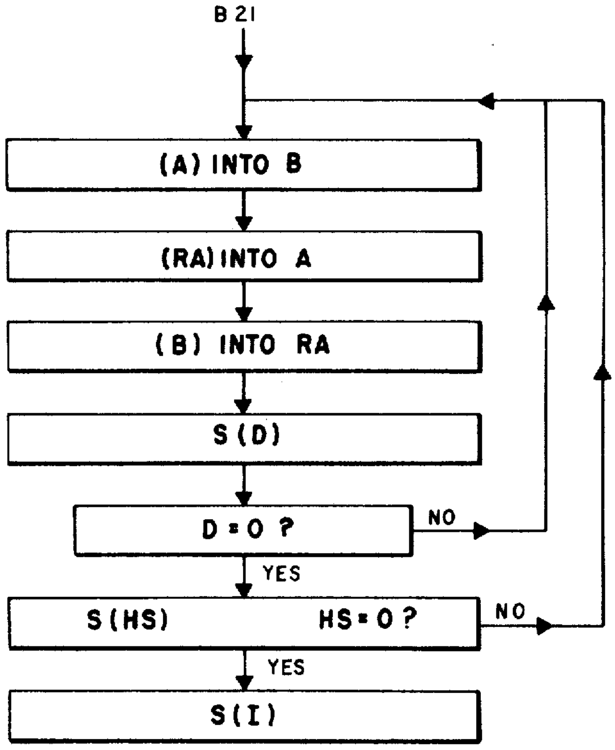
Figure 21A:
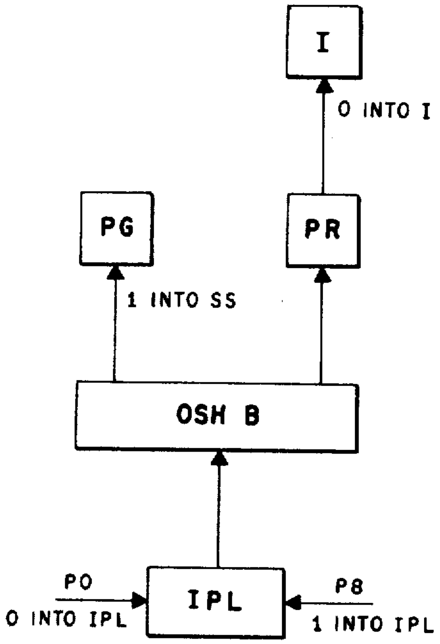
Figure 21B:
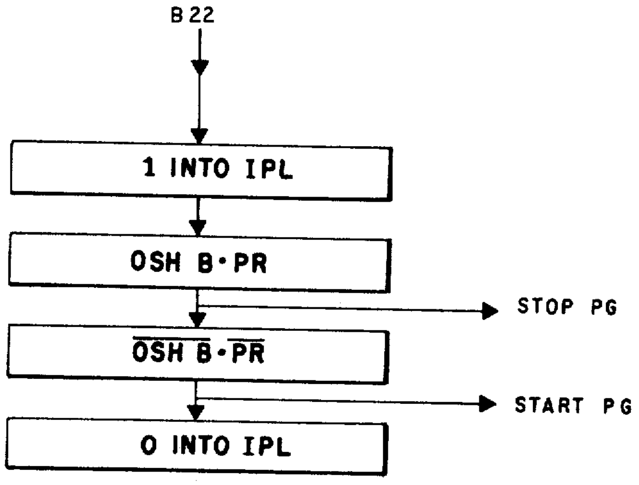
Figure 221A:
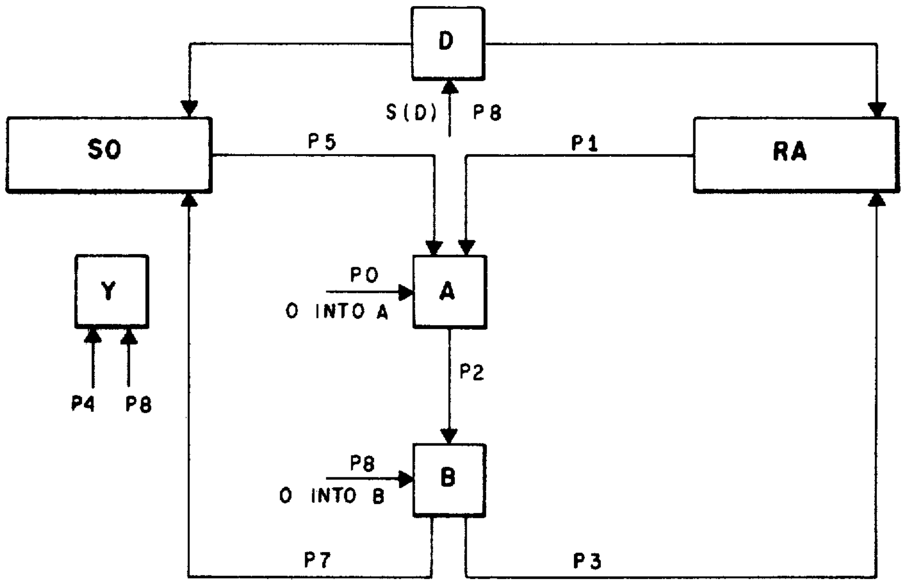
Figure 221B:
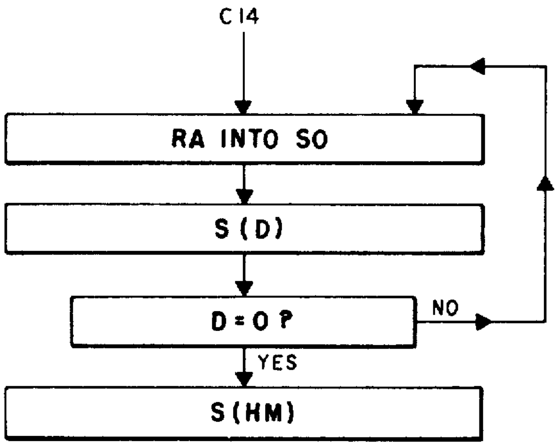

FIGS. 69, 69A and 69B illustrate an operational chart, logic diagram, and flow chart, respectively, for the shift right two places instruction. This instruction shifts each digit in the active register two places to the right and is equivalent to multiplying the number in the active register by .01. Reference to these figures shows that the shift right two places instruction is accomplished by performing the shift right one time instruction twice. The first performance of the shift right instruction causes a P9, Y0, D0 and Z7 signal to occur simultaneously, which signals reset the HS flip-flop. When reset, the HS flip-flop will not generate an HS1 signal. The absence of this HS1 signal after the first completion of the shift right one time operation prevents stepping of the instruction I counter. Since the instruction counter is not stepped, the same sequence is again performed for each position of the D counter; that is, the shift right one time instruction is again performed to result in a shift right two places operation. When the second shift to the right one time is completed, the second occurrence of a P9, Y0, D0 and Z7 signal will switch the HS flip-flop into a set condition which generates the HS1 signal which permits the instruction counter to be stepped. The stepping of the instruction counter will then cause the next instruction of the program line to be performed.

(8) SHIFT LEFT (2)

FIGS. 70, 70A and 70B illustrate an operational chart, logic diagram and flow chart, respectively, for the shift left two places instruction which is equivalent to multiplying the number in the active RA register by "100." This instruction is accomplished in a manner substantially similar to the shift right two places instruction except that the D counter is caused to count up for this instruction to obtain the shift to the left. As with the shift right two places instruction, two places to the left shift is obtained by utilizing the HS flip-flop to repeat the shift left one time instruction twice. As will be obvious to those skilled in the art, any desired number of shifts to the right or to the left can be accomplished by repeating the basic one shift to the left or one shift to the right instruction the desired number of times.

(9) REPEAT PROGRAM

FIGS. 71, 71A and 71B illustrate an operational chart, logic diagram and flow chart, respectively, for a repeat program line or iterate instruction. This instruction is utilized to repeat a program line when desired and is, therefore, generally the last instruction of the program line which it is resired to repeat. An add, subtract, and multiply instruction is available for the electronic processor, but no comparable divide instruction is available. However, division can readily be accomplished by utilizing this iterate instruction to cause a program line, including subtraction, to be repeated a desired number of times. In order to cause a predetermined program line to be repeated, it is necessary that the instruction counter I, illustrated in FIGS. 6 and 51, be set to "0" and at the same time the contents of the three field code flip-flops 45, 46 and 47 illustrated in FIGS. 6 and 47 must be preserved.

The realization of this instruction will be apparent from a perusal of FIG. 71 which shows that activation of the iterate or repeat program line hub B22 produces a Y0 and Z9 signal. The first occurrence of a P8 pulse and the Y0 and Z9 signals cause the iterate program line IPL flip-flop of FIG. 47 to be set by enabling the AND gate 385. The iterate program line IPL flip-flop being set causes the AND gate 304 of FIG. 52B to be activated by the occurrence of the subsequent occurring P9 pulse which results in the one-shot OSHB circuit being triggered which, in turn, causes a pulse reset PR pulse to appear on the lead 384 of FIG. 47. Further, the occurrence of a P9 pulse when the IPL flip-flop is set causes the start-stop SS flip-flop of FIG. 59 to be set which, in turn causes the free-running multivibrator MV or pulse generator to be disabled so that no P pulses are produced by the P counter. The PR pulse appearing on the lead 384 will have a duration that is equal in length to the period of time the one-shot OSHB circuit is activated. Reference to FIG. 51 shows that the occurrence of the pulse reset PR pulse will reset each of the flip-flops comprising the instruction I counter and, therefore, set the instruction counter to "0." Also, reference to FIG. 47 shows that since the IPL flip-flop is set, the occrrence of the pulse reset PR pulse will fail to enable the AND gate 386, therefore, the condition of the three field code flip-flops 45, 46 and 47 will not be altered. Accordingly, the two conditions necessary to cause the program line to be repeated have been accomplished. When the one-shot OSHB circuit of FIG. 52B times out, the PR pulse also terminates which, in turn, resets the start-stop SS flip-flop which enables the free-running multivibrator MV which, in turn, enables P pulses to be generated again. The next occurring P0 pulse applied to the OR gate 387 of FIG. 47 will reset the iterate IPL flip-flop to its normal or reset condition. At this point, the instruction counter is at "0" and the program line previously performed will again be performed.

As discussed above, a program line is selected by a combination of the condition of the three field code flip-flops and a depressed program key. In reference to the above iterate instruction, it is not necessary to preserve the program key depression which selected the particular program line which is to be repeated. The reason for this will become apparent from a consideration of FIG. 58 which illustrates the ten program keys and their associated program code PCA amplifiers. As discussed above, depression of one of the ten program keys turns on its associated PCA amplifier. Once turned on, a PCA amplifier is turned off by the occurrence of an end-of-program line EPL and release program bank RPB signal occurring on the lead which is coupled to the base of the NPN transistor 370 by way of an OR gate. When an iterate or repeat program line instruction is performed, the program line is repeated. Accordingly, an end-of-program line EPL signal is not generated which prevents the NPN transistor 370 from turning off the PCA amplifier which has activated by the depression of its associated program key.

(10) MULTIPLICATION

Multiplication is performed by multiplying the contents of the passive RP register by the contents of the active RA register and placing the product in the active RA register and is accomplished by successively adding and shifting. For example, the number in the passive register is added a number of times determined by the least significant digit of the number in the active register. After this addition, the result is shifted, after which the number in the passive register is added to the previously obtained result a number of times determined by the next most significant digit of the number in the active register, after which, the result is again shifted. This adding and shifting process continues for each digit position of the number in the active register. Since the result of the multiplication is entered into the active RA register, the multiplier number appearing in the active register is transferred to the storage S0 register prior to the multiplication by successive addition and shifting. The number of additions which takes place for each digit position of the number transferred to the S0 storage register from the active RA register is determined by successively transferring each digit position of the S0 storage register to the M counter of FIG. 42 starting with the least significant digit D1 position of the S0 register and ending with the most significant D12 digit position.

Multiplication comprises six separate steps or phases which are controlled by the help multiply HM phase counter of FIG. 50. Reference to FIG. 50 shows that the HM counter comprises three interconnected flip-flops HM*a*, HM*b*, and HM*c* and is capable of counting from "0" through "7." The HM counter normally contains a "0" therein, that is, each of the three flip-flops are in a reset condition. A "1" in the HM counter is produced by setting the HM*a* flip-flop while the remaining flip-flops are in a reset condition. For this condition, one of the AND gates coupled to the set and reset outputs of the three flip-flops will produce an HM1 signal which indicates that the HM counter contains a "1" count. This condition of the HM counter is utilized to transfer the multiplier in the active RA register into the storage S0 register. Conversely, when the HM counter contains a "2," the HM*b* flip-flop is set and the remaining flip-flops are reset and an HM2 signal is produced which is utilized to clear the RA register prior to any successive additions of the number in the passive RP register. A "3" is contained in the HM counter whenever the HM*a* and HM*b* flip-flops are set and the remaining flip-flop is reset. This condition of the counter is not utilized in performing addition; consequently, an AND gate is not provided for producing an HM3 signal. A "4" in the counter finds the HM*c* flip-flop set and the remaining flip-flops reset which causes an HM4 signal to be produced which causes the proper digit position of the number in the storage S0 register to be transferred into the M counter of FIG. 42. This digit, when transferred to the M counter, determines how many times to repeat adding the number in the passive RP register, A "5" in the counter finds the HM*b* flip-flop reset and the remaining flip-flops set which produces an HM5 signal which is utilized to add the number in the passive register a number of times controlled by the digit transferred to the M counter from the storage S0 register during the occurrence of a "4" in the HM counter. A "6" in the counter comprises the HM2 flip-flop being reset and the remaining flip-flops being set so as to produce an HM6 signal which causes the number appearing in the active RA register to be shifted. A "7" in the counter finds all three of the flip-flops set which produces an HM7 signal which is utilized to align the result of the multiplication around the decimal point.

FIGS. 72–1, 72–1A and 72–1B illustrate an operational chart, logic diagram and flow chart, respectively, for the phase of the multiplication instruction wherein the HM phase counter contains a "1," that is, when the multiplier in the active RA register is transferred to the storage S0 register. Reference to FIG. 72–1B shows that this instruction is accomplished by sequentially transferring each digit position of the active RA register into the storage S0 register. Reference to FIGS. 72–1 and 72–1A shows that the transfer from the active RA register to the storage S0 register is accomplished by having the RA and S0 registers comprise a cooperating pair of registers. Selection of the storage S0 register as one of the cooperating pair of registers is accomplished by the generation of a G3 pulse during the occurrence of the P4 pulse, which G3 pulse sets the Y flip-flop 68 of FIGS. 8 and 45. When set, this flip-flop enables the AND gate which has one of its inputs coupled to the set side of the flip-flop 68. When enabled, this AND gate has its output coupled to the storage switch SZ which activates the S0 register. The transfer is accomplished by sequentially transferring each digit of the active register to the corresponding digit position in the storage S0 register under the control of the digit D counter and by way of the A and B counters with the readout from the active RA register being nondestructive. Further, FIG. 72–1 shows that the occurrence of a P0 pulse during the performance of this phase causes a "1" to be set into the cycle C counter of FIG. 44. Once the transfer is completed, the occurrence of a P9 pulse enables the pulse gate which is coupled to the HM*a* flip-flop of the phase HM counter illustrated in FIG. 50. Since the phase counter HM contains a "1" therein, the HM*c* flip-flop is reset which enables one terminal of the AND gate 388. The other input terminals of this AND gate are enabled by the presence of the Y1 and Z1 signals. Enabling of the AND gate 388 enables one of the inputs to the AND gate 389, the other input of which is enabled by the occurrence of the D0 pulse which occurs after the transfer of the number betweeen the RA and S0 registers is complete. Activation of the AND gate 389 enables the pulse gate and steps the phase counter HM to a count of "2" upon the occurrence of the P9 pulse.

Figures 2A, 22:
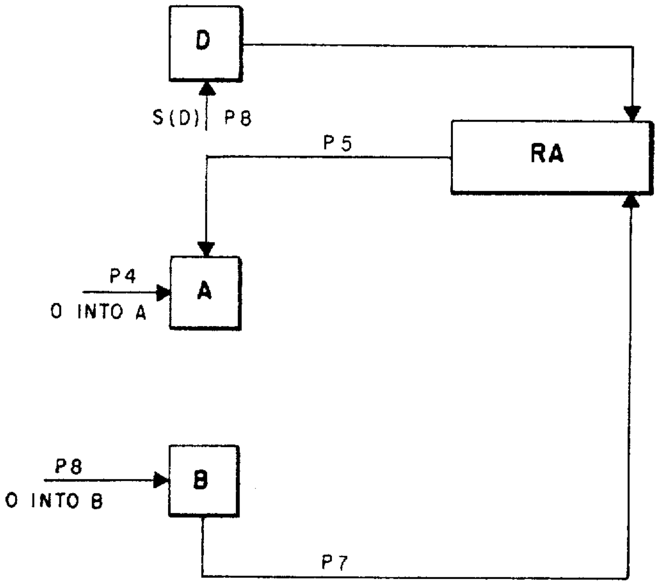
Figures 2B, 22:
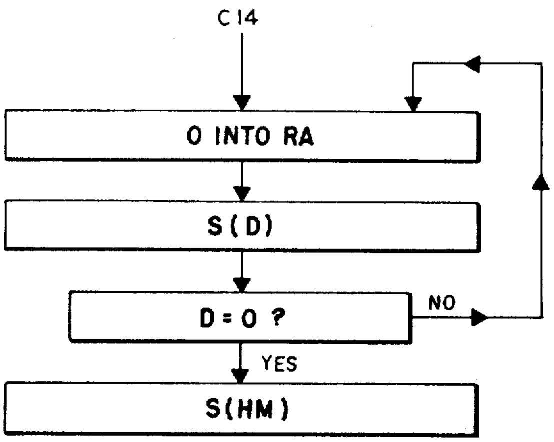

FIGS. 72–2, 72–2A and 72–2B illustrate an operational chart, logic diagram and flow chart, respectively, for the phase of the multiplication instruction wherein the HM phase counter contains a "2," that is, when the active RA register is cleared. FIG. 72–2B illustrates that this phase of the multiplication instruction is accomplished by sequentially setting each digit position of the active RA register to "0" under the control of the digit D counter. Comparison of FIGS. 72–2 and 65 will show that this phase of the multiplication instruction is substantially identical to the "clear the active register" instruction associated with the B16 hub of the instruction counter described above.

After the active register has been set to "0," the occurrence of a P9 pulse enables the pulse gate illustrated in FIG. 50, which has its output coupled to the HM*a* flip-flop of the phase HM counter. Since the phase HM counter contains a "2" therein, the HM*c* flip-flop is reset which, in conjunction with the Y1, Z1 and D0 signals, will cause the HM counter to be stepped to a count of "3" in a manner as described above. The count of "3" in the phase HM counter is not utilized in the multiplication instruction and the occurrence of the next P9 signal again enables the pulse gate coupled to the HM*a* flip-flop and causes the phase HM counter to again be stepped so that it now contains a count of "4."

FIGS. 72–3, 72–3A and 72–3B illustrate an operational chart, logic diagram and flow chart, respectively, for the phase of the multiplication instruction wherein the phase HM counter contains a "4,' that is, the transfer of a digit in the storage S0 register to the M counter, which digit controls the number of times a repeat addition need be performed. The digits are transferred from the storage S0 register to the M counter of FIG. 42 one at a time beginning with the least significant digit position and ending with the most significant digit position. This phase is performed one time, that is, one digit is transferred to the M counter, after which one or more other phases are performed before another phase four is repeated.

Figures 3A, 22:
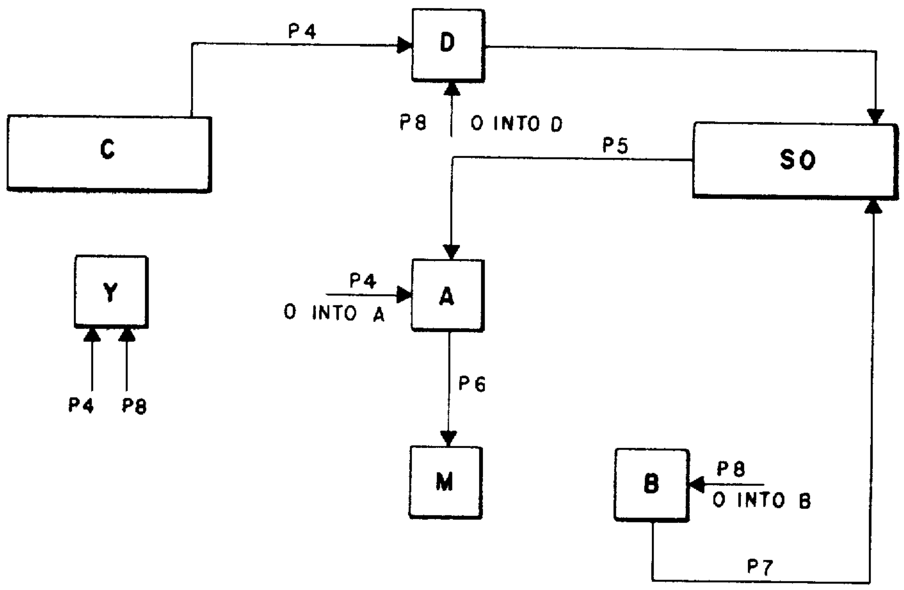
Figures 3B, 22:
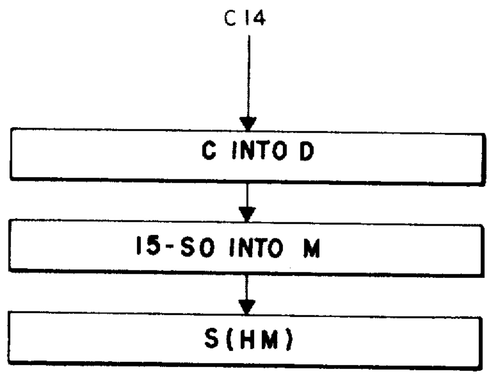
Figures 4A, 22:
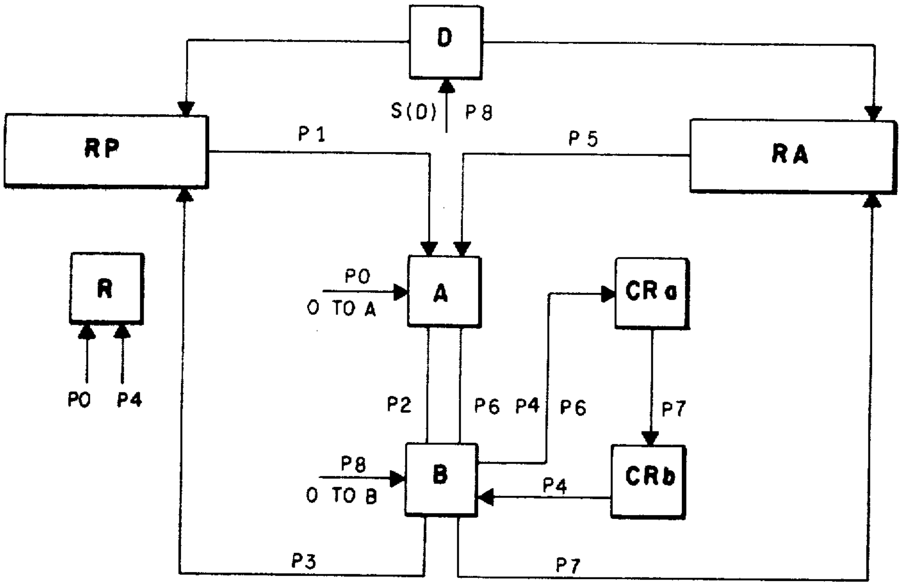
Figures 4B, 22:
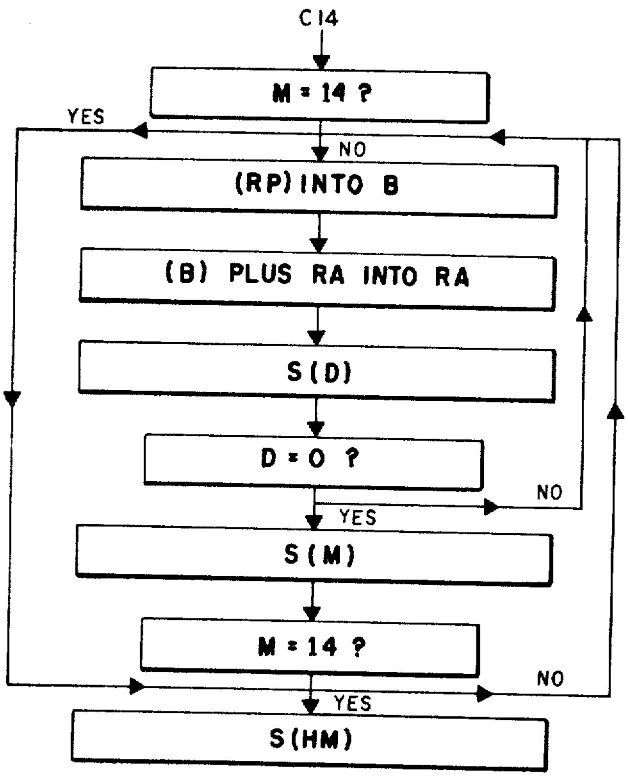
Figures 5A, 22:
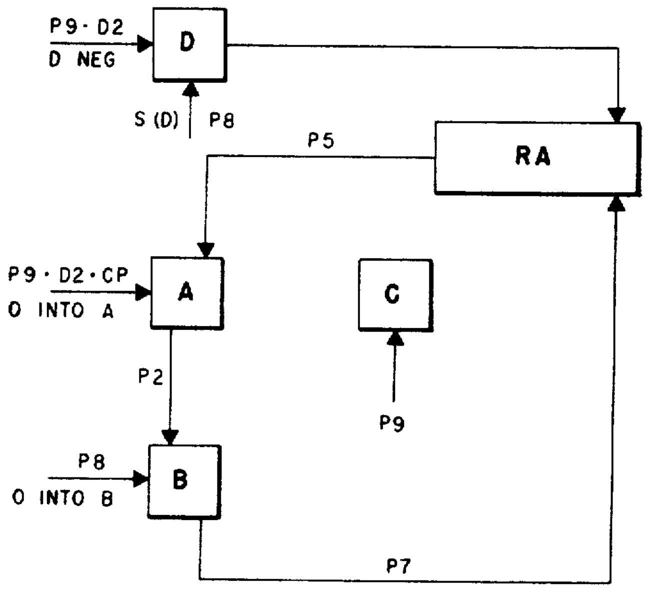

Reference to FIG. 72–3B shows that this phase of the multiplication instruction is accomplished by setting the count in the cycle C counter into the digit D counter. This causes the corresponding digit position of the storage S0 register to be transferred in to the M counter such that the M counter will contain the "15's" complement of the number transferred therein from the storage S0 register. More specifically, reference to FIGS. 72–3 and 72–3A shows that during the occurrence of the P4 pulse, a G8 signal transfers the contents of the C counter into the D counter. As described hereinabove in conjunction with transferring the contents of the active register to the storage S0 register, the C counter has previously been set to "1" during the performance of the phase associated with a count of "1" in the HM phase counter. Since the D counter contains a count of "1," the read operation, which takes place during the subsequently occurring P5 pulse, is from the first digit position D1 of the storage S0 register. Had the number transferred from the C counter into the digit D counter been greater than "1," the digit position read out of the storage S0 register during the occurrence of the P5 pulse would have been that digit position corresponding to the number set into the D counter. In other words, the digit position of the storage S0 register transferred to the M counter during the operation of this phase of the multiplication instruction is determined by the number transferred from the C counter into the D counter. The "15's" complement of the number, if any, in the A counter is transferred into the M counter of FIG. 42 by the occurrence of a G7 signal. This is accomplished by each flip-flop M*a*, M*b*, M*c* and M*d* comprising the M counter having its set side coupled to the set side of the corresponding flip-flops A*a*, A*b*, A*c* and A*d*, of the A counter by way of a gated A.C. input such that the gated A.C. input is enabled if, and only if, the corresponding flip-flop of the A counter is in a reset position. Accordingly, the occurrence of the G7 signal will set those flip-flops of the M counter whose corresponding flip-flops in the A counter are reset. As will be obvious to those skilled in the art, this results in the "15's" complement of the number in the A counter being set into the M counter by the occurrence of the G7 signal. FIGS. 72–3 and 72–3B show that the occurrence of the P8 pulse during this phase of the multiplication instruction causes the D counter to be set to "0" after the "15's" complement of the digit has been transferred into the M counter.

If a "0" was in the A counter at the time the G7 signal occurred, all of the flip-flops of the M counter (FIG. 42) would have been set, which results in the occurrence of an M15 signal. Reference to FIGS. 50 and 72–3 shows that an M15 signal at the time a count of "4" is contained in the phase HM counter sets the HM*b* flip-flop upon the occurrence of the P9 pulse to set a "6" into the HM phase counter, causing that phase to be performed and thereby skipping over the phase associated with a count of "5" in the phase HM counter. However, if the A counter contains something other than a "0," not all of the flip-flops of the M counter are reset, thereby producing an $\overline{M15}$ signal, as illustrated by FIGS. 50 and 72–3. The occurrence of a P9 pulse now enables the pulse gate coupled to the input of the HM2 flip-flop and a count of "4" in the HM phase counter together with the presence of $\overline{M15}$ signal steps the HM phase counter in a manner as described above so that it now contains a count of "5." As will now be clear, phase five is omitted whenever a "0" is in the corresponding digit position of the storage S0 register which makes the successive addition performed during phase five unnecessary. Accordingly, when it is not necessary to repeat add the number in the active register, the sixth phase, corresponding to a count of "6" in the HM phase counter, is directly stepped to from phase four.

FIGS. 72–4, 72–4A and 72–4B illustrate an operational chart, logic digaram and flow chart, respectively, for the phase of the multiplication instruction wherein the phase counter HM contains a "5," that is, where there is repeated addition of the number in the passive RP register. A comparison of FIGS. 72–4A and 63A will show that this phase of the multiplication instruction is similar to the add instruction associated with the B14 hub of the instruction patchboard. Prior to the first performance of this phase of the multiplication instruction, the active RA register contains a "0" due to the performance of the second phase of the multiplication instruction which took place when the HM phase counter contained a "2." Accordingly, the first performance of this phase merely results in the number in the passive register being transferred to the active RA register such that the same number will appear in both the active RA and passive RP registers. Unlike the add instruction, however, this phase is performed a number of times determined by the digit contained in the M counter which, as described above, is determined by the digit position in the multiplier appearing in the storage S0 register which is currently being looked at. Since the "15's" complement is transferred into the M counter, the sequence illustrated in FIGS. 72–4, 72–4A and 72–4B is repeated a number of times sufficient to cause the M counter of FIG. 42 to contain a count of "14" which results in the sequence being performed a number of times corresponding to the digit which was transferred from a digit position of the S0 storage register during the phase associated with a count of "4" in the HM phase counter. When the M counter reaches "14," the occurrence of a P9 pulse, a count of "0" in the digit D counter, and the count of "5" in the phase HM counter, results in the HM phase counter being stepped by way of the gated input coupled to the HM*a* flip-flop in a manner as described above, thereby causing the phase HM counter to contain a count of "6."

FIGS. 72–5, 72–5A and 72–5B illustrate an operational chart, logic diagram and flow chart, respectively, for the phase of the multiplication instruction wherein the phase HM counter contains a count of "6." This shift phase is performed once after each repeated addition phase, or when the repeated addition phase is skipped due to a "0" being transferred into the M counter. As described above, the electronic processor may have a left and right of decimal LRD setting of three places to the right of the decimal point and nine places to the left of the decimal point. Multiplication of two numbers each having three places to the right of the decimal point results in a product having six decimal places to the right of the decimal point. Since none of the registers have such a capacity, it is necessary that the result of the multiplication operation be shifted three times to the right, which results in the three excess digit positions being effectively erased by occurring outside of the capacity of the registers in the core memory. The nine places to the left of the decimal point require the result of multiplication appearing in the active register to be shifted around nine times, whereby, for each shift around the number in the least significant digit position of the RA register is caused to appear in the most significant digit position. In other words, the first three times repeat addition takes place, or a repeat addition phase is skipped, the number appearing in the active RA register is shifted one time to the right. Subsequently, after each repeated addition or passing over a repeated addition, the number appearing in the active RA register is shifted round one time.

How this is accomplished can be understood from a perusal of FIG. 72–5 which shows that when the first or least significant digit position is being looked at (the digit counter D contains a "1"), the number in the first digit position of the active RA register is transferred to the A counter due to the production of a G16 pulse at the time of the occurrence of the P5 pulse. Subsequently, the occurrence of a P8 pulse in conjunction with the H9 signal produces a G2 pulse which steps the digit counter D to a count of "2" which enables the subsequent occurrence of the P9 pulse to step the digit D counter to "12." If the cycle C counter of FIG. 44 contains a "1," "2" or "3," a CP signal is generated which, in conjunction with the P9 pulse, a "6" count in the HM counter, a "2" in the digit D counter, and the D negative flip-flop of FIG. 46 being reset will cause a "0" to be set into the A counter, thereby destroying the number previously transferred thereto from the first digit position of the active register. As described, the C counter was stepped to a count of "1" when the multiplier in the active RA register was transferred to the storage S0 register. Accordingly, the first time this phase is performed, a CP signal is generated which causes a "0" to be set into the A counter.

The next sequence of P pulses, P0 through P9, will cause the "twelfth" digit position D12 of the active RA register to be transferred to the "eleventh" digit position, the following sequence of P pulses causes the "eleventh" digit position to be transferred to the "tenth" digit position, etc. By performing this sequence once each time the digit counter is stepped down, the entire number in the active RA register is shifted one time to the right, causing the number which previously appeared in the least significant digit position D1 to be transferred or shifted out of the register. Once the single shift right has been completed, the occurrence of a P9 pulse, a "6" count in the HM phase counter and the digit counter D being at "0" causes the cycle counter C to be stepped up to a count of "2." Also, at the occurrence of this P9 pulse, an attempt is made to step the phase HM counter to "7." However, as long as the C counter of FIG. 44 does not contain a count of "12" a $\overline{C12}$ signal appears as one input to the AND gate of FIG. 50 which has its output coupled to the reset side of the HM*c* flip-flop by way of an inverter. Since a "6" is in the HM phase counter and the digit D counter has been counted down to "0," the other inputs of this AND gate are satisfied which resets the HM$c$ flip-flop at the same time that a "7" is being set into the HM phase counter. The presence of the $\overline{C12}$ signal causes the HM$c$ flip-flop to be reset but, however, does not prevent the HM$a$ and HM$b$ flip-flops from being set. As a result, the HM$a$ and HM$b$ flip-flops will be set and the HM$c$ flip-flop will be reset, which results in a "3" in the HM phase counter rather than a "7."

As will now be obvious, provision is made, if necessary, for repeat adding each of the twelve digit positions which may be in the multiplier, and a shift operation is also provided for each digit position. Until all twelve digit positions have been looked at and all twelve shift operations take place, the multiplication operation is such that completion of a shift operation results in the phase counter being set back to a count of "3" rather than being stepped to "7." After this operational phase is completed for each of the twelve possible digit positions, the C counter will then contain a count of "12" which will cause the $\overline{C12}$ signal to be absent. When this occurs, a "7" will be set into the HM counter, which enables the next phase to be carried out.

After the first three shifts to the right, the C counter of FIG. 44 will have been stepped so that it will contain a count greater than "3." Accordingly, when the next shift phase occurs, a CP signal will not be present which causes the first digit transferred into the A counter to remain in the A counter when the digit D counter is shifted from a count of "2" to a count of "12" and caused to count down. This results in the first digit position of the active register being placed in the most significant digit postion of the active register and comprises a shift round which will occur once for each of the next nine counts which can be contained in the C counter. As will be obvious to those skilled in the art, the number of times a shift right is performed and the number of times a shift round is performed is determined by the number of places to the left and right of decimal. That is, a shift right is performed a number of times as there are digits to the right of the decimal point in the active RA register and a shift round is performed a number of times equal to the number of digit positions to the left of the decimal point in the active register.

It is to be understood that the sequence set forth in FIG. 72–5 is repeated once for each of the twelve counts contained in the C counter and that for each such sequence the D counter is stepped from a "0" to a count of "2" and from there to a count of "12" and then is counted down from a count of "12" to a count of "0." After this, the C counter is stepped one time and a shift operation will not again occur until after a phase four or phase five operation.

FIGS. 72–6, 72–6A and 72–6B illustrate an operational chart, logic diagram and flow chart, respectively, for the phase of the multiplication instruction wherein the phase HM counter contains a "7." When the phase counter HM is stepped from a count of "6" to "7," multiplication has been completed and the product now appears in the active RA register. However, the answer or product in the active register is such that the most significant digit positions of the answer are located in the least significant digit positions of the active register. Accordingly, it is necessary to shift round the number in the active register a number of times so as to have the answer properly aligned around the decimal point. For a left and right of the decimal LRD pattern of 9.3, it is necessary to shift round three times to properly align the answer in the active register around the decimal point.

Figures 5B, 22:
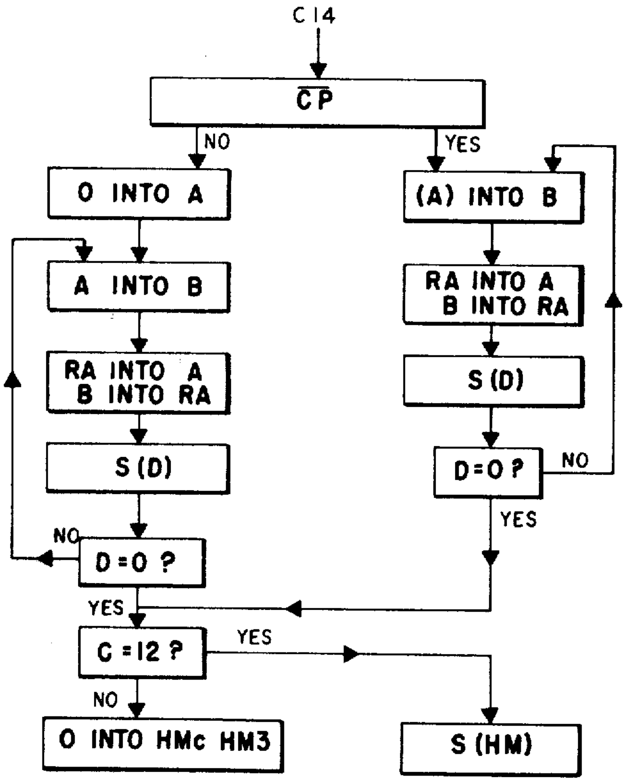
Figures 6A, 22:
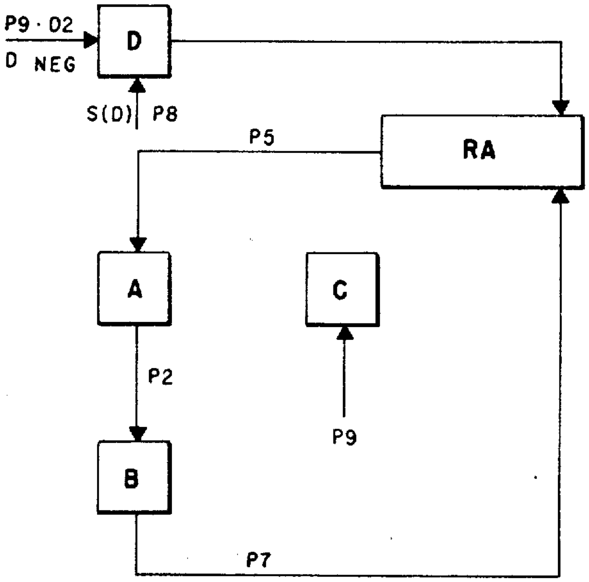
Figures 6B, 22:
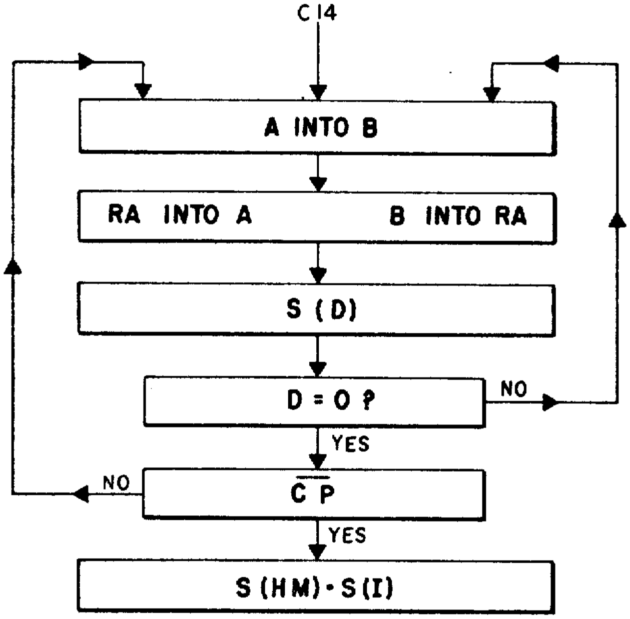

A perusal of FIGS. 72–6B and 72–5B will show that the shift round for a count of "7" in the phase counter is substantially similar to the shift round which occurs when a count of "6" is in the phase counter. FIG. 72–5 illustrates that the last shift round associated with a "6" in the phase HM counter results in the C counter being stepped from a count of "12" to a count of "1." Accordingly, the first shift round which takes place when the HM counter contains a "7" finds a count of "1" in the C counter. After the first shift round, the occurrence of a P9 pulse, a count of "7" in the phase HM counter, a count of "2" in the D counter and the D negative flip-flop being reset, causes the C counter to be stepped to a count of "2" as illustrated by FIG. 72–6. Accordingly, the second shift round will cause the C counter to be stepped to "3" and the third shift round will cause the C counter to be stepped to a count of "4." As shown by FIG. 44, when the C counter contains a count of "4," a $\overline{CP}$ signal is generated which (in conjunction with a count of "7" in the phase HM counter, a "0" in the digit D counter, and the occurence of a P9 pulse) will step the instruction counter S(I) to the next instruction which terminates the multiplication instruction.

In summary then, multiplication is performed by the electronic processor in six separate phases or steps which are controlled by the count in the phase or help multiply HM counter and multiplication comprises multiplying the number in the passive register RP by the number in the active RA register. The first phase is accomplished by a count of "1" in the HM phase counter which transfers the multiplier in the active RA register to the storage S0 register. The second phase corresponding to a count of "2" in the HM counter clears the active register. A count of "3" in the HM counter is not utilized in the multiplication operation. When the HM counter contains a "4," the least significant digit in the storage S0 register is transferred to the M counter and determines how many times the number in the active register is repeat added with the repeat adding taking place when a "5" is contained in the HM counter. After the repeat adding associated with a digit position transferred from the storage S0 register into the M counter is complete, a shift operation takes place corresponding to a "6" in the HM counter. A repeat adding and a subsequent shift takes place for each of the twelve possible digit positions in the storage S0 register with the repeat adding step being skipped whenever a "0" is transferred from a digit position of the storage S0 register to the M counter. However, even though the repeat adding step may be skipped, a shift takes place for each digit position in the storage S0 register, which shift corresponds to a count of "6" in the phase counter. The repeat adding and shifting causes the product of the multiplication to appear in the active register, however, the product therein must be properly aligned around the decimal point. This is accomplished when the HM counter contains a "7" which will shift round the number appearing in the active register a number of times sufficient to cause the product to be properly aligned around the decimal point which ends or terminates the multiplication instruction.

(11) RESET OF MANUALLY OPERATED KEYS AND SWITCHES

FIGS. 73, 74 and 75 are operational charts which describe the instructions which enable the electronic processor to automatically reset the program keys and manual selector switches at the end of a program line. Because of the nature of these instructions, no logic or flow diagrams are associated therewith. Reference to FIG. 73 shows that the manual selector switches A, B and C are returned to their normal position by resetting their associated flip-flops MSA, MSB and MSC, respectively. The occurrence of the first or P0 pulse sets the first release the manual selector switch RMS1 flip-flop of FIG. 54 and the occurrence of the subsequent P9 pulse will step the instruction I counter. However, since this instruction is the last instruction of the program line, the end of program line EPL flip-flop of FIG. 52B will be set. The occurrence of the EPL signal and the RMS1 flip-flop being set enables the AND gate 327 of FIG. 54 which causes an inverter coupled to the output of this AND gate to reset the MSA, MSB and MSC flip-flops to their normal condition which effectively releases any of the manual selector switches A, B and C which were previously selected. When each of these flip-flops MSA, MSB and MSC are reset, the AND gate having an input coupled to the reset output of each of these flip-flops is enabled which, in turn, will reset the RMS1 flip-flop to its normal condition. Also, the end of the program line EPL signal produces a pulse reset PR signal which will set various flip-flops and counters throughout the electronic processor to their normal conditions. FIG. 52B indicates the various figures to which this PR pulse is applied and reference to these figures will illustrate the various flip-flops, counters, etc., which are placed into their normal positions by the occurrence of the PR pulse.

FIG. 74 is the operational chart for the instruction which resets the manual selector switches X, Y and Z. Perusal of this chart shows that it is substantially similar to FIG. 73 except that the MSX, MSY and MSZ flip-flops are placed into their normal or reset condition by setting the second release manual selector switch RMS2 flip-flop of FIG. 54 on the occurrence of the P0 pulse.

FIG. 75 is the operational chart for the instruction which releases any one of the ten program keys which may be depressed and any of the six manual selector switches A, B, C, X, Y and Z which may be selected. Reference to the operational chart shows that the six manual selector switches are released by setting the RMS1 and RMS2 flip-flops in the manner as described above. The single program key which may be depressed or selected is released by first setting the release the program bank RPB flip-flop of FIG. 54. The occurrence of a P0 and X14 signal and the subsequent occurrence of the end of program line EPL signal enables the AND gate 325 of FIG. 54 which will disable any of the program code PCA amplifiers of FIG. 58 which were enabled by selection of one of the ten program keys.

(12) BLOCK AUTOMATIC TABULATION

As described above, in the absence of a selected program line, a depressed program key will cause the typewriter carriage to automatically tabulate until a position is reached wherein the depressed program key and field code combination will select a program line. If, during the performance of a program line it is desirable that the typewriter operator enter nonnumeric data, such as descriptive material, into the form being utilized, a block automatic tab BAT instruction is patched into the program line. Two such block automatic tab BAT instructions are illustrated by the operational charts of FIGS. 76 and 77, respectively. Reference to FIG. 76 shows that this instruction is accomplished by setting the first block automatic tab BAT1 flip-flop of FIG. 59 which disables the AND gate 351 to prevent the generation of an end of program line EPL signal. As is described below in conjunction with FIG. 91, the presence of an EPL signal is required in order for the typewriter to automatically tabulate. Accordingly, the absence of an EPL signal prevents automatic tabulation. Once the purpose of the block automatic tab instruction is completed, such as the completion of the typing of descriptive material onto an account-form utilized with the typewriter, subsequent typewriter carriage motion will activate the field switch FS11 to reset the BAT1 flip-flop and enables the next instruction, if any, to be performed. The block automatic tab instruction described by FIG. 77 is substantially similar to that illustrated by FIG. 76 except that the second block automatic tab BAT2 flip-flop and the field switch FS12 is utilized rather than the BAT1 flip-flop and the field switch FS11.

(13) AUTOMATIC DATE

The electronic processor is designed such that each day the current date can be stored in one of the nine storage registers $S_1$ through $S_9$, such as the storage register $S_7$, and a program line patched such that the electronic processor will automatically type out the date. The date comprises three pairs of two digit positions which provide two digit positions for the month, day and year, respectively. For example, two digit positions are available for identifying the month, two digit positions are available for identifying the day, and two digit positions are available for identifying the year. The first or month pair of digits is separated from the second or day pair of digits and the third or year pair of digits is separated from the day pair of digits by a dash, space, or period, or, if desired, a slash. Since three pairs of two digit positions are required, six of the twelve digit positions of the $S_7$ storage register are utilized for storing the date. Since the storage registers do not store spaces, dashes, periods, etc., provision must be made for causing the typewriter to produce these at the appropriate place between the pairs of digits.

The D7 through D12 digit positions of the $S_7$ storage register are utilized for storing the digits of the date and are read out beginning at the D12 digit position and ending with the D7 position. That is, the left and right LR number length of the date in the $S_7$ storage register extends from the "twelfth" to the "seventh" digit position. If the first digit of any of the pairs of digits is a "0," a space is typed instead of a "0." However, when the first digit of each pair of digits is a number other than "0," the next or second digit, if a "0," will be typed as a "0." For example, the tenth day, of the tenth month, of the sixtieth year, would be typed out as follows: 10–10–60. Whereas, the first day of the first month of the sixtieth year would be typed out as follows: 1–1–60.

Figure 78A:
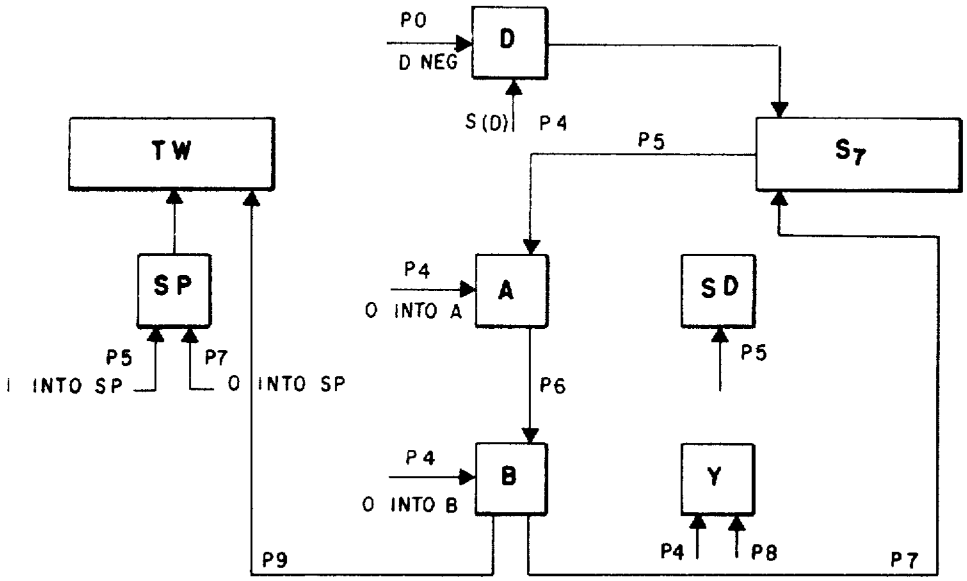
Figure 78B:
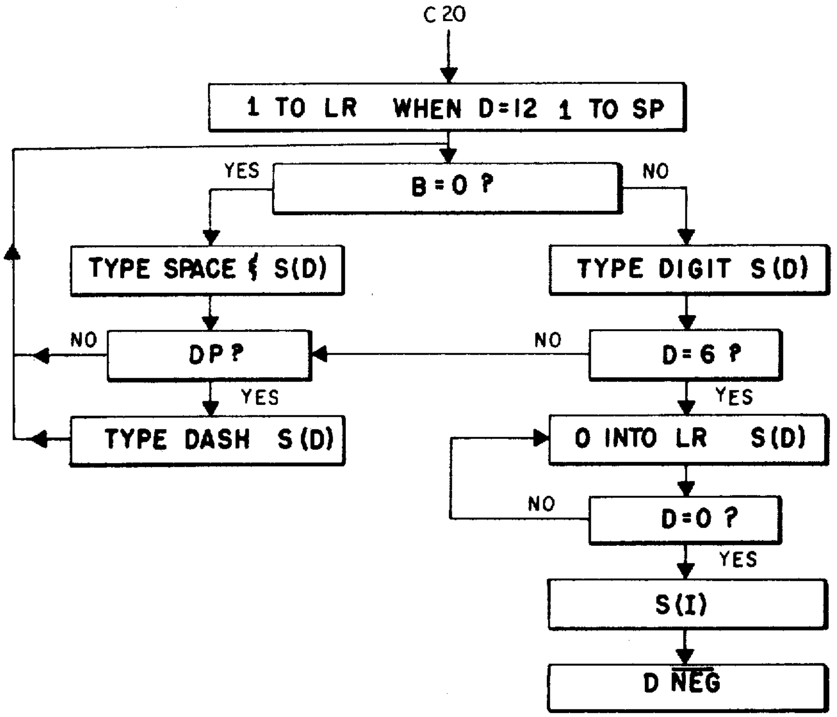

FIGS. 78–1 through 78–7 constitute an operational chart for the automatic date instruction, whereas FIGS. 78A and 78B constitute a logic diagram and flow chart, respectively, for the automatic date instruction. Reference to FIG. 78A shows that this instruction is accomplished by counting the digit D counter down and successfully transferring the information in the $S_7$ storage register digit positions to the A counter and then from the A counter to the B counter. The number or digit in the B counter is typed out by the typewriter TW. However, the typewriter produces a space whenever the space SP flip-flop of FIG. 52A is set and will type a "0" whenever the space SP flip-flop is reset. To enable dashes to be produced by the typewriter TW between the pairs of digits, the SD flip-flop is switched which, in turn, prevents stepping of the digit D counter until the SD flip-flop is again switched.

Reference to the flow diagram of FIG. 78B shows that when the number field is entered by the digit counter D being stepped to "12," the LR flip-flop is set to "1" and the space SP flip-flop is set. If the first digit is a "0," a space is typed and the digit counter is stepped to look at the next digit. If the DP flip-flop is set, a dash will be typed. However, the DP flip-flop is set only after the second digit of each pair of digits is typed so that the numbers representing the day, month and year are separated by a dash. If the number transferred to the B counter is something other than "0," then the typewriter is caused to type that digit. If the number transferred to the B counter is a "0" and is the second digit in the pair, a "0" is typed. When the digit D counter has counted down to "6," the LR flip-flop is reset which indicates that the number field of interest has ended. Accordingly, no more numerals or spaces will be produced by the typewriter. Rather, the digit counter D will now count down to "0" after which the instruction counter is stepped S(I) so as to cause the next instruction to be performed.

Reference to FIG. 78–1 shows that the LR flip-flop of FIG. 53 is set when the digit counter D contains a "12" (D12). During the occurrence of a P5 pulse, a count of "12" in the digit D counter produces an H4 signal which, in turn, produces a G4 signal which will set the space SP flip-flop. If the number transferred from the "twelfth" digit position of the $S_7$ storage register is other than a "0," then the B counter of FIG. 43 produces an H0 signal which causes the space SP flip-flop of FIG. 52A to be reset which will prevent the typewriter from producing a space for this digit position. The occurrence of a P9 pulse together with an LR signal sets the start-stop SS flip-flop which disables the free-running multivibrator MV of FIG. 59 so that no more P pulses are produced. That is, the P9 pulse will have length which is sufficient for the typewriter to type out a number or space. Reference to FIG. 78–2 shows that if the space SP flip-flop is not reset by a number being placed in the B counter, the typewriter is caused to produce a space. However, if the space SP flip-flop is reset by a number other than "0" being transferred to the B counter, that number will be caused to be typed out by the typewriter after which the digit counter D is stepped to "11." The sequence set forth on FIGS. 78–1 and 78–2 is repeated except that since the D counter no longer contains a "12," a G4 signal is not produced and, accordingly, the space SP flip-flop will not be set. When not set, the transfer of a "0" into the B counter will cause the typewriter TW to type out a "0" rather than to produce a space.

For purposes of illustration only, FIGS. 78–1 through 78–7 illustrate a date of November 1, 1911, or 11–1–11.

After the first two digit positions have been looked at, the digit counter contains a count of "11" and a dash will now be produced in a manner as described by FIG. 78–3 which shows that a G2 signal will be generated which steps the digit counter S(D) to a count of "10." A subsequently occurring G5 pulse will step the sense decimal S(SD) flip-flop which will prevent the digit counter D from being stepped by the next sequence of P pulses, P0 through P9. Although a number corresponding to the "tenth" digit position D10 of the $S_7$ storage register will be transferred into the B counter due to the operations illustrated in FIG. 78–3, a dash rather than this number in the B counter will be produced by the typewriter. This is so because during the occurrence of the P9 pulse, the presence of a P*t* signal will disable the AND gate 263 of FIG. 43 which prevents the number in the B counter from being transferred to the output lines which activate the numeric keys of the typewriter TW.

At this point the first two digits representing the month, and the dash which separates the two digits of the month from the two digit positions of the day has been produced by the typewriter. Reference to FIG. 78–4 shows that the next group of P pulses causes the "tenth" digit position D10 of the storage register $S_7$ to be transferred into the B counter. The occurrence of a P4 pulse will not generate a G2 signal to step the D counter for the first group of P pulses because, as described above, the SD flip-flop has been set which causes the $\overline{SD}$ signal to go to a logic ZERO level which prevents the generation of an H3 signal by the H signal generator. During the occurrence of a P5 pulse, however, a G5 pulse is produced which resets the SD flip-flop thereby causing the $\overline{SD}$ signal to become a logic ONE to enable the digit D counter to be stepped by the next occurrence of a P4 pulse which produces a G2 signal. The P5 pulse of the first group of P0 through P9 pulses, which occur after the typewriter produces the dash, will produce a G4 pulse which sets the space SP flip-flop. If the number transferred from the "tenth" digit position of the storage register $S_7$ to the B counter is a digit other than "0," then the occurrence of a P7 pulse produces a G1 signal which resets the space SP flip-flop. The subsequently occurring P9 pulse will then cause the typewriter to type out the number in the B counter. As discussed above, for purposes of illustration only, FIG. 78–4 describes the typing of the numeral "1." If the B counter contained a "0," the occurrence of a P7 pulse does not produce a G1 signal to reset the space SP flip-flop so that the subsequent occurrence of a P9 pulse will cause the typewriter to produce a space.

At this point, the first digit position of the day pair of digits has been produced as a space or a numeral other than "0." The second digit position is produced by the typewriter by repeating the sequence illustrated in FIGS. 78–4. The P4 pulse of the next group of P pulses, P0 through P9, will produce a G2 pulse which steps the digit D counter to a count of "9" since the occurrence of the previous P5 pulse stepped the SD flip-flop back to its reset condition. The "ninth" digit position D9 of the $S_7$ register is now transferred to the B counter. Since the D, or digit counter, now contains a count of "9," a G4 pulse is not produced. Therefore, the space SP flip-flop is not set during the occurrence of a P5 pulse. Accordingly, if a "0" is transferred into the B counter from the $S_7$ storage register for this sequence of P pulses, the typewriter will be caused to produce a "0" rather than a space by the subsequently occurring P9 pulse. It is clear then, that the second digit position of each of the three pairs of digits which comprise the date will always be a numeral whereas the first digit of each of the three pairs of digits may be a space when the corresponding digit position of the $S_7$ register contains a "0." The next dash and two digit positions corresponding to the year are produced in a manner as described by FIGS. 78–5 and 78–6, respectively, and which are substantially identical to FIGS. 78–4 and 78–5 and, accordingly, need not be described again. When the second digit corresponding to the year is typed by the typewriter, the digit D counter will have a count of "7" therein.

As illustrated by FIG. 78–7, the next group of P pulses after the automatic date has been completely produced by the typewriter causes the digit D counter to be stepped to "6" and the sixth digit D6 position of the $S_7$ register is transferred to the B counter and from the B counter back to the "sixth" digit position of the storage register $S_7$. This sequence is repeated until the digit D counter is counted down to "0" at which time the occurrence of a P9 pulse causes the instruction counter to be stepped S(I) thereby causing the electronic processor to perform the next instruction of the program line. Also, the occurrence of the P9 pulse at the time the digit D counter contains a "0" will reset the D negative flip-flop of FIG. 46 which enables the D counter to be counted up.

(14) SWITCH REGISTERS (INVERT)

FIG. 79 illustrates an operational chart for the instruction which steps the flip-flop R which interchanges the activity and passivity of the cooperating pair of registers $R_1$ and $R_2$. The R flip-flop is identified in FIGS. 8 and 45 by the reference character 67. Because of the simplicity of this instruction, no logic diagram or flow chart is associated with the operational chart of FIG. 79. As described above, a B16 instruction clears the active register but will not function to clear the passive register. Accordingly, when it is desirable to clear both the active and passive registers $R_1$ and $R_2$, a B16 instruction is patched which clears the active register after which step the R flip-flop instruction is performed which reverses the activity and passivity of the $R_1$ and $R_2$ registers which, if followed by another B16 instruction, will clear the register which is now active and which was passive when the first B16 instruction was performed. In this manner, both the $R_1$ and $R_2$ registers are cleared.

Reference to FIG. 79 shows that this instruction produces Y1 and Z8 signal levels which produce an H13 signal which, upon the occurrence of the P0 pulse, will produce a G12 pulse. This G12 pulse is applied to the R flip-flop 67 and switches this flip-flop to a state opposite to that to which it was in prior to the occurrence of the G12 pulse and, in a manner as described hereinabove, interchanges the activity and passivity of the $R_1$ and $R_2$ registers. The occurrence of the P9 pulse will step the instruction counter S(I) thereby causing the electronic processor to perform the next instruction on the program line.

(15) NEGATIVE NUMBER TEST

Figure 80A:
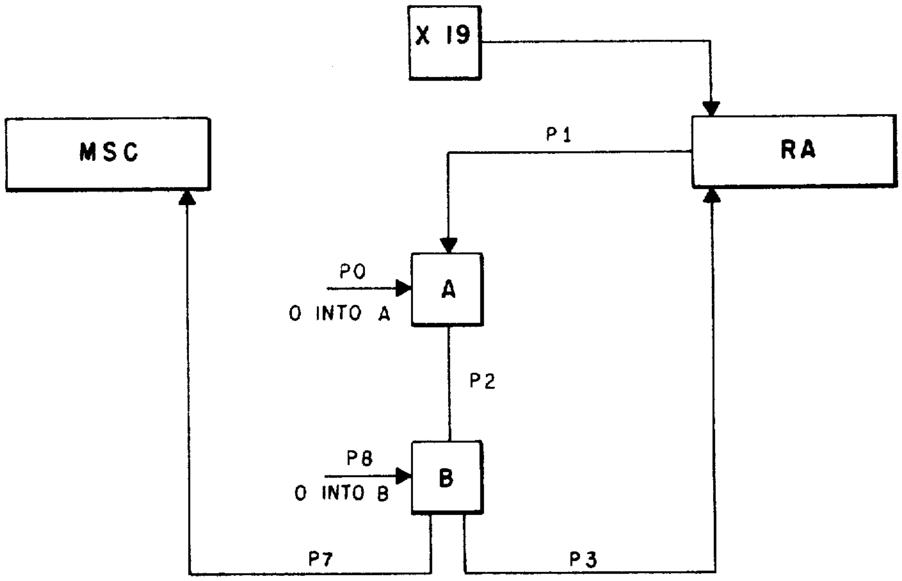
Figure 80B:
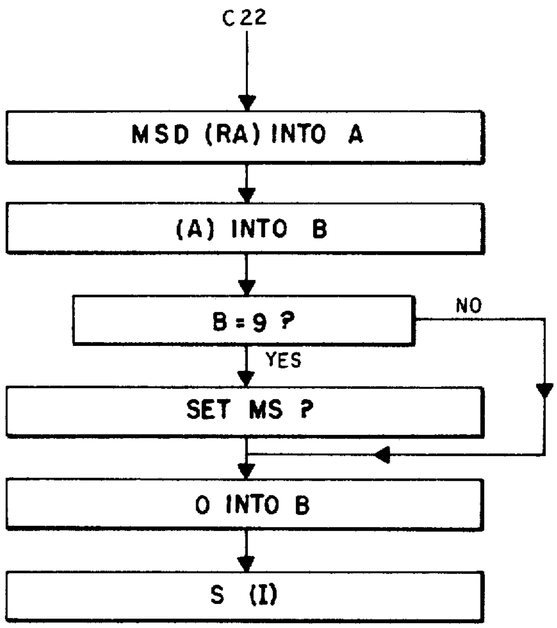

FIGS. 80, 80A and 80B illustrate an operational chart, logic diagram and flow chart, respectively, for the instruction which checks to see if a negative number is present in the active RA register and when such a negative number is present, causes one of the manual selector flip-flops be set. In accordance with a preferred embodiment of this invention, a negative number in the active RA register sets the manual selector MSC flip-flop. This instruction is utilized in patching various operations, such as a division operation, where it is desirable to check for the presence of a negative number. The presence of a negative number in the active RA register is denoted by the presence of a "9" in the most significant digit position of the active register.

Reference to FIG. 80B shows that this instruction is accomplished by transferring the most significant digit MSD position D12 of the active register into the B counter by way of the A counter. If the number now in the B counter is a "9," the appropriate manual selector flip-flop is set and if the number now in the B counter is not a "9," the B counter is cleared and the instruction counter is stepped S(I) so that the next instruction of the program line will be performed.

Reference to FIGS. 80 and 80A shows that the readout from the most significant digit position of the active register during the occurrence of the P1 pulse is nondestructive because this number is read back into the most significant digit position of the active register during the occurrence of the subsequently occurring P3 pulse. Also, the occurrence of the number "9" in the B counter is denoted by the B*a* and B*d* flip-flops of the B counter of FIG. 43 being set and the remaining flip-flops being reset. Whenever the hub C22 is activated, it produces a Y1 and Z9 signal which results in an X19 signal. Reference to FIG. 54 shows that the AND gate 329 is enabled whenever the B*a* and B*d* flip-flops of the B counter are set, the X19 signal is present and the P7 pulse occurs. When these conditions are met, enabling of the AND gate 329 sets the manual selector C flip-flop. The subsequently occurring P9 pulse will, in conjunction with the other signals indicated by FIG. 80, step the instruction counter S(I).

(16) INPUT

Figure 81B:
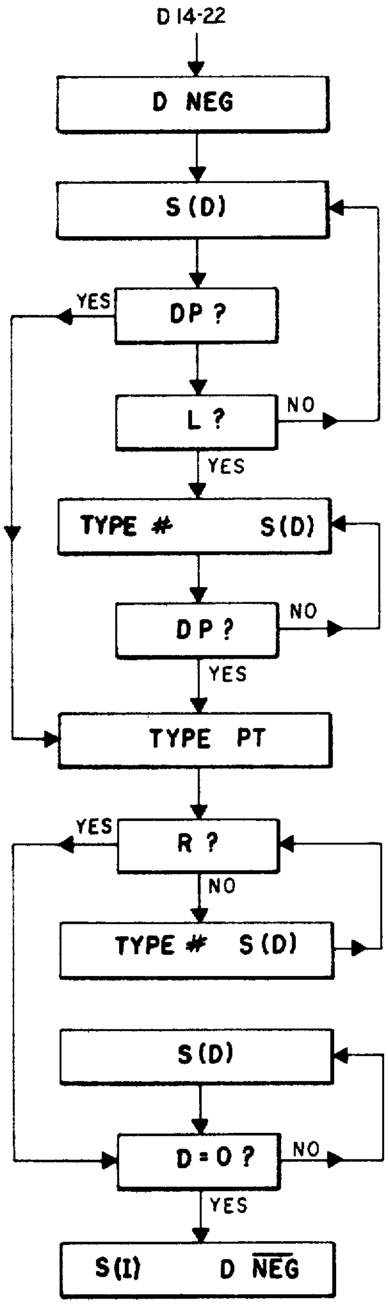
Figure 81A:
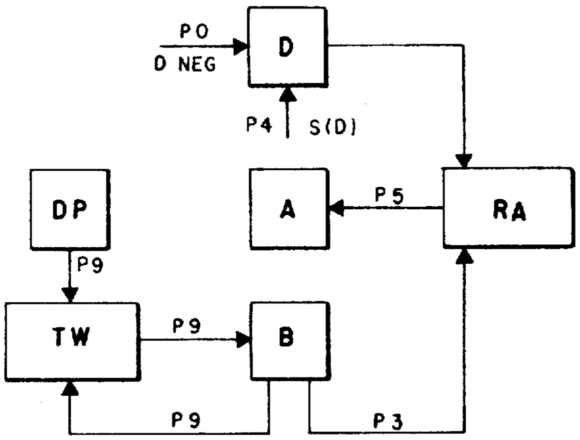
Figure 81B:
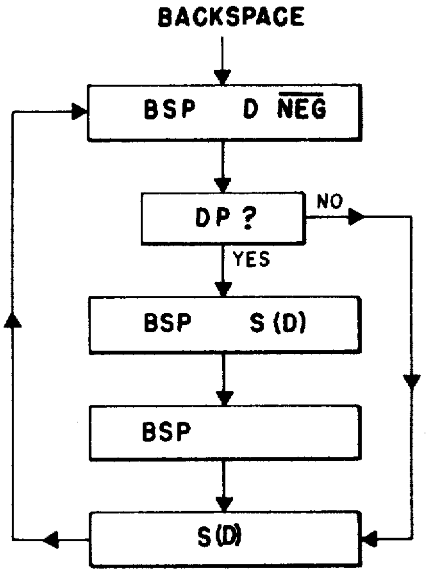

FIGS. 81-1 through 81-7 constitute an operational chart for the instruction wherein a number is entered into the active register RA from the typewriter TW keyboard. Flow charts for this instruction are illustrated by FIGS. 81B and 81B' and a logic diagram for this instruction is illustrated by FIG. 81A. As described above, a number entered into the electronic processor has a predetermined number field which is determined by the number of the "twelve" available digit positions which are utilized. For example, the number field may contain four digit positions which may be located as desired with regard to the decimal point which, as described above, is located between the "third" and "fourth" digit positions. Accordingly, as indicated by FIG. 81-1 this instruction can be accomplished by patching any one of the several hubs D14 through D22. This particular hub selected is determined by the desired number field which has been patched to each of the various hubs. For example, each of the hubs D14 through D22, when activated, produces a separate Z signal, Z1 through Z9. Each of these Z signals can be patched in a manner as described hereinabove in conjunction with FIG. 53 to produce a separate and distinct number field, or left and right of decimal pattern. Since each hub produces a different Z signal and since each Z signal may be patched to produce a different number field, which of the nine hubs D14 through D22 are patched to produce this instruction is determined by the desired number field.

For purposes of illustration only, the operational charts illustrated in FIGS. 81-1 through 81-7 describe a number field comprising two digits to the left and two digits to the right of the decimal point. That is, the digit positions D5, D4, D3 and D2 are utilized, with the digit position D5 being the most significant digit position and the digit position D2 being the least significant digit position. Also, for purposes of illustration only, FIGS. 81-1 through 81-5 illustrate entering the number "1.11" from the typewriter TW keyboard into the core memory. The operator of the machine comprising the instant invention is not required to enter a number of digits equal to the number of digits in the selected number field. However, in order to properly locate the individual digits of the number being entered into the active RA register, the operator must depress the space bar where a digit is absent. For example, assume that the number field has four digits to the left of the decimal point and that it is desired to enter the number "333." To properly locate this number with respect to the decimal point, the operator first depresses the space bar and then successively depresses the number "3" digit key three times. Accordingly, the total depressions of the space and digit keys will total the number of digit positions in the particular number field. Also, if the number field contains digit positions both to the left and right of the decimal point, the electronic processor will automatically type the decimal point without the aid of the operator in a manner as described hereinbelow.

Reference to FIG. 81A shows that this instruction is accomplished by counting the digit D counter down, in other words, entering the most significant digit first. Depression of a typewriter TW numeric key causes the digit associated therewith to be transferred into the B counter, during the occurrence of the P9 pulse. Also during the occurrence of the P9 pulse, the number transferred into the B counter is caused to be typed by the typewriter TW under the control of the electronic processor. During the subsequently occurring P3 pulse, the number previously entered into the B counter during the occurrence of the previous P9 pulse is transferred to the appropriate digit position of the active RA register. Further, when the decimal point DP is reached, the electronic processor will automatically cause the typewriter to type the decimal point.

Reference to FIG. 81B shows that this instruction is accomplished by setting the D negative flip-flop which enables the D counter to be counted down. The digit D counter is counted down until the left L portion of the number field is reached, after which the first digit is entered from the typewriter keyboard. If the decimal point DP is reached prior to the left L portion of the number field, the decimal point will be automatically produced by the typewriter TW under the control of the electronic processor. After the left L termination of the number field has been made, the digits continue to be entered and the digit D counter stepped until the right R termination of the number field is made after which no further digits from the typewriter are entered and the digit D counter is counted down to "0" and the instruction counter S(I) is stepped to cause the next instruction to be performed by the electronic processor.

Reference to FIG. 81-1 will show that the occurrence of the P0 pulse generates a G12 pulse which will step the R flip-flop S(R) and interchange the activity and passivity of the cooperating pair of registers $R_1$ and $R_2$. That is, prior to the entry of a number from the typewriter into the storage registers the active and passive registers are interchanged. Also during the occurrence of the P0 pulse, a G6 signal is generated which sets the D negative flip-flop which enables the digit D counter to count down. The digit counter is counted down until the first, or most significant, digit position of the number field is reached. For purposes of illustration only, this digit position is described in FIG. 81-1 as being the "fifth" D5 digit position. For a number field having two digit positions to the left and right of the decimal, the Z signal associated with this instruction is patched to the terminal F36 of FIG. 53. Accordingly, the presence of a "5" in the digit counter, together with the Z signal which is coupled to the terminal F36, enables the AND gate 314, the output of which is an L signal which denotes that the left portion of the number field has been reached. This L signal, together with a Y2 or Y3 ($Y2+3$) signal, and the presence of a $\overline{X17}$ signal sets the left and right of decimal LR flip-flop. When set the LR flip-flop denotes that the count in the digit counter corresponds to a digit that is within the number field.

The occurrence of the subsequent P9 pulse together with the LR signal sets the start-stop SS flip-flop which, in turn, disables the free-running multivibrator MV of FIG. 59 which prevents any further P pulses from being generated. Also, the occurrence of a P9 pulse enables a ONE to be set into the input IP flip-flop which enables the electronic processor to receive an input from the keyboard of the typewriter. Assuming now for purposes of illustration that the number "1.11" is to be entered into the active RA register, the operator will now depress the space bar of the typewriter inasmuch as no digit or number is to be entered in the "fifth" D5 digit position. FIG. 81-2 shows that operation of the space bar produces a KSP signal which resets the AR flip-flop of FIG. 52A and fires the one-shot OSHC circuit of FIG. 52B. When fired, the one-shot OSHC circuit, in conjunction with the KSP signal, sets the space SP flip-flop which prevents any number which may be in the B counter of FIG. 43 from appearing as an output and causes the typewriter carriage to space one time. When the typewriter performs the space operation, the OK flip-flop of FIG. 52B is reset for a period of time which is at least sufficient to enable the space function to be completely performed. After the OK flip-flop times out by becoming set, the start-stop SS flip-flop resets which restarts the free-running multivibrator MV to again cause the generation of P pulses. The next occurring P4 pulse will step the digit D counter down to a count of "4" and the next P9 pulse will, in a manner as described above, set the start-stop SS flip-flop to prevent the generation of any further P pulses and set the input IP flip-flop to again enable the electronic processor to receive an input from the keyboard of the typewriter. For purposes of illustration only, suppose that the key corresponding to the numeral "1" on the typewriter is now depressed. As shown by FIG. 81-3 this produces a K1 signal which is applied to a diode matrix (FIG. 62) which converts this signal into a four bit binary form. This four bit binary representing the numeral or digit "1" is applied to the four flip-flops comprising the B counter of FIG. 43 so as to set the B counter to "1" by setting the B*a* flip-flop of the B counter while the remaining flip-flops remain reset.

Entry of the "1" into the B counter also causes the one-shot OSHC circuit to be fired which, after the entry of the number is complete, will time out to set the output OP flip-flop and reset the input IP flip-flop which enables the electronic processor to cause the typewriter to type out the number which has just been entered into the B counter. Since the input IP flip-flop is no longer set, the output lines from the B counter can be activated. This, in turn, will enable the solenoid illustrated in FIG. 62 which will actuate the type bar of the typewriter which will produce or type the numeral or digit "1." Typing of the digit will cause the ribbon RIBB line to reset the OK flip-flop. When the type bar falls back from the typewriter platen the ribbon RIBB contacts will open causing the OK flip-flop to time out or again be set, which resets the start-stop SS flip-flop to again cause P pulses to be produced.

The subsequently occurring P pulses step the digit counter to "3" as shown by FIG. 81-3. Reference to FIG. 53 shows that stepping the digit D counter from D4 to D3 crosses the decimal point which is located between the "third" and "fourth" digit positions and results in the generation of a decimal point DP signal which, in conjunction with an H2 signal, will step the sense decimal point flip-flop SD so as to produce a decimal point P*t* signal. When set, the SD flip-flop will prevent the digit counter D from being stepped until the SD flip-flop is again reset. Further, as illustrated by FIG. 81-3 the occurrence of the P*t* signal causes the typewriter to type a decimal point. It is clear then that the operator merely enters the numbers and the decimal point is automatically typed by the typewriter under the control of the electronic processor. After the decimal point has been typed, P pulses are again generated by resetting the start-stop SS flip-flop after which the SD flip-flop is reset which will enable the digit D counter to be stepped down. The next occurring P9 pulse sets the SS flip-flop to again prevent generation of P pulses and sets the input IP flip-flop to enable the electronic processor to receive the next digit from the typewriter keyboard. The next two digits are entered from the typewriter keyboard in a manner as described by FIGS. 81-4 and 81-5 which are substantially similar to the way the first two digits were entered as illustrated by FIGS. 81-1 and 81-2. However, reference to FIG. 81-5 shows that when the digit counter is counted down to "1," an R signal is generated which denotes that the right side or the end of the number field has been reached. This results in the LR flip-flop being reset which denotes that the digit position represented by the count in the digit counter is outside of the desired number field. When this occurs the digit counter is counted down to "0" after which the instruction counter is stepped S(I) to activate the next instruction.

If the operator makes an error in entering a number into the storage register by depressing the wrong numeral or digit key, the error can be corrected by depressing the backspace key and then activating the correct digit or number key. If the error was made when entering the digit just to the left of the decimal point, the decimal point subsequently will be automatically produced by the typewriter after which the typewriter carriage will be in a position to type the first digit to the right of the decimal point. Accordingly, to properly position the typewriter carriage so that the digit entered just before the decimal point can be corrected, two backspaces must be produced. For any other correction, however, only one backspace need take place.

FIG. 81-6 is an operational chart where the correction is made by backspacing one time and FIG. 81-7 is an operational chart where the correction is made by backspacing twice, that is, where the correction must be made to the digit that was entered just prior to the decimal point and so the backspacing is over the decimal point. FIG. 81B′ illustrates a flow diagram for the backspace operation which corrects digits erroneously entered into the active RA register, and illustrates that the error correcting function is performed by depressing the backspace BSP key which resets the D negative flip-flop which, in turn, enables the D counter to count up. If the backspacing does not cross the decimal point DP, the digit counter is stepped S(D) and the correct digit entered. However, if the decimal point DP is crossed, two backspaces occur before the digit counter is stepped S(D) and the correct digit entered.

Reference to FIG. 81-6 shows that when only one backspace is necessary, the correction is accomplished by backspacing one time, stepping the digit counter up one time, clearing out the digit which was erroneously entered in the B counter by setting the B counter to "0," and then entering the correct digit in a manner as described above. Reference to FIG. 81-7 shows that when the operator backspaces over the decimal point, a second backspace is required after which the D counter is stepped up, the B counter set to "0" and the correct digit entered into the appropriate digit position.

(17) OUTPUT

FIGS. 82–1 through 82–7 constitute an operational chart for the readout instruction wherein a number in the active RA register is typed out by the typewriter TW. FIG. 82A is a logic diagram of this instruction and FIG. 82B is a flow chart of this instruction. Referring now to FIG. 82A it is shown that this instruction is performed by counting the digit D counter down which results in the most significant digits being typed first. Each digit position of the active RA register is transferred to the B counter by way of the A counter and then caused to actuate the appropriate solenoids of the typewriter in a manner as described hereinabove. If the most significant digit positions of the number being read out are "0's" the typewriter will produce spaces. However, once a digit position is reached which contains a digit "1" through "9," the following digit positions which contain "0's" will be typed out as "0's."

Figure 82A:
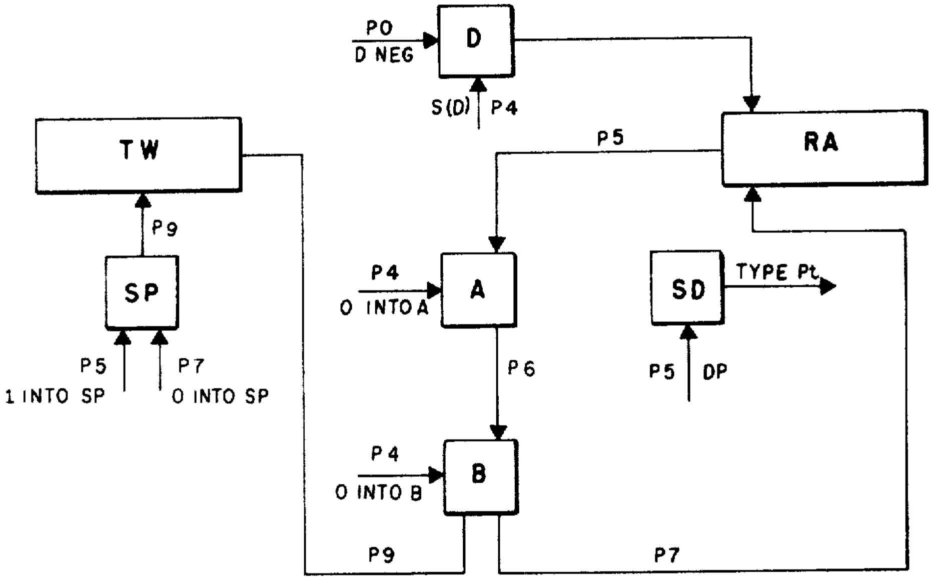
Figure 82B:
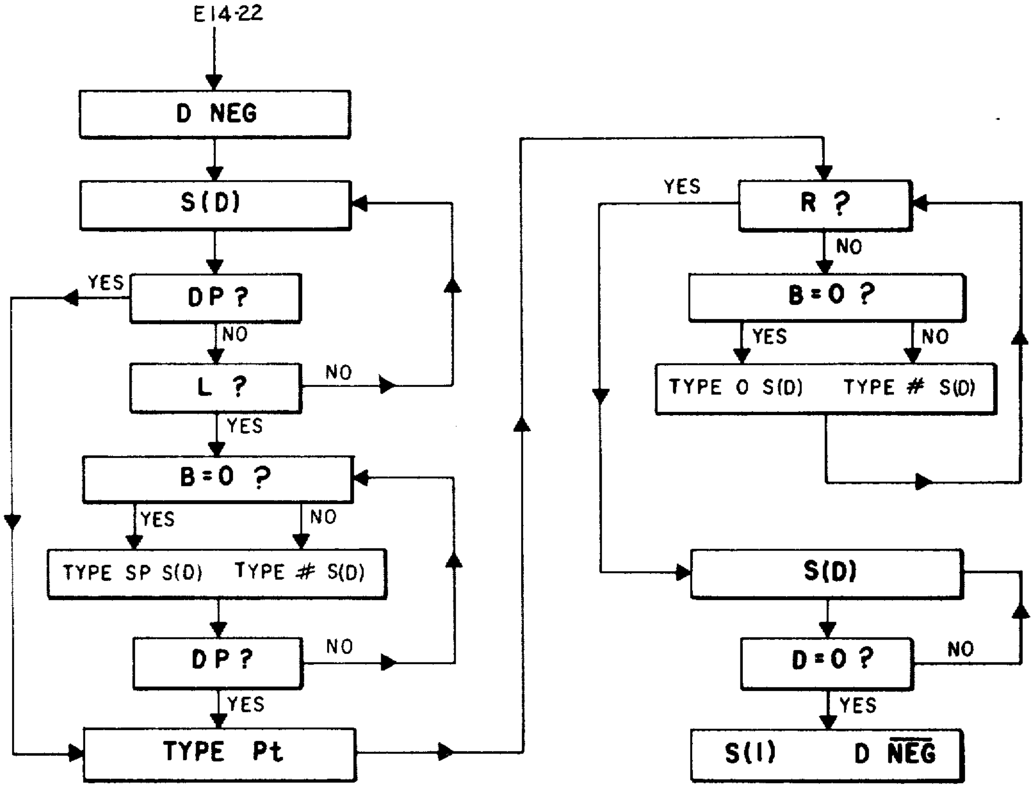

Referring now to the flow chart of FIG. 82B it is shown that this instruction sets the D negative flip-flop to cause the D, or digit counter, to count down. The digit counter is counted down until the decimal point or the left L determination of the number field is reached. If the decimal point is crossed prior to reaching the left L side of the number field, the decimal point will be typed to properly position and locate the number with reference to the decimal point. The most significant digit positions of the number which contains "0's" cause the typewriter to space rather than to type "0's." Also, if the decimal point is contained within the number field, it is automatically typed at the proper position by the electronic processor. The digit D counter is stepped down as each of the digits of the number field are typed out until the right R determination of the number field is reached, after which no further digits are typed by the typewriter and the digit counter D is stepped to "0" after which the instruction counter is stepped S(I).

As will now be apparent, the accomplishment of the output instruction is similar in many ways to the input instruction. Accordingly, the operational chart for this instruction illustrated by FIGS. 82–1 through 82–7 will not be described except to point out that the operational charts describe an output for a number field having two digit positions to the left and right of the decimal point and wherein the number read out is "1.01." Since the most significant digit position of the number field is a "0," the typewriter will be caused to space, type a "1," type a decimal point ".", type a "0" and type a "1." Also, it is seen that this instruction is obtained by patching any of the nine hubs, E14 through 22. A plurality of hubs are provided to provide a plurality of left and right of decimal LRD patterns, that is, a variety of number fields. As described above, a separate number field can be provided for each of the Z signals, Z1 through Z9.

(18) STORE

Figure 83A:
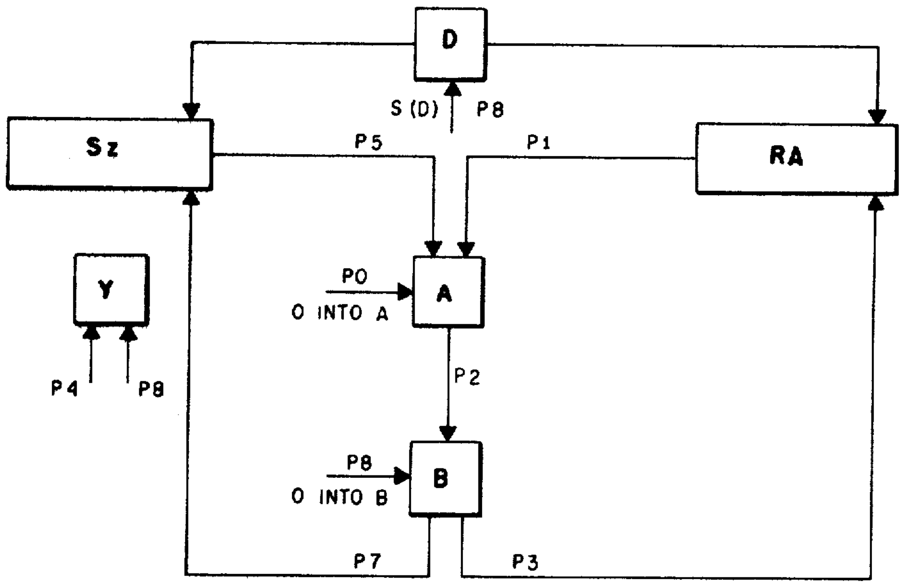
Figure 83B:
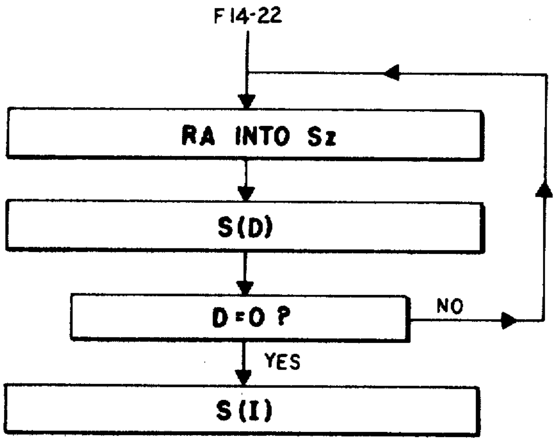

FIGS. 83, 83A and 83B illustrate an operational chart, logic diagram and flow chart, respectively, for the instruction which transfers the contents of the active RA register to one of the storage registers $S_1$ through $S_9$ without destroying the contents of the active register. As used hereinbelow, and in FIGS. 83 through 88, the notation SZ identifies and denotes the nine storage registers $S_1$ through $S_9$. This instruction is activated by enabling or selecting any one of the nine hubs F14 through F22 with each hub corresponding to one of the nine storage registers $S_1$ through $S_9$. For example, FIG. 61 shows that each of the hubs, F14 through F22, has associated therewith a particular Z signal. Reference to FIG. 45 shows that each of these nine Z signals, Z1 through Z9, are utilized to select one of the storage registers, $S_1$ through $S_9$. It is clear then that the storage register ($S_1$ through $S_9$) into which the contents of the active RA register are to be entered is determined by which of the hubs F14 through F22 are patched to accomplish this instruction.

Reference to FIG. 83B shows that this instruction is accomplished by sequentially transferring the contents of the active RA register into one of the nine storage registers SZ under the control of the digit D counter. Reference to FIGS. 83 and 83A shows that each digit position of the active RA register is nondestructively transferred to a storage register under the control of the P pulses, P0 through P9. The occurrence of the P0 pulse clears the A counter after which the occurrence of the P1 pulse causes the digit position in the active register to be transferred to the A counter after which the occurrence of the P2 pulse transfers the number in the A counter to the B counter. The occurrence of the P3 pulse causes the number in the B counter to be read back into the digit position in the active RA register so that the readout from the active register is nondestructive. The occurrence of the P5 pulse causes the number in the corresponding digit position of the storage SZ register to be transferred to the A counter. The next occurrence of the P0 pulse, in the next group of P pulses, clears the A counter to destroy any digit transferred from the SZ register to the A counter during the occurrence of the previous P5 pulse. The occurrence of the P7 pulse transfers the number from the B counter into the corresponding digit of the SZ storage register. The number transferred from the B counter to the storage SZ register during the occurrence of the P7 pulse corresponds to the digit transferred from the active register to the A counter during the occurrence of the P1 pulse. Also, the Y flip-flop, which is identified by the reference character 68 in the FIGS. 8 and 45, is stepped by the occurrence of the P4 and P8 pulses so that data is always entered into or taken out of an active register. The cooperating pair of registers for this instruction is one of the registers $R_1$ or $R_2$ and one of the storage registers $S_1$ through $S_9$, with the activity or passivity of the cooperating pair of registers being determined by the condition of the Y flip-flop.

(19) RETRIEVE

Figure 84A:
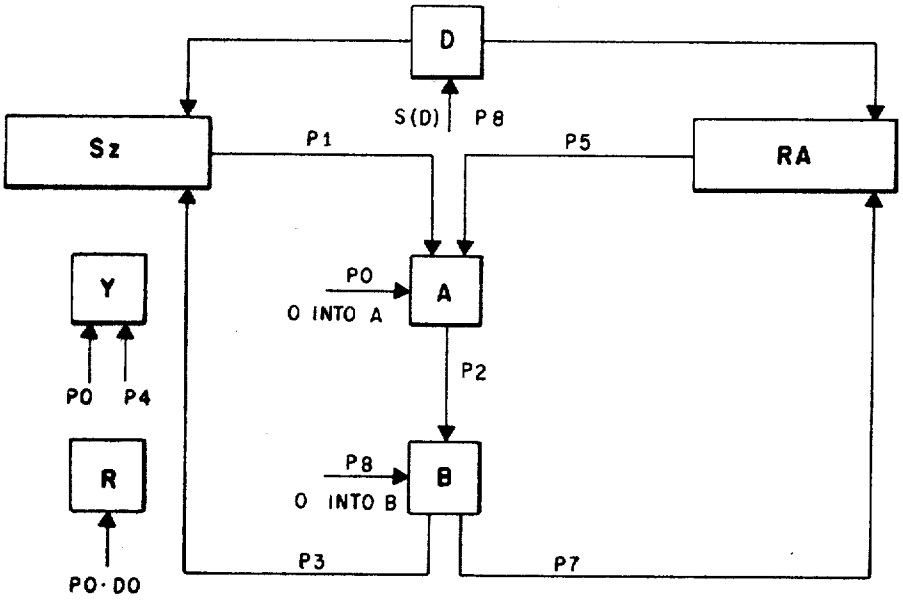
Figure 84B:
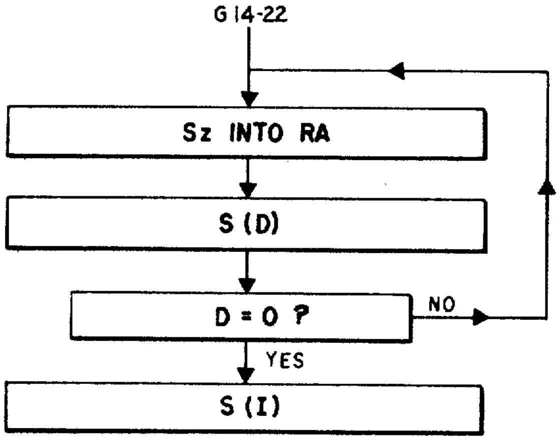

FIGS. 84, 84A and 84B illustrate an operational chart, logic diagram and flow chart, respectively, for the instruction wherein the contents of one of the storage registers SZ ($S_1$ through $S_9$) is nondestructively transferred to the active RA register, which active register comprises one of the registers $R_1$ or $R_2$. This instruction is accomplished by activating any one of the nine hubs G14 through G22 with each hub being associated with a particular one of the nine storage registers $S_1$ through $S_9$.

Reference to FIG. 84B shows that the digits of the SZ register are transferred to the active register in succession and under the control of the digit D counter. Reference to FIGS. 84 and 84A show that the occurrence of the P0 pulse clears the A counter after which the occurrence of the P1 pulse transfers the contents of the selected digit position of the SZ register into the A counter and the subsequent occurrence of the P2 pulse transfers the number from the A counter to the B counter. The occurrence of the P3 pulse reads the number in the B counter back into the digit position in the SZ register, thereby causing the transfer from the SZ register to be nondestructive. The occurrence of the P5 pulse reads out a digit position from the active register to the A counter where it is destroyed, or wiped out, by a subsequently occurring P0 pulse. The occurrence of the P7 pulse causes the number in the B counter to be transferred to the corresponding digit position in the active register, which number corresponds to the number transferred from the SZ register to the A counter during the occurrence of the P1 pulse. Also, the occurrence of a P0 and P4 pulse switches the Y flip-flop 68 (FIGS. 8 and 45) so that readout of a digit and entry of a digit always takes place from, and is entered into, the register of the cooperating pair of registers which is active.

(20) STORE ADDING

Figure 85A:
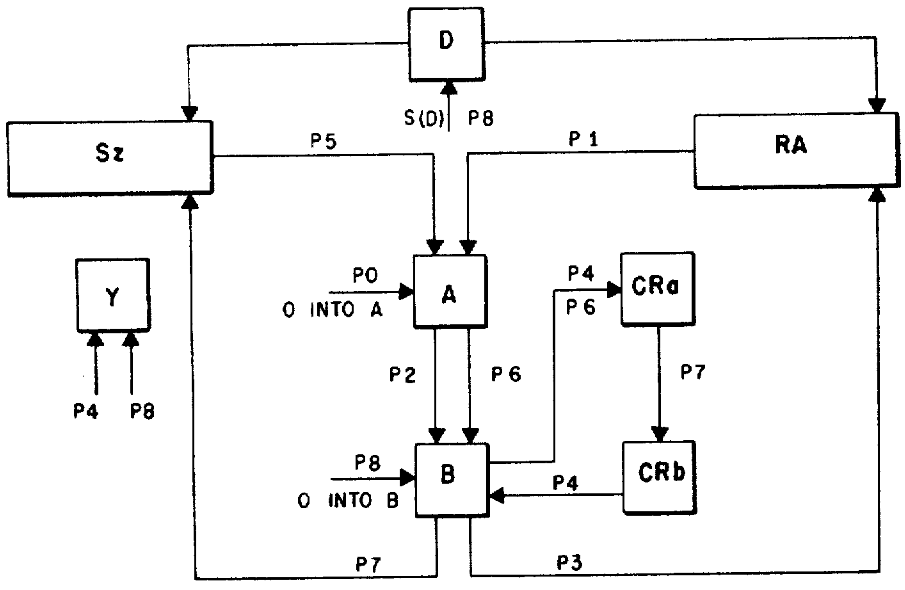
Figure 85B:
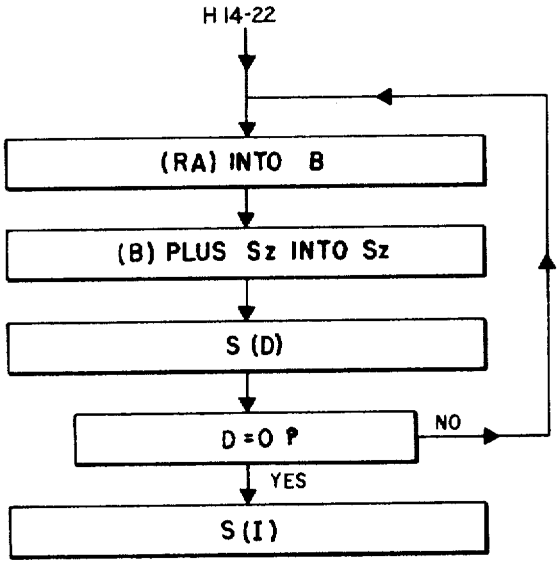

FIGS. 85, 85A and 85B illustrate an operational chart, logic diagram and flow chart, respectively, for the instruction wherein the contents of the active register are added to one of the nine storage registers SZ with the sum appearing in the storage register SZ and the contents of the active register remaining unchanged. The nine hubs, H14 through H22, are associated with this instruction with each hub denoting one of the nine storage registers SZ ($S_1$ through $S_9$), that is, a particular storage register $S_1$ through $S_9$ is chosen by patching a particular hub H14 through H22 associated with the desired storage register. A perusal of FIGS. 85, 85A and 85B with FIGS. 63, 63A and 63B shows that this instruction is substantially similar to the add instruction associated with the hub B14. Unlike the previously described add instruction, however, this add instruction has as a cooperating pair of registers one of the registers $R_1$ or $R_2$ and one of the storage registers $S_1$ through $S_9$. The selection of one of the registers $R_1$ and $R_2$ and one of the nine storage registers SZ as a cooperating pair of registers has been previously described and need not be repeated.

(21) STORE SUBTRACTING

Figure 86A:
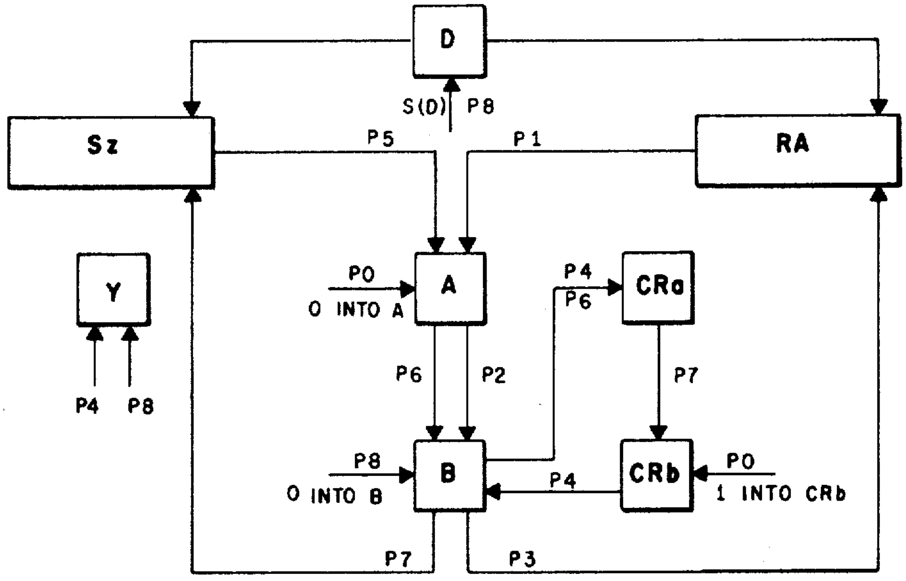
Figure 86B:
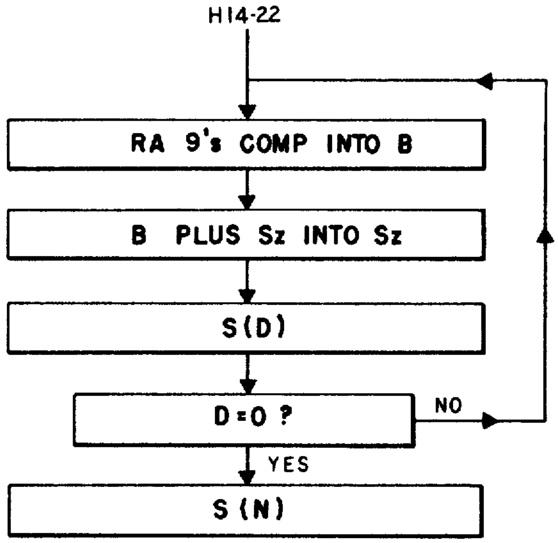
Figure 82A:
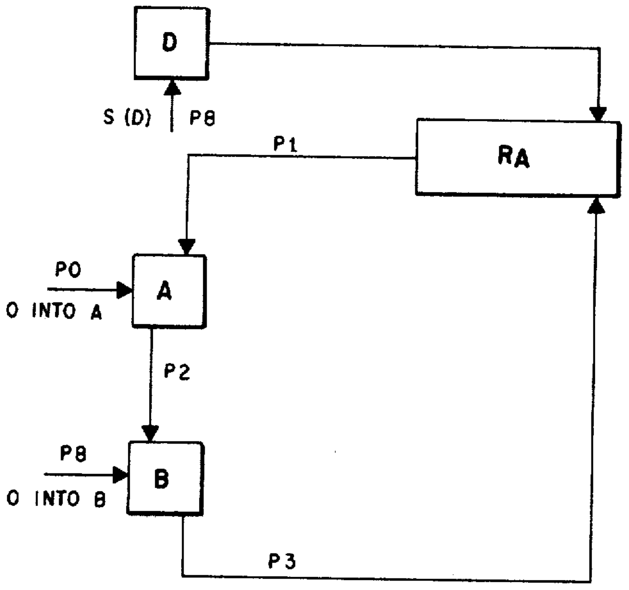
Figure 82B:
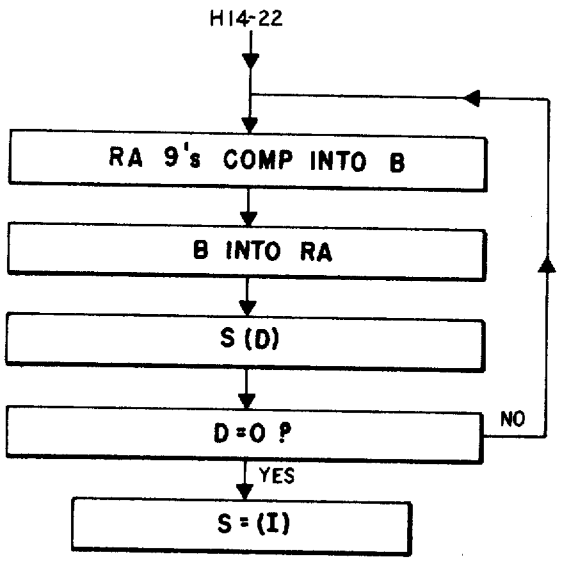

If, at the time one of the hubs H14 through H22 is activated the manual selector Z flip-flop has also been set, the contents of the selected storage register SZ, instead of being added to the contents of the active RA register, will be subtracted. The accomplishment of this is described by FIG. 86 which comprises an operational chart, FIG. 86A which comprises a logic diagram and FIG. 86B which comprises a flow chart. Reference to FIG. 86 shows that when any of the hubs H14 through H22 are activated and when the manual selector Z flip-flop is set, each digit position of the active register is added to each digit position of a selected storage SZ register. However, as illustrated by FIG. 86B the "9's" complement of the number in the active register is added to the number in the storage SZ register. As illustrated by the logic diagram of FIG. 86A this results in the "9's" complement of the number read out of the active RA register during the occurrence of a P1 pulse to be placed back in the active RA register on the occurrence of a P3 pulse. That is, once the subtract operation is completed, the active register will contain the "9's" complement of the digit or number it previously contained prior to the subtract operation. FIGS. 87, 87A and 87B comprise an operational chart, logic diagram and flow diagram, respectively, for the operation which complements the "9's" complement which results in the active RA register so that the active register will contain the number in proper form. Reference to FIG. 87B shows that this is accomplished by successively passing each of the digit positions of the active register into the A counter such as to obtain the "9's" complement thereof and then reading this number back into the active register by way of the B counter. Since this is equivalent to taking the "9's" complement of a "9's" complement, the number appearing in the active register will be in its proper form. Also as illustrated by FIG. 87B the "9's" complement is obtained successively for each digit position of the active register under the control of the digit D counter.

Reference to FIGS. 87A and 87B shows that by enabling the A counter to count up, the "9's" complement is obtained for each digit position which is transferred from the active register to the A counter and then back to the active register by way of the B counter. More specifically, FIGS. 87 and 87A show that the occurrence of a P1 pulse transfers the digit position indicated by the digit D counter from the active register to the A counter in such a manner hat the "9's" complement thereof is obtained. This resulting "9's" complement of a "9's" complement is transferred to the B counter on the occurrence of a P2 pulse and subsequently transferred from the B counter to the appropriate digit position of the active register upon the occurrence of a P3 pulse.

(22) RECALL MULTIPLYING

FIGS. 88–1 through 88–6 constitute an operational chart, for the instruction wherein a number in one of the nine storage registers SZ is multiplied by the number in the active RA register in such a manner that the product of the multiplication appears in the active RA register and the contents of the storage register remains unchanged. This multiplication instruction is substantially similar to the multiplication instruction previously described except that for this instruction the cooperating pair of registers comprises one of the registers $R_1$ or $R_2$ and one of the nine storage registers SZ rather than the two registers $R_1$ and $R_2$. Since the multiplication instruction has been previously described, it will be unnecessary to again describe FIGS. 88–1 through 88–6 which again show the accomplishment of the multiplication under the control of the phaes HM counter. However, it should be pointed out that which one of the nine, $S_1$ through $S_9$, registers will have their contents multiplied by the number in the active register is determined by which of the nine hubs, I14 through I22, associated with the nine storage registers SZ are patched to accomplish this instruction. Also, as in the previously described multiplication instruction, the multiplier appearing in the active RA register is stored in the S0 storage register.

(23) TYPEWRITER CONTROL

FIGS. 89–1 through 90–5 are operational charts which illustrate and describe various instructions whereby the electronic processor is enabled to control various typewriter motions and typing functions. For example, FIG. 89–1 is an operational chart which denotes the twenty hubs for which various lower case characters, such as digits, letters or symbols can be caused to be produced by the typewriter under the control of the electronic processor. Whenever any one of these hubs are patched and subsequently activated, their associated Y and Z signals are applied to the output circuit of FIGS. 55 and 56 and function to activate or enable a preselected solenoid of FIG. 62 to cause the appropriate lower case letter, digit or symbol to be typed.

FIG. 89–2 is an operational chart which denotes the twenty hubs which, when patched and activated, cause various preselected upper case letters, numbers and symbols to be typed or produced by the typewriter under the control of the electronic processor. As described by FIG. 89–2, activation of any of the twenty hubs set forth results in a ONE being placed into the case shift CS line of FIG. 56 which causes the typewriter to case shift so that the subsequent typing operation produces the predetermined upper case letter, symbol or number.

(24) TABULATE

Figures 5, 90:
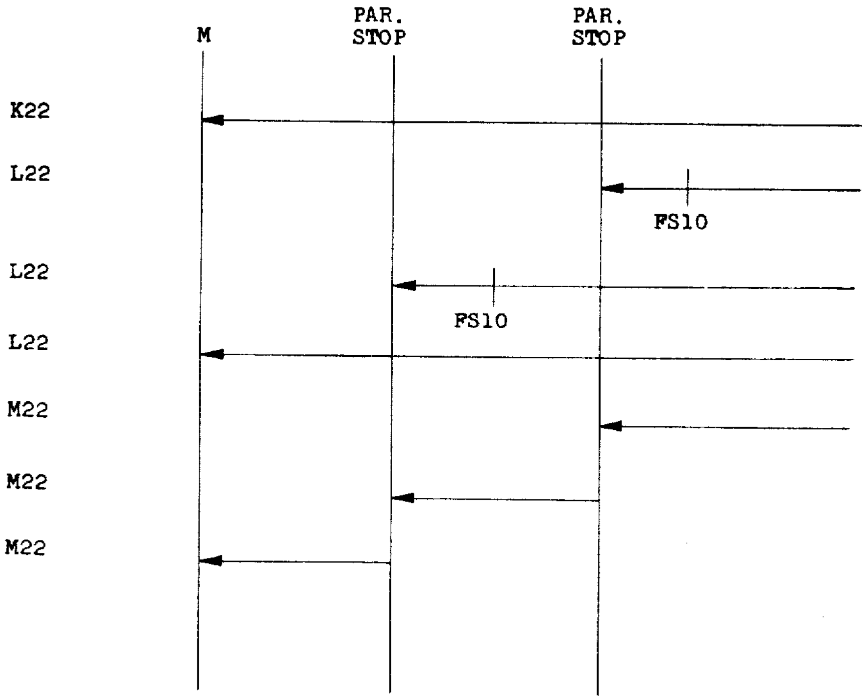

Referring now to FIG. 90–1, which is the operational chart for a tabulate TAB instruction, it is seen that activation of the hub J22 produces Y8 and Z9 signal levels which function to set the start-stop SS flip-flop to prevent the occurrence of any more P pulses upon the occurrence of the P9 pulse. Also, the output OP flip-flop is set to enable the electronic processor to actuate the typewriter. Also the Y and Z signals activate the tabulate solenoid of FIG. 62 causing the typewriter carriage to tabulate. Once the tabulation has been completed, the OK flip-flop is timed out which resets the start-stop SS flip-flop to again cause P pulses to be generated. As discussed above, the tab stops are set at preselected locations on the typewriter carriage so that the tabulate instructions will cause the typewriter carriage to move to the next tab stop position at which position a depressed program key will cause a comparison to be made of the condition in the field code flip-flops to see if a new program line is selected.

A plurality of partial carriage return stops which comprise simple mechanical devices are manually set on the margin rack located behind the typewriter carriage such that, when set, a carriage return operation is terminated at a predetermined point, that is, a partial carriage return is performed.

(25) CARRIAGE RETURN

Reference to FIGS. 90–2 and 90–5 shows that activation of the hub K22 causes the typewriter carriage to return to the left-hand margin. This instruction resets the partial carriage return stops thereby permitting the carriage to be returned to the left-hand margin.

Reference to FIGS. 90–3 and 90–5 shows that activation of the hub L22 will cause the carriage to return to the left margin if the field switch FS10 of FIGS. 6 and 56 is not closed. However, if movement of the typewriter carriage is designed to close the field switch FS10, a partial carriage return takes place by the field switch FS10 setting a partial carriage return stop. The partial carriage return stop and the field switch FS10 position can be predeterminedly located. The partial carriage return stop which is set by the field switch FS10 must be placed at least ten spaces to the left of the field switch to provide sufficient time to enable the partial carriage return stop to be set by closing of the field switch FS10.

Reference to FIGS. 90–4 and 90–5 shows that activation of the hub M22 will cause the typewriter carriage to return to the next partial carriage stop position; that is, this instruction will set all of the partial carriage return stops so that the typewriter carriage can only be returned to the first partial return stop. Successively performing this instruction will eventually cause the typewriter carriage to be returned to the lef-hand margin. In performing this operation the partial carriage return stops must be located at least eight spaces to the left to provide sufficient time to set the partial carriage return stops once this instruction has been activated.

(26) AUTOMATIC TABULATION

As described above, when one of the ten program keys is depressed, a program line will be selected if predetermined conditions exist in the three field code flip-flops. However, if the conditions of the three field code flip-flops are such that the proper combination is not obtained to select a program line, the typewriter carriage will automatically tabulate until a carriage position is reached that causes the three field code flip-flops to have the conditions that satisfied the requirements for selecting a program line. FIG. 91 is an operational chart which describes with reference to the logic diagram of the electronic processor how this automatic tabulation is accomplished. As is obvious, this automatic tabulate operation is not an instruction but rather will occur when no program line PL has been selected. As disclosed by FIG. 61, the absence of a selected program line causes the $\overline{X}$ signal to be at a logic ONE level which results in the end of program line EPL flip-flop being set. When set, the EPL flip-flop sets the one-shot OSHB circuit which, in turn, produces a pulse reset PR pulse which will place various counters, flip-flops, etc., to their nonrmal condition. Timing out of the one-shot OSHB circuit sets the output OP flip-flop which enables the electronic processor to control the typewriter.

When any one of the ten program keys of FIG. 58 is depressed, its associated PCA amplifier is enabled such that the program code PC0 signal is at a logic ZERO level which, in turn, causes a $\overline{PC0}$ signal to be at a logic ONE level. As shown by FIG. 52A, the presence of an $\overline{X}$ signal and a PC0 signal at the same time that the EPL flip-flop is set produces an automatic AT signal which, in conjunction wih the output OP flip-flop being set and the presence of the $\overline{X}$ signal, enable the appropriate OA*a* and OA*b* amplifiers of FIG. 62 which activate those solenoids which causes the type writer carriage to tabulate. The tabulate operation will be terminated by the typewriter carriage moving to the first tab stop position at which time the OK flip-flop timing out causes a ONE to be placed into the one-shot OSHB circuit to again produce a PR pulse which will place different conditions in the three field code flip-flops. If the new conditions in the three field code flip-flops are not such as to select a program line in conjunction with the previously depressed program key, the typewriter will again tabulate, in a manner as described above, to the next tab stop position at which time new conditions will be set into the three field code flip-flops in an attempt to find the field code flip-flop conditions which, with the depressed program key, select a new program line. Once a program line is selected one of the hubs on the instruction patchboard of FIG. 61 will be activated. Activation of any one of these hubs causes the X signal to become a logic ZERO level signal which, as shown by the operational chart of FIG. 91, will prevent an automatic tabulate from taking place.

X. PROGRAMMING

A. *Program panel wiring*

The control and direction of all functions of the subject machine are accomplished by means of a removable "wired" program panel. Sections of the program panel have been briefly described previously as part of the control circuitry within the subject machine, e.g., the LRD pattern development described in conjunction with FIG. 53.

Hubs on the program panel serve as exit or entry points for the various electrical impulses used in programming the subject machine. There are eight hundred ninety-six double hubs on the program panel, of which five hundred eleven are used for program development. These hubs are divided into groups or sections according to their function.

An illustration of the program patch panel is shown in FIG. 93. For simplicity of explanation, the various sections of this panel are labeled with Roman numerals. Eight sections on the program patchboard are identified by the Roman numerals and the location of the associated hubs with relation to the logic diagram is accomplished by referring to the specific figure numbers of the logic diagram as follows:

Section I—Program line steps—FIG. 60.
Section II—Processor instructions—FIG. 61.
Section III—Typewriter instructions—FIG. 61.
Section IV—Electronic switches (16)—FIG. 54.
Section V—Program key/carriage position switches (field switches FS1, FS2 and FS3)—FIG. 47.
Section VI—Program line pickup hubs (A34-135)—FIG. 60.
Section VII—Manual selector keys (A, B, C, X, Y and Z)—FIG. 54.
Section VIII—LRD patterns—FIG. 53.

The left-hand side of the program panel of FIG. 93 is labeled A through P vertically, while the top of the program panel is numbered "1" through "45" (in increments of 5) horizontally. Any given hub may be determined by using a combination of these letters and numbers according to the standard coordinate system.

B. *Program selection*

The selection of program lines to facilitate the operation of the subject machine is accomplished, as previously described, by the depression of a program key in combination with the positioning of one or more of cams 6 on the actuator rack 4 of FIG. 4. This program key-actuator rack position combination produces a pulse in the corresponding hub of the program key/carriage position (Sectin V) of the program panel of FIG. 93. The seventy program key/carriage position or field switch combination denoted by the coordinates (B–O, 28–32), utilize seventy sets of output hubs. There is one set or pair of hubs for each combination obtainable from the ten program keys and the seven binary outputs from three field code flip-flops associated with the three channels on the actuator rack.

FIG. 93 shows that hte program key/carriage position Section V of the program panel is divided into two groups, and that each group has five vertical columns of hubs, giving a total of ten columns of hubs. These ten columns of hubs represent the ten program keys, one column for each key. The seven pairs of hubs in each vertical column represent the seven binary outputs available with each program key. The first digit of each hub represents the corresponding program key, and the second digit represents the corresponding binary output. For example, hub 31 in Section V of FIG. 93 represents the third program key and a binary output of "1," or the actuation of a field switch in the first channel of the actuator rack 4.

To select a program line, hubs from the program key/carriage position, Section V of the program panel, must be wired to the program line pickup hubs (Section VI). The section of the program panel containing the program line pickup hubs (A–I, 34–35) contains eighteen sets of hubs labeled A through T, I and O having been omitted. There is one set of hubs for each of the eighteen program lines contained within the machine. The program line pickup hubs act as a pickup command for the appropriate program line. Therefore, to connect a program key/carriage position hub to a corresponding program line pickup hub, each end of a jumper wire is inserted into the appropriate hub.

C. *Program lines*

There are a total of one hundred sixty-five program steps or instructions contained within the program panel, these steps being assigned to eighteen program lines. The eighteen program lines, with their alphabetical designations, are located in Section I of the program panel (FIG. 93). Each program line has a predetermined number of steps, ranging from three to fifteen, as illustrated by FIG. 60. The assignment of steps to the various program lines is as follows:

| Program lines: | Number of steps, |
|---|---|
| A–B–C–D | each 15 |
| E–F–G | do 12 |
| H–J | do 10 |
| K–L | do 8 |
| M–N | do 7 |
| P–Q | do 5 |
| R–S–T | do 3 |

The alphabetical designation of each program line corresponds to the alphabetical designation of the program line pickup hubs in Section VI of the program panel. After a selected program line has been energized, the machine is conditioned to carry out the individual instructions that have been wired to each step in the selected program line. The number of instructions in any given program line can be equal to, or less than, the number of steps in that program line. For example, a fifteen step program line may contain fifteen instructions, or any number of instructions less than fifteen. However, the first instruction must be connected to the first step of a program line. If an intermediate step on a program line does not have an interconnecting wire connected to it, the operation of the machine will be terminated at this point.

D. *Instructions*

The instructions are connected to the various steps in the program lines. There are two groups of instructions contained within the program panel, electronic processor instructions and typewriter instructions. The processor instructions are located in Section II. There are seventy-two sets of hubs in this section (B–I, 14–22), one set for each of the arithmetic, logic and functional instructions used in the machine.

The typewriter instructions are located in Section III of the program panel. There are forty-four sets of hubs in this section (J–N, 14–21 and J–M, 22), one set for each of the printing and carriage movement instructions used in the machine. Hubs in both instruction sections of the panel are numbered horizontally, and each number corresponds to a specific instruction. For example, hub O1 represents instruction B14, the add instruction. Wiring is simply a matter of connecting the required instruction to the proper step in a program line.

E. *Programming principles*

The primary role of the programmer is to (a) translate various tasks, such as the processing of employee payroll accounts, into a form acceptable to the subject machine; and (b) instruct the subject machine as to how such tasks are to be carried out. To accomplish this, a detailed knowledge of the component parts of the subject machine and how they function in relation to each other is required. Prior to developing any program, a programmer must know:

(1) The number of operations available in the system, and function of each operation, (2) The method of solution which must be translated into step-by-step instructions, and (3) The requirements which must be met as a result of this processing.

Because each application consists of different related parts, the programmer must develop a logical sequence for each series of operations to arrive at an efficient solution.

Listed below are the steps which should be followed when programming the subject machine for electronic billing and accounting operations:

1.—Analyze application requirements.
2.—Allocate LRD patterns and storage locations.
3.—Write out program instructions.
4.—Refine program.
5.—Wire program panel.
6.—Check out program.

(1) *Analysis.*—The system is analyzed to determine requirements from a procedural point of view, and to determine the methods which must be utilized to arrive at an adequate solution according to the requirements of the application. Basically, this involves determining the number of totals required, the processing requirements necessary to arrive at these totals, forms design, etc.

(2) *Allocation.*—After analyzing the system, left and right of decimal patterns and storage locations are assigned by the programmer wherein specific storage locations are assigned for specific functions, such as working, totaling, etc. Also, decimal control of fixed length numerical entry and readout data will be assigned to the nine available LRD patterns.

(3) *Coding.*—Using the analysis as a guide, the programmer can now write out the instructions for a given application in actual machine language. This process of listing the program steps is commonly referred to as "coding." In this process, the programmer must determine what instructions are available to cause the machine to perform each of the arithmetic and functional processes required by the application.

(4) *Refinement.*—After the coding process has been completed, the programmer may then proceed to refine the entire program. Program refinement consists of establishing subroutines in terms of available program lines and frequency of use. The final assignment of actuator channel/program key combination can then be made.

(5) *Wiring.*—Wiring of the program panel is the next logical step in the programming process. The use of a program sheet provides all of the detailed programming data in a convenient form to facilitate wiring of the program panel for all electronic processor operations.

(6) *Checking.*—The final step in the programming process consists of checking the program panel to ensure that it is wired accurately. This is accomplished by means of a test panel which can be temporarily connected to the electronic processor, and by placing the machine in a single-step mode of operation. In this manner, each instruction in a program line can be checked out prior to its execution.

F. *Sample application*

How the programming principles and instructions are applied in the programming of a typical application will now be described. The application selected requires the multiplication of a quantity (up to 4.0 digits in length) by a price (2.2 digits in length). The result of this multiplication is printed on a document and accumulated for a printed total. Also, the quantity entry is stored to produce a quantity total at a later time.

For simpliciy of explanation, it will be assumed that the application requirements and form design have been established, and that storage locations and LRD patterns have been allocated. Quantity, price and net amount are under decimal (LRD) control. The machine will tab from quantity to price, and from price to the net amount column. A carriage return function will be performed at the end of the line.

The program line for this routine will be selected by program key No. 1 in conjunction with the actuator in the first channel of the actuator rack. There will be an actuator in the second channel at the margin (locking automatic tab), so that the operator can type the description when program key No. 1 is depressed. Also, there will be an actuator in channel eleven to release the block automatic tab BAT instruction.

FIG. 92 shows the program instructions necessary to complete the sample application. Two program lines are required; a three-step line and a ten-step line. The purpose of the three-step program line is to block the automatic tab operation of the machine. All machine functions in this application are described below:

(1) Clear the RA register.

(2) Release the manual selector keys X, Y and Z. This is required because selector key Z is used later in the program and it is essential that this key be deenergized.

(3) Block automatic tab to allow the operator to type the item description.

(4) Enter the quantity (with LRD pattern 4.0) into the RA register by an input instruction. This instruction causes the contents of the RA and RP registers to invert prior to the entry of the quantity.

(5) Add the quantity in the RA register to the contents of the storage $S_1$. This is an accumulative add operation which does not affect the figure in the RA register.

(6) Tabulate to the price section of the form.

(7) Enter the price (with LRD pattern 2.2) into the RA register by an input instruction. This instruction again causes the contents of the RA and RP registers to invert prior to the entry of the price. The end result is that the quantity appears in the RP register, while the price appears in the RA register.

(8) Multiply the quantity in the RP register by the price in the RA register. The resultant product develops in the RA register, while the contents in the RP register remain unchanged.

(9) Tabulate to the net amount section of the form.

(10) Print out the contents of the RA register (with LRD pattern 5.2).

(11) Following the readout of the net amount, the machine will shift one space, or if this is a credit entry, a minus sign will be printed. This program modification is controlled by operation of manual selection key C. Normally, the machine will perform a shift one space operation. However, when selector key Z is operated, the machine will print a minus sign.

Note: Operation of manual selector key Z allows this same program line to be used for a reversed credit entry.

(12) Add the net amount in the RA register to the contents of storage $S_2$ to accumulate an invoice total. This does not affect the net amount figure in the RA register.

(13) Return the carriage to the left margin for the next entry.

The program panel wiring required for this application is shown in FIG. 93. A description of wiring required follows:

Program line T. The selection of program line T is accomplished by wire (1) which connects the program key/carriage position switch No. 12 to program line pickup hub T.

(1) Instruction 03 (clear RA register) is wired (2) from the processor instructions section of the program panel to step 1 of the program line T–2.

(2) Instruction 13 (release selector keys X, Y and Z) is wired (3) to step 2 of program line T (wire No. 3).

(3) Instruction 15 (block automatic tab) is wired (4) to step 3 of program line T (wire No. 4).

Program line A. The selection of program line A is accomplished by wire (5), which connects the program key/carriage position switch to program line pickup hub A.

(1) Instruction 21 (enter data via LRD1) is wired (6) from the processor instruction section of the panel to step 1 of program line A.

(2) Instruction 61 (store accumulative $S_1$) is wired (7) to step 2 of program line A.

(3) Instruction 89 (tabulate) is wired (8) from the typewriter instruction section of the program panel to step 3 of program line A.

(4) Instruction 22 (enter data via LRD2) is wired (9) to step 4 of program line A.

(5) Instruction 11 (multiply $RP \times RA$) is wired (10) to step 5 of program line A.

(6) Instruction 89 (tabulate) is wired (11) to step 6. This can be accomplished by means of "leap-frog" wiring. Since step 3 of program line A is already wired to instruction 89, a connection from step 3 to step 6 will make instruction 89 effective in both steps of the program line.

(7) Instruction 33 (printout via LRD3) is wired (12) to step 7 of program line A.

(8) Instruction 124/114 (space or print minus sign) is wired to step 8 of program line 8 via electronic switch No. 16. The wiring is as follows: Step 8 is wired (13) to the common hub of the electronic switch No. 16; instruction 124 is wired (14) to the normal hub; instruction 114 is wired (15) to the transfer hub; the R hub of the electronic switch is wired (16) to the R hub of the manual selector key Z; and the S hub is wired (17) to the S hub of the same selector key.

(9) Instruction 62 (store accumulative $S_2$) is wired (18) to step 9 of program line A.

(10) Instruction 99 (carriage return) is wired (19) to step 10 of the program line A.

This completes the wiring of the program lines. Only the wiring of the three LRD patterns remain to complete the program panel wiring for this application. Before the LRD patterns can be wired, it is necessary to determine the decimal hub numbers which will be wired to the L and R hubs in each LRD group. The decimal hub DH numbers for the three LRD patterns used in this application are shown below. (It is assumed that the machine has a decimal position of 9.3.)

| No. | DH | Left | Dec. Pt. | Right | DH |
|---|---|---|---|---|---|
| 1 | D7 | 4 | . | 0 | D3 |
| 2 | D5 | 2 | . | 2 | D1 |
| 3 | D8 | 5 | . | 2 | D1 |

Wiring for the LRD patterns is as follows (see FIG. 93):

(1) LRD1 (4.0 quantity)—the left L hub is wired (20) to the decimal hub No. 7 and the right R hub is wired (21) to the decimal hub No. 3.

(2) LRD2 (2.2 price)—the left L hub is wired (22) to the decimal hub No. 5 and the right R hub is wired (23) to the decimal hub No. 1.

(3) LRD3 (5.2 net amount)—the left L hub is wired

(24) to the decimal hub No. 8 and the right R hub is wired (25) to the decimal hub No. 1.

This completes the wiring of the sample application.

G. *Program modification*

A program of the subject invention can be modified by the depression of the manual selector keys on the keybank. Twelve output hubs from these manual selector keys are located in Section VII of the program panel.

As shown in FIG. 93, there are two sets of hubs for each associated switch. These hubs are labelel S (set) which represents an output when the key is selected, and R (reset) when the key is normal. By means of these hubs, a manual selector key can be wired to none, some, or all sixteen of the electronic switches. The electronic switches are located in Section IV of the program panel and there are eighty sets of hubs in this section (A–P, 23–27), five sets of hubs for each switch. The hubs for each electronic switch are labeled R (reset), N (normal), C (common), T (transfer) and S (set). Each alphabetical designation pertains to all of the hubs in the vertical column above and below the alphabetical designation.

The reset R and set S hubs will be connected to their corresponding hubs in the manual selector key section (Section VII) of the program panel, and the common C, normal N and transfer T hubs will be wired to other sections of the program panel to modify the program as required. Program modification includes modifying program instructions, and selecting alternate program lines.

For example, if the second electronic switch is wired to change an add to a subtract instruction in the fifth step of the program line L illustrated in FIG. 92 when manual selector key A is depressed, the common hub is wired to the appropriate step in the program line, the add instruction is wired to the normal hub, and the subtract instruction is wired to the transfer hub.

What is claimed is:

1. Computing apparatus comprising; an arithmetic and control portion, means for enabling said arithmetic portion to perform arithmetic operations on a series of nonaddressed numbers where the series of numbers are such that a following arithmetic operation is based upon the result of a preceding arithmetic operation, said means including two nonaddressable temporary storage registers adapted to cooperate with one another as active and passive registers respectively, selecting circuit means coupled to said arithmetic and control portion and said registers for interchanging the active and passive registers under the control of said arithmetic and control portion prior to the entry of a nonaddressed number into the active register of said pair of registers, and a typewriter coupled to said arithmetic and control portion and adapted to function as an input and output unit for said arithmetic and control portion.

2. Computing apparatus comprising; an arithmetic and control unit which is adapted to perform arithmetic operations on a series of nonaddressed numbers thereby reducing the complexity of said computer, said arithmetic and control unit including two nonaddressable temporary storage registers adapted to cooperate with one another as active and passive registers respectively, means coupled to said arithmetic and control unit for interchanging the active and passive registers prior to the entry of a nonaddressed number into the active register of said pair of registers, a typewriter having a movable carriage and adapted to enter nonaddressed numeric data into said arithmetic and control unit, said typewriter also adapted to receive output data from said arithmetic and control unit, and means coupled to said typewriter and said arithmetic and control unit for enabling said arithmetic and control unit to perform a predetermined program in response to the position of said typewriter carriage.

3. Computing apparatus comprising; an arithmetic and control unit, two single number nonaddressable storage registers coupled to said arithmetic and control unit and adapted to cooperate as active and passive registers, said arithmetic and control unit adapted to interchange the active and passive registers prior to the entry of a nonaddressed number into the active register of said pair of registers, said arithmetic and control unit adapted to perform arithmetic operations on the numbers in said pair of registers with the result of such arithmetic operations appearing in said active register of said cooperating pair of registers, a typewriter coupled to said arithmetic and control unit and adapted to operate as an input and output unit for said computing apparatus, said typewriter having a movable carriage thereon, and program means coupled to said typewriter and said arithmetic and control unit for enabling said arithmetic and control unit to perform predetermined programs in response to the position of said movable typewriter carriage.

4. The computing apparatus according to claim 3 wherein numeric data is always entered into the active register of said two storage registers from said arithmetic and control unit.

5. The computing apparatus according to claim 3 wherein numeric data is always removed from the active register of said two storage registers.

6. The computing apparatus according to claim 3 wherein said program means includes a plurality of manually activated program selecting devices whereby a predetermined program is caused to be performed by said arithmetic and control unit by a predetermined combination of said typewriter carriage position and at least one activated program selecting device.

7. The computing apparatus according to claim 6 wherein said program means further includes a plurality of manually activated program modifying devices adapted, when activated, to modify in a predetermined manner the predetermined program caused to be performed by said combination of typewriter carriage position and at least one activated program selecting device.

8. The computing apparatus according to claim 3 wherein said typewriter has selected ones of its type bars adapted to be activated by said arithmetic and control unit.

9. The computing apparatus according to claim 3 wherein said typewriter has its numeric keys electrically coupled to said arithmetic and control unit and its numeric type bars adapted to be operated by said arithmetic and control unit.

10. Computing apparatus comprising; an arithmetic and control portion, a plurality of temporary storage registers, selecting circuit means coupled to said arithmetic and control portion and said registers for selecting at least two of said plurality of registers as a cooperating pair of nonaddressable registers, said cooperating nonaddressable registers adapted to selectively cooperate with one another as active and passive registers respectively, said selecting circuit means adapted to interchange the active and passive registers prior to the entry of a nonaddressed number into the active register of said registers and under the control of said arithmetic and control portion, a typewriter having a movable carriage and selected ones of its keyboard elements coupled to said arithmetic and control portion to enable said typewriter to function as a data input and output unit for said arithmetic and control portion, and program selecting means coupled to said arithmetic and control portion and said typewriter and including a plurality of manually activated program selecting devices whereby a predetermined program is caused to be performed by said arithmetic and control portion by a predetermined combination of said typewriter carriage position and at least one activated program selecting device.

11. The computing apparatus according to claim 10 wherein at least one activated program device causes said typewriter to automatically tabulate in order to obtain the carriage position which, in combination with said at least one activated program device, causes said arithmetic and control portion to perform a predetermined program.

12. The computing apparatus according to claim 10 wherein said program selecting means further includes manually activated program modifying devices adapted, when activated, to modify in a predetermined manner the predetermined program caused to be performed by said combination of typewriter carriage position and at least one activated program selecting device.

13. The computing apparatus according to claim 10 wherein said program selecting means further includes a plurality of switches adapted to be activated by movement of said typewriter carriage, a plurality of bistable devices each capable of having two stable conditions therein, each said bistable device coupled to and adapted to indicate the electrical position of a predetermined one of said plurality of switches by being in one of said two conditions, and means coupled to said plurality of bistable devices and said manually activated program selecting devices for causing said arithmetic and control unit to perform predetermined programs in response to predetermined combinations of at least one activated program selecting device and the condition of said plurality of bistable devices.

14. The computing apparatus according to claim 10 wherein said program selecting means includes a plurality of switches selected ones of which are adapted to be activated by predetermined typewriter carriage positions, a plurality of bistable devices each capable of having two stable conditions, each said bistable device coupled to and adapted to indicate the electrical position of a different one of said plurality of switches for predetermined positions of said typewriter carriage by being in one of said two conditions, and means coupled to said plurality of bistable devices and said manually activated program selecting devices for causing said arithmetic and control unit to perform predetermined programs in response to predetermined combinations of at least one activated program selecting device and the condition of said plurality of bistable devices.

15. The apparatus according to claim 14 wherein said bistable devices comprise electronic flip-flop circuits.

16. Computing apparatus comprising; an arithmetic and control portion, a plurality of temporary storage registers, selecting circuit means coupled to said arithmetic and control portion and said registers for selecting two of said plurality of registers as a cooperating pair of registers, said cooperating pair of registers adapted to selectively cooperate with one another as active and passive registers respectively, said selecting circuit means adapted to interchange the active and passive registers prior to the entry of a number into one of the registers of said cooperating pair under the control of said arithmetic and control portion, a typewriter having a movable carriage and selected ones of its keyboard elements coupled to said arithmetic and control portion to enable said typewriter to function as a data input and output unit for said arithmetic and control portion, and program selecting means coupled to said arithmetic and control portion and said typewriter and including a plurality of manually activated program selecting devices whereby a predetermined program is caused to be performed by said arithmetic and control portion by a predetermined combination of said typewriter carriage position and at least one activated program selecting device, said program selecting means includes a patchboard having at least a first, second, and third patch portion thereon, each said patchboard portion having a plurality of rows and columns of electrically interconnected hubs thereon, means responsive to predetermined positions of said typewriter carriage for applying a potential of a predetermined row of hubs on said first patchboard portion, each said column of interconnected hubs on said first patchboard portion being coupled to different ones of said manually activated program selecting devices, a hub on said first patchboard portion being selected whenever the row to which it is coupled has a potential applied thereto by said means responsive to said typewriter carriage position and the column to which it is coupled has a potential applied thereto by its associated program selecting device being activated, circuit means for applying a potential to successive rows of interconnected hubs on said second patchboard portion under the control of said arithmetic and control unit, each hub on said first patchboard portion capable of being coupled to at least one of the columns of interconnected hubs on said second patchboard portion, a hub on said second patchboard portion being selected whenever the row to which it is coupled has a potential applied thereto by said circuit means and the column to which it is coupled has a potential applied thereto by being coupled to a selected hub on said first patchboard portion, each said hub on said second patchboard portion capable of being coupled to a hub on said third patchboard portion, a hub on said third patchboard portion being selected whenever the hub on the second patchboard portion to which it is coupled is selected, said third patchboard portion adapted to provide at least one electrical potential in response to a hub thereon being selected which potential identifies the selected hub, and means coupling said electrical potentials produced by said third patchboard to said arithmetic and control unit.

17. The computing apparatus according to claim 16 wherein said hubs on said third patchboard portion each represent a function which can be performed by said arithmetic and control unit and selection of said hubs causes their associated function to be performed by said arithmetic and control unit.

18. A temporary storage organized to enable a relatively simple and inexpensive computer to be realized for carrying out calculations such as are required in accounting and invoicing machines comprising; two temporary nonaddressable single number storage registers adapted to cooperate with one another as active and passive registers respectively, means to enable two nonaddressed numbers entered into said cooperating registers to be arithmetically operated upon without the necessity of addressing said numbers including circuit means coupled to said registers for interchanging the active and passive registers prior to the entry of a nonaddressed number into the active register of said cooperating pair of registers.

19. The temporary storage according to claim 18 further including a plurality of additional and equivalent addressable registers for storing constant factors and intermediate results.

20. A temporary storage organized to enable a relatively simple and inexpensive computer to be realized for carrying out calculations such as are required in accounting and invoicing machines comprising; a plurality of temporary storage registers, selecting circuit means coupled to said registers for selecting two of said plurality of registers as a cooperating pair of nonaddressable registers, said cooperating pair of nonaddressable registers adapted to selectively cooperate with one another as active and passive registers respectively, said selecting circuit means adapted to interchange the active and passive registers prior to the entry of a nonaddressed number into the active register of said cooperating pair, and means coupled to said pair of registers for performing an arithmetic operation on the numbers in said cooperating pair of registers.

21. A temporary storage for an electronic computer comprising; two temporary storage registers, a plurality of additional registers which are equivalent to said temporary storage registers, selecting circuit means for selecting two of said registers to cooperate with one another as active and passive registers respectively, said cooperating pair of registers always including at least one of said two temporary registers, means for applying nonaddressed numbers only to the active register of said cooperating pair of registers, said selecting circuit means being adapted to interchange the active and passive registers prior to the entry of a number into the active register of said cooperating pair, means coupled to said pair of registers for performing an arithmetic operation on the numbers in said cooperating pair of registers with the result of said arithmetic operation appearing in the active register of said cooperating pair.

22. The apparatus according to claim 21 wherein said selecting circuit means includes a first and second bistable device each capable of being switched independently of one another, an AND gate preceding each of said two temporary storage registers with one input of said AND gates being coupled to a different output of said first bistable device and another input of said AND gates being coupled to one and the same first output of said second bistable device, an AND gate preceding at least one of the additional registers and having one input coupled to one and the same second output of said second bistable device and another input adapted to receive an address indicating signal.

23. A temporary storage for an electronic computer which storage is organized to reduce the number of addresses needed to perform various arithmetic operations comprising; two temporary storage registers adapted to cooperate with one another as active and passive registers respectively in order to carry out wanted computations, means for entering nonaddressed numbers into the active register of said cooperating pair of registers including circuit means for interchanging the active and passive registers prior to the entry of a number into the active register of said cooperating pair of registers, a number of additional registers coupled to said circuit means and adapted to store addressed constant factors and addressed intermediate results.

24. An electronic computer comprising; an arithmetic and control portion, a storage portion operably coupled to said arithmetic and control portion for performing arithmetic operations on numbers in said storage portion, said storage portion including a plurality of temporary storage registers, a selecting circuit coupled to said registers and said arithmetic and control portion for selecting two of said registers as a cooperating pair in response to a function to be performed by said arithmetic and control portion, said pair of registers adapted to cooperate as active and passive registers respectively in order to enable arithmetic operations to be performed with a minimum of addressing, means responsive to said arithmetic and control unit for automatically interchanging the active and passive registers prior to the entry of a number into the active register of said cooperating pair of registers whereby the number entered into said active register need not be addressed.

25. An electronic computer comprising; an arithmetic and control portion, a storage portion operably coupled to said arithmetic and control portion, said storage portion including two temporary storage registers and a number of additional and equivalent registers, and a selecting circuit coupled to said registers and said arithmetic and control unit for selecting two of said registers to cooperate with one another as active and passive registers respectively in response to a function to be performed by said arithmetic and control portion such that nonaddressed numbers may be entered into said cooperating pair of registers and arithmetically operated on by said arithmetic and control portion, said cooperating pair of registers always including at least one of said two temporary storage registers, said selecting circuit being responsive to said arithmetic and control portion for automatically interchanging the active and passive registers prior to the entry of a number into a register of said cooperating pair of registers.

26. The apparatus according to claim 25 wherein said selecting circuit means includes a first and second bistable device each capable of being switched independently of one another, each said bistable device having a first and second output representative of the two stable states respectively, an AND gate preceding each of said two temporary storage registers with an input of one AND gate being coupled to said first output of said first bistable device and an input of the other AND gate being coupled to said second output of said first bistable device, each said AND gate having an input coupled to said first output of said second bistable device, an AND gate preceding at least one of said additional registers and having one input coupled to said second output of said second bistable device and another input coupled to said arithmetic and control unit.

27. The apparatus according to claim 25 wherein said cooperating pair of registers comprise said two temporary storage registers.

28. The apparatus according to claim 25 wherein said cooperating pair of registers comprise one of said two temporary storage registers and one of said additional registers.

29. The apparatus according to claim 27 wherein said temporary storage registers cooperate with said arithmetic and control portion to perform arithmetic operations on numeric data entering said computer.

30. The apparatus according to claim 28 wherein said cooperating pair of registers operably function with said arithmetic and control portion to perform arithmetic operations on numeric data in said storage portion.

31. Computing apparatus comprising an arithmetic and control portion, a storage portion operably coupled to said arithmetic and control portion, said storage portion including two temporary storage registers and a number of additional and equivalent registers, a selecting circuit coupled to said registers for selecting two of said registers to cooperate with one another as active and passive nonaddressable registers respectively in response to a function to be performed by said arithmetic and control portion and for interchanging the active and passive registers prior to the entry of nonaddressed data into the active register of said cooperating pair of registers, a typewriter having a movable carriage thereon and adapted to function as a data input and output unit for said arithmetic and control portion, and program selecting means coupled to said arithmetic and control portion and said typewriter for enabling said arithmetic and control portion to perform preselected functions in response to the position of said typewriter carriage.

32. The computing apparatus according to claim 31 wherein said typewriter is adapted to receive an accounting form having a plurality of columns thereon and a predetermined relationship exists between the position of said columns on said form and the typewriter carriage positions which permit said arithmetic and control portion to perform preselected functions.

33. The computing apparatus according to claim 31 wherein said cooperating pair of registers include said two temporary storage registers which cooperate with said arithmetic and control portion to perform arithmetic operations on nonaddressed numeric data entered into said computing apparatus from the keyboard of said typewriter.

34. The computing apparatus according to claim 31 wherein said cooperating pair of registers include one of said two temporary storage registers and one of said additional registers which said cooperating pair of registers operably function with said arithmetic and control portion to perform arithmetic operations on numeric data in said cooperating pair of registers.

35. The computing apparatus according to claim 31 wherein said cooperating pair of registers include said two temporary storage registers which cooperate with said arithmetic and control portion to perform arithmetic operations on numeric data in said cooperating pair of registers.

36. Computing apparatus according to claim 31 wherein the numeric keys of said typewriter are electrically coupled to said arithmetic and control portion and the numeric type bars of said typewriter are adapted to be activated by said arithmetic and control portion.

37. Computing apparatus according to claim 31 wherein predetermined alphabetic and symbol type bars of said typewriter are adapted to be activated by said arithmetic and control portion.

38. Computing apparatus according to claim 31 wherein said selecting circuit includes a first and second bistable device each capable of being switched independently of one another under the control of said arithmetic and control portion, each said bistable device having a first and second output representative of the two stable states respectively, an AND gate preceding each of said two temporary storage registers with an input of one AND gate being coupled to said first output of said first bistable device and an input of the other AND gate being coupled to said second output of said first bistable device, each said AND gate having an input coupled to said first output of said second bistable device, an AND gate preceding at least one of said additional registers and having one input coupled to said second output of said second bistable device and another input coupled to said arithmetic and control position.

39. Computing apparatus comprising an arithmetic and control portion, a storage portion operably coupled to said arithmetic and control portion, an input-output unit operably coupled to said arithmetic and control unit, said input-output unit having a movable portion thereon, and program means coupled to said input-output unit and said arithmetic and control portion for enabling said arithmetic and control unit to perform a predetermined program sequence in response to a position of said movable portion of said input-output unit, said program means including a plurality of manually activated program selecting devices whereby a predetermined program sequence is caused to be performed by said arithmetic and control unit by a predetermined combination of a position of said movable portion of said input-output unit and at least one activated program selecting means, said program selecting means also including a plurality of manually activated program modifying devices adapted, when activated, to modify in a predetermined manner the predetermined program sequence caused to be performed by said combination of movable portion of said input-output unit and at least one activated program selecting device.

40. The computing apparatus according to claim 39 wherein said input-output unit is adapted to receive an accounting form having a plurality of columns thereon and a predetermined relationship exists between said columns on said form and the positions of said movable portion of said input-output unit which permit said arithmetic and control portion to perform preselected program sequences.

41. The combination according to claim 40 wherein said input-output unit comprises a typewriter and the movable portion of said input-output device comprises the typewriter carriage.

42. The combination according to claim 41 wherein said typewriter is adapted to enter data into the columns of said form under the control of said arithmetic and control unit and the keyboard of said typewriter.

43. The computing apparatus according to claim 41 wherein said program selecting means further includes a plurality of switches adapted to be activated by movement of said typewriter carriage, a plurality of bistable devices each capable of having two stable conditions therein, each said bistabled evice coupled to and adapted to indicate the electrical position of a predetermined one of said plurality of switches by being in one of said two conditions, and means coupled to said plurality of bistable devices and said manually activated program selecting devices for causing said arithmetic and control unit to perform a predetermined program sequence in response to the predetermined combination of at least one activated program selecting device and the condition of said plurality of bistable devices.

44. The computing apparatus according to claim 41 wherein said program selecting means includes a plurality of switches selected ones of which are adapted to be activated by predetermined typewriter carriage positions, a plurality of bistable devices each capable of having two stable conditions, each said bistable device coupled to and adapted to indicate the electrical position of a different one of said plurality of switches for predetermined positions of said typewriter carriage by being in one of said two conditions, and means coupled to said plurality of bistable devices and said manually activated program selecting devices for causing said arithmetic and control unit to perform a predetermined program sequence in response to a predetermined combination of at least one activated program selecting device and the condition of said plurality of bistable devices.

45. Computing apparatus according to claim 41 wherein said program selecting means includes a patchboard having at least a first, second, and third patch portion thereon, each said patchborad portion having a plurality of rows and columns of electrically interconnected hubs thereon, means responsive to predetermined positions of said typewriter carriage for applying a potential to a predetermined row of hubs on said first patchboard portion, each said column of interconnected hubs on said first patchboard portion being coupled to different ones of said manually activated program selecting devices, a hub on said first patchboard portion being selected whenever the row to which it is coupled has a potential applied thereto by said means responsive to said typewriter carriage position and the column to which it is coupled has a potential applied thereto by its associated program selecting device being activated, circuit means for applying a potential to successive rows of interconnected hubs on said second patchboard portion under the control of said arithmetic and control unit, each hub on said first patchboard portion capable of being coupled to at least one of the columns of interconnected hubs on said second patchboard portion, a hub on said second patchboard portion being selected whenever the row to which it is coupled has a potential applied thereto by said circuit means and the column to which it is coupled has a potential applied thereto by being coupled to a selected hub on said first patchboard portion, each said hub on said second patchboard portion capable of being coupled to a hub on said third patchboard portion, a hub on said third patchboard portion being selected whenever the hub on the second patchboard portion to which is coupled is selected, said third patchboard portion adapted to provide at least one electrical potential in response to a hub thereon being selected which identifies the selected hub, and means coupling said electrical potentials produced by said third patchboard to said arithmetic and control unit.

46. The computing apparatus according to claim 45 wherein said hubs on said third patchboard portion each represent a function which can be performed by said arithmetic and control unit and selection of said hubs causes their associated function to be performed by said arithmetic and control unit.

47. Computing apparatus comprising an arithmetic and control portion, a plurality of temporary storage registers coupled to said arithmetic and control portion, at least two of said registers adapted to cooperate as nonaddressable active and passive registers, said arithmetic and control portion adapted to interchange the active and passive registers prior to the entry of a nonaddressed number into the active register of said two cooperating registers, a typewriter coupled to said arithmetic and control portion and adapted to operate as a data input and output unit for said computing apparatus, said typewriter having a movable carriage thereon, and program means coupled to said typewriter and said arithmetic and control portion for enabling said arithmetic and control portion to perform preselected programs in response to predetermined positions of said typewriter carriage.

48. The computing apparatus according to claim 47 wherein said typewriter has selected ones of its type bars adapted to be activated by said arithmetic and control unit.

49. The computing apparatus according to claim 47 wherein said typewriter has its numeric keys electrically coupled to said arithmetic and control portion and its numeric type bars adapted to be operated by said arithmetic and control portion.

50. The computing apparatus according to claim 47 wherein said typewriter has selected ones of its alphabetic and symbol type bars adapted to be activated by said arithmetic and control portion.

51. The computing apparatus according to claim 47 wherein said typewriter is adapted to receive an accounting form having a plurality of columns thereon and a predetermined relationship exists between the position of said columns on said form and the predetermined positions of said typewriter carriage which enables said arithmetic and control portion to perform preselected programs.

52. The computing apparatus according to claim 47 wherein said typewriter is adapted to enter data into said columns on said form under the control of said arithmetic and control portion.

53. Computing apparatus comprising an arithmetic and control portion, a plurality of temporary storage registers coupled to said arithmetic and control portion, at least two of said registers adapted to cooperate with one another as active and passive nonaddressable registers, said arithmetic and control portion adapted to interchange the active and passive registers prior to the entry of a nonaddressed number into one of said two cooperating registers from said arithmetic and control portion, a typewriter coupled to said arithmetic and control portion and adapted to operate as a data input and output unit for said arithmetic and control portion, said typewriter having a movable carriage thereon, and program means coupled to said typewriter and said arithmetic and control portion for enabling said arithmetic and control portion to perform preselected programs in response to predetermined positions of said typewriter carriage, said typewriter having its numeric keys electrically coupled to said arithmetic and control unit and its numeric type bars adapted to be operated by said arithmetic and control portion.

54. Computing apparatus comprising an arithmetic and control portion, a plurality of temporary storage registers coupled to said arithmetic and control portion, at least two of said registers adapted to cooperate with one another as active and passive registers, said arithmetic and control portion adapted to interchange the active and passive registers prior to the entry of a number into one of said two cooperating registers from said arithmetic and control portion, a typewriter coupled to said arithmetic and control portion and adapted to operate as a numeric data input and output unit for said arithmetic and control portion, said typewriter having a movable carriage thereon, and program means coupled to said typewriter and said arithmetic and control portion for enabling said arithmetic and control portion to perform a preselected program sequence in response to a predetermined position of said typewriter carriage, said typewriter having its numeric keys electrically coupled to said arithmetic and control unit and its numeric type bars adapted to be operated by said arithmetic and control portion, said typewriter having selected ones of its alphabetic and symbol type bars adapted to be operated by said arithmetic and control portion and the keyboard of said typewriter.

55. Computing apparatus comprising an arithmetic and control portion, a plurality of temporary storage registers coupled to said arithmetic and control portion, at least two of said registers adapted to cooperate with one another as active and passive nonaddressable registers, said arithmetic and control portion adapted to interchange the active and passive registers prior to the entry of a nonaddressed number into one of said two cooperating registers from said arithmetic and control portion, a typewriter coupled to said arithmetic and control portion and adapted to operate as a numeric data input and output unit for said arithmetic and control portion, said typewriter having a movable carriage thereon, and program means coupled to said typewriter and said arithmetic and control portion for enabling said arithmetic and control portion to perform preselected programs in response to predetermined positions of said typewriter carriage, said typewriter having its numeric keys electrically coupled to said arithmetic and control unit and its numeric type bars adapted to be operated by said arithmetic and control portion, said typewriter having selected ones of its alphabetic and symbol type bars adapted to be operated by said arithmetic and control portion and the keyboard of said typewriter, said typewriter adapted to receive an accounting form having a plurality of columns thereon such that a predetermined relationship exists between the position of said columns on said form and the predetermined positions of said typewriter which enables said arithmetic and control portion to perform preselected programs.

56. Computing apparatus comprising an arithmetic and control portion, a plurality of temporary storage registers coupled to said arithmetic and control portion, at least two of said registers adapted to cooperate with one another as active and passive registers, said arithmetic and control portion adapted to interchange the active and passive registers prior to the entry of a number into one of said two cooperating registers from said arithmetic and control portion, a typewriter coupled to said arithmetic and control portion and adapted to operate as a numeric data input and output unit for said arithmetic and control portion, said typewriter having a movable carriage thereon, and program means coupled to said typewriter and said arithmetic and control portion for enabling said arithmetic and control portion to perform a preselected program sequence in response to a predetermined position of said typewriter carriage, said typewriter adapted to receive an accounting form having a plurality of columns thereon such that a predetermined relationship exists between the positions of said columns on said form and the predetermined positions of said typewriter which enables said arithmetic and control portion to perform preselected program sequences, said typewriter adapted to enter data into said columns on said form under the control of said arithmetic and control portion and the keyboard of said typewriter.

57. Computing apparatus comprising an arithmetic and control portion, a plurality of temporary storage registers coupled to said arithmetic and control portion, at least two of said registers adapted to cooperate with one another as active and passive nonaddressable registers, said arithmetic and control portion adapted to interchange the active and passive registers prior to the entry of a nonaddressed number into one of said two cooperating registers from said arithmetic and control portion, a typewriter coupled to said arithmetic and control portion and adapted to operate as a numeric data input and output unit for said arithmetic and control portion, said typewriter having a movable carriage thereon, and program means coupled to said typewriter and said arithmetic and control portion for enabling said arithmetic and control portion to perform preselected programs in response to predetermined positions of said typewriter carriage, said typewriter having its numeric keys electrically coupled to said arithmetic and control unit and its numeric type bars adapted to be operated by said arithmetic and control portion, said typewriter having selected ones of its alphabetic and symbol type bars adapted to be operated by said arithmetic and control portion and the keyboard of said typewriter, said typewriter adapted to receive an accounting form having a plurality of columns thereon such that a predetermined relationship exists between the position of said columns on said form and the predetermined positions of said typewriter which enables said arithmetic and control portion to perform preselected programs, said typewriter adapted to enter data into said columns on said form under the control of said arithmetic and control portion and the keyboard of said typewriter.

58. Computing apparatus comprising an arithmetic and control portion, a storage portion operably coupled to said arithmetic and control portion, said storage portion including two temporary storage registers and a number of additional and equivalent registers, a selecting circuit coupled to said registers for selecting two of said registers to cooperate with one another as active and passive nonaddressable registers respectively in reponse to a function to be performed by said arithmetic and control portion and for interchanging the active and passive registers prior to the entry of nonaddressed data into a register of said cooperating pairs of registers, a typewriter having a movable carriage thereon and adapted to function as a data input and output unit for said arithmetic and control portion, program selecting means coupled to said typewriter and adapted to provide at least two D.C. level signals which identify a function to be performed by said arithmetic and control portion, means for producing sequentially occurring pulses coupled to and controlled by said arithmetic and control portion, and signal generating means adapted to receive the D.C. level signals produced by said program selecting means and the pulses produced by said sequenital pulse producing means for providing a plurality of signals which enable the arithmetic and control portion to perform the function identified by said D.C. level signals produced by said program selecting means.

59. The computing apparatus of claim 58 wherein said sequential pulse producing means includes an oscillator coupled to and controlled by said arithmetic and control portion, a counter adapted to receive and be stepped by the output of said oscillator so as to provide a plurality of sequentially occurring output pulses each of which correspond to a particular count in said counter, and switching means coupled to and controlled by said arithmetic and control portion for switching the output of said oscillator between said counter and said arithmetic and control portion.

60. The computing apparatus according to claim 59 wherein said oscillator comprises a free-running multivibrator.

61. Computing apparatus comprising an arithmetic and control portion, a storage portion operably coupled to said arithmetic and control portion, said storage portion including two temporary storage registers and a number of additional and equivalent registers, a selecting circuit coupled to said registers for selecting two of said registers to cooperate with one another as active and passive nonaddressable registers respectively in response to a function to be performed by said arithmetic and control portion and for interchanging the active and passive registers prior to the entry of nonaddressed data into a register of said cooperating pair of registers, a typewriter having a movable carriage thereon and adapted to function as an input and output unit for said computing apparatus, program selecting means coupled to said typewriter and including a plurality of manually activated program selecting devices, said program selecting means adapted to provide at least two D.C. level signals which identify a function to be performed by said arithmetic and control portion in response to a predetermined combination of said typewriter carriage position and at least one activated manually activated program selecting device, means for producing sequentially occurring pulses coupled to said arithmetic and control portion, and signal generating means coupled to said arithmetic and control portion and adapted to receive the D.C. level signals produced by said program selecting means and the pulses produced by said sequential pulse producing means for providing a plurality of signals which enable the arithmetic and control portion to perform the function identified by said D.C. level signals.

62. The combination according to claim 61 wherein said program selecting means further includes a plurality of manually activated program modifying devices adapted, when activated, to modify in a predetermined manner the program caused to be selected by said typewriter carriage position and at least one activated manually activated program selecting device.

63. The computing apparatus of claim 61 wherein said sequential pulse producing means includes an oscillator coupled to and controlled by said arithmetic and control portion, and a counter adapted to receive and be stepped by the output of said oscillator to provide a plurality of sequentially occurring output pulses each of which correspond to a particular count in said counter.

64. The computing apparatus according to claim 63 wherein said sequential pulse producing means further includes switching means coupled between said oscillator and said counter and controlled by said arithmetic and control portion for switching the output of said oscillator between said counter and said arithmetic and control portion.

65. Computing apparatus according to claim 61 wherein at least one activated program selecting device causes said typewriter to automatically tabulate to obtain the carriage position which, in combination with said activated program selecting device, causes said program selecting means to provide at least two D.C. level signals.

References Cited

UNITED STATES PATENTS

| | | | |
|---|---|---|---|
| 3,020,525 | 2/1962 | Garrison et al. | 340—172.5 |
| 3,138,702 | 6/1964 | Heming et al. | 340—172.5 |
| 3,161,763 | 12/1964 | Glaser | 340—172.5 |
| 3,196,260 | 7/1965 | Pugmire | 235—173 |
| 3,228,005 | 1/1966 | Delmege et al. | 340—172.5 |
| 3,242,317 | 3/1966 | Reiss et al. | 340—172.5 |
| 3,293,613 | 12/1966 | Gabor | 340—172.5 |
| 3,319,228 | 5/1967 | Apple | 340—172.5 |
| 3,341,819 | 9/1967 | Emerson | 340—172.5 |
| 3,345,619 | 10/1967 | Anderson et al. | 340—172.5 |
| 3,353,163 | 11/1967 | Soule et al. | 340—172.5 |

PAUL J. HENON, *Primary Examiner.*

J. P. VANDENBURG, *Assistant Examiner.*

U.S. Cl. X.R.

235—156, 168